United States Patent
Kim et al.

(10) Patent No.: US 10,796,564 B2
(45) Date of Patent: Oct. 6, 2020

(54) REMOTE CONTROL APPARATUS CAPABLE OF REMOTELY CONTROLLING MULTIPLE DEVICES

(71) Applicant: LG ELECTRONICS INC., Seoul (KR)

(72) Inventors: Dongik Kim, Seoul (KR); Seulki Jung, Seoul (KR); Sunho Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/568,660

(22) PCT Filed: Apr. 22, 2016

(86) PCT No.: PCT/KR2016/004215
§ 371 (c)(1),
(2) Date: Oct. 23, 2017

(87) PCT Pub. No.: WO2016/171506
PCT Pub. Date: Oct. 27, 2016

(65) Prior Publication Data
US 2018/0165951 A1 Jun. 14, 2018

(30) Foreign Application Priority Data

Apr. 23, 2015 (KR) .................. 10-2015-0057462

(51) Int. Cl.
*H04L 12/28* (2006.01)
*G08C 17/02* (2006.01)
(Continued)

(52) U.S. Cl.
CPC .............. *G08C 23/04* (2013.01); *G06F 3/167* (2013.01); *H04L 12/2838* (2013.01);
(Continued)

(58) Field of Classification Search
CPC .......... G06F 3/16; G06F 3/017; G06F 3/0304; G08C 2201/31; G08C 2201/61;
(Continued)

(56) References Cited

U.S. PATENT DOCUMENTS

| 2008/0066094 | A1* | 3/2008 | Igoe | .................... H04L 12/2809 725/25 |
| 2010/0141578 | A1* | 6/2010 | Horiuchi | ................. G06F 3/017 345/158 |

(Continued)

FOREIGN PATENT DOCUMENTS

| KR | 10-2004-0058401 A | 7/2004 |
| KR | 10-0703207 B1 | 4/2007 |

(Continued)

*Primary Examiner* — Dionne Pendleton
(74) *Attorney, Agent, or Firm* — Birch, Stewart, Kolasch & Birch, LLP

(57) ABSTRACT

The present invention relates to a remote control apparatus which can remotely control multiple devices. A remote control apparatus according to an embodiment of the present invention comprises: a key input unit having multiple keys; a reception unit for receiving at least one device identification signal from at least one device or a transmission device corresponding to the device; a processor for detecting an identification signal for a device, which can be remotely controlled, from the at least one received device identification signal, extracting information on a control command for the remote control of the device, on the basis of the detected identification signal, and matching at least one of the multiple keys to the control command for the remote control of the device, on the basis of the extracted information on the control command; and a transmission unit for transmitting a signal corresponding to the control command when the key matched to the control command is selected. Accordingly, the present invention can remotely control multiple devices.

21 Claims, 105 Drawing Sheets

(51) Int. Cl.
*G08C 17/00* (2006.01)
*H04N 5/44* (2011.01)
*G08C 23/04* (2006.01)
*H04Q 9/00* (2006.01)
*H04N 21/422* (2011.01)
*G06F 3/16* (2006.01)

(52) U.S. Cl.
CPC ......... *H04N 21/42225* (2013.01); *H04Q 9/00* (2013.01); *G08C 2201/31* (2013.01); *G08C 2201/42* (2013.01); *G08C 2201/61* (2013.01); *G08C 2201/70* (2013.01); *G08C 2201/92* (2013.01); *G08C 2201/93* (2013.01); *H04N 21/42213* (2013.01); *H04N 21/42222* (2013.01); *H04N 2005/4428* (2013.01)

(58) Field of Classification Search
CPC ............ G08C 2201/70; G08C 2201/92; G08C 23/04; G08C 17/02; G08C 2201/30; G08C 15/04; G08C 17/00; G08C 19/00; G08C 19/28; G08C 2201/20; G08C 2201/32; G08C 2201/93; G08C 2201/42; H04N 2005/4428; H04N 21/42213; H04N 21/42222; H04N 21/42225; H04N 21/42204; H04N 21/4223; H04N 21/4312; H04N 21/440263; H04N 21/4415; H04N 21/44218; H04N 21/45455; H04N 21/4751; H04N 21/4821; H04N 5/4403; H04N 5/44543; H04Q 9/00; G06K 9/0002; G06K 9/00093; H04L 12/2818; H04L 12/2838; H04L 21/43615; H04L 21/42204; H04L 21/4131; H04L 2005/4435; H04L 2005/4412

See application file for complete search history.

(56) References Cited

U.S. PATENT DOCUMENTS

| | | | |
|---|---|---|---|
| 2014/0049417 A1* | 2/2014 | Abdurrahman | G08C 19/00 341/176 |
| 2014/0267933 A1* | 9/2014 | Young | H04N 5/4403 348/734 |
| 2016/0104371 A1* | 4/2016 | Selfe | G08C 17/02 340/4.32 |
| 2016/0373800 A1* | 12/2016 | Lin | H04N 21/42222 |
| 2017/0272266 A1* | 9/2017 | Zhu | H04L 12/2807 |
| 2018/0068555 A1* | 3/2018 | Su | G08C 23/04 |
| 2018/0123818 A1* | 5/2018 | Shinar | H04L 12/2834 |
| 2018/0374340 A1* | 12/2018 | Mui | G08C 23/04 |

FOREIGN PATENT DOCUMENTS

| | | |
|---|---|---|
| KR | 10-2010-0008518 A | 1/2010 |
| KR | 10-2010-0035557 A | 4/2010 |
| KR | 10-2011-0038424 A | 4/2011 |
| KR | 10-2014-0022673 A | 2/2014 |
| KR | 10-2014-0126231 A | 10/2014 |

* cited by examiner

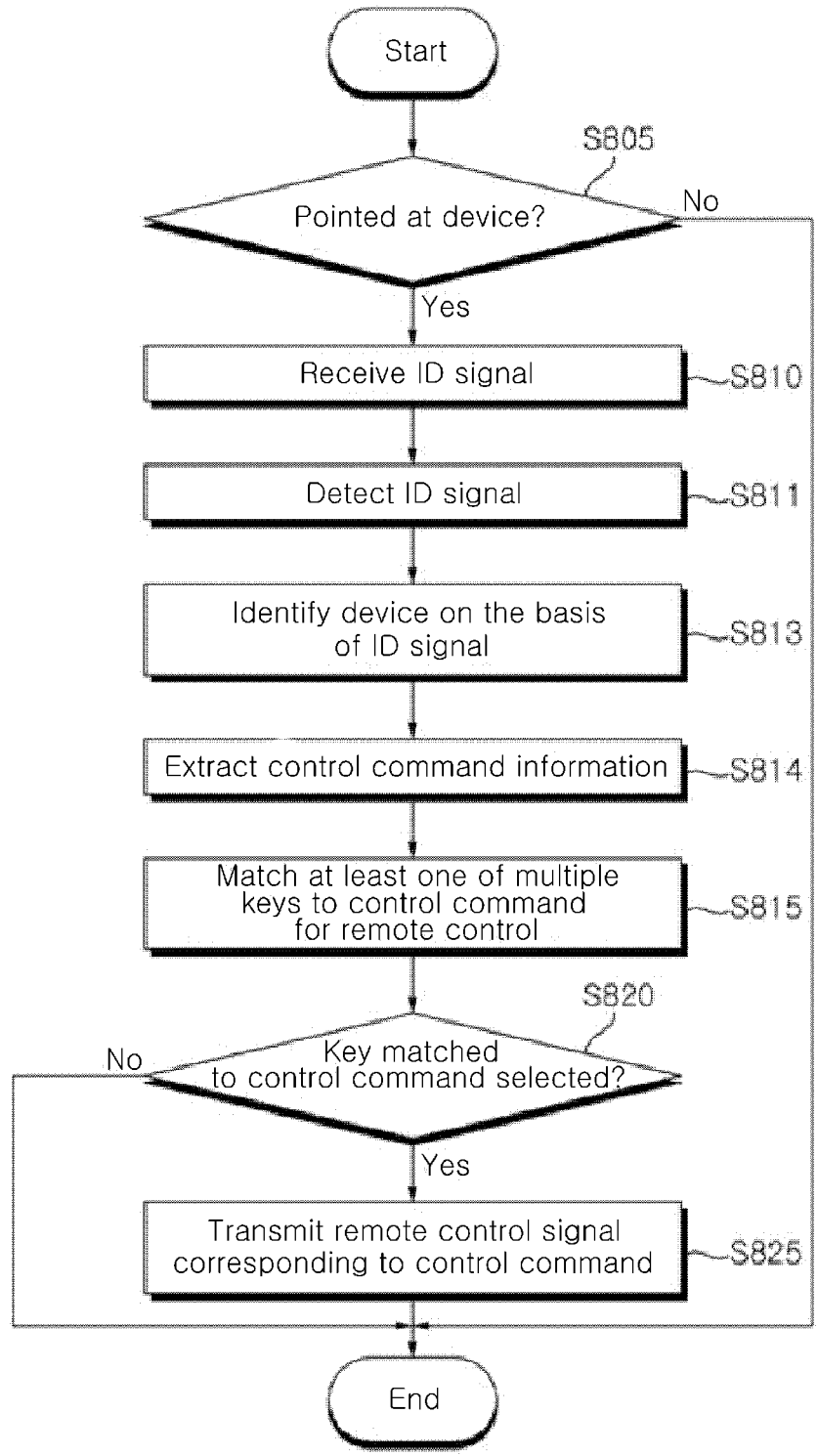

FIG. 9E
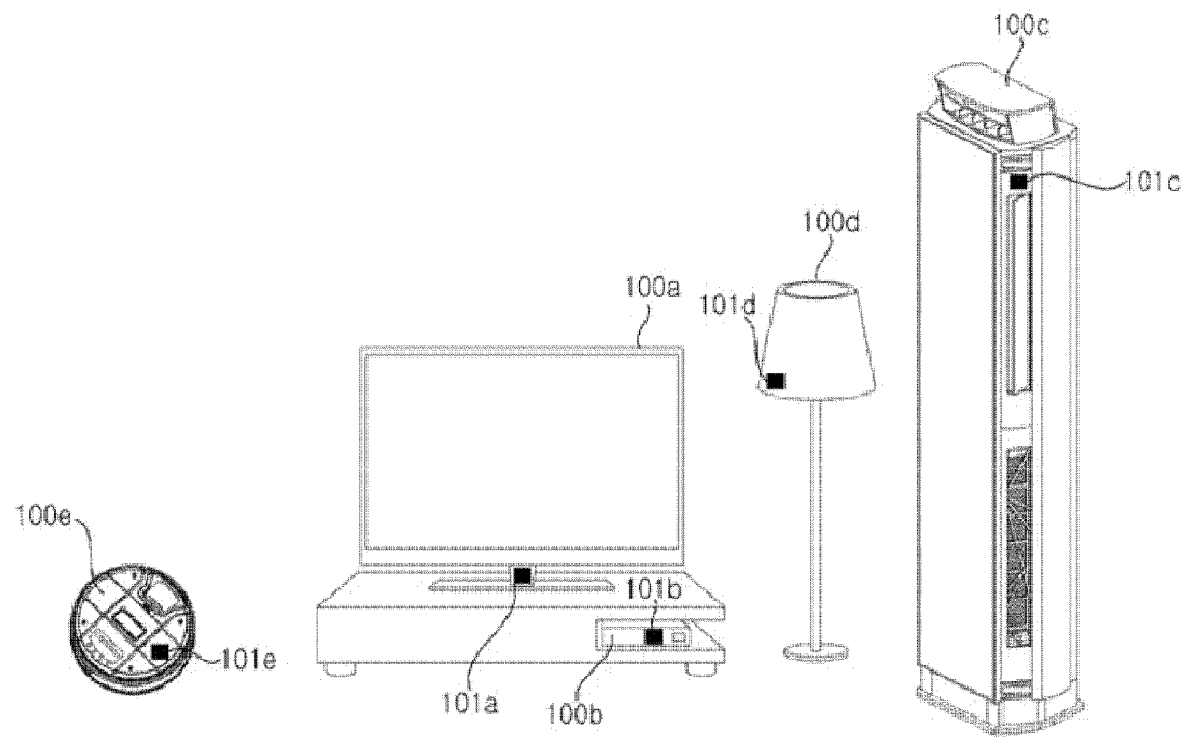
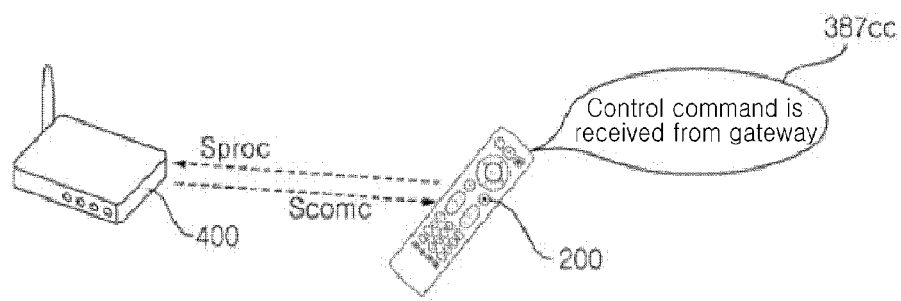

FIG. 9I
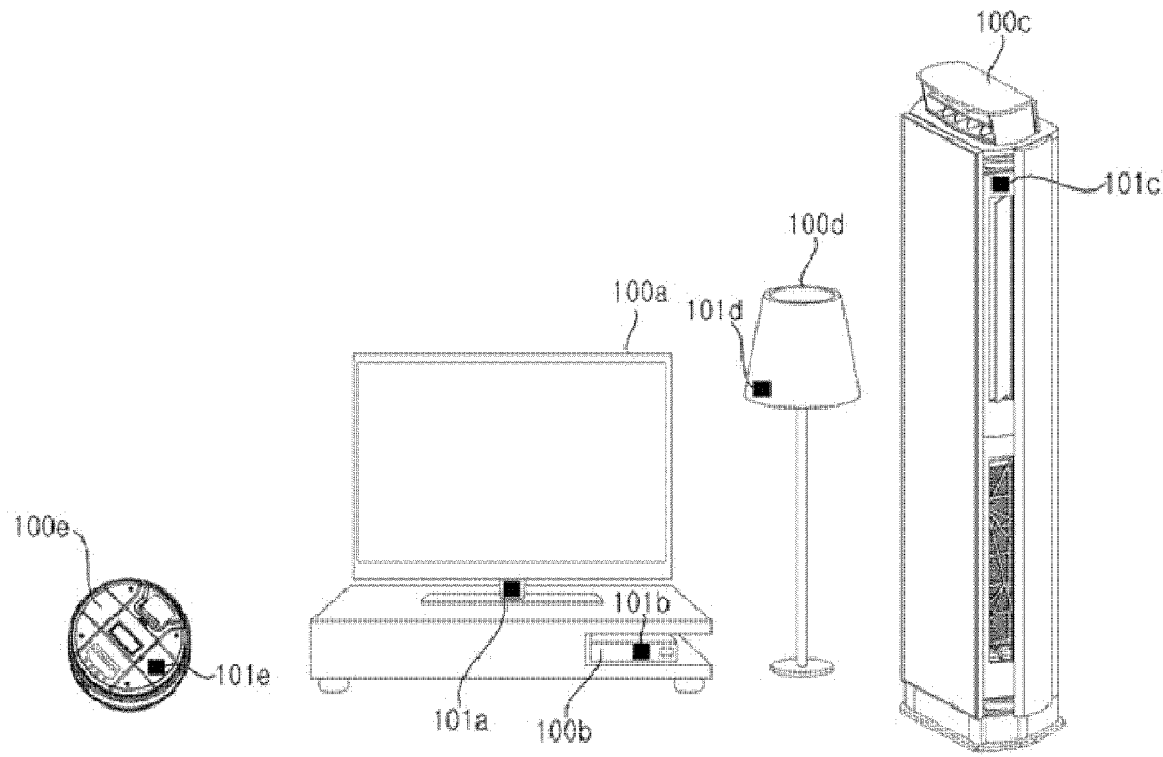
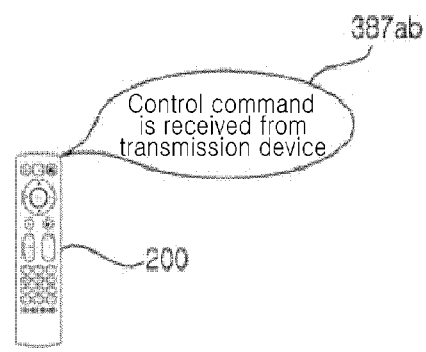

FIG. 11D
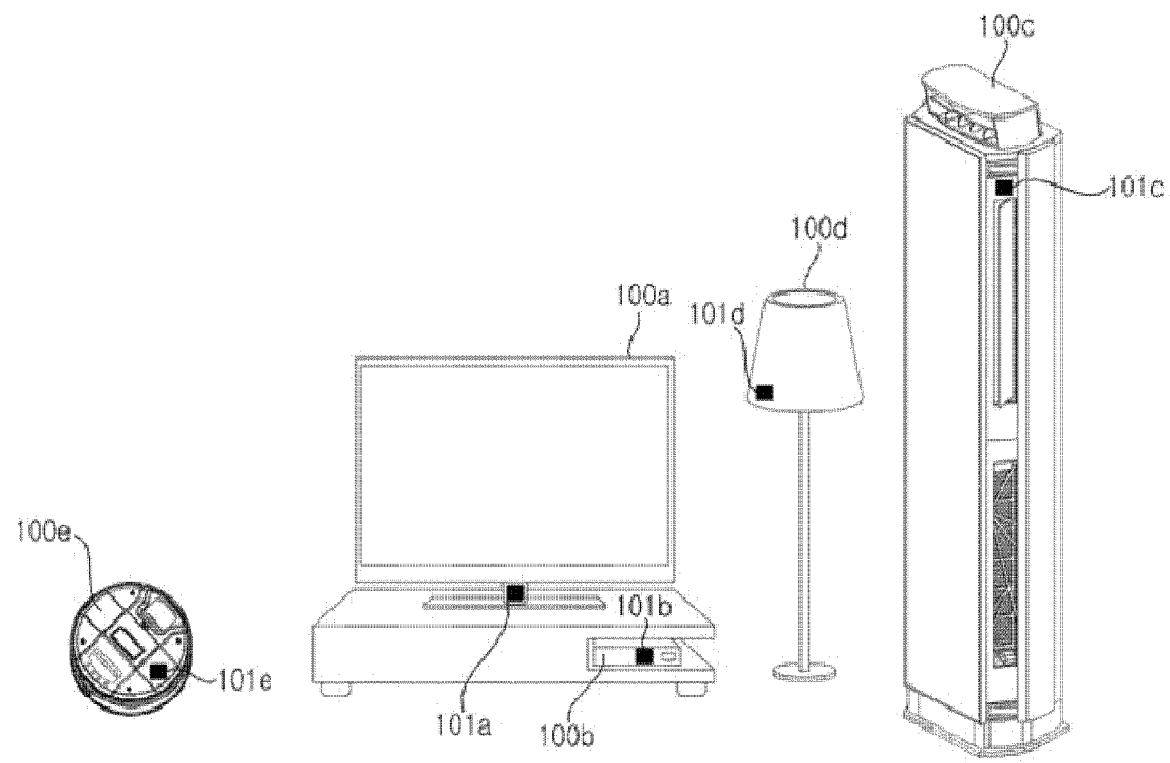
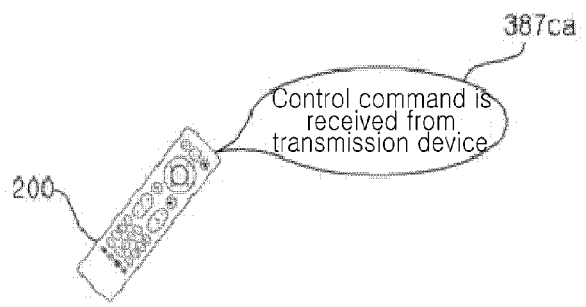

FIG. 11F
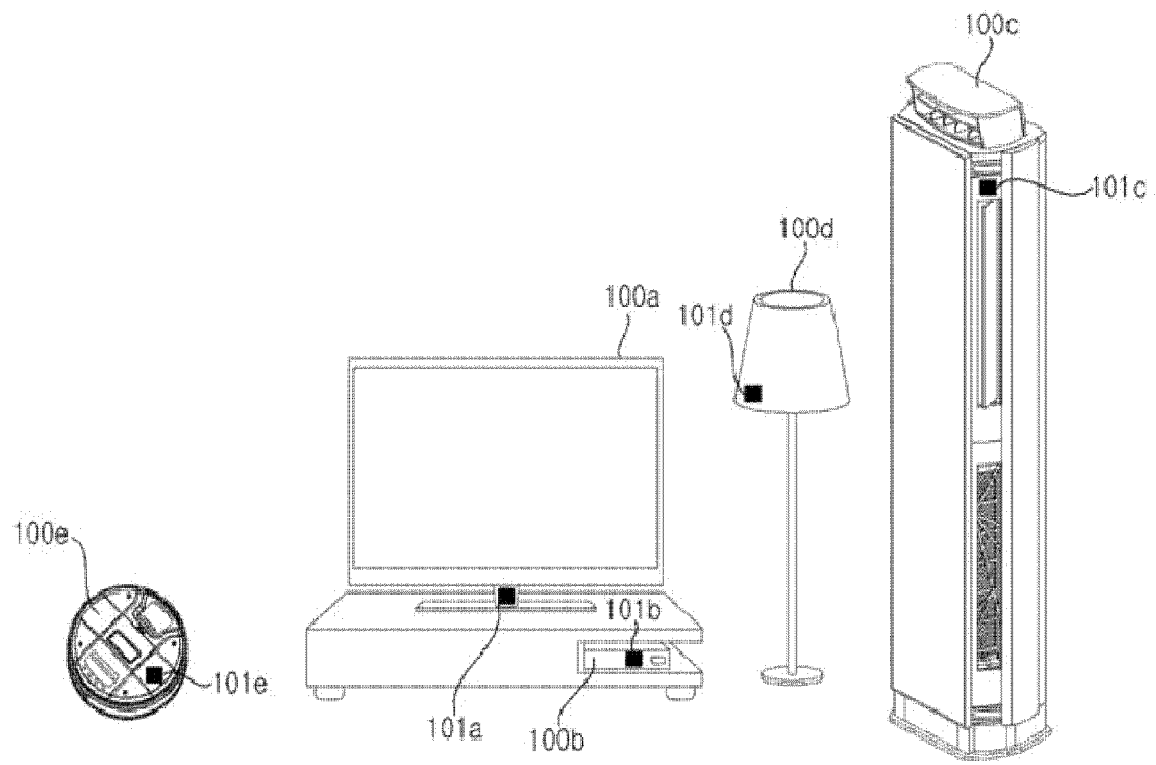
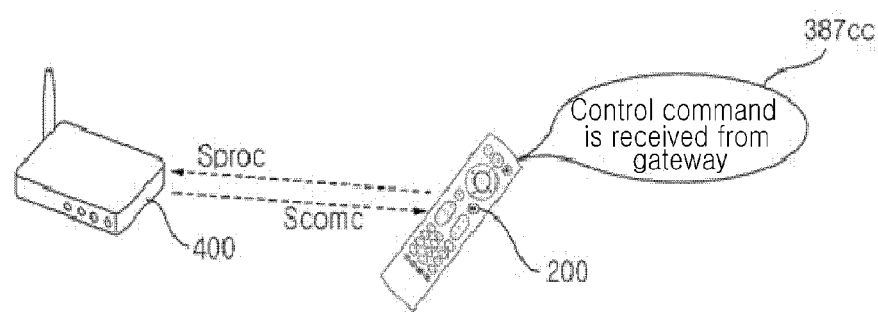

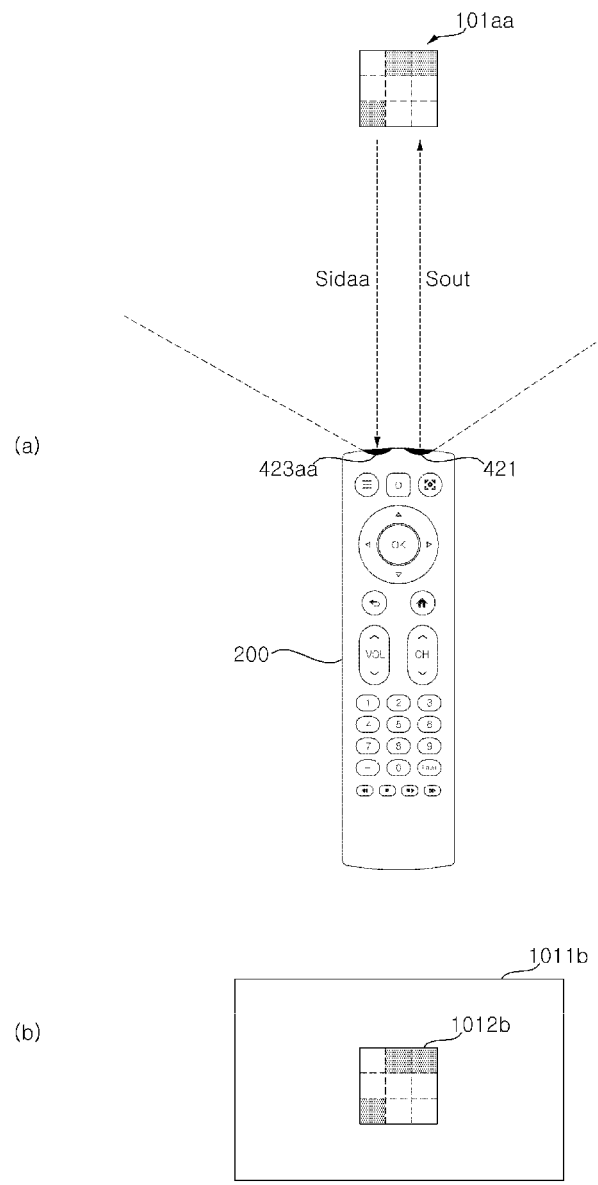

FIG. 11K
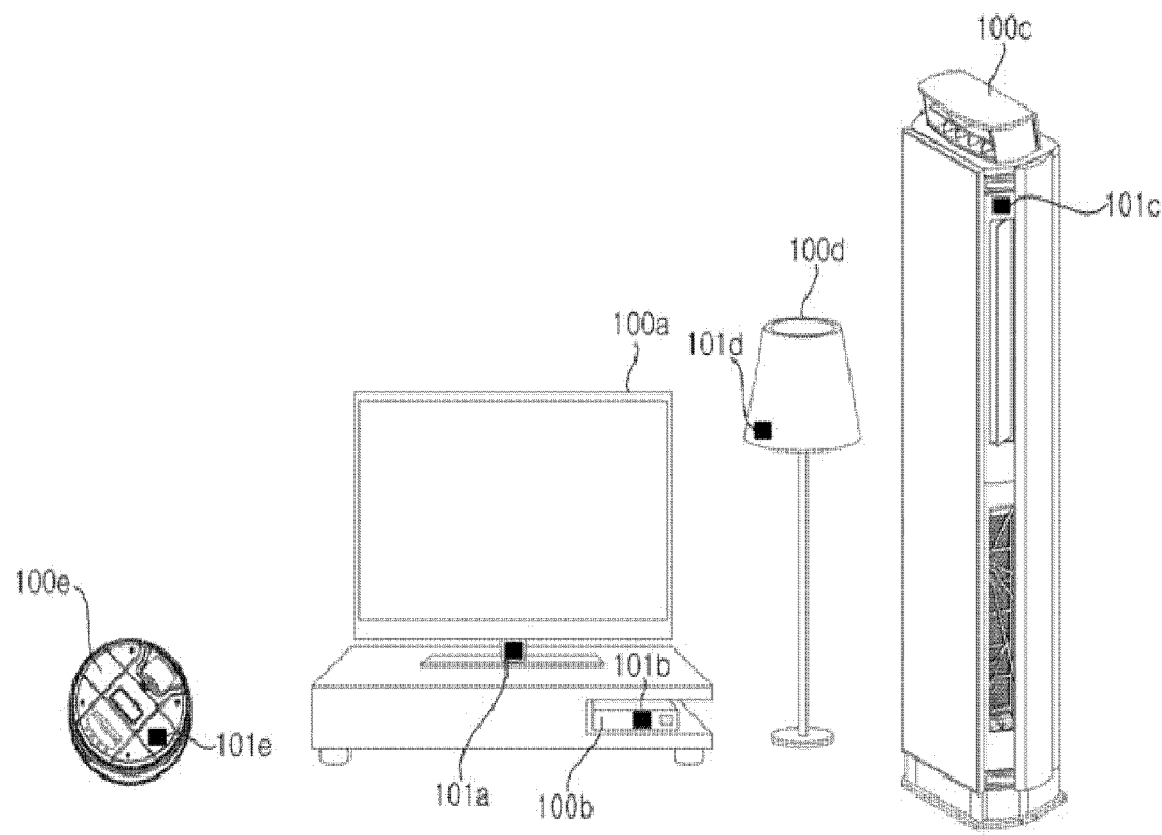
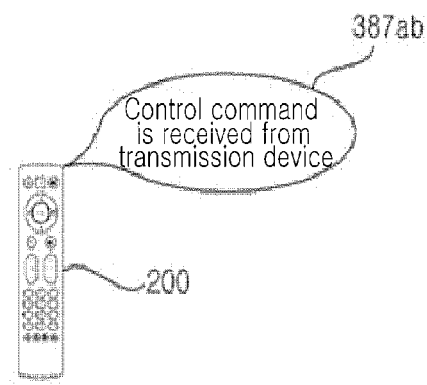

FIG. 110
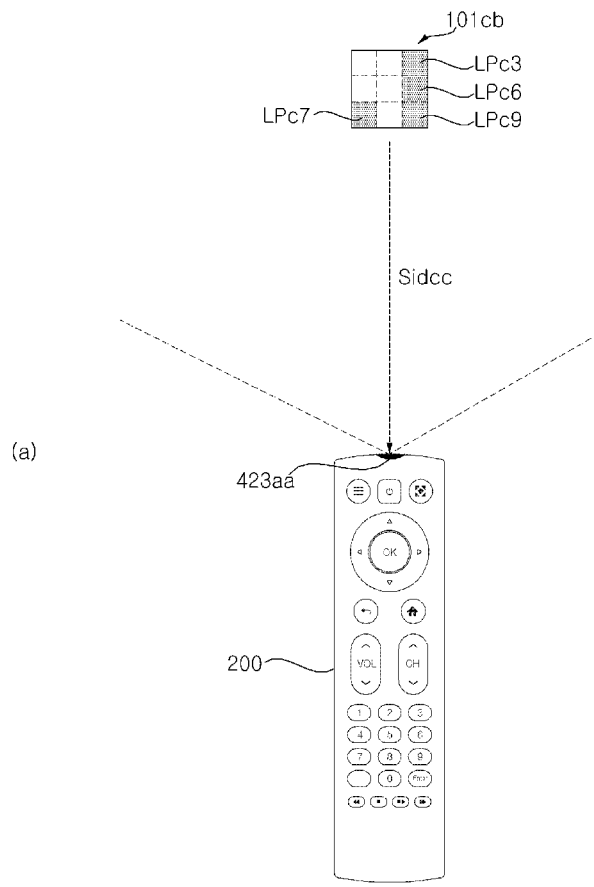
(a)
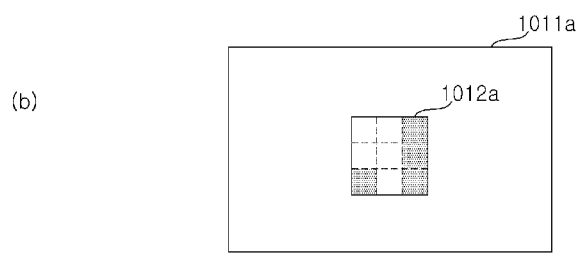
(b)

FIG. 13E
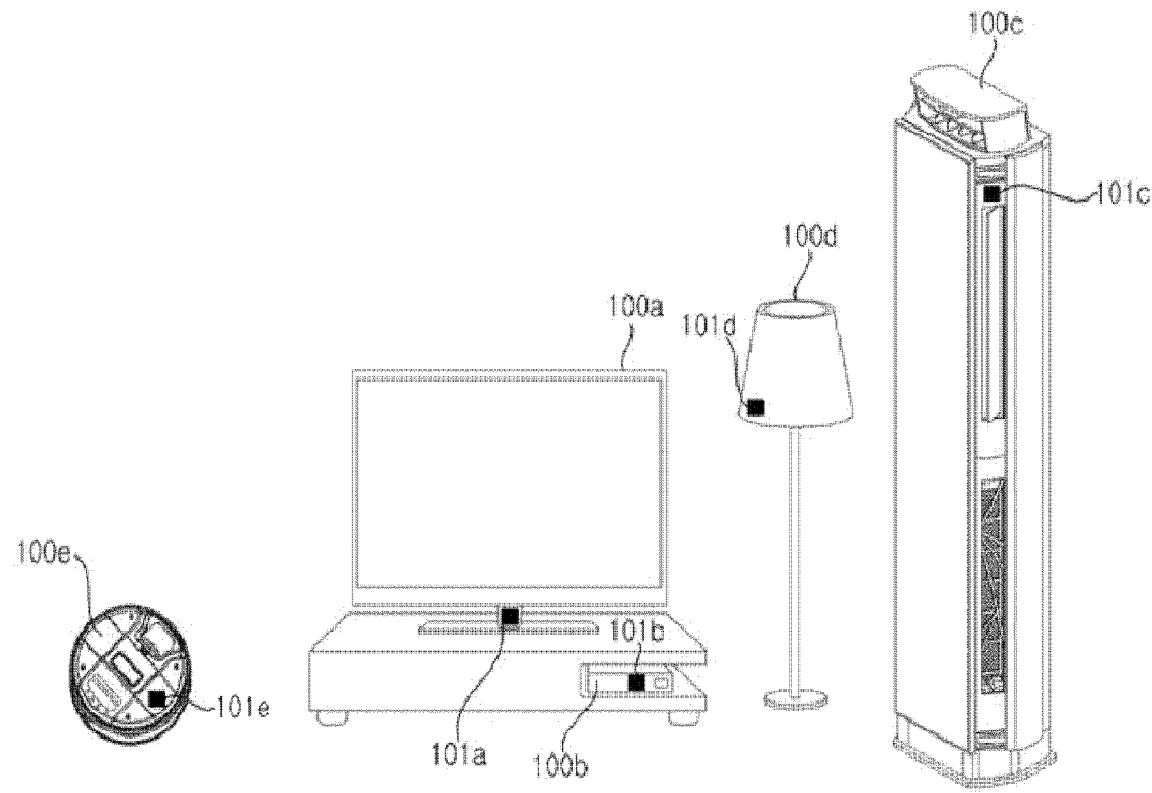
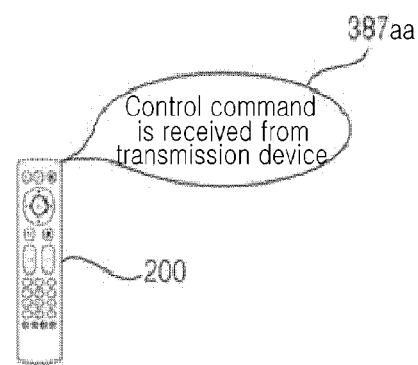

FIG. 17C
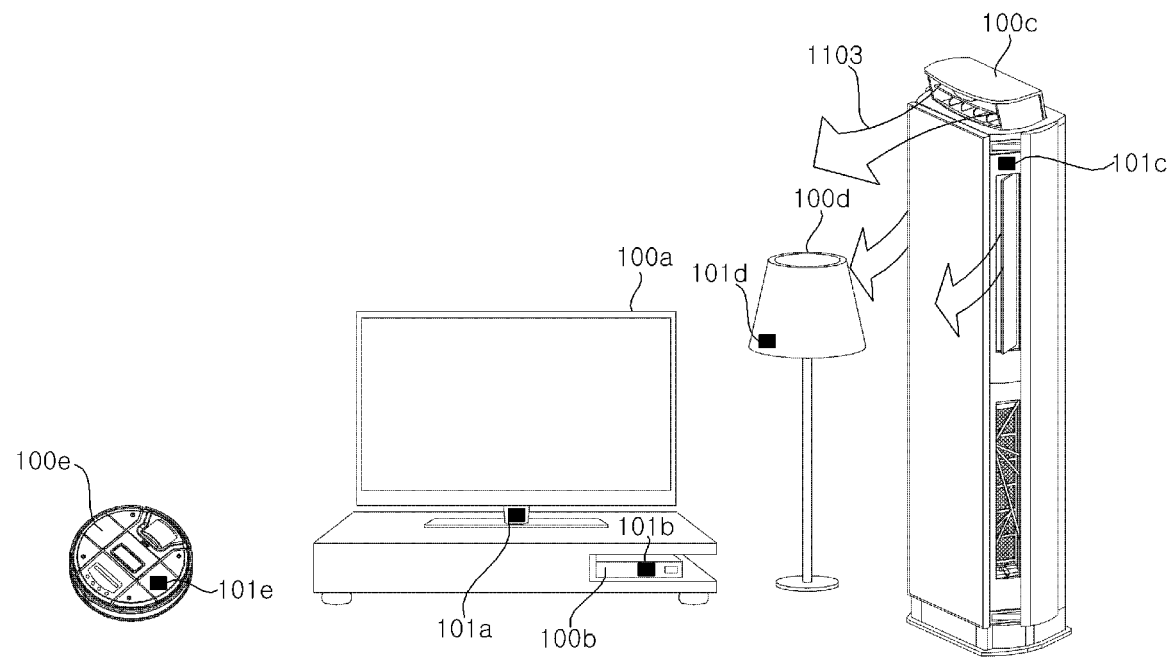
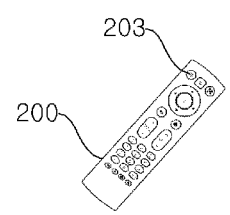

FIG. 22A
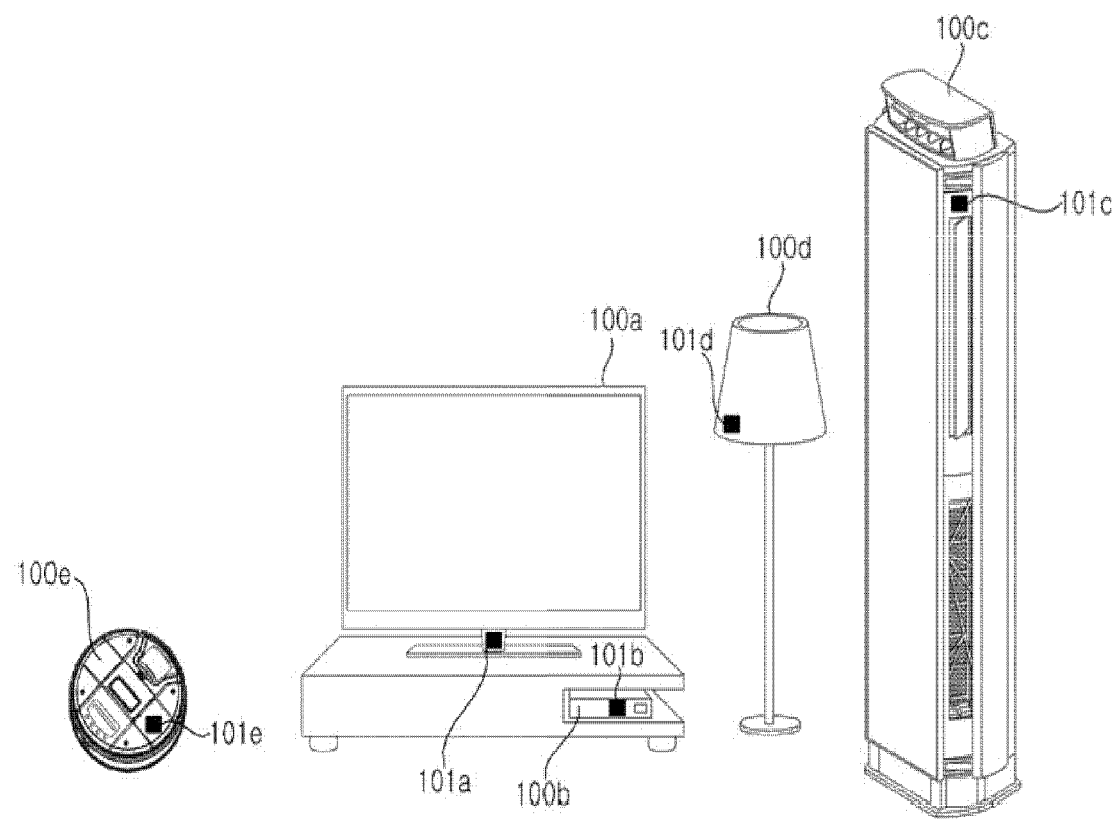
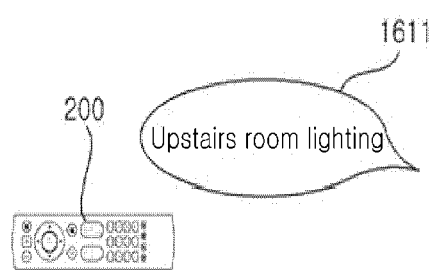

FIG. 22B
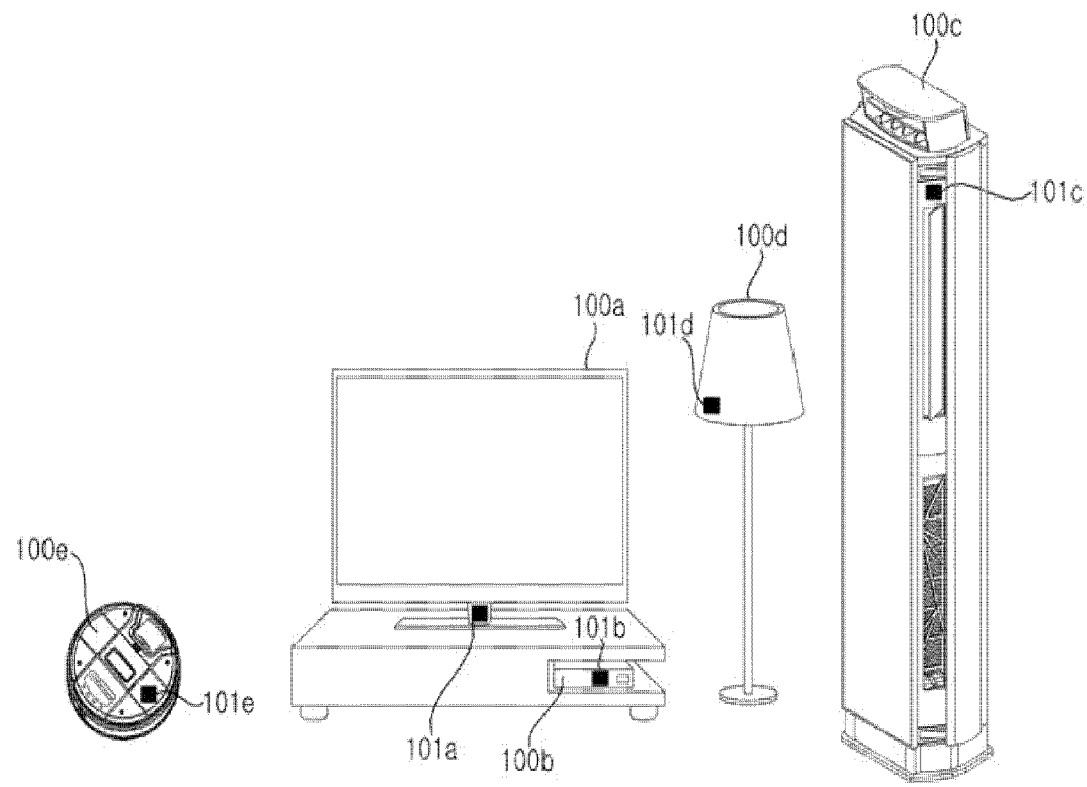
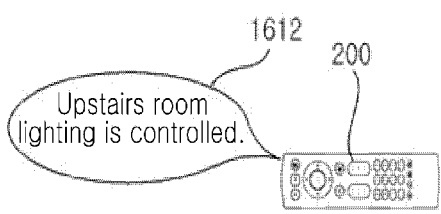

FIG. 24B
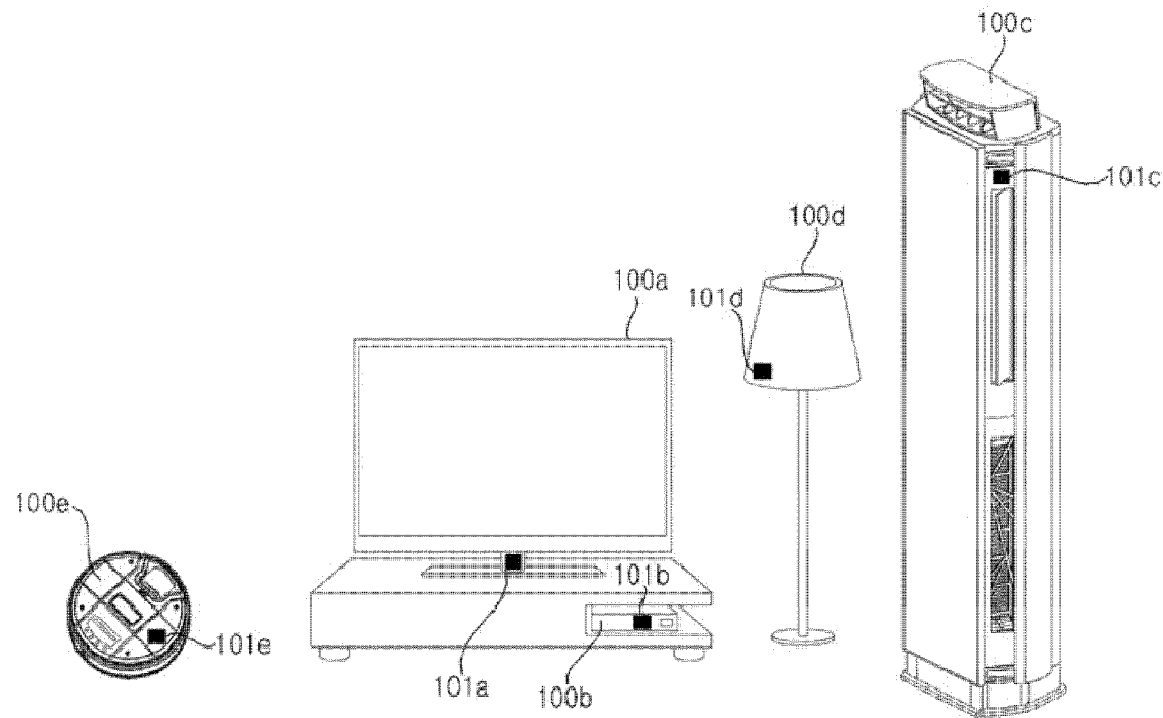
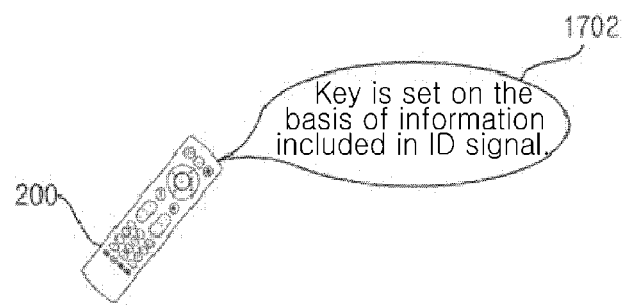

FIG. 24C
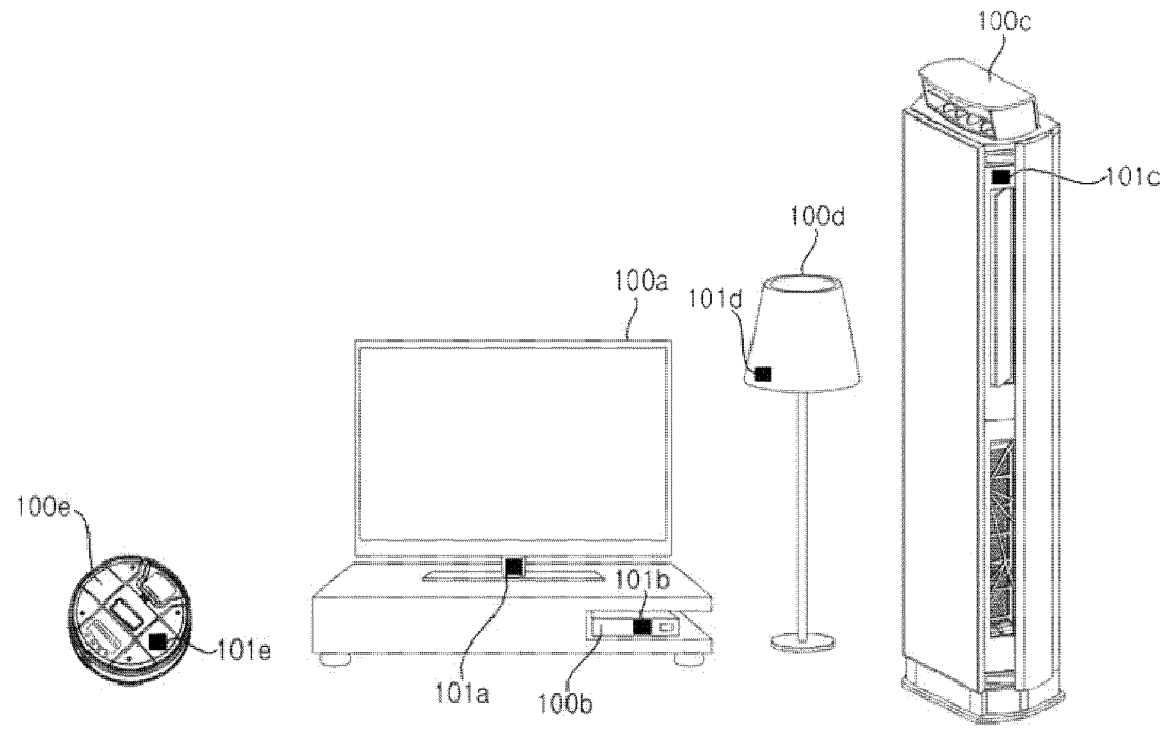
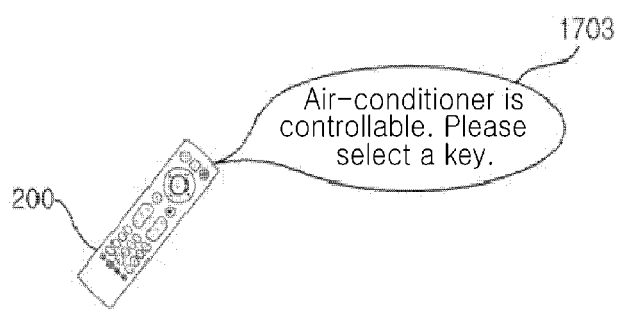

FIG. 24E
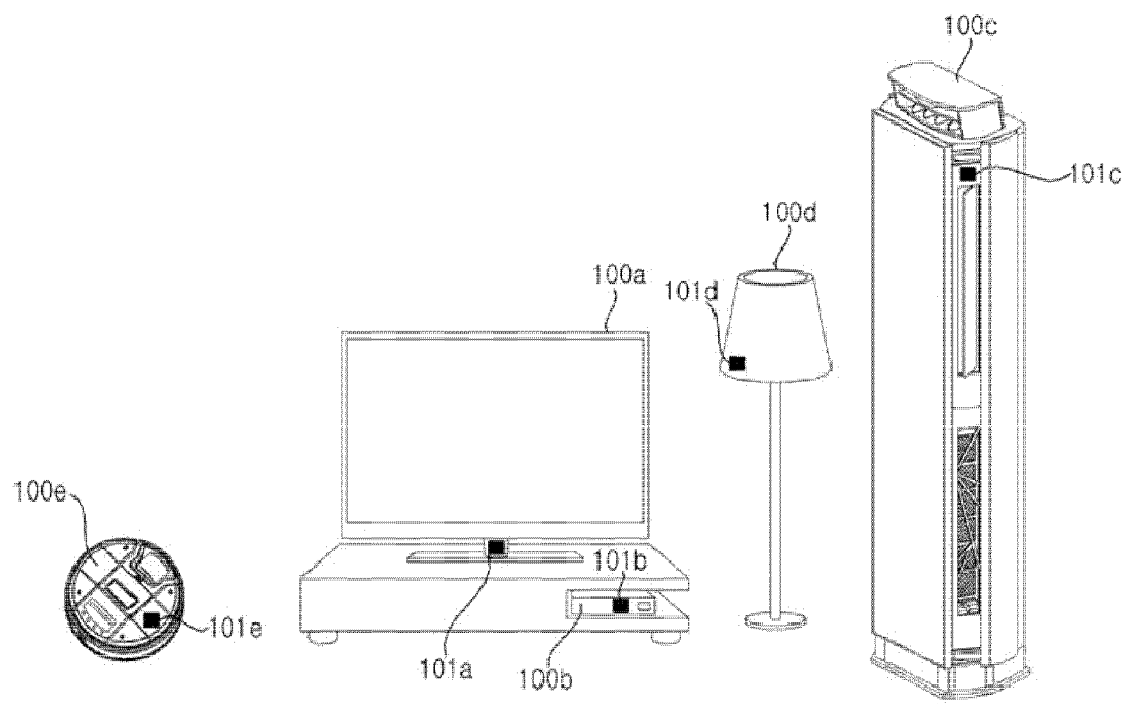
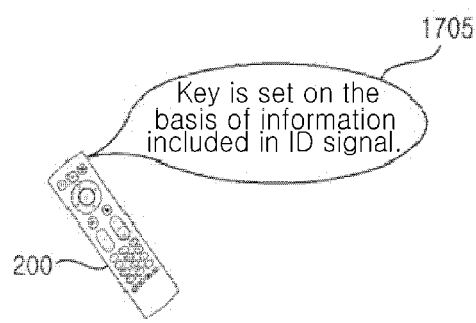

FIG. 24F
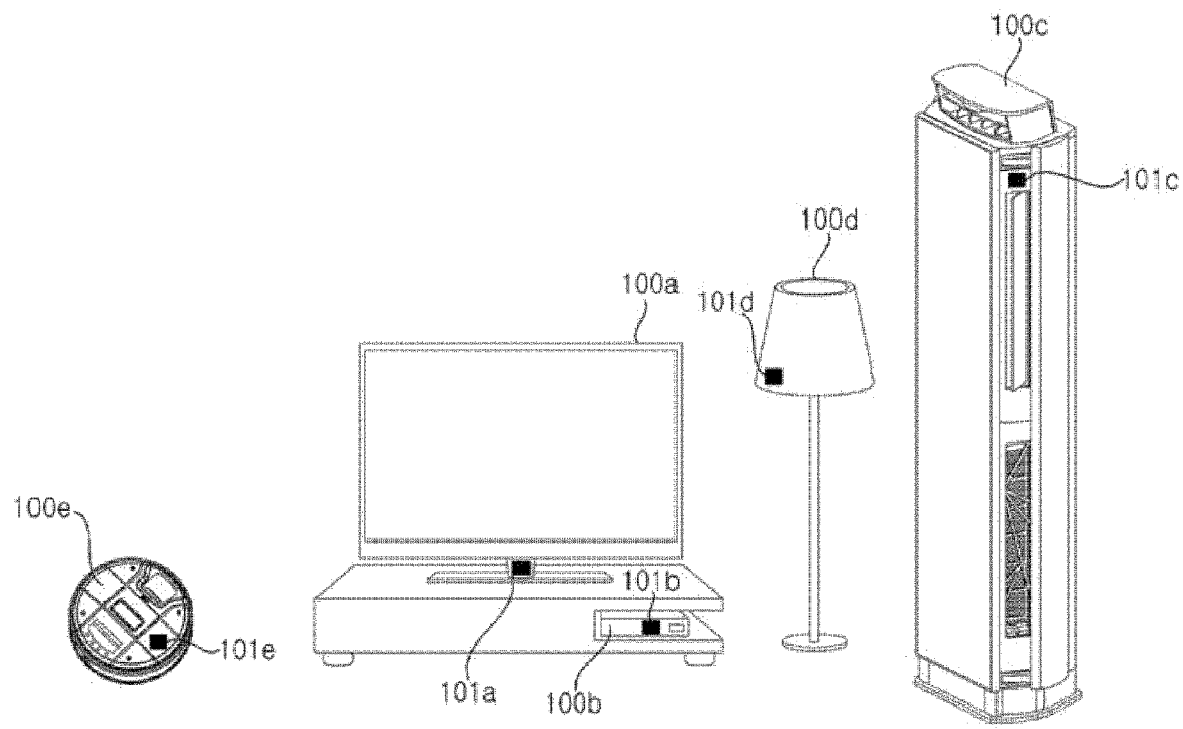
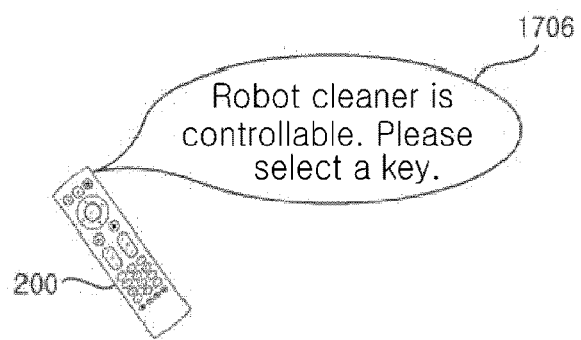

FIG. 26B
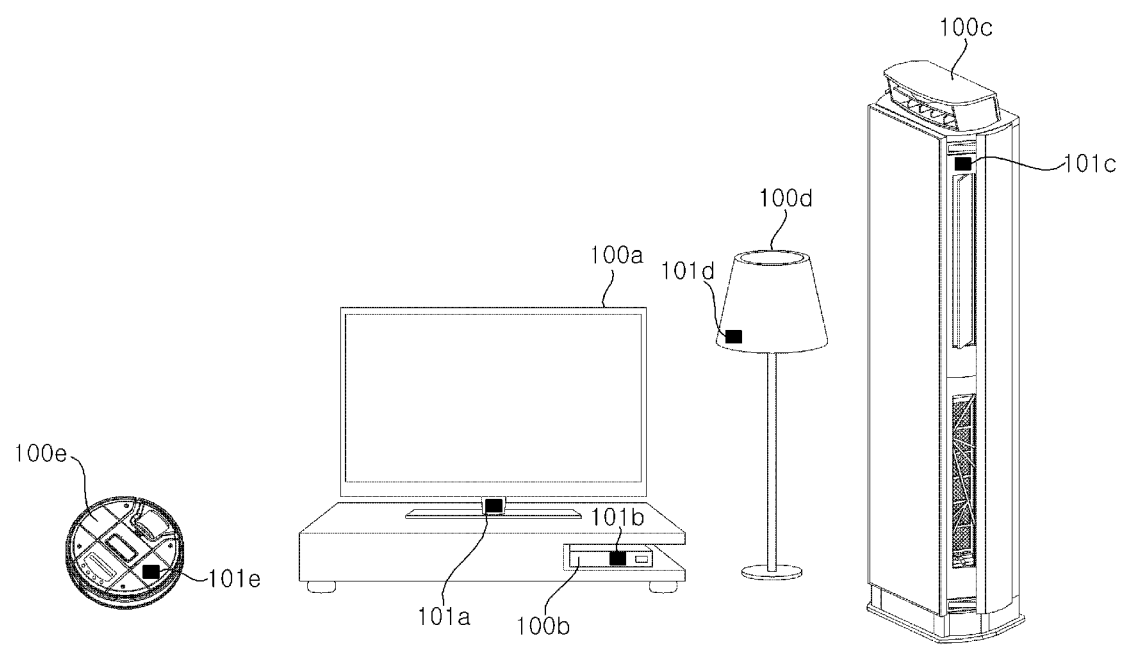
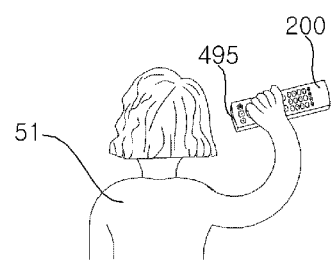

FIG. 26C
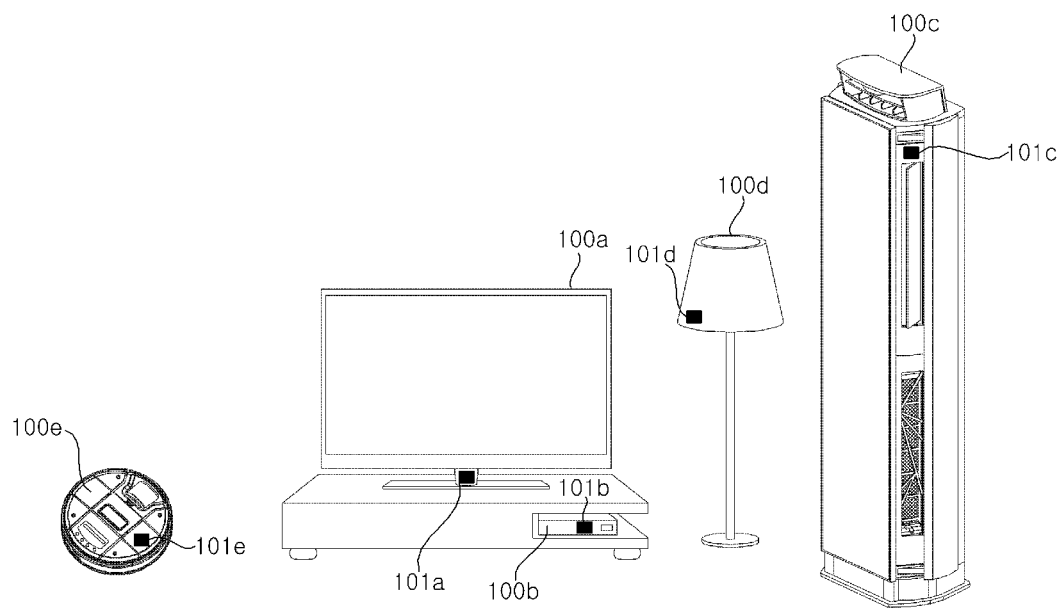
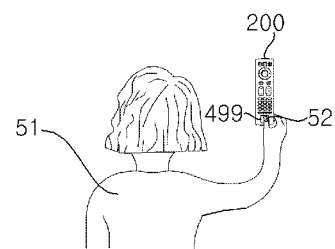

FIG. 26D
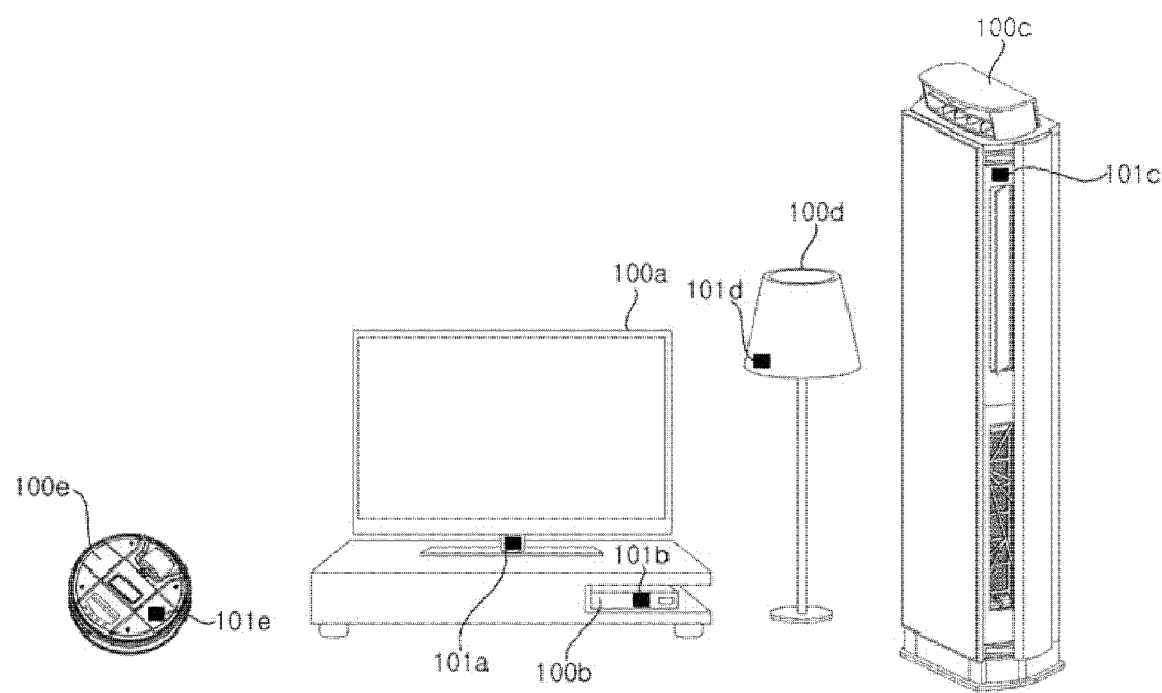
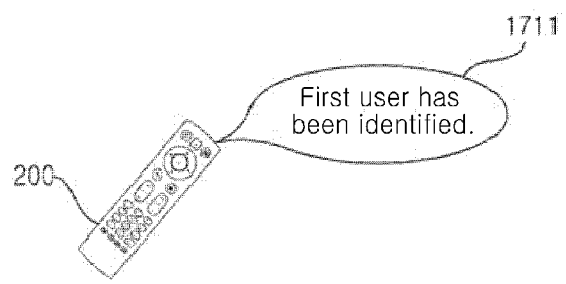
First user has been identified.

FIG. 26F
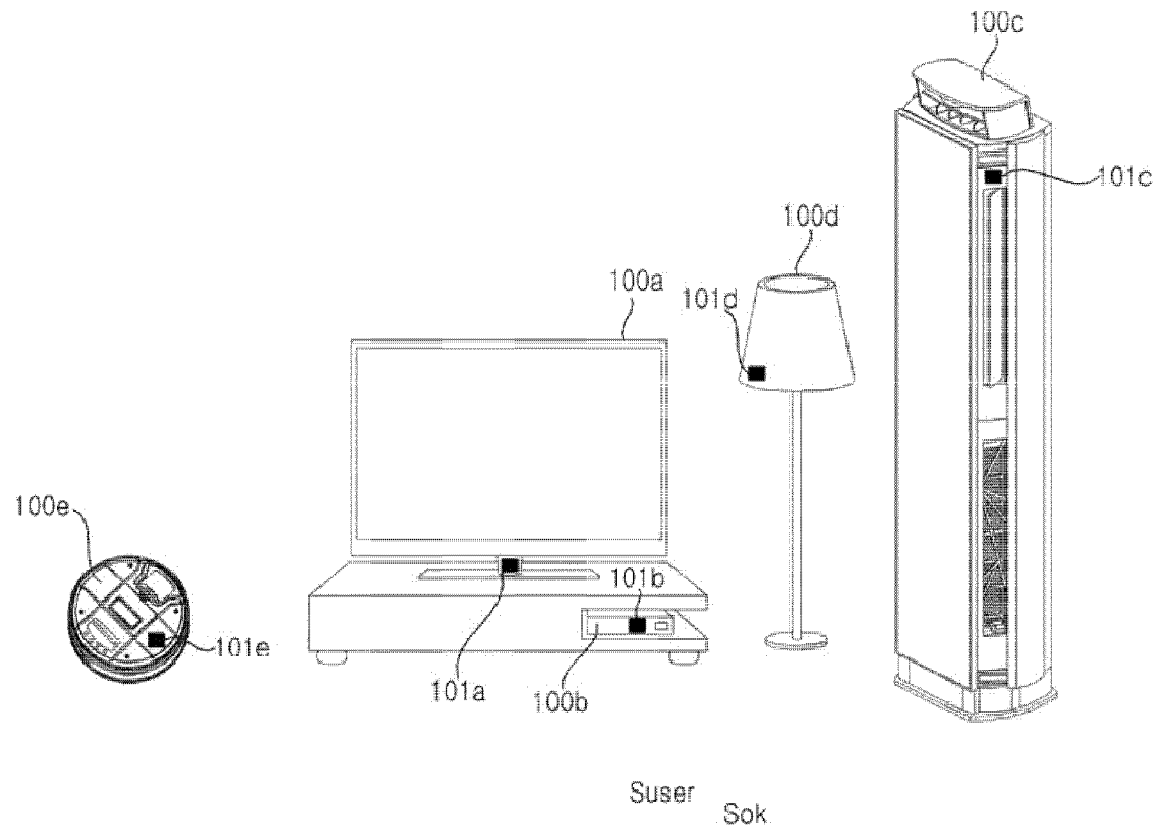
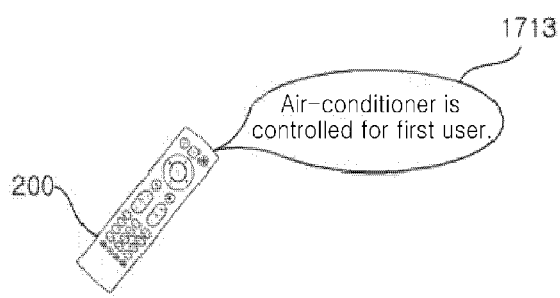

FIG. 26G
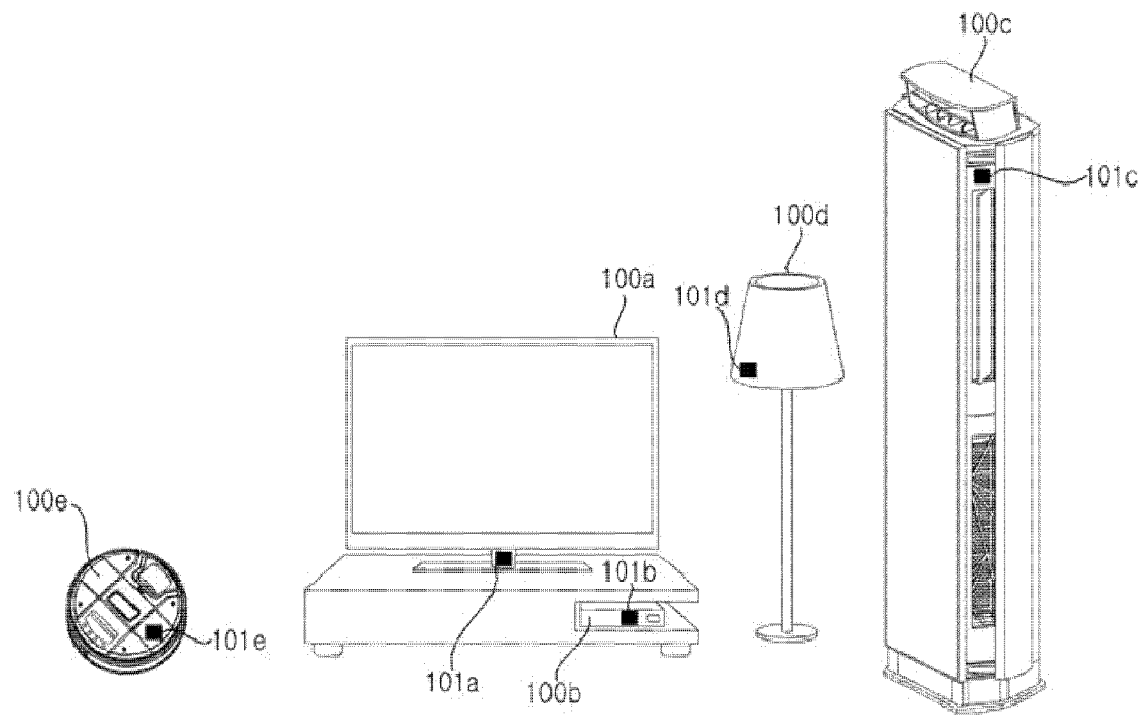
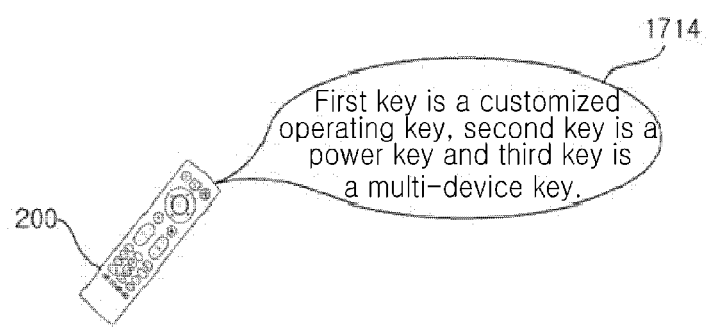

FIG. 27B
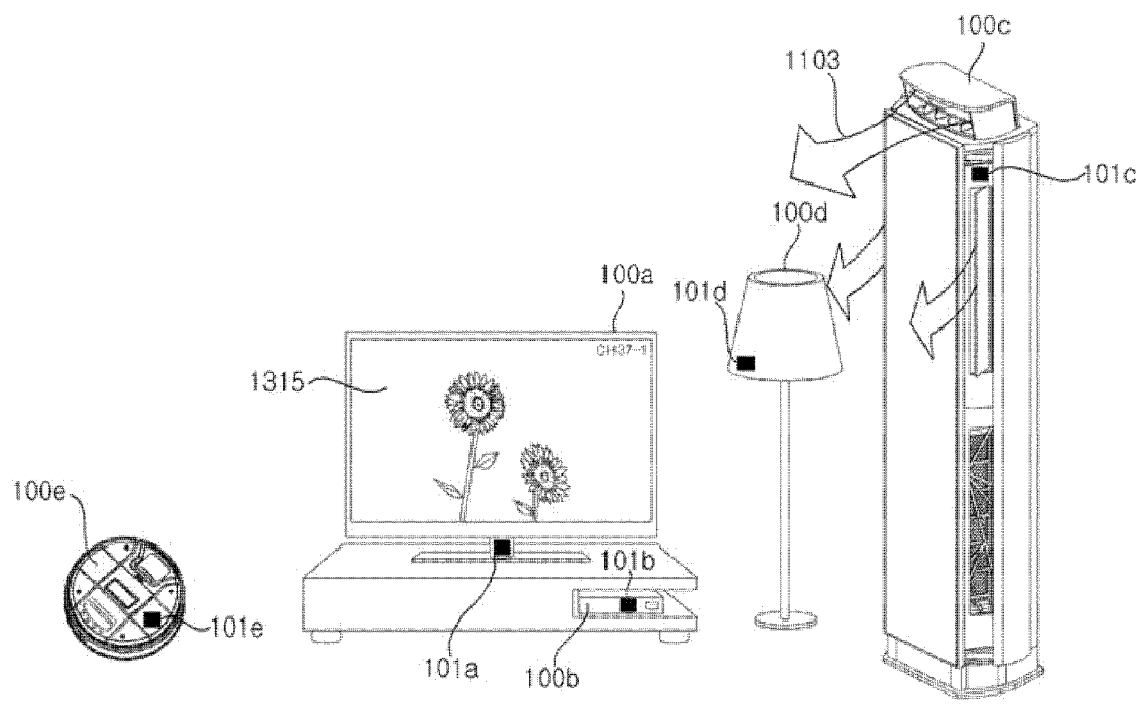

FIG. 27C
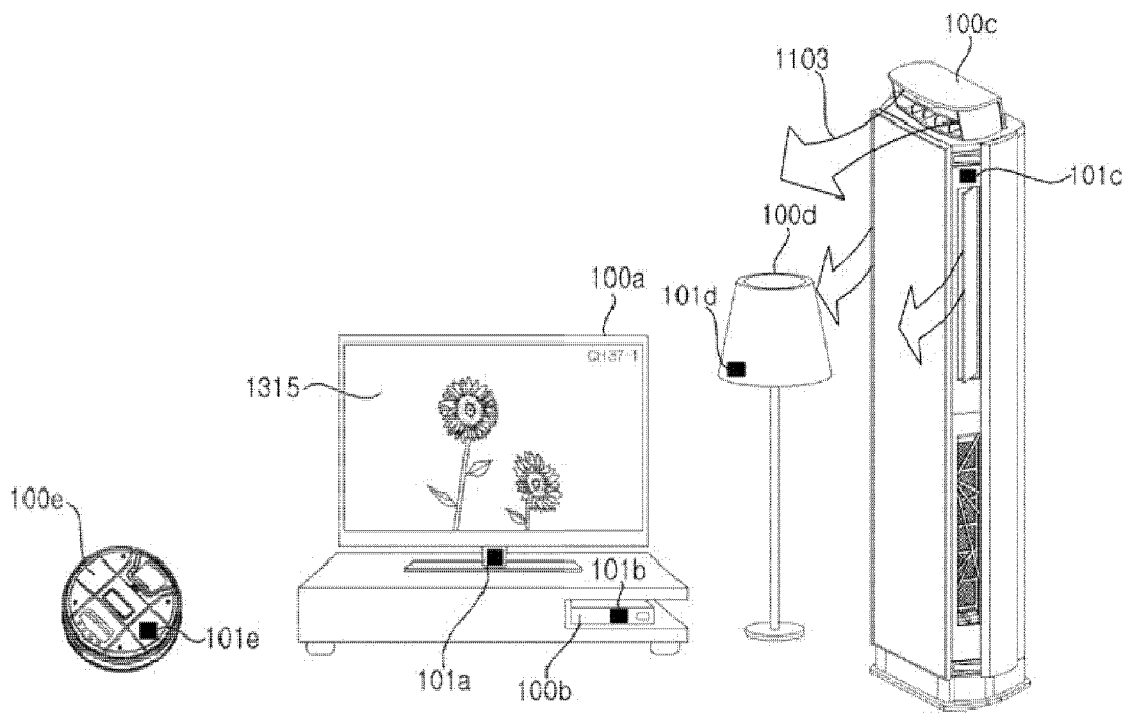
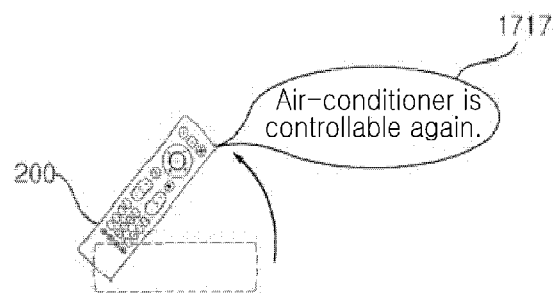

FIG. 27D
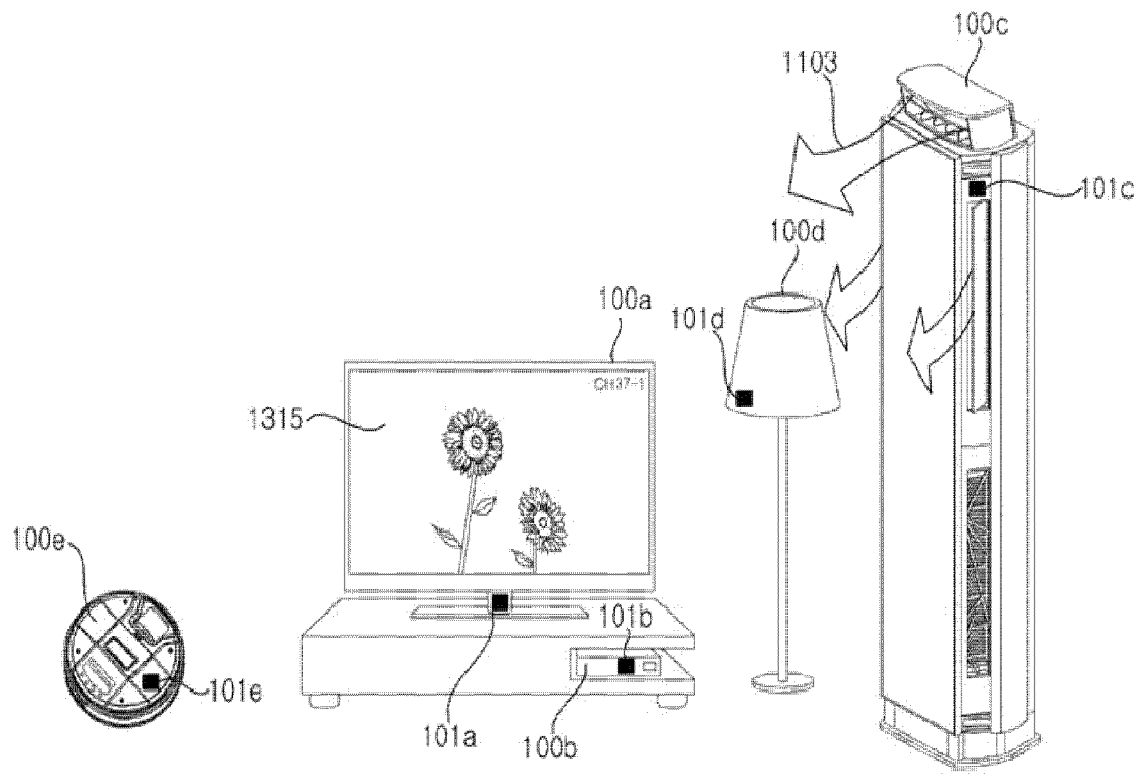
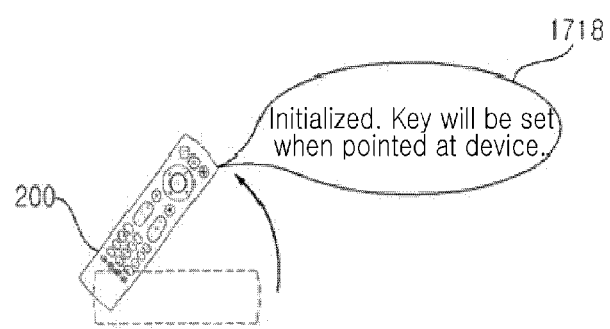

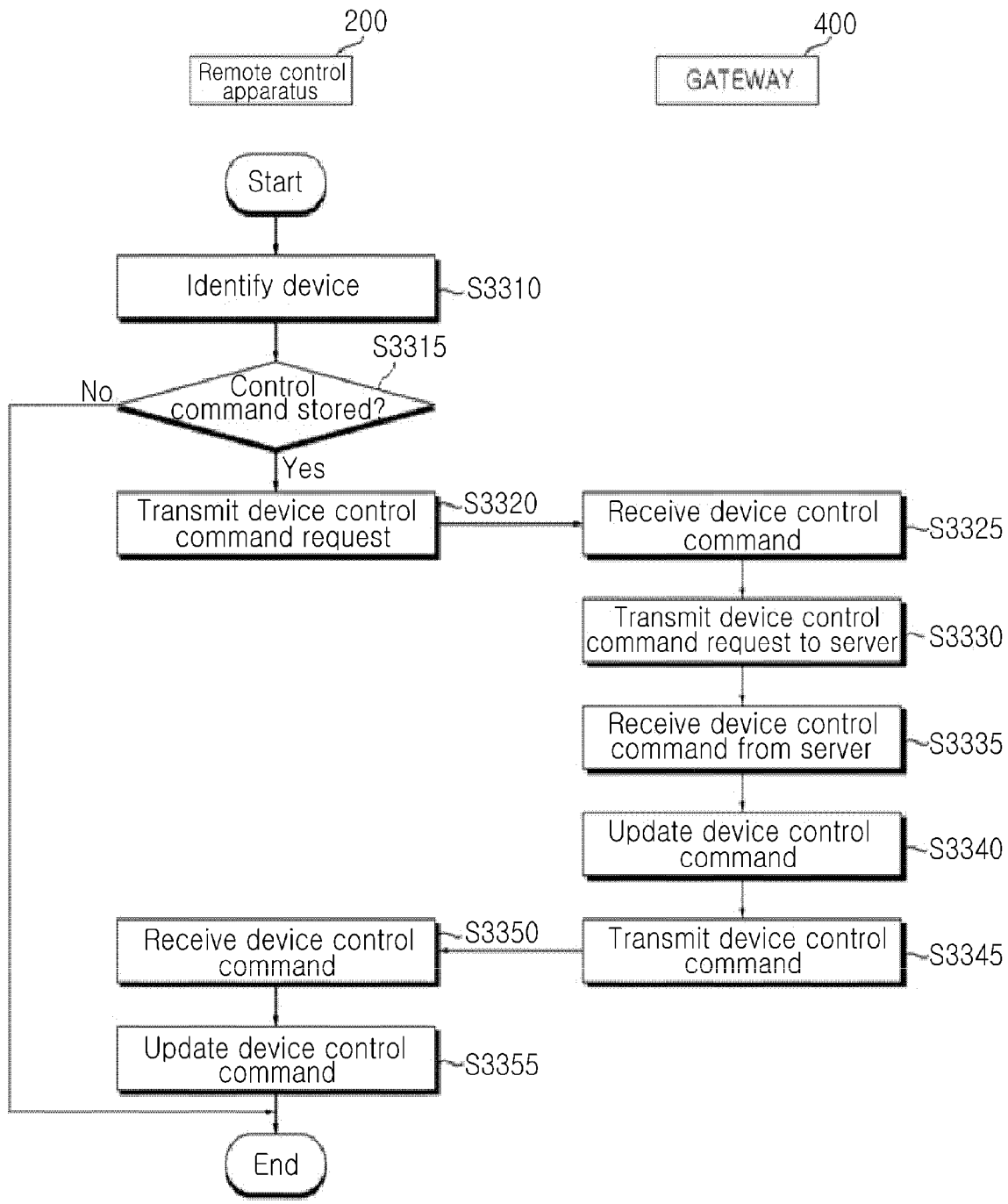

REMOTE CONTROL APPARATUS CAPABLE OF REMOTELY CONTROLLING MULTIPLE DEVICES

CROSS REFERENCE TO RELATED APPLICATIONS

This application is the National Phase of PCT International Application No. PCT/KR2016/004215, filed on Apr. 22, 2016, which claims priority under 35 U.S.C. 119(a) to Patent Application No. 10-2015-0057462, filed in the Republic of Korea on Apr. 23, 2015, all of which are hereby expressly incorporated by reference into the present application.

TECHNICAL FIELD

The present invention relates to a remote control apparatus which can remotely control multiple devices and, more specifically, to a remote control apparatus which can easily remotely control multiple devices through a terminal.

BACKGROUND ART

Remote control apparatuses are used to remotely control a TV, an air-conditioner, an optical disc player and the like.

To remotely control such electronic devices, a remote control apparatus for the TV, a remote control apparatus for the air-conditioner and a remote control apparatus for the optical disc player, to which different control codes are allocated, are used.

Although the number of electronic devices which employ a remote control apparatus increases for user convenience, it is inconvenient for a user to use electronic devices when separate remote control apparatuses are used for the respective electronic devices. Accordingly, efforts have been made to solve such user inconvenience.

DISCLOSURE

Technical Problem

An object of the present invention is to provide a remote control apparatus which can identify multiple devices and remotely control the identified devices.

Another object of the present invention is to provide a remote control apparatus having no display, which can remotely control multiple devices.

Technical Solution

To accomplish the objects, a remote control apparatus according to embodiments of the present invention includes: a key input unit including multiple keys; a receiver for receiving at least one device identification signal from at least one device or a transmission device corresponding to the device; a processor for detecting an identification signal of a remotely controllable device from the received at least one device identification signal, extracting information on a control command for remote control of the device on the basis of the detected identification signal, and matching at least one of the multiple keys to the control command for remote control of the device on the basis of the extracted information on the control command; and a transmitter for transmitting a signal corresponding to the control command when a key matched to the control command is selected.

Advantageous Effects

According to an embodiment of the present invention, the remote control apparatus can remotely control multiple devices by including a key input unit including multiple keys; a receiver for receiving at least one device identification signal from at least one device or a transmission device corresponding to the device; a processor for detecting an identification signal of a remotely controllable device from the received at least one device identification signal, extracting information on a control command for remote control of the device on the basis of the detected identification signal, and matching at least one of the multiple keys to the control command for remote control of the device on the basis of the extracted information on the control command; and a transmitter for transmitting a signal corresponding to the control command when a key matched to the control command is selected.

Particularly, when the remote control apparatus is pointed at a device, the remote control apparatus can confirm or identify a device on the basis of an identification signal transmitted from the device or a transmission device around the device and thus can set a predetermined control command to a key corresponding to the device, thereby easily remotely controlling multiple devices.

DESCRIPTION OF DRAWINGS

FIG. 8 is a flowchart illustrating an example of a remote control apparatus operation method according to an embodiment of the present invention.

FIGS. 9a to 9l are diagrams referred to for description of the remote control apparatus operation method of FIG. 8.

FIGS. 13a to 13g are diagrams referred to for description of the remote control apparatus operation method of FIG. 12.

FIG. 30 is a flowchart illustrating an example of a remote control apparatus operation method according to another embodiment of the present invention.

BEST MODE

The present invention will be described in more detail with reference to the attached drawings.

In the following description, the terms "module" and "unit" used to signify components are used herein to aid in the understanding of the components and thus they should not be considered as having specific meanings or roles. Accordingly, the terms "module" and "unit" may be used interchangeably.

Figure 1:
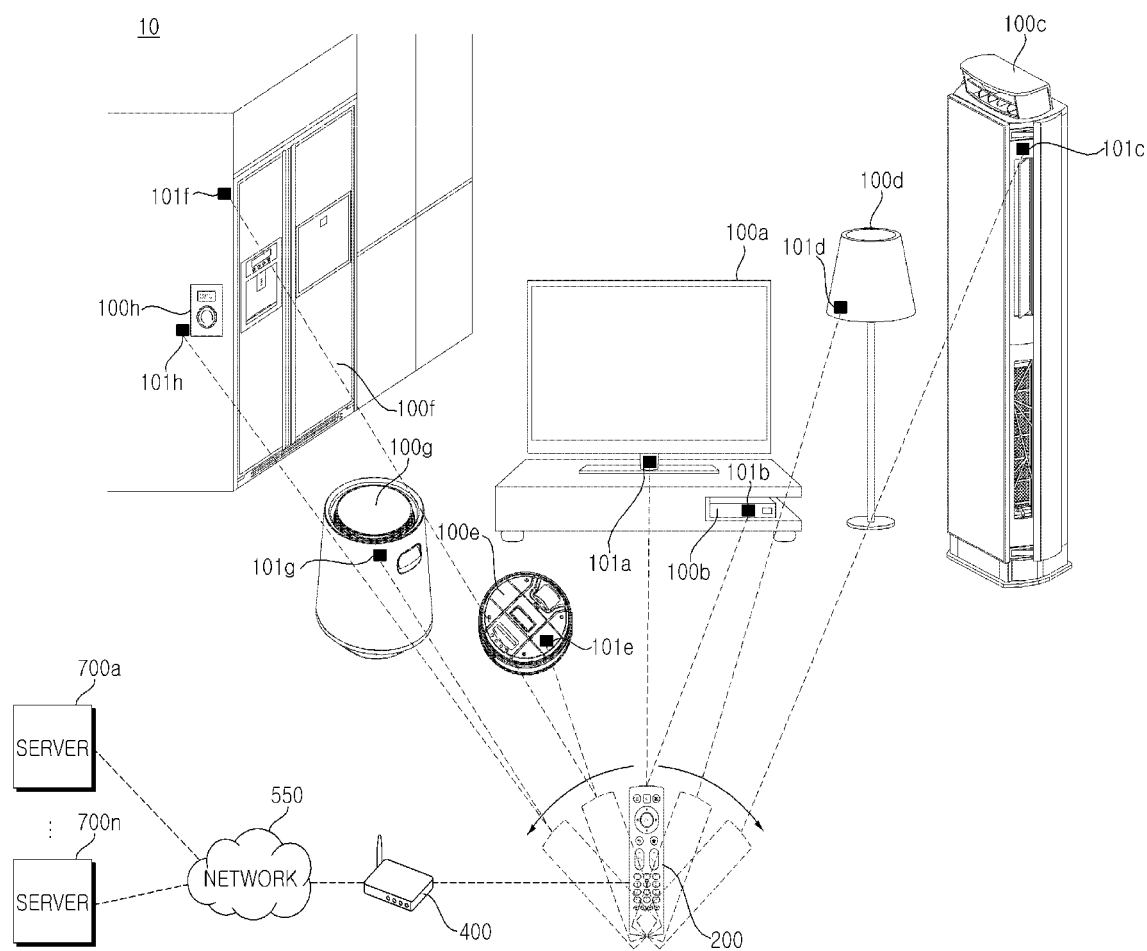
FIG. 1 illustrates a remote device control system according to embodiments of the present invention.

FIG. 1 illustrates a remote device control system according to embodiments of the present invention.

Referring to FIG. 1, a remote device control system 10 according to an embodiment of the present invention may include a remote control apparatus 200, multiple devices 100a, 100b, 100c, 100d, 100e, 100f, 100g and 100h, and transmission devices 101a, 101b, 101c, 101d, 101e, 101f, 101g and 101h mounted in the respective devices or arranged around the devices.

The remote device control system 10 may further include a gateway 400 and servers 700a, . . . , 700n.

While the image display device 100a such as a TV, the set-top box 100b, the air-conditioner 100c, the lighting device 100d, the robot cleaner 100e, the refrigerator 100f, the air purifier 100g and the temperature controller 100h are illustrated as exemplary devices in the figure, other various devices may be used. The devices shown in the figure may be called home devices.

For example, a washing machine, an optical disc player, a game console, a gas valve, a security device such as a security camera, an electronically open/closed door, an electronically open/closed window, an audio output device, an electronic frame, an energy storage system (ESS), a digital camera, a scent generator, a vehicle, a drone and the like may be exemplified as devices.

The following description is based on the devices shown in the figure.

The transmission devices 101a, 101b, 101c, 101d, 101e, 101f, 101g and 101h can transmit a device identification (ID) signal for device identification.

The device ID signal may include at least one of device type information, manufacture information, device model name information, device state information and device control command related information about each device.

The device state information may include a device on/off state, an operation value state during device operation, and the like.

Alternatively, the device ID signal may be a specific signal set for identification of each device. For example, the device ID signal may be a time-based pattern signal or a space-based pattern signal. More specifically, the device ID signal may be a time-based infrared (IR) pattern signal or a space-based IR pattern signal.

The transmission devices 101a, 101b, 101c, 101d, 101e, 101f, 101g and 101h may reflect a signal output from the remote control apparatus 200 to transmit a device ID signal to the remote control apparatus 200.

Further, the device ID signal may be one of an IR signal, a radio frequency (RF) signal, a Wi-Fi signal, a ZigBee signal, a Bluetooth signal, a laser signal and an Ultra-Wideband (UWB) signal as a high-directivity signal.

The remote control apparatus 200 may receive multiple ID signals from the transmission devices 101a, 101b, 101c, 101d, 101e, 101f, 101g and 101h.

Here, when the remote control apparatus 200 is pointed at one of the multiple devices 100a, 100b, 100c, 100d, 100e, 100f, 100g and 100h or the multiple transmission devices 101a, 101b, 101c, 101d, 101e, 101f, 101g and 101h, the remote control apparatus 200 may detect one of received ID signals as a representative ID signal.

In addition, the remote control apparatus 200 may perform signal processing on the detected ID signal or representative ID signal and confirm or identify a device corresponding to the ID signal on the basis of at least one of device type information, manufacturer information, device model name information, device state information and device control command related information which are included in the detected ID signal.

Alternatively, the remote control apparatus 200 may compare the detected ID signal or representative ID signal with data related to ID signals prestored therein to confirm or identify a device.

In addition, the remote control apparatus 200 may match at least part of multiple keys included therein to a control command for controlling the confirmed device. Alternatively, the remote control apparatus 200 may set at least part of the multiple keys included therein as a specific operation key for controlling the corresponding device.

When a user selects one of the multiple keys after control commands or keys for device control are set, the remote control apparatus 200 may output and transmit a signal corresponding to a control command of the selected key, that is, a remote control signal.

For example, when the remote control apparatus 200 is pointed at the air-conditioner 100c, the remote control apparatus 200 may match a first key among the multiple keys to a control command for blower strength control with respect to the air-conditioner, and when the first key is selected, output and transmit a remote control signal related to blower strength control with respect to the air-conditioner.

Consequently, when the remote control apparatus 200 is pointed at a first device, the remote control apparatus 200 can detect a first ID signal received from the first device and match at least one of the multiple keys to a control command for remote control of the first device on the basis of the detected first ID signal. When the remote control apparatus 200 is pointed at a second device, the remote control apparatus 200 can detect a second ID signal received from the second device and match at least one of the multiple keys to a control command for remote control of the second device on the basis of the detected second ID signal.

Accordingly, various devices can be remotely controlled using the single remote control apparatus 200.

That is, the image display device 100a such as a TV, a set-top box 100b, an air-conditioner 100c, a lighting device 100d, a robot cleaner 100e, a refrigerator 100f, an air purifier 100g and a temperature controller 100h can be remotely controlled depending on orientation of the remote control apparatus 200.

A remote control signal output from the remote control apparatus 200 may be one of an IR signal, an RF signal, a Wi-Fi signal, a ZigBee signal, a Bluetooth signal, a laser signal and a UWB signal.

The remote control apparatus 200 may receive control command information about at least part of the multiple keys from the gateway 400 for remote control of each device.

Alternatively, the remote control apparatus 200 may transmit control command information about at least part of the multiple keys to the gateway 400 for remote control of each device.

Particularly, the gateway 400 may receive control command information about at least part of the multiple keys from the external servers 700a, . . . , 700n through a network 550 for remote control of each device.

Here, the external servers 700a, . . . , 700n may be servers operated by device manufacturers or servers which store information about devices.

Figure 2:
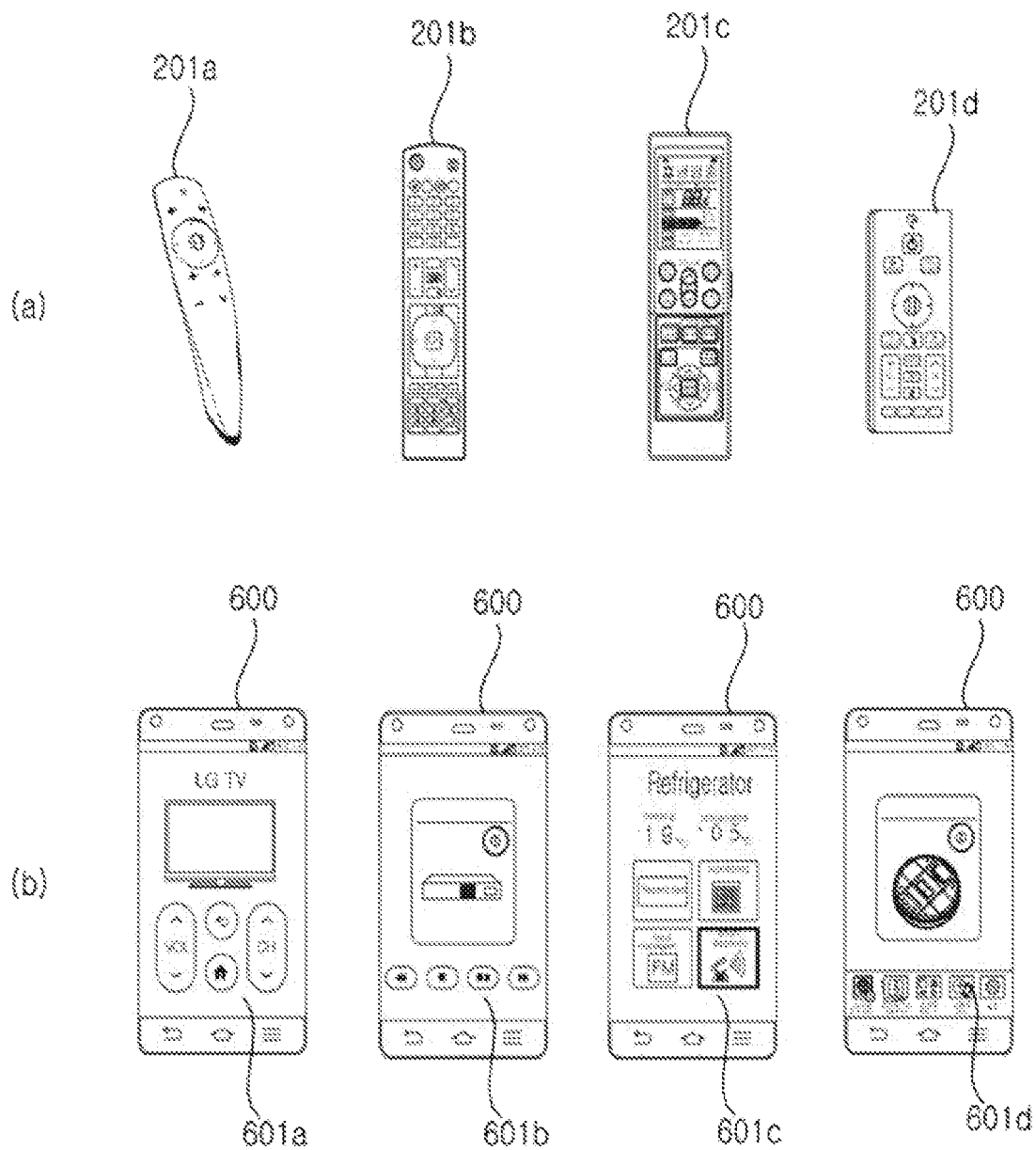
FIG. 2 illustrates a remote control apparatus or a remote control screen per device.

FIG. 2 illustrates a remote control apparatus or a remote control screen per device.

Referring to the figure, FIG. 2(a) illustrates a remote control apparatus 201a for an image display device, a remote control apparatus 201b for an optical disc player, a remote control apparatus 201c for an air-conditioner, and a remote control apparatus 201d for a robot cleaner.

FIG. 2(b) illustrates a remote control screen 601a for an image display device, a remote control screen 601b for an optical disc player, a remote control screen 601c for an air-conditioner, and a remote control screen 601d for a robot cleaner, which can be displayed through a mobile terminal 600 or a display embedded in the remote control apparatus 200.

When remote control apparatuses assigned different codes are used in order to remotely control respective electronic devices as illustrated in FIG. 2(a), the number of remote control apparatuses increases and thus it is inconvenient for a user to use the remote control apparatuses.

Furthermore, it is inconvenient for a user to additionally download and execute an application and to display a corresponding remote control screen, as illustrated in FIG. 2(b).

The present invention proposes a remote control apparatus which can remotely control multiple devices more easily.

FIGS. 3a to 3f illustrate change of types of devices controlled depending on orientation of the remote control apparatus of FIG. 1.

Figure 3A:
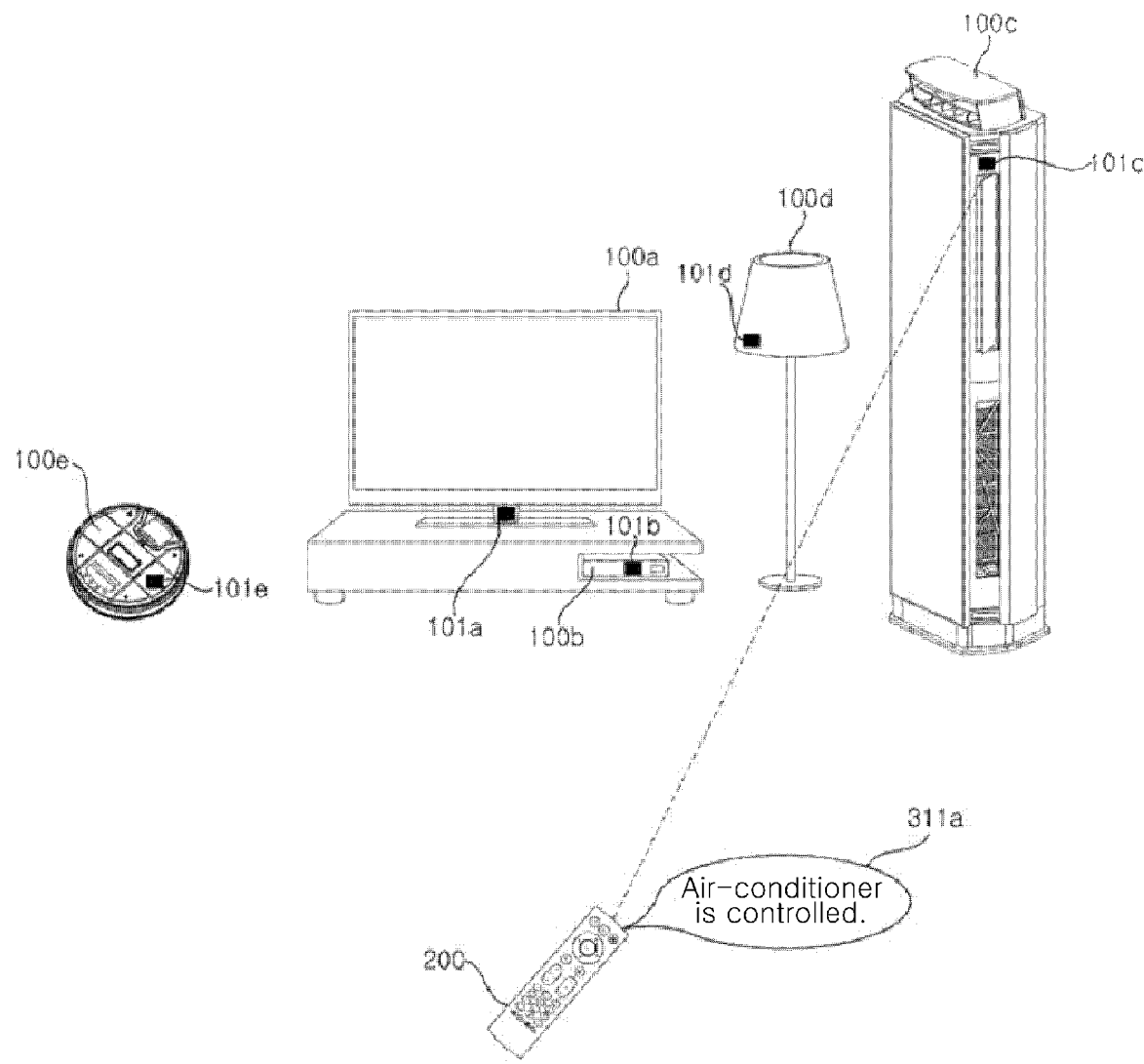
FIGS. 3a to 3f illustrate change of types of devices controlled depending on the orientation of the remote control apparatus of FIG. 1.

FIG. 3a illustrates a case in which the remote control apparatus 200 is pointed at the air-conditioner 100c from among various home devices 100a, 100b, 100c, 100d and 100e.

The remote control apparatus 200 receives one or more ID signals including an ID signal from the transmission device 101c corresponding to the air-conditioner 100c. In addition, the remote control apparatus 200 may detect the ID signal from the received ID signals and confirm or identify the air-conditioner 100c as a remotely controllable device on the basis of the detected ID signal.

For example, when the detected ID signal includes at least one of device type information, manufacturer information and device model name information, the remote control apparatus 200 may extract at least one of the device type information, manufacturer information and device model name information by performing signal processing on the ID signal and confirm or identify the device corresponding to the ID signal on the basis of at least one of the extracted device type information, manufacturer information and device model name information.

Alternatively, when the received and detected ID signal is a specific signal set to identify the corresponding device, the remote control apparatus 200 may compare the received and detected ID signal with signal related data stored in a memory 470 to confirm or identify the device.

More specifically, when the received and detected ID signal is a time-based pattern signal, the remote control apparatus 200 may compare the received pattern signal with time-based pattern signal related data stored in the memory 470 to confirm or identify the device.

Alternatively, when the received and detected ID signal is a spaced-based pattern signal, the remote control apparatus 200 may compare the received pattern signal with spaced-based pattern signal related data stored in the memory 470 to confirm or identify the device.

In addition, when the device at which the remote control apparatus 200 is pointed is identified as the air-conditioner 100c, the remote control apparatus 200 may match at least part of the multiple keys to a control command for the air-conditioner 100c.

The remote control apparatus 200 may output a message 311a indicating that the device is controllable through sound, turn on an LED included therein for a predetermined time or generate vibration when device identification or key setting is completed. Accordingly, the user can recognize that the air-conditioner is controllable. FIG. 3a illustrates output of the message 311a indicating that the air-conditioner is controllable, such as "air-conditioner is controlled", as sound.

Alternatively, for user convenience, a device identified or controllable by the remote control apparatus 200 may be indicated by turning on an LED included in the device or the transmission device corresponding thereto for a predetermined time, generating specific sound through an audio device included in the device of the transmission device or displaying a remote control message of the remote control apparatus 200 through a display included in the device or the transmission device.

Particularly, when a specific key of the remote control apparatus 200 is operated after key setting is completed, the remote control apparatus 200 may transmit a remote control signal corresponding to a control command of the specific key to the air-conditioner 100c.

Then, the air-conditioner 100c may turn on an LED included therein for a predetermined time after reception of the remote control signal. Accordingly, the user can recognize that the air-conditioner is controlled.

Figure 3B:
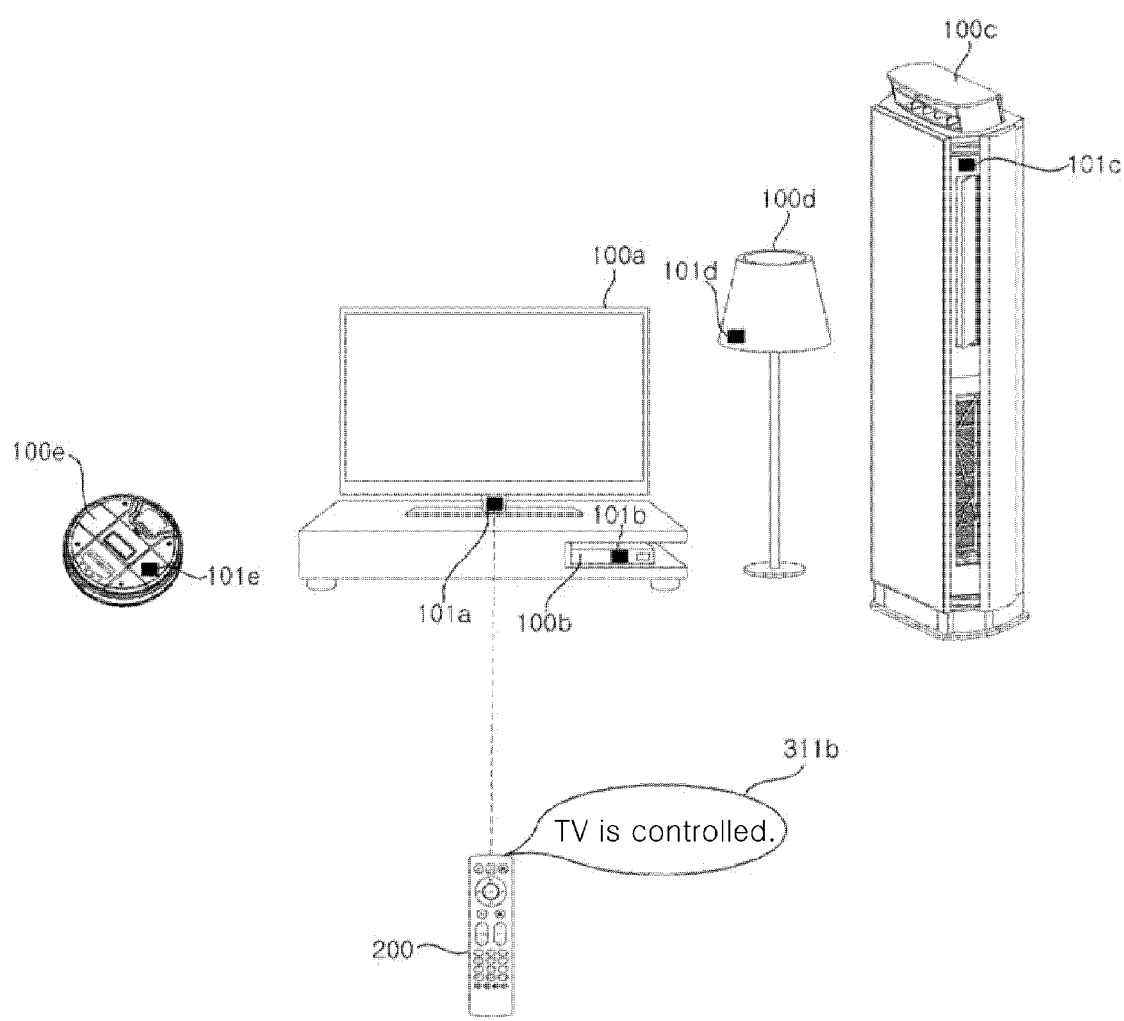

FIG. 3b illustrates a case in which the remote control apparatus 200 is pointed at the image display device 100a from among the various home devices 100a, 100b, 100c, 100d and 100e.

The remote control apparatus 200 receives an ID signal from the transmission device 101a corresponding to the image display device 100a.

Then, the remote control apparatus 200 may detect the ID signal from one or more ID signals including the ID signal received from the image display device 100a and confirm or identify the image display device 100a as a remotely controllable device on the basis of the detected ID signal. The method of confirming the image display device 100a is omitted with reference to the description of FIG. 3a.

Upon confirmation that the device at which the remote control apparatus 200 is pointed is the image display device 100a, the remote control apparatus 200 may match at least part of the multiple keys to a control command for the image display device 100a.

Figure 3C:
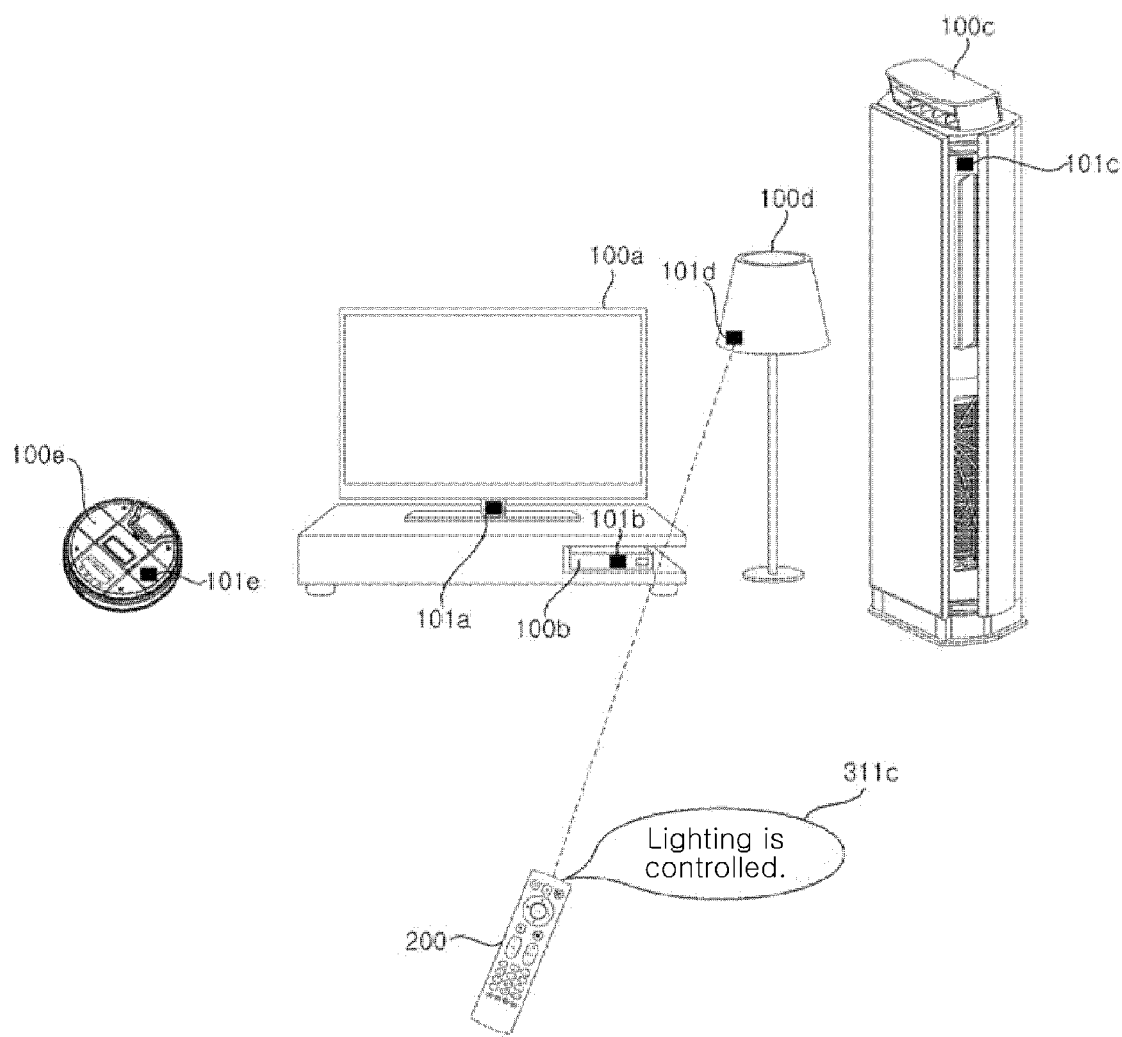

FIG. 3c illustrates a case in which the remote control apparatus 200 is pointed at the lighting device 100d from among the various home devices 100a, 100b, 100c, 100d and 100e.

The remote control apparatus 200 receives an ID signal, for example, an infrared (IR) signal, from the transmission device 101d corresponding to the lighting device 100d.

Then, the remote control apparatus 200 may confirm that the device at which the remote control apparatus 200 is pointed is the lighting device 100d on the basis of the IR signal. The method of confirming the lighting device 100d is omitted with reference to the description of FIG. 3a.

Upon confirmation that the device at which the remote control apparatus 200 is pointed is the lighting device 100d, the remote control apparatus 200 may match at least part of the multiple keys to a control command for the lighting device 100d.

Figure 3D:
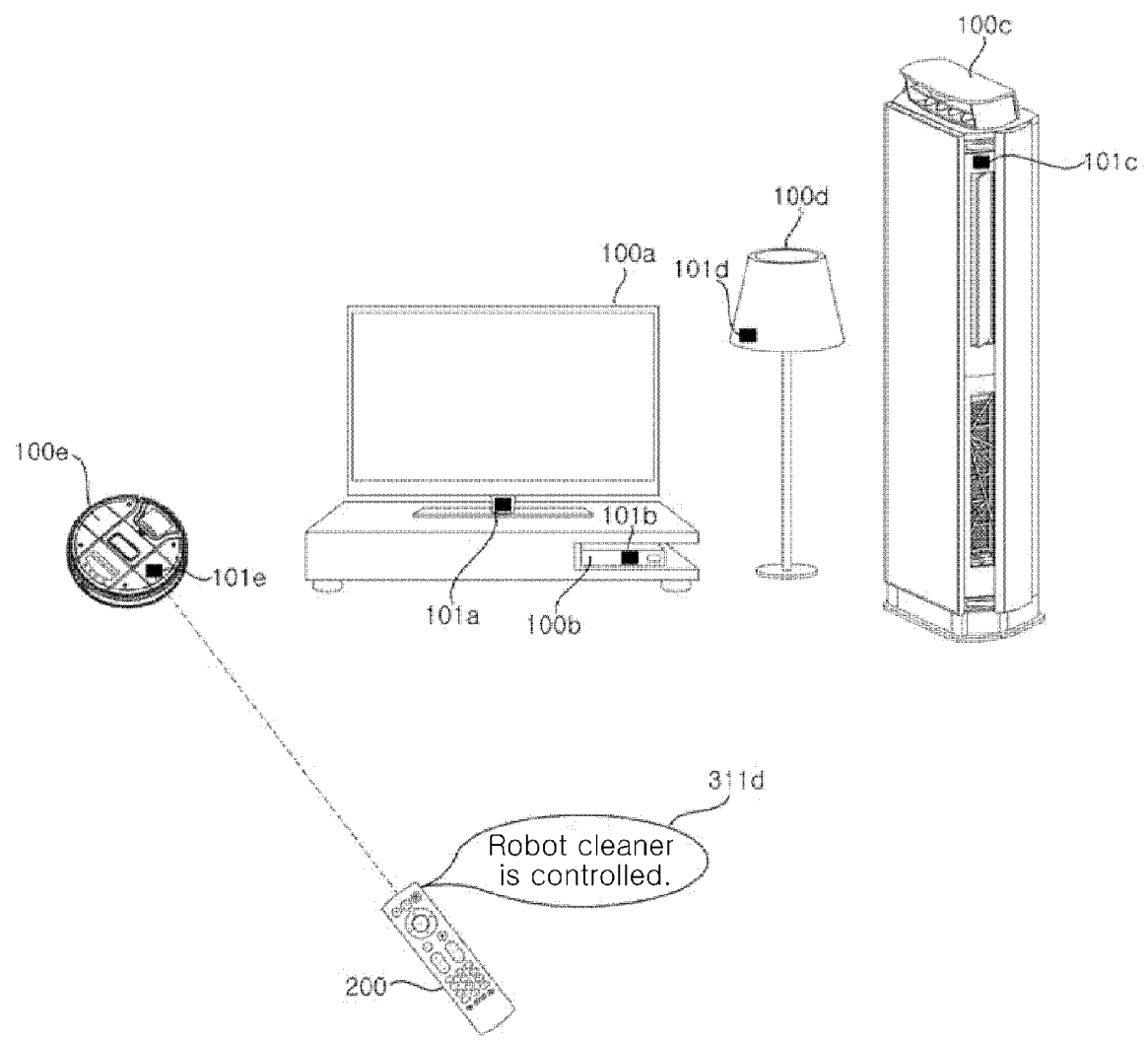

FIG. 3d illustrates a case in which the remote control apparatus 200 is pointed at the robot cleaner 100e from among the various home devices 100a, 100b, 100c, 100d and 100e.

The remote control apparatus 200 receives an ID signal from the transmission device 101e corresponding to the robot cleaner 100e.

Then, the remote control apparatus 200 may detect the ID signal from one or more ID signals including the ID signal received from the robot cleaner 100e and confirm or identify the robot cleaner 100e as a remotely controllable device on the basis of the detected ID signal. The method of confirming the robot cleaner 100e is omitted with reference to the description of FIG. 3a.

Upon confirmation that the device at which the remote control apparatus 200 is pointed is the robot cleaner 100e, the remote control apparatus 200 may match at least part of the multiple keys to a control command for the robot cleaner 100e.

Figure 3E:
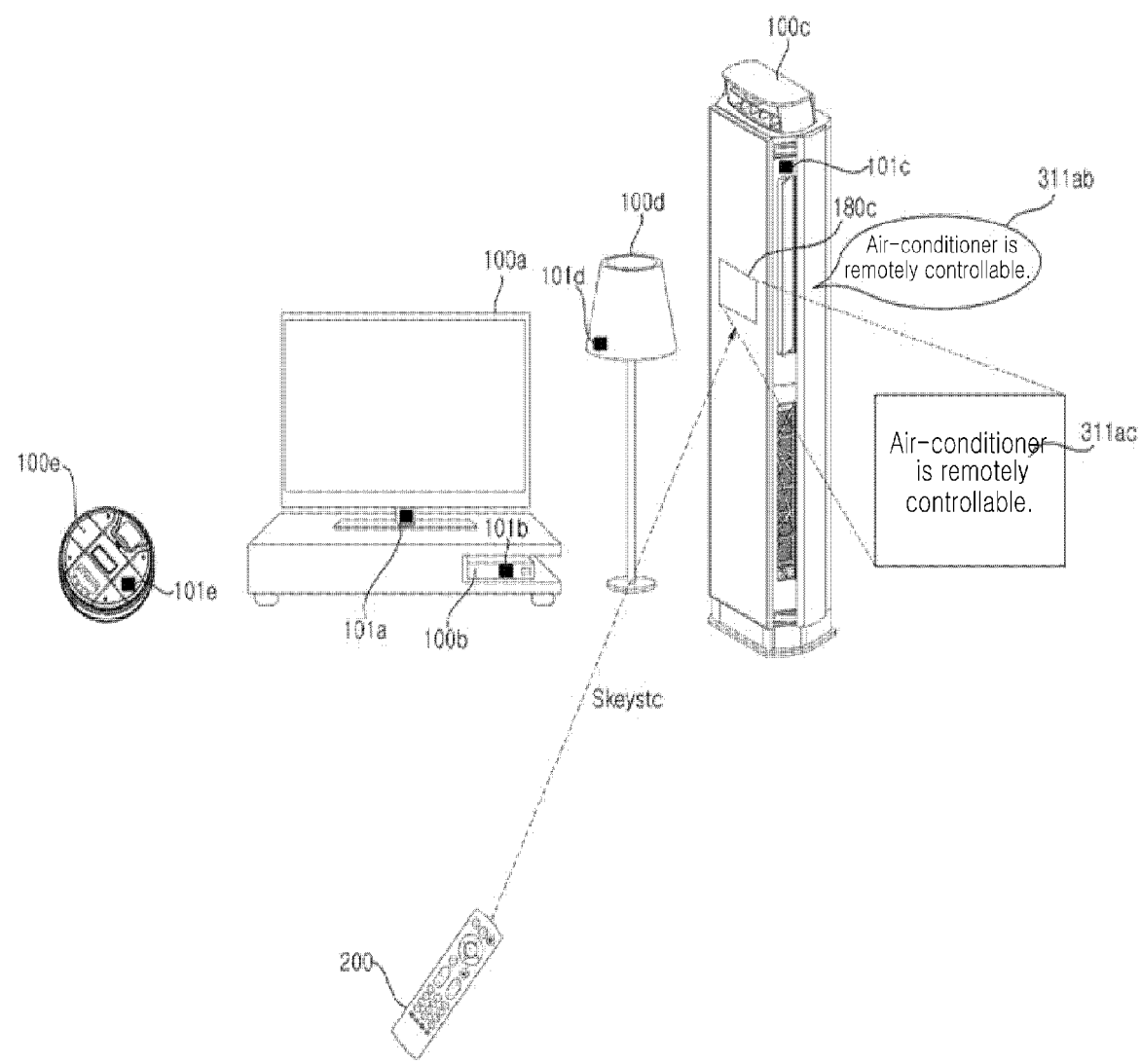

FIG. 3e illustrates transmission of a remote control signal Skeystc from the remote control apparatus 200 to the air-conditioner 100c when setting for remote control of the air-conditioner 100c is completed.

Upon reception of the remote control signal Skeystc, the air-conditioner 100c may display a message 311ac indicating that the air-conditioner is remotely controllable on a display 180c or output a message 311ab indicating that the air-conditioner is remotely controllable as sound.

That is, the remote control apparatus 200 may transmit the remote control signal Skeystc to the air-conditioner 100c such that the air-conditioner 100c outputs the messages 311ab and 311ac indicating that the air-conditioner is remotely controllable, instead of outputting the message 311a indicating that the air-conditioner is controllable, such as "air-conditioner is controlled", as described above with reference to FIG. 3a.

Figure 3F:
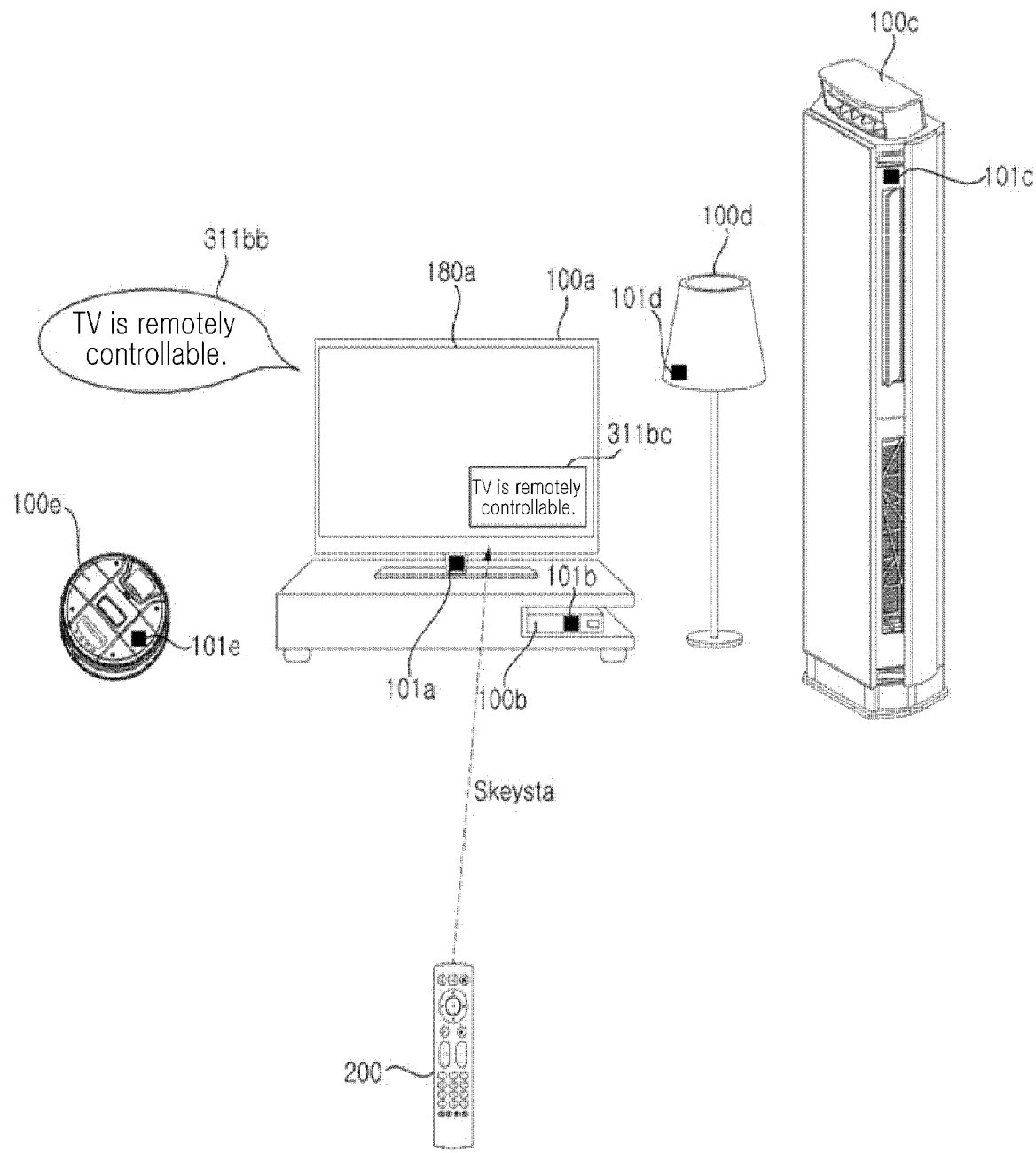

FIG. 3f illustrates transmission of a remote control signal Skeysta from the remote control apparatus 200 to the image display device 100a when setting for remote control of the image display device 100a is completed.

Upon reception of the remote control signal Skeysta, the image display device 100a may display a message 311bc indicating that the image display device is remotely controllable on a display 180a or output a message 311bb indicating that the image display device is remotely controllable as sound.

Figure 4:
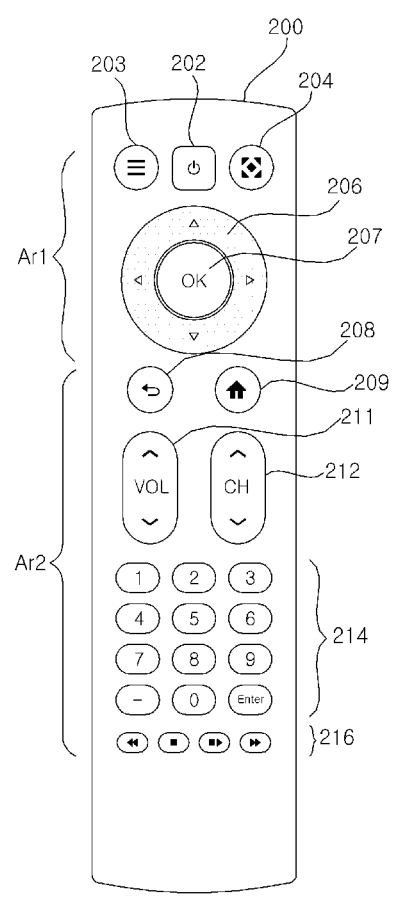
FIGS. 4 and 5 illustrate various examples of the remote control apparatus of FIG. 1.
Figure 5:
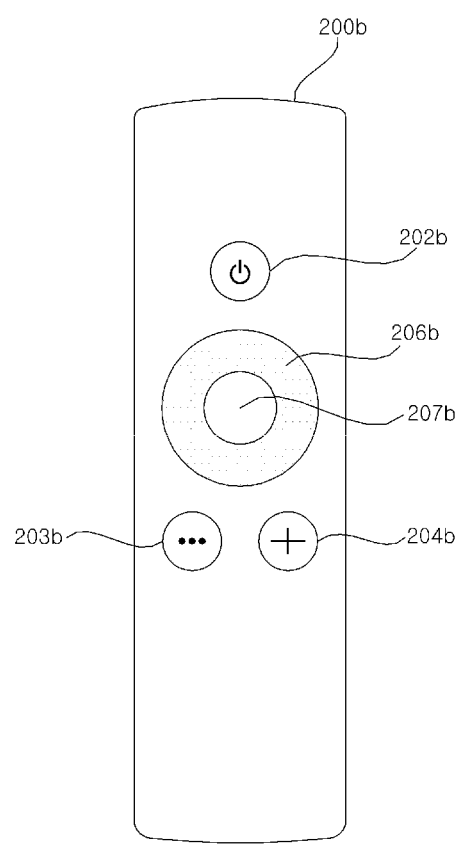

FIGS. 4 and 5 illustrate various examples of the remote control apparatus of FIG. 1.

FIG. 4 illustrates an example of the remote control apparatus 200.

Referring to the figure, the remote control apparatus 200 may include multiple keys.

The figure shows a power key 202, a menu key 203, a multi-device operation key 204, a wheel key 206, a confirmation key 207, a back key 208, a home key 209, a volume key 211, a channel key 212, numeral keys 214, playback related keys 216, etc.

A first area Ar1 including the power key 202, the menu key 203, the multi-device operation key 204, the wheel key 206 and the confirmation key 207 may be used for all devices.

A second area Ar2 including the back key 208, the home key 209, the volume key 211, the channel key 212, the numeral keys 214 and the playback related keys 216 may be used only to remotely control set-top boxes or image display devices.

FIG. 5 illustrates another exemplary remote control apparatus 200b.

The remote control apparatus 200b of FIG. 5 is similar to the remote control apparatus 200 of FIG. 4 but differs from the remote control apparatus 200 of FIG. 4 in that the former does not include the numeral keys, channel key and volume key. That is, the remote control apparatus 200b of FIG. 5 may include only keys which can be used for all devices.

The figure shows a power key 202b, a menu key 203b, a multi-device operation key 204b, a wheel key 206b and a confirmation key 207b.

The following description is based on the remote control apparatus 200 of FIG. 4.

Figure 6:
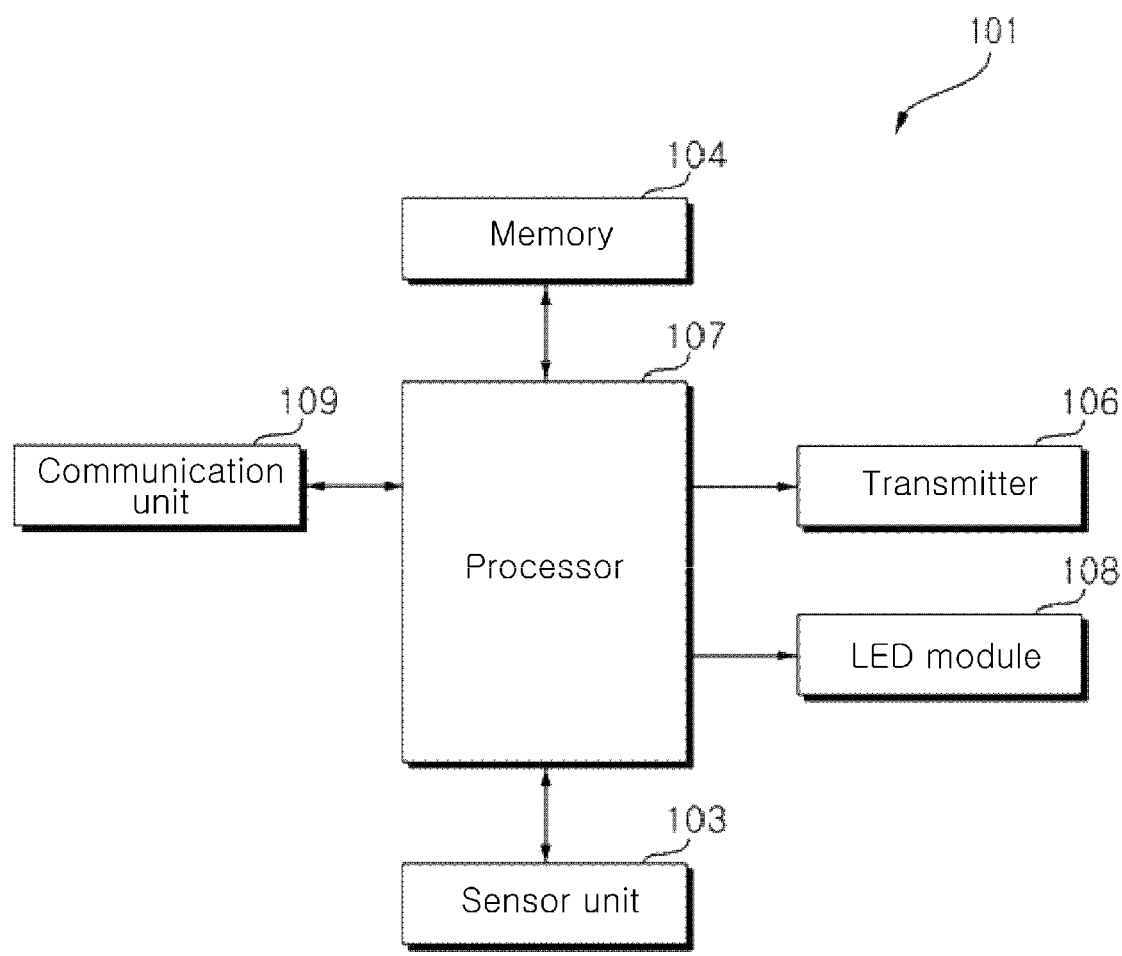
FIG. 6 is an exemplary block diagram of a transmission device of FIG. 1.

FIG. 6 is an exemplary block diagram of the transmission device shown in FIG. 1.

Referring to the figure, the transmission device 101 may include a sensor unit 103, a memory 104, a processor 107, a transmitter 106, an LED module 108 and a communication unit 109.

The sensor unit 103 may sense power on/off of the device corresponding to the transmission device. To this end, the sensor unit 103 may include an electromagnetic field (EMF) sensor.

The processor 107 may check device type information or device model name information using device power on/off sensing information from the sensor unit 103. Then, the processor 107 may control the transmitter 106 to transmit a control signal corresponding to the checked device type or device model.

The memory 104 may store information related to the corresponding device or data related to a specific pattern corresponding to the device.

The transmitter 106 transmits a control signal. Particularly, the transmitter 106 may transmit a control signal in a specific pattern corresponding to the device.

The LED module 108 may emit light depending on an operation state of the transmission device 101. For example, when the remote control apparatus 200 transmits a remote control signal, the LED module 108 may blink.

The communication unit 109 may exchange data with a device. For example, the communication unit 109 may receive an ID signal from a device. That is, the communication unit 109 may receive at least one of device type information, manufacturer information, device model name information, device state information and device control command related information about each device from the device.

The device state information may include a device on/off state and an operation value state during device operation.

In addition, the communication unit 109 may transmit/receive data to/from the gateway 400.

For example, the communication unit 109 may receive, from the gateway 400, control command information about at least part of the multiple keys for remote control of each device.

The communication unit 109 may transmit, to the gateway 400, control command information about at least part of the multiple keys for remote control of each device.

The transmission device may further include a power supply unit which is not shown. The power supply unit may transform a commercial AC voltage into a DC voltage and supply the DC voltage to each unit or supply a DC voltage to each unit through a separate battery.

The transmission device may further include a display unit and an audio output unit which are not shown. The display unit may display whether the remote control apparatus can execute remote control or whether the transmission device pairs with the remote control apparatus, and the audio output unit may output whether the remote control apparatus can execute remote control or whether the transmission device pairs with the remote control apparatus as sound.

Figure 7:
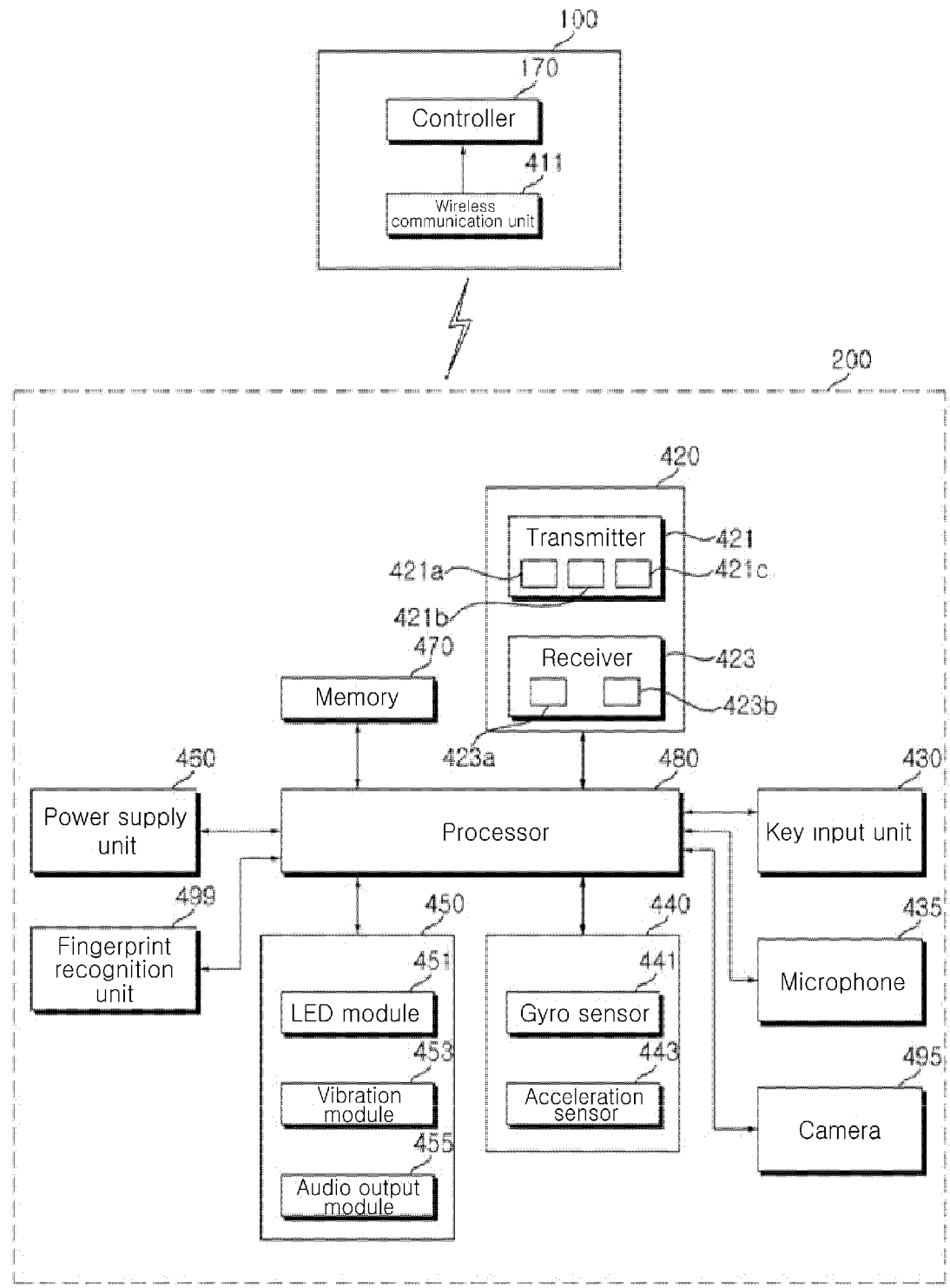
FIG. 7 is a block diagram of the remote control apparatus of FIG. 1.

FIG. 7 is a block diagram of the remote control apparatus of FIG. 1.

Referring to the figure, the remote control apparatus 200 may include a wireless communication unit 420, a key input unit 430, a microphone 435, a sensor unit 440, an output unit 450, a power supply unit 460, the memory 470, a processor 480, a camera 495 and a fingerprint recognition unit 499.

The wireless communication unit 420 may transmit/receive signals to/from any one of devices as described above. To this end, the wireless communication unit 420 may include a receiver 423 and a transmitter 421.

In the present embodiment, the remote control apparatus 200 may include the receiver 423 which receives a device ID signal and the transmitter 421 which outputs a remote control signal or a call signal.

The receiver 423 may receive a device ID signal corresponding to one of an IR signal, an RF signal, a Wi-Fi signal, a ZigBee signal, a Bluetooth signal, a laser signal and a UWB signal from the transmission device 101.

The transmitter 421 may output a remote control signal corresponding to one of an IR signal, an RF signal, a Wi-Fi signal, a ZigBee signal, a Bluetooth signal, a laser signal and a UWB signal.

Further, the transmitter 421 may output different remote control signals for multiple devices. For example, when the transmitter 421 outputs a remote control signal corresponding to an IR signal, the transmitter 421 may output IR signals having different patterns or different frequency bands.

Figure 15A:
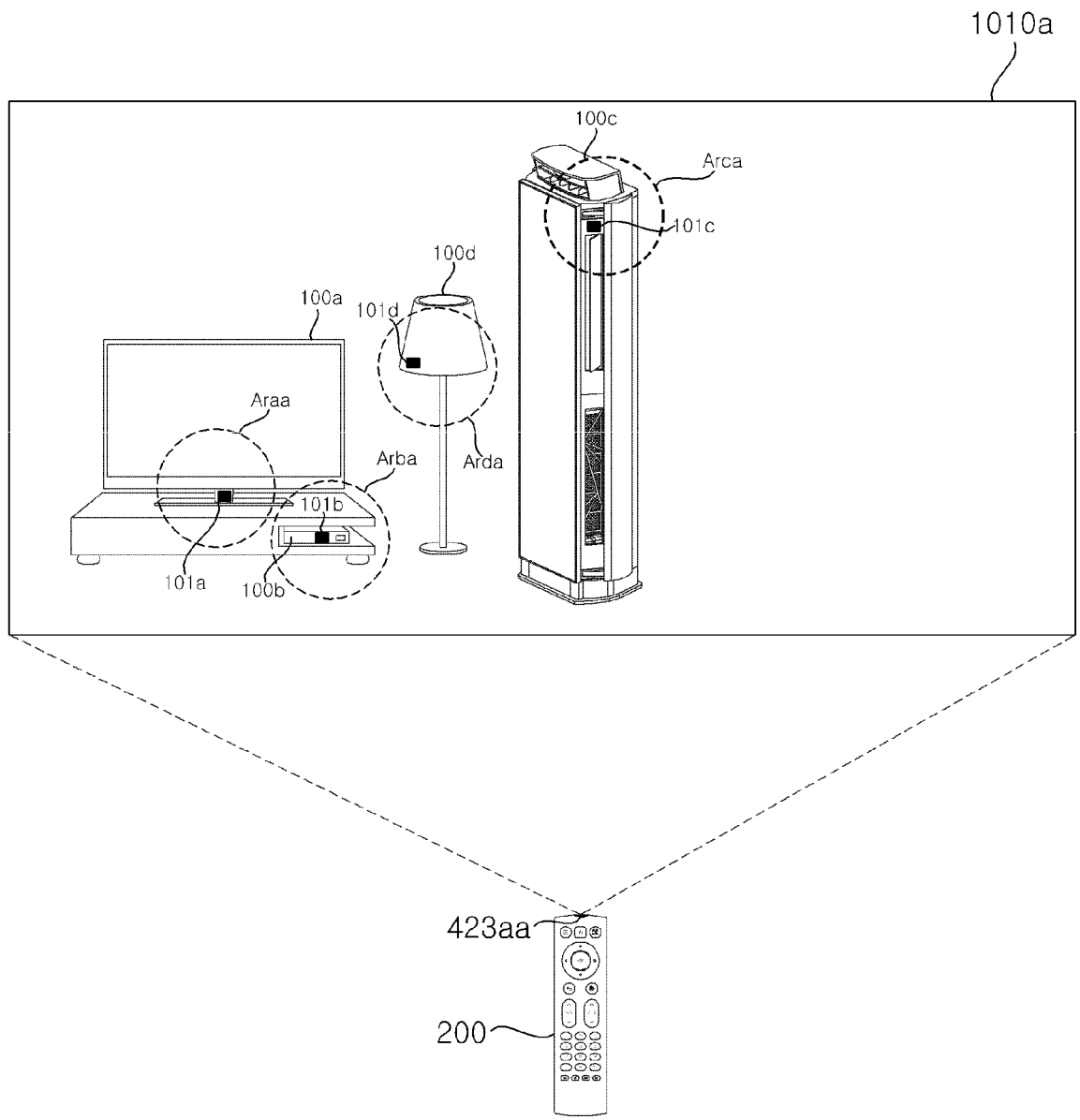
FIGS. 15a and 15b are diagrams referred to for description of the remote control apparatus operation method of FIG. 14.

The transmitter 421 may output an output signal Sout in the case shown in FIG. 15a. Here, the output signal Sout may be any one of an IR signal, an RF signal, a Wi-Fi signal, a ZigBee signal, a Bluetooth signal, a laser signal and a UWB signal.

When the device at which the remote control apparatus 200 is pointed is the image display device 100a, the remote control apparatus 200 may transmit a signal including pointing information of the remote control apparatus 200, for example, information about motion of the remote control apparatus 200.

The key input unit 430 may include multiple keys. The multiple keys may be realized as a keypad, buttons, a touchpad or a touchscreen.

The microphone 435 may receive a user voice, convert the received user voice into an electronic signal and deliver the electronic signal to the processor 480.

The sensor unit 440 may include a gyro sensor 441 or an acceleration sensor 443. The gyro sensor 441 may sense information about motion of the remote control apparatus 200.

For example, the gyro sensor 441 may sense information about a motion of the remote control apparatus 200 on the basis of x, y and z axes. The acceleration sensor 443 may sense information about a movement speed of the remote control apparatus 200.

The output unit 450 may output a vibration or sound signal corresponding to operation of the key input unit 430 or turn on an LED. The user may recognize whether the key input unit 430 is operated through the output unit 450.

For example the output unit 450 may include an LED module 451 which is turned on when the key input unit 430 is operated or an IR signal is transmitted or received through the wireless communication unit 425, a vibration module 453 which generates vibration when the key input unit 430 is operated or an IR signal is transmitted or received through the wireless communication unit 425, and an audio output module 455 which outputs sound when the key input unit 430 is operated or an IR signal is transmitted or received through the wireless communication unit 425.

The power supply unit 460 supplies power to the remote control apparatus 200. The power supply unit 460 may save power by suspending power supply when the remote control apparatus 200 is not moved for a predetermined time. The power supply unit 460 may resume power supply when a predetermined key included in the remote control apparatus 200 is operated.

The memory 470 may store various types of programs, application data, and the like necessary to control or operate the remote control apparatus 200.

Particularly, the memory 470 may store multiple pieces of device information or multiple pieces of device identification information. The processor may confirm or identify a remotely controllable device on the basis of the multiple pieces of device information or multiple pieces of device identification information stored in the memory 470. In addition, the memory 470 may store data related to patterns of multiple signals received from multiple devices. Further, the memory 470 may store control command data for setting an operation key for each device. In addition, the memory 470 may store a signal pattern with respect to an operation key for each device.

The processor 480 controls various matters related to control of the remote control apparatus 200.

When one or more ID signals including device ID signals are received from one or more devices or transmission devices corresponding thereto through the receiver 423, the processor 480 may detect an ID signal from the received ID signals, confirm or identify a device on the basis of the detected ID signal, match at least one of the multiple keys to a control command for remote control of the device, and when a key matched to the control command is selected, control the transmitter 421 to transmit a signal corresponding to the control command.

When the remote control apparatus is pointed at a device, the processor 480 may identify the device on the basis of an ID signal received from the device or the transmission device corresponding to the device.

When the remote control apparatus 200 is pointed at a first device, the processor 480 may detect a first ID signal from one or more ID signals including the first ID signal received from the first device and match at least one of the multiple keys to a control command for remote control of the first device on the basis of the detected first ID signal. When the remote control apparatus 200 is pointed at a second device, the processor 480 may detect a second ID signal from one or more ID signals including the second ID signal received from the second device and match at least one of the multiple keys to a control command for remote control of the second device on the basis of the detected second ID signal.

The processor 480 may control a signal corresponding to operation of a predetermined key of the key input unit 430 to be transmitted to a device through the wireless communication unit 425.

When the remote control apparatus 200 is pointed at the image display device 100a to identify the image display device 100a and a part of control keys is matched to a control command for the image display device 100a, the processor 480 may transmit a signal corresponding to a sensed motion of the remote control apparatus 200 or a pointing signal to the image display device 100a through the wireless communication unit 425.

The camera 495 may capture an image. Particularly, when the camera 495 is directed to a user's face, the camera 495 can capture an image including the user's face.

The processor 480 may identify or confirm the user on the basis of the captured user face image and prestored user image related data.

The fingerprint recognition unit 499 may capture an image including a fingerprint of the user. In this case, the processor 480 may identify or confirm the user on the basis of the captured user fingerprint image and prestored user fingerprint image related data.

The processor 480 may perform user authentication on the basis of an image captured by the camera 495 and control devices to be remotely controlled when user authentication has been successfully performed.

The processor 480 may control user information to be transmitted to a device which has been identified and thus is controllable, and when user authentication confirmation information is received from the device, control the device to be remotely controlled.

A device 100 may include a wireless communication unit 411 which can wirelessly transmit/receive signals to/from the remote control apparatus 200 and a controller 170 for controlling operation corresponding to a received RF signal.

The wireless communication unit 411 may wirelessly transmit/receive signals to/from the remote control apparatus 200. In addition, the wireless communication unit 411 may receive signals transmitted by the remote control apparatus 200 according to various communication standards.

FIG. 8 is a flowchart illustrating an example of a remote control apparatus operation method according to an embodiment of the present invention and FIGS. 9a to 9l are diagrams referred to for description of the remote control apparatus operation method of FIG. 8.

Referring to FIG. 8, when the remote control apparatus 200 is pointed at a device (S805), the receiver 423 of the remote control apparatus 200 receives ID signals (S810).

For example, when the remote control apparatus 200 is pointed at the air-conditioner 100c, as illustrated in FIG. 3a, the receiver 423 of the remote control apparatus 200 may receive an ID signal having a pattern corresponding to the air-conditioner from the air-conditioner 100c or the transmission device 101c corresponding to the air-conditioner 100c.

Then, the processor 480 of the remote control apparatus 200 may detect an ID signal from one or more received ID signals (S811).

Subsequently, the processor 480 of the remote control apparatus 200 identifies a device on the basis of the detected ID signal (S813).

Device identification methods may include a method of extracting information from a received ID signal to identify a device and a method of comparing a received ID signal with data related to multiple pieces of device information or multiple device ID signals stored in the memory 470 to identify a device.

Thereafter, the processor 480 of the remote control apparatus 200 extracts control command information (S814).

Subsequently, the processor 480 of the remote control apparatus 200 matches at least one of the multiple keys to a control command for remote control of the device (S815).

For example, the processor 480 of the remote control apparatus 200 may extract information related to a device control command from the device ID signal and match at least one of the multiple keys to the control command for remote control of the device on the basis of the device control command related information.

Alternatively, the processor 480 of the remote control apparatus 200 may receive device control command information for controlling the device from the device 100 or the transmission device 101 corresponding to the device 100 and match at least one of the multiple keys to the control command for remote control of the device.

Alternatively, the processor 480 of the remote control apparatus 200 may identify the device on the basis of the detected device ID signal, transmit the identified device information to the device 100 or the transmission device 101 corresponding to the device 100, receive device control command information for controlling the device from the device 100 or the transmission device 101 corresponding to the device 100, and match at least one of the multiple keys to the control command for remote control of the device on the basis of the received device control command information.

Alternatively, the processor 480 of the remote control apparatus 200 may transmit a device control command request to the device 100 or the transmission device 101 corresponding to the device 100, receive the device control command information for controlling the device from the device 100 or the transmission device 101 corresponding to the device 100, and match at least one of the multiple keys to the control command for remote control of the device on the basis of the received device control command information.

Alternatively, the processor 480 of the remote control apparatus 200 may identify the device on the basis of the detected device ID signal, transmit the identified device information to the gateway 400 or a server 700, receive device control command information for controlling the device from the gateway 400 or the server 700, and match at least one of the multiple keys to the control command for remote control of the device on the basis of the received device control command information.

Alternatively, the processor 480 of the remote control apparatus 200 may transmit a device control command request to the gateway 400 or the server 700, receive the device control command information for controlling the device from the gateway 400 or the server 700, and match at least one of the multiple keys to the control command for remote control of the device on the basis of the received device control command information.

The device control command request may be transmitted along with information for device identification to the gateway 400 or the server 700.

Alternatively, the processor 480 of the remote control apparatus 200 may receive, from the gateway 400 or the server 700, device control command information for remote control of at least one device on the basis of control command profile information stored in the memory 470.

The control command profile information may include at least one of history information and version information.

Then, the processor 480 of the remote control apparatus 200 determines whether a key matched to the control command is selected (S820) and controls a remote control signal corresponding to the control command to be transmitted when the key matched to the control command is selected (S825). Accordingly, the corresponding device can be easily remotely controlled.

Figure 9A:
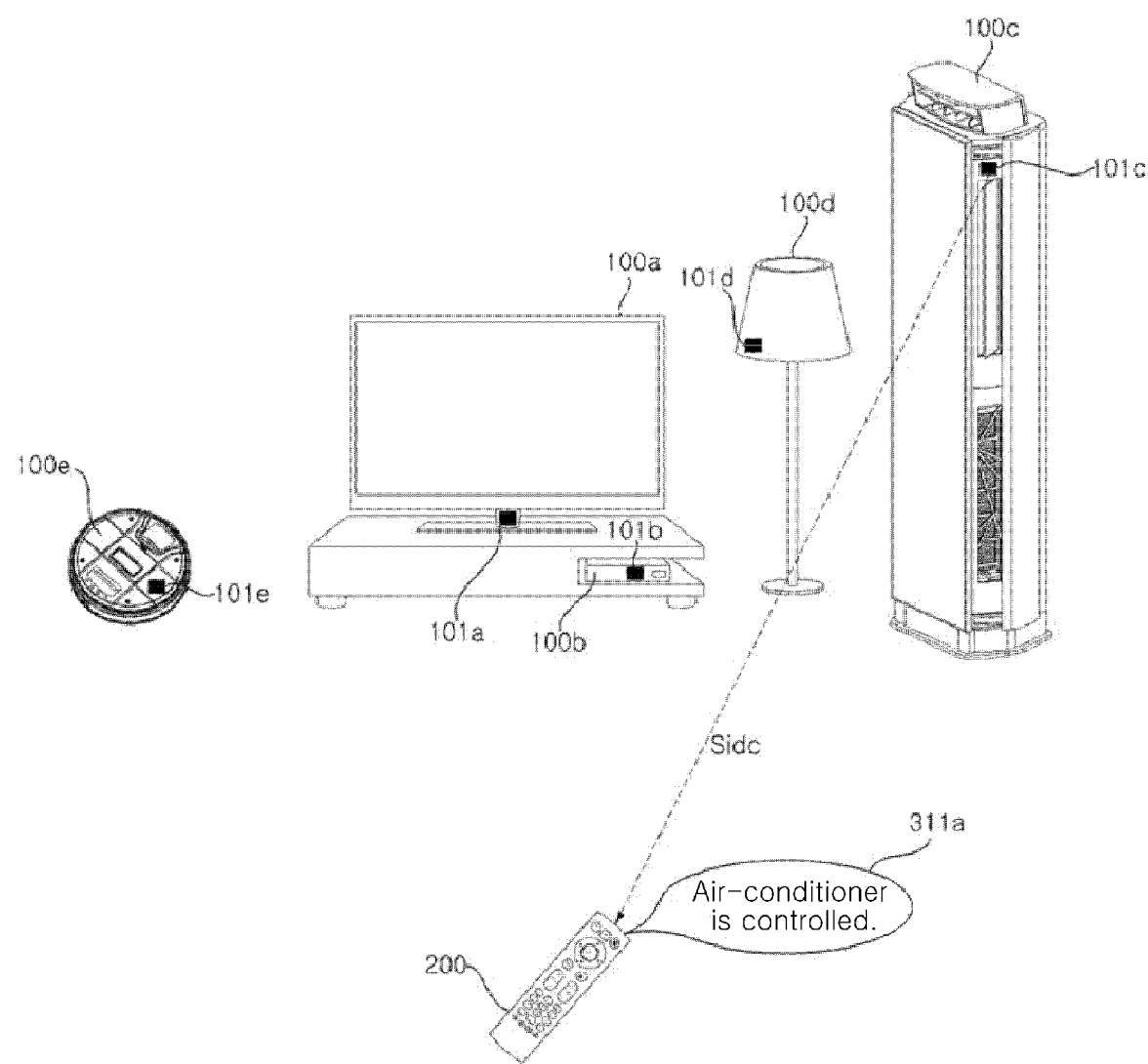

Referring to FIG. 9a, multiple transmission devices 101a, 101b, 101c, 101d, 101e, 101f, 101g and 101h are active transmission devices and may include separate power supplies and output respect device ID signals.

The figure illustrates a case in which the transmission device 101c corresponding to the air-conditioner 100c outputs an ID signal Sidc when the remote control apparatus 200 is pointed at the air-conditioner 100c.

Accordingly, the remote control apparatus 200 can receive one or more ID signals including the ID signal Sidc through the receiver 423, detect the ID signal Sidc from the received ID signals and perform signal processing on the detected ID signal Sidc to confirm or identify the air-conditioner 100c as a currently remotely controllable device.

Figure 9B:
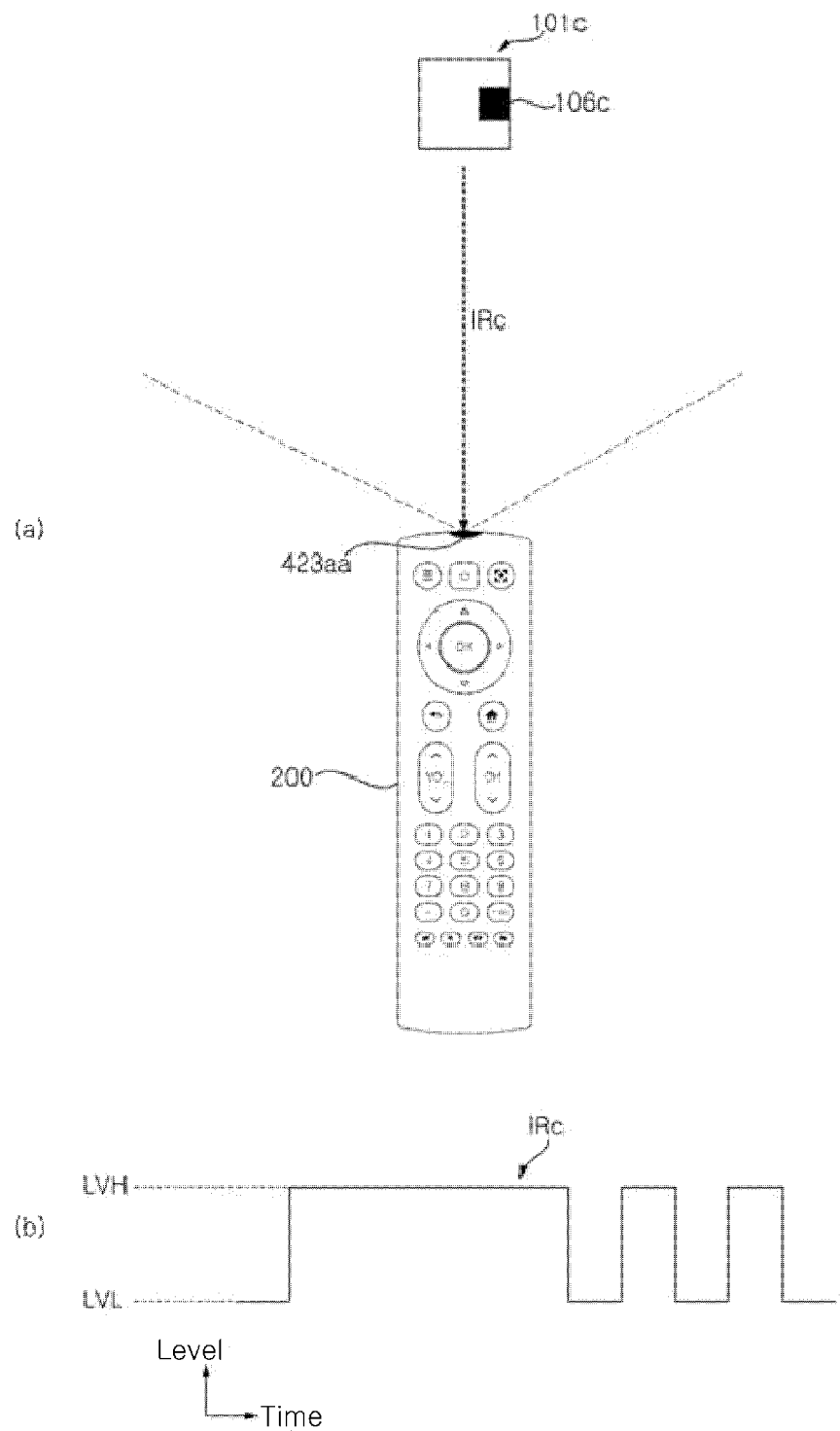

FIG. 9b illustrates output of a first IR ID signal IRc from a transmitter 106c of the transmission device 101c corresponding to the air-conditioner 100c.

As shown in (a) of FIG. 9b, an IR camera 423aa of the remote control apparatus 200 may capture an IR image including the transmission device 101c corresponding to the air-conditioner 100c.

(b) of FIG. 9b illustrates the first IR ID signal IRc which has a predetermined low level LVL and high level LVH and a variable duty. That is, (b) of FIG. 9b shows the first IR ID signal IRc having a time-based duty in a first pattern.

The processor 480 may detect the first IR ID signal IRc having the duty in the first pattern as shown in the figure on the basis of multiple IR images captured for a predetermined frame period.

The processor 480 may compare the first pattern of the detected first IR ID signal IRc with pattern related data prestored in the memory 470 to identify the device at which the remote control apparatus 200 is pointed as the air-conditioner 100c.

Figure 9C:
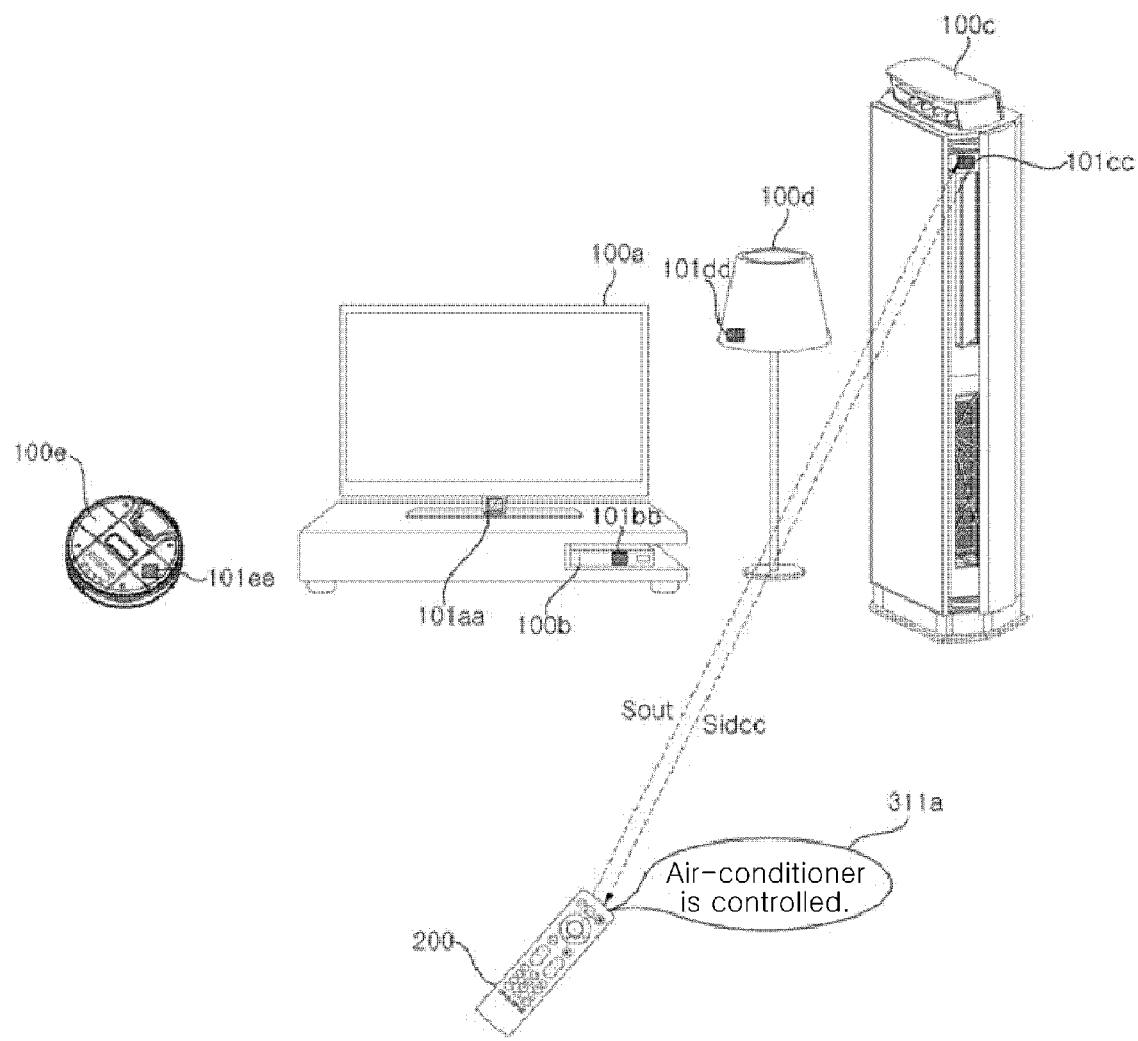

FIG. 9c illustrates a case in which control command information is received from the transmission device 101c corresponding to the air-conditioner 100c. Particularly, the figure illustrates output of a control command information reception completion message 387ca as sound.

Figure 9D:
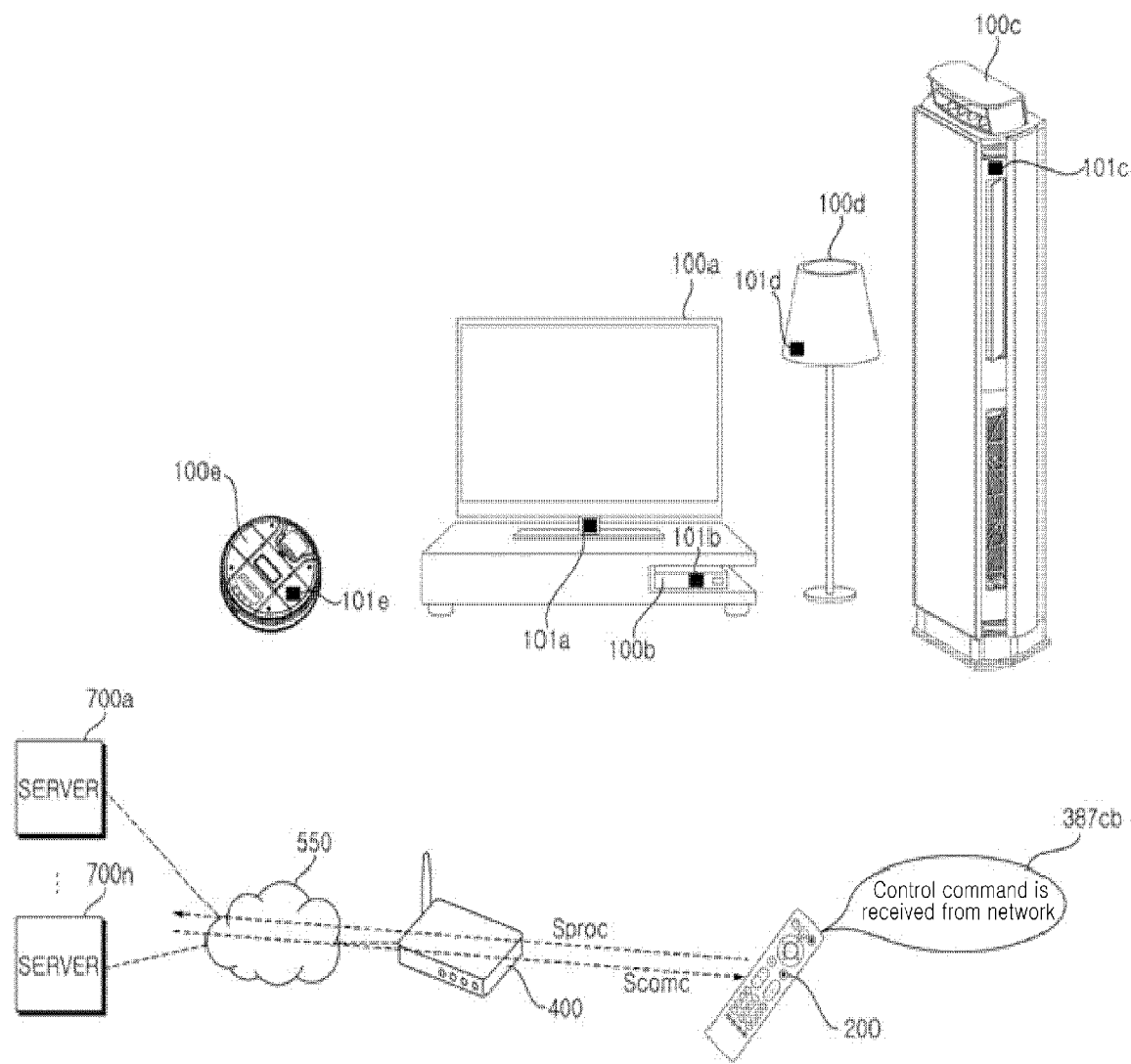

FIG. 9d illustrates a case in which control command information is received from the server 700. Particularly, the figure illustrates output of a control command information reception completion message 387cb as sound.

FIG. 9d illustrates a case in which the remote control apparatus 200 outputs a control command information request Sproc to the server 700 and receives control command information Scomc from the server 700.

FIG. 9e illustrates a case in which control command information is received from the gateway 400. Particularly, the figure illustrates output of a control command information reception completion message 387cc as sound.

FIG. 9e illustrates a case in which the remote control apparatus 200 outputs the control command information request Sproc to the gateway 400 and receives the control command information Scomc from the gateway 400.

A control command information request target may differ from a control command information transmission target, distinguished from the cases of FIGS. 9a to 9e.

For example, the remote control apparatus 200 may transmit the control command information request to the device 100, the device 100 may request that the gateway 400 or the server 700 provide the control command information, and the gateway 400 or the server 700 may transmit the control command information to the remote control apparatus.

Alternatively, the remote control apparatus 200 may transmit the control command information request to the gateway 400, the gateway 400 may request that the device 100 or the server 700 provide the control command information, and the device 100 or the server 700 may transmit the control command information to the remote control apparatus.

Alternatively, the remote control apparatus 200 may transmit the control command information request to the server 700, the server 700 may request that the device 100 or the gateway 400 provide the control command information, and the device 100 or the gateway 400 may transmit the control command information to the remote control apparatus.

Figure 9F:
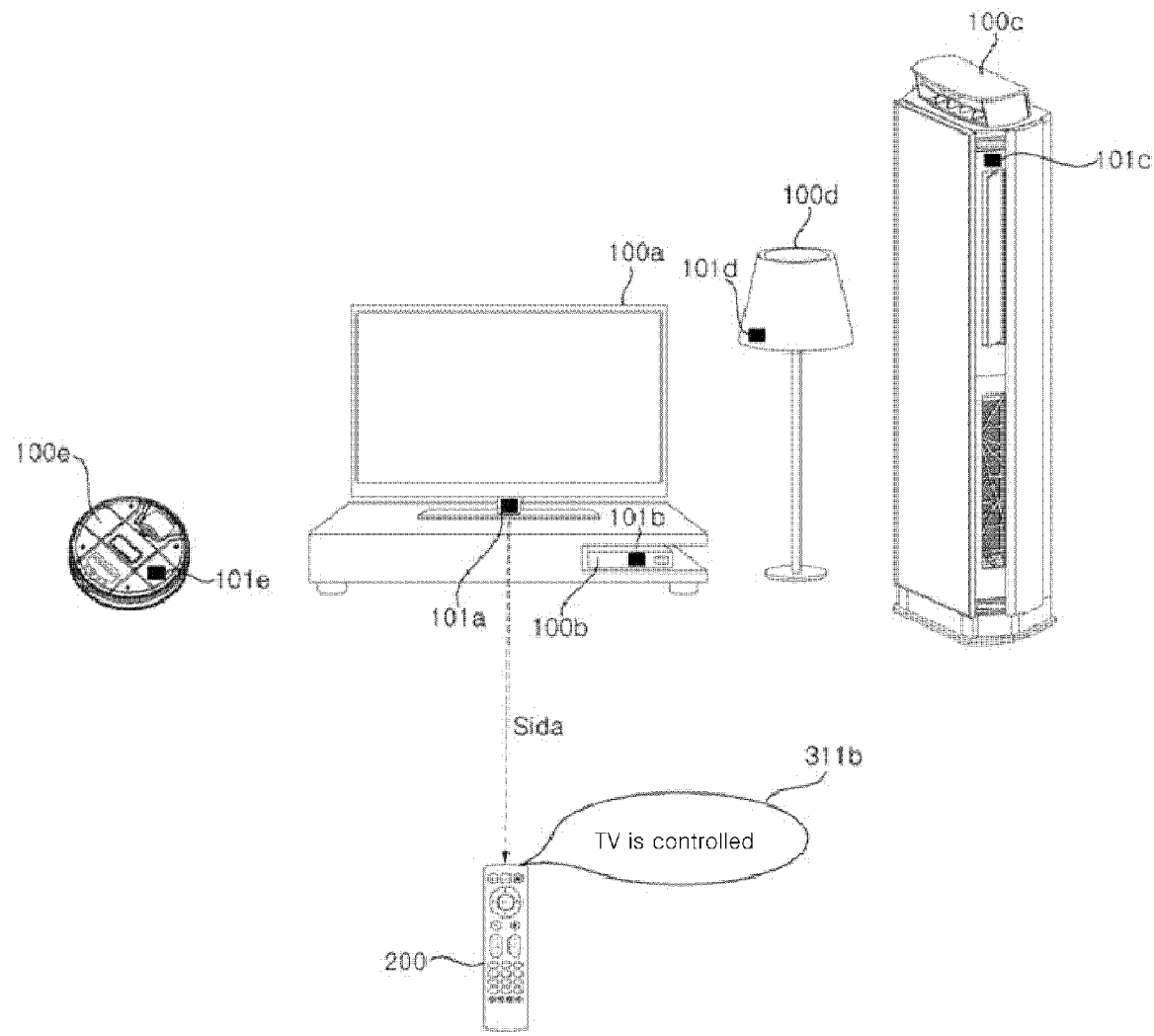

FIG. 9f illustrates a case in which a control command corresponding to at least part of the multiple keys is completed on the basis of control command information received through the transmission device 101c or the gateway 400. The figure illustrates output of a message 311a indicating that the corresponding device is controllable as sound.

Figure 9G:
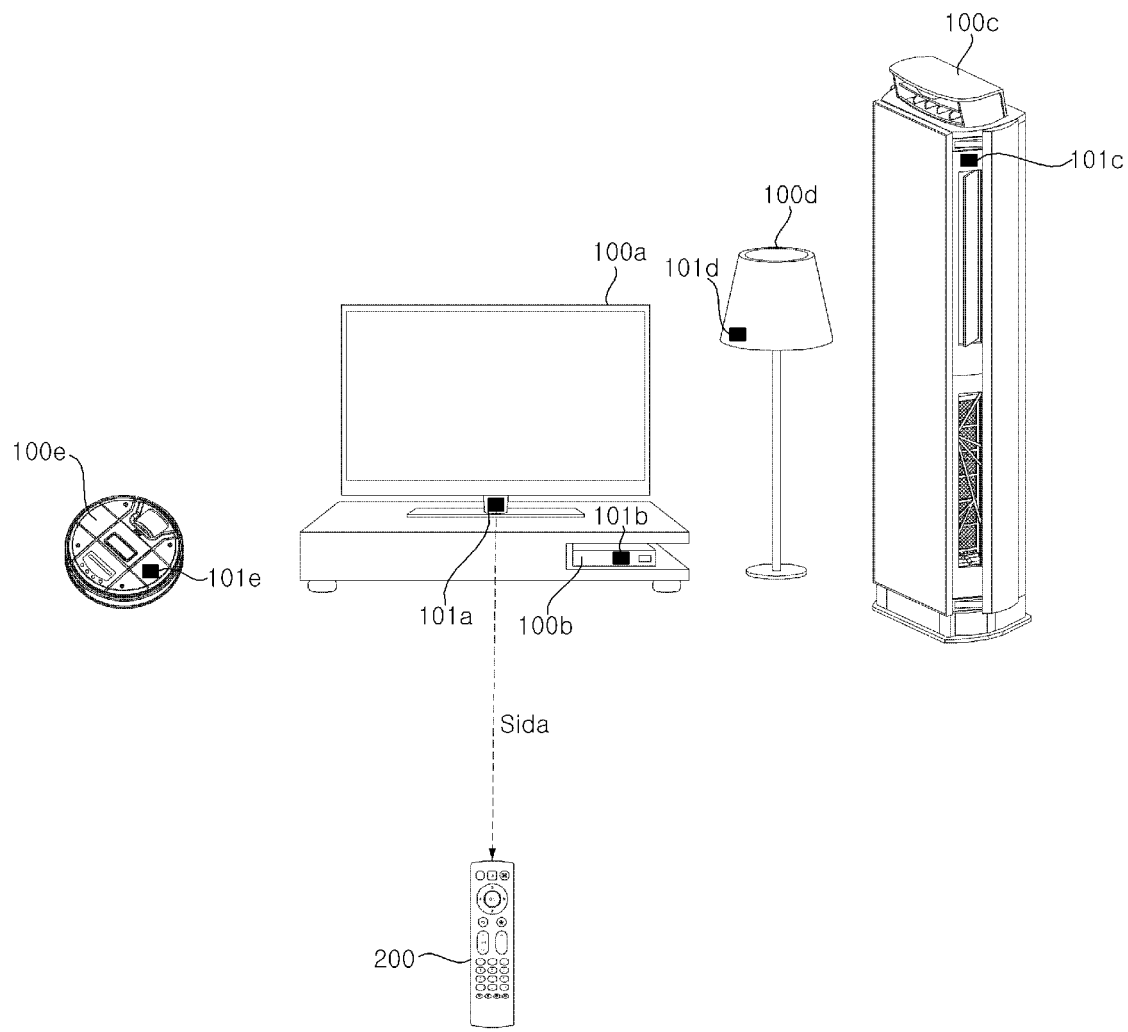

FIG. 9g illustrates output of an ID signal Sida from the transmission device 101a corresponding to the image display device 100a when the remote control apparatus 200 is pointed at the image display device 100a.

Accordingly, the remote control apparatus 200 may receive one or more ID signals including the ID signal Sida through the receiver 423, detect the ID signal Sida from the received ID signals and perform signal processing on the detected ID signal Sida to confirm or identify the image display device 100a as a currently remotely controllable device.

Figure 9H:
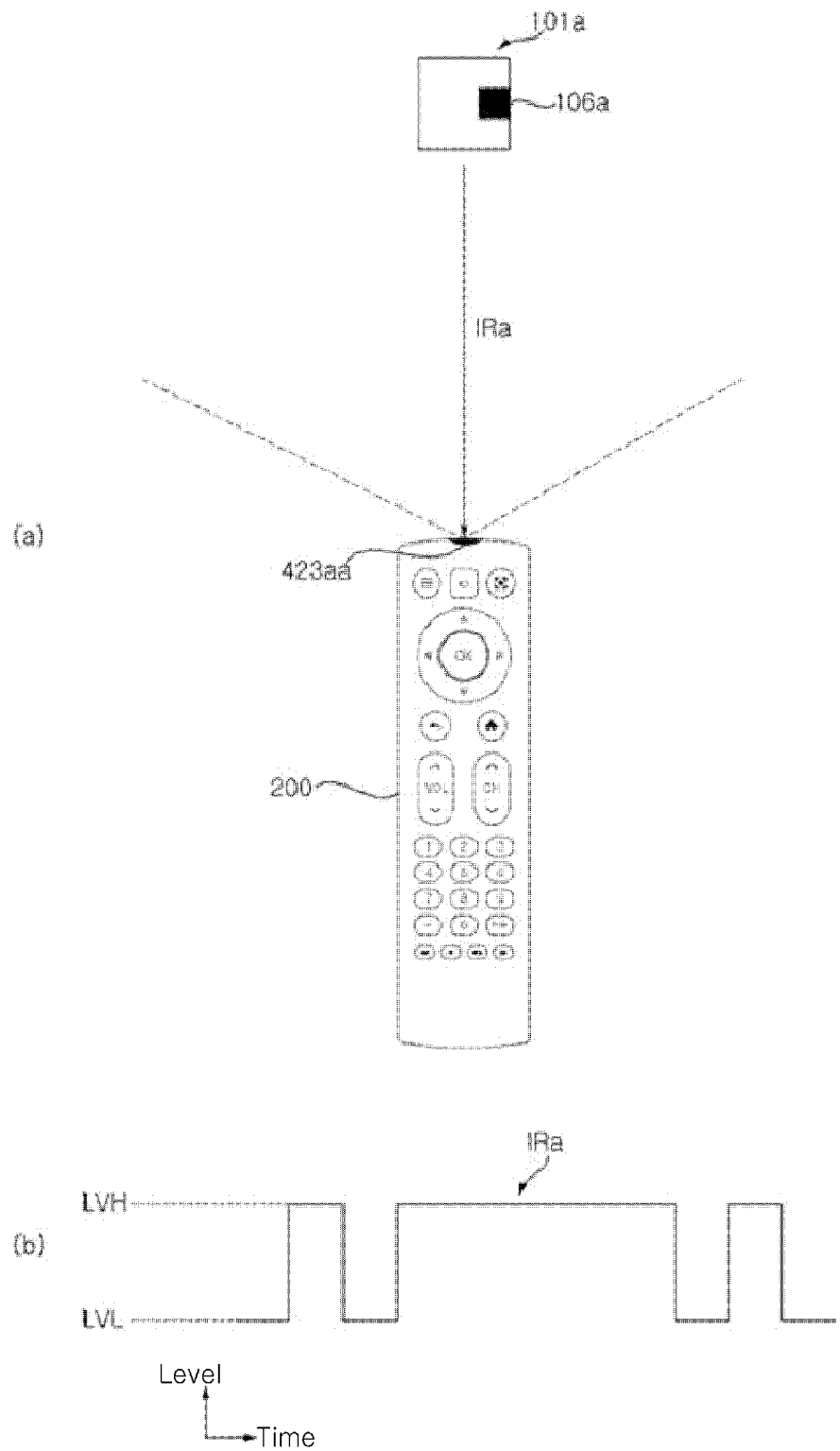

FIG. 9h illustrates output of a second IR ID signal Ira from the transmitter 106a of the transmission device 101a corresponding to the image display device 100a.

As shown in (a) of FIG. 9h, the IR camera 423aa of the remote control apparatus 200 may capture an IR image including the transmission device 101a corresponding to the image display device 100a.

(b) of FIG. 9h illustrates the IR ID signal IRa which has a predetermined low level LVL and high level LVH and a variable duty. That is, (b) of FIG. 9h shows the second IR ID signal IRa having a time-based duty in a second pattern.

The processor 480 may detect the second IR ID signal IRa having the duty in the second pattern as shown in the figure on the basis of multiple IR images captured during a predetermined frame period.

The processor 480 may compare the second pattern of the detected second IR ID signal IRa with pattern related data prestored in the memory 470 to identify the device at which the remote control apparatus 200 is pointed as the image display device 100a.

FIG. 9*i* illustrates a case in which control command information is received from the transmission device 101*a* corresponding to the image display device 100*a*. Particularly, the figure illustrates output of a control command information reception completion message 387*aa* as sound.

Figure 9J:
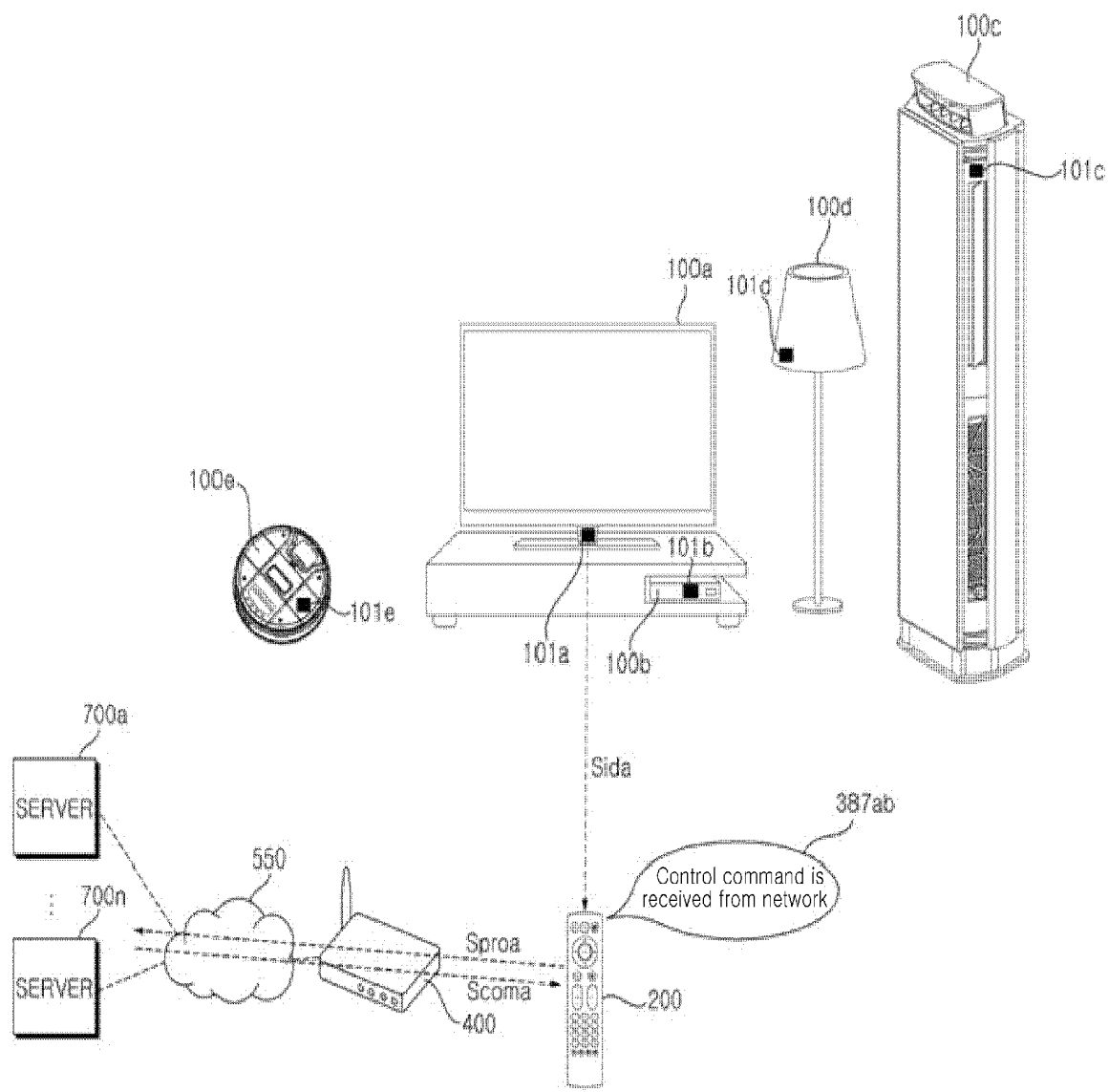

FIG. 9*j* illustrates a case in which control command information is received through the gateway 400. Particularly, the figure illustrates output of a control command information reception completion message 387*ab* as sound.

FIG. 9*j* illustrates a case in which the remote control apparatus 200 outputs a control command information request Sproa to the server 700 and receives control command information Scoma from the server 700.

Figure 9K:
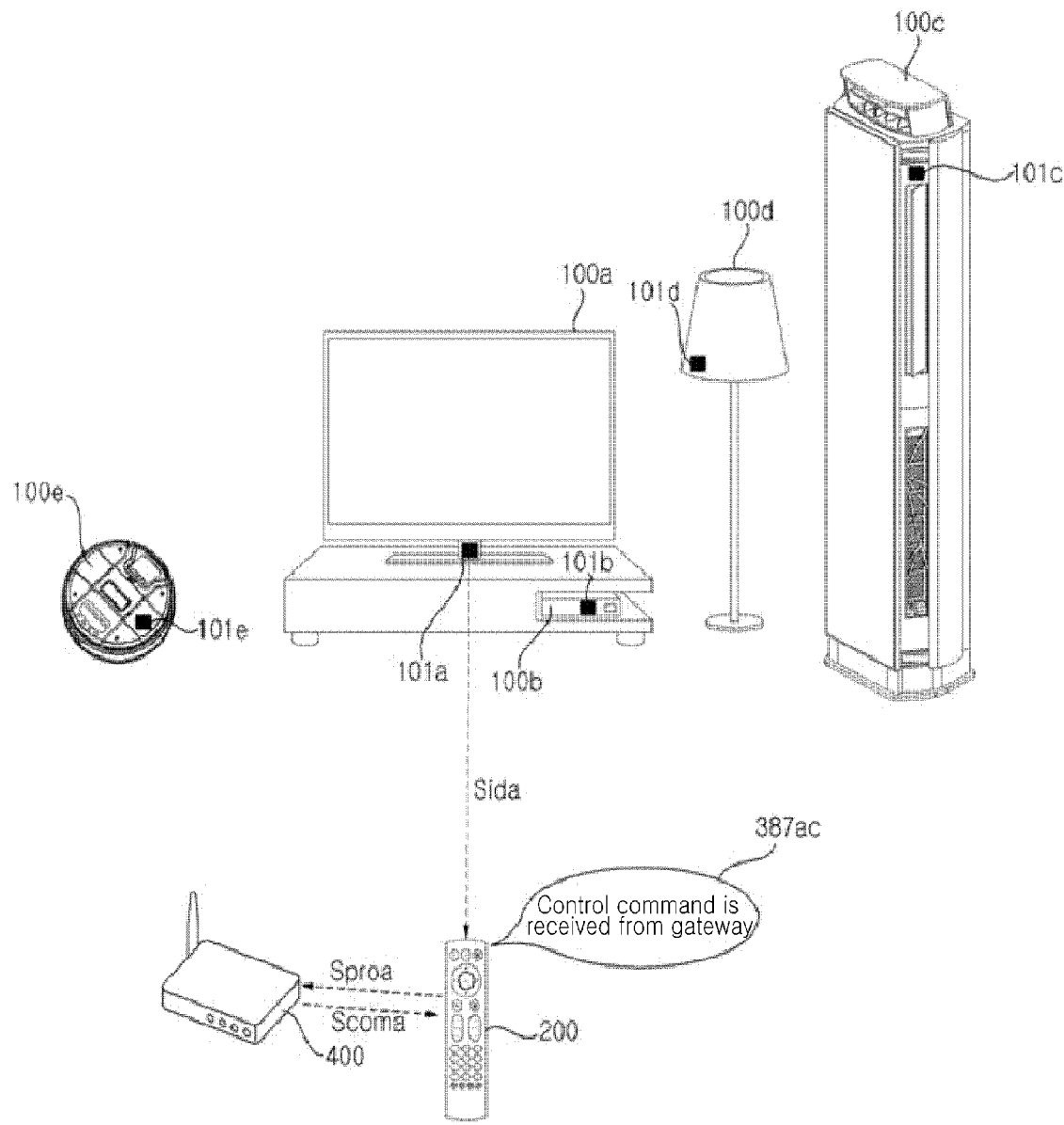

FIG. 9*k* illustrates a case in which control command information is received from the gateway 400. Particularly, the figure illustrates output of a control command information reception completion message 387*ac* as sound.

FIG. 9*k* illustrates a case in which the remote control apparatus 200 outputs the control command information request Sproa to the gateway 400 and receives the control command information Scoma from the gateway 400.

Figure 9L:
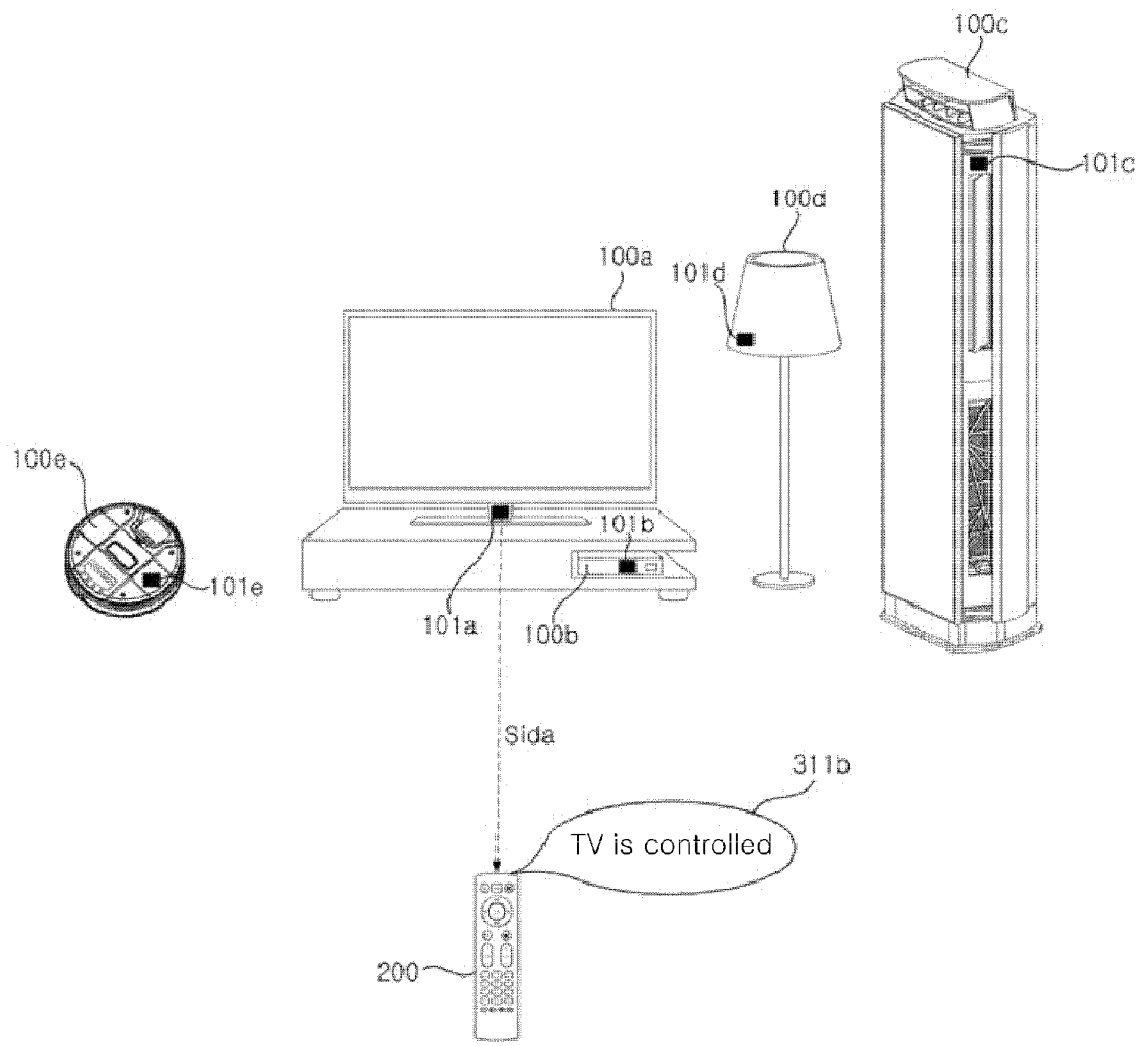

FIG. 9*l* illustrates case in which a control command corresponding to at least part of the multiple keys is completed on the basis of control command information received through the transmission device 101*a* or the gateway 400. The figure illustrates output of a message 311*b* indicating that the corresponding device is controllable as sound.

Figure 10:
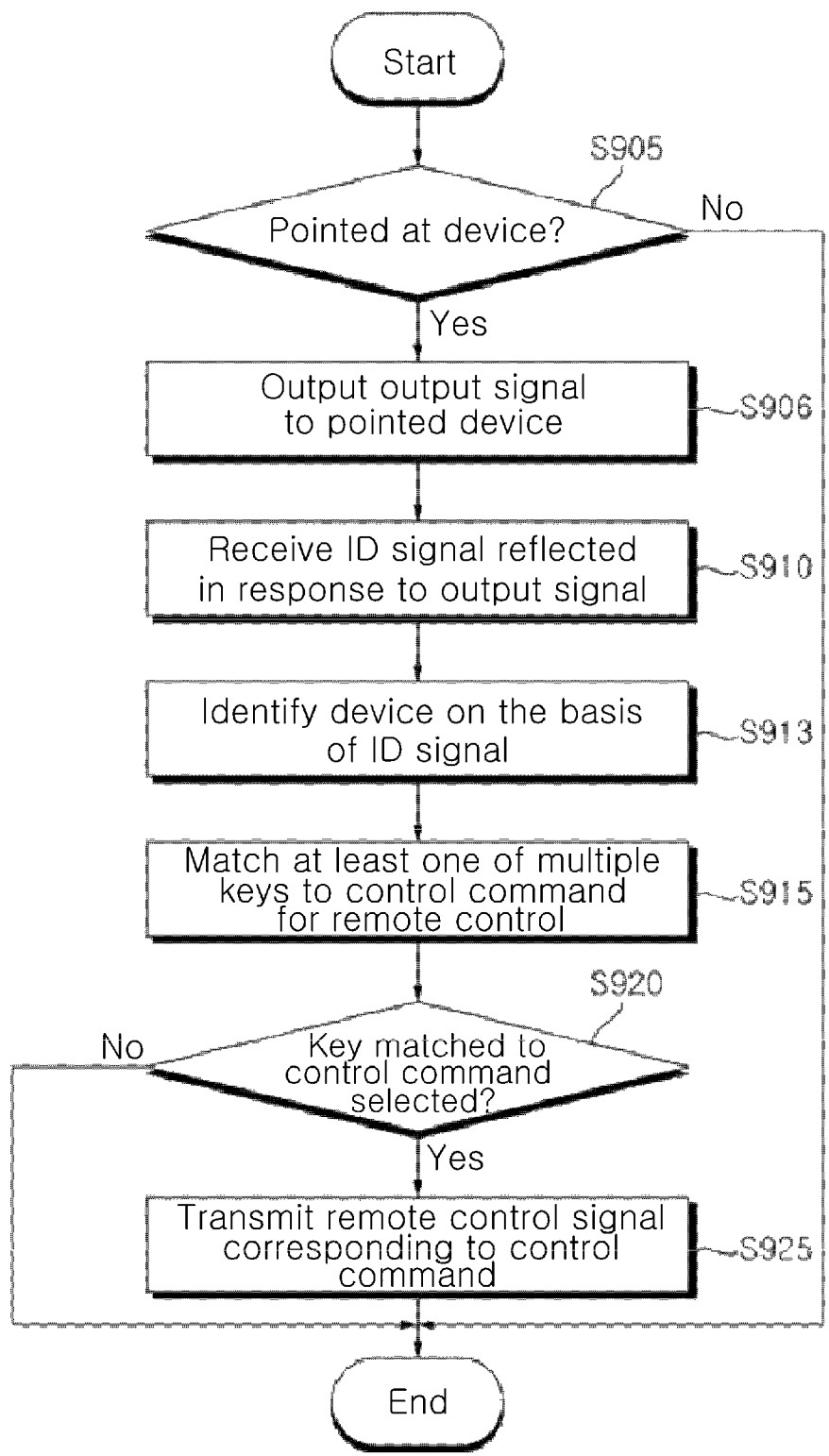
FIG. 10 is a flowchart illustrating an example of a remote control apparatus operation method according to another embodiment of the present invention.
Figure 11A:
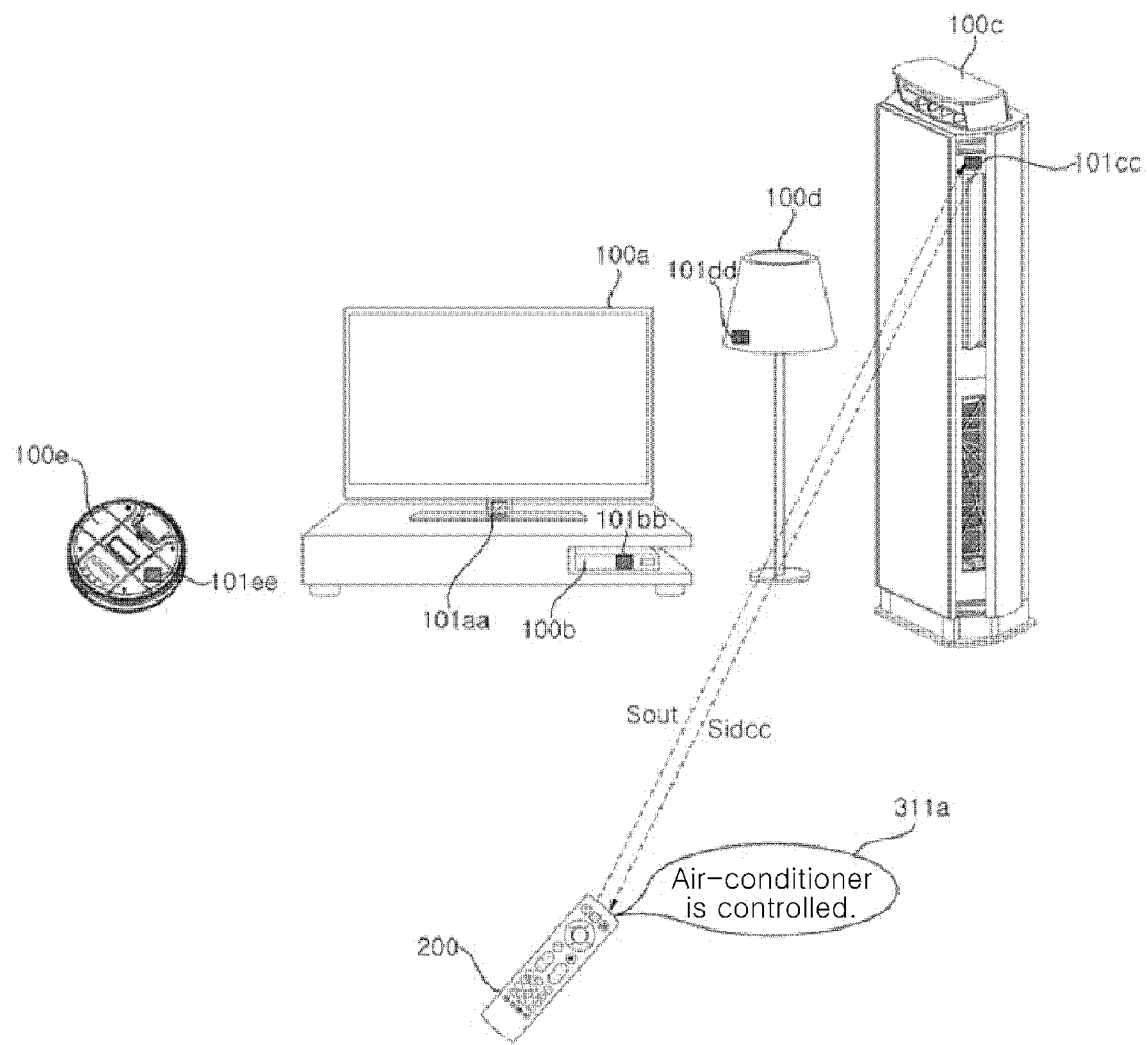
FIGS. 11a to 11p are diagrams referred to for description of the remote control apparatus operation method of FIG. 10.
Figure 11B:
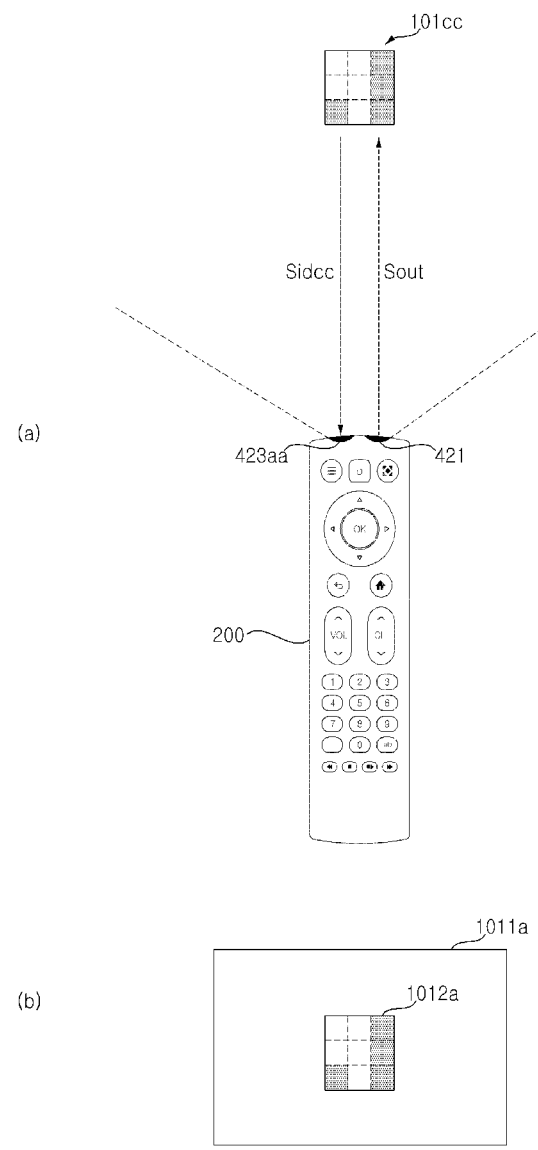
Figure 11C:
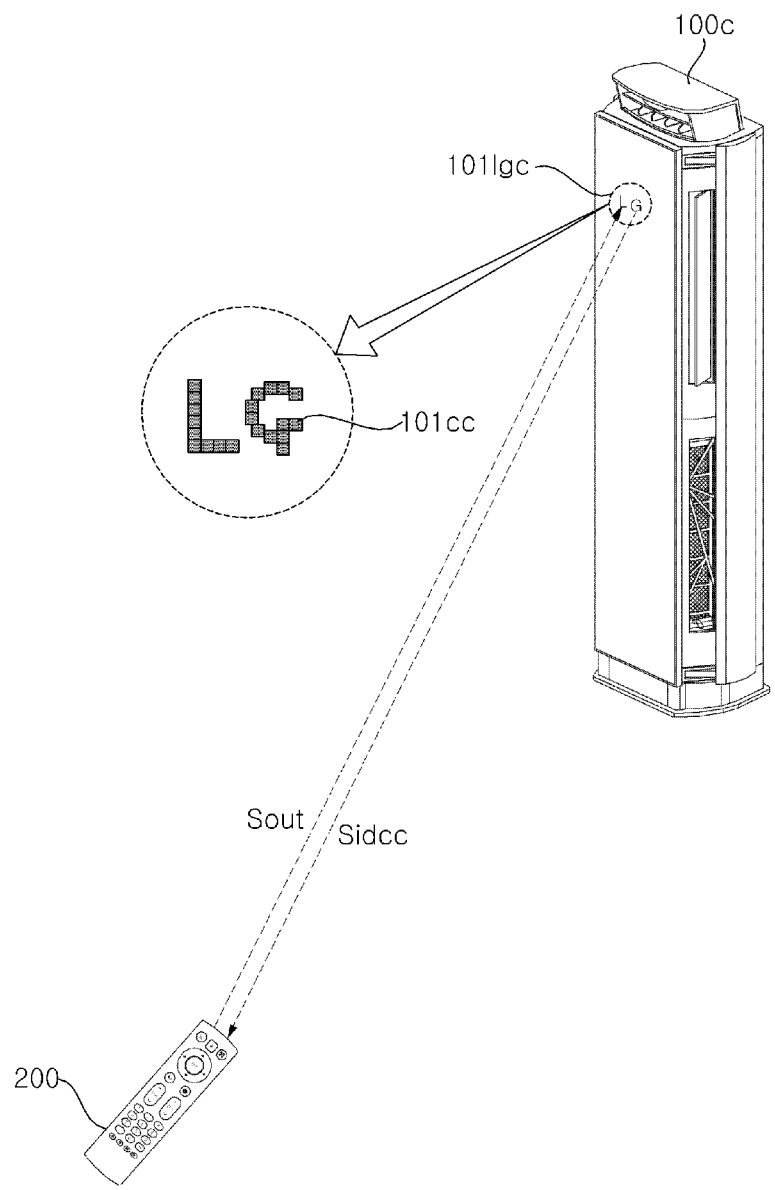
Figure 11E:
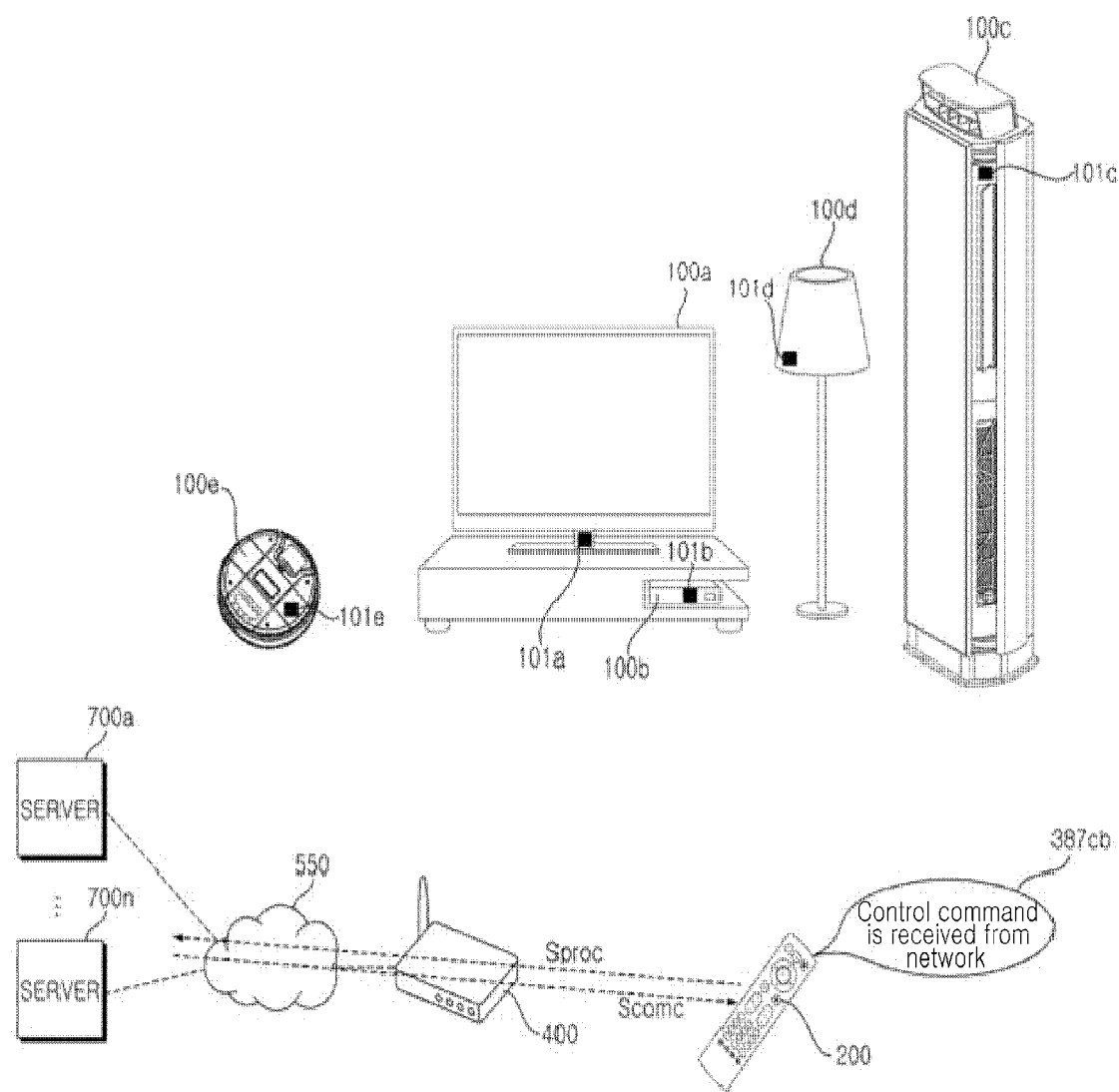
Figure 11G:
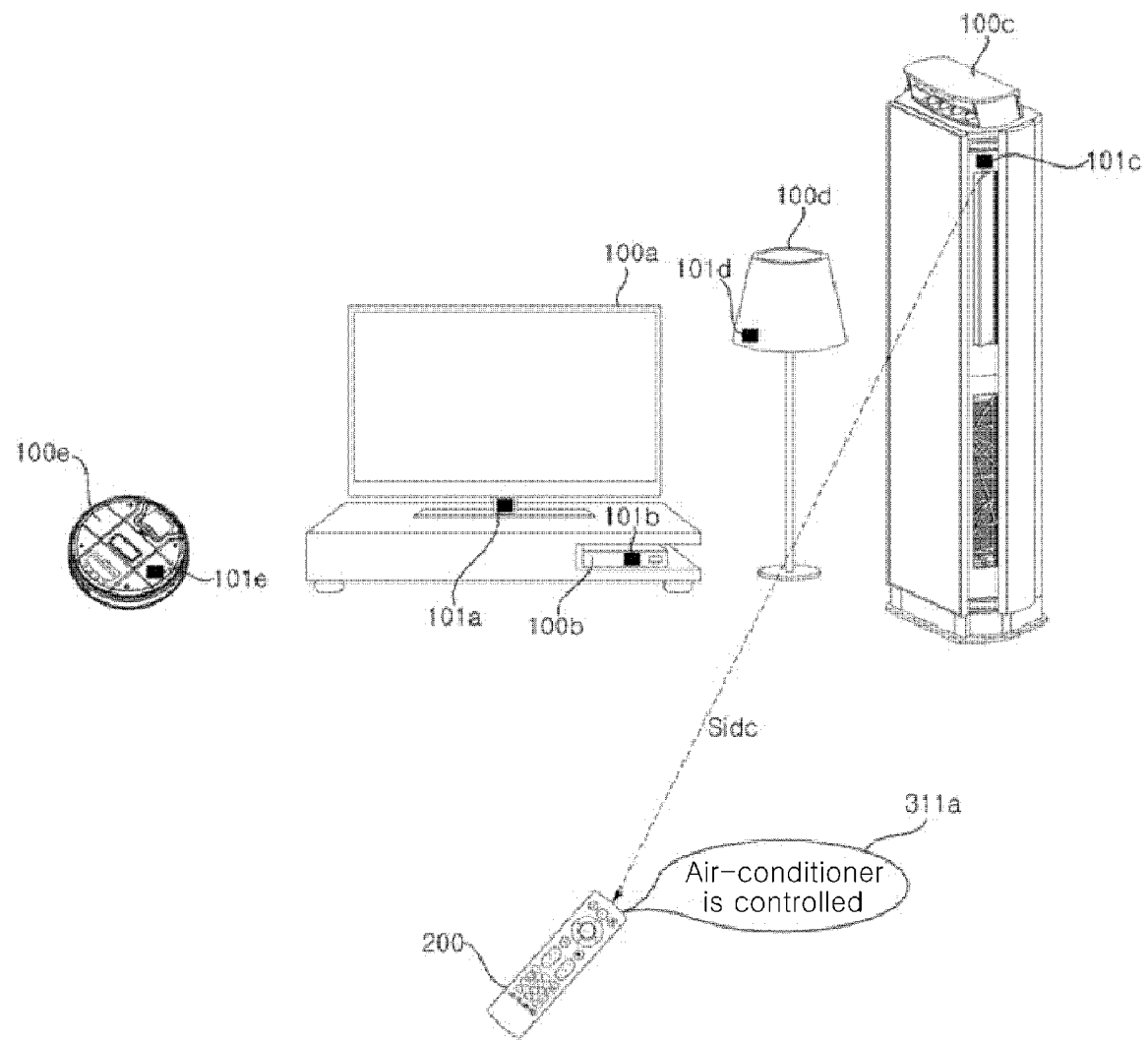
Figure 11H:
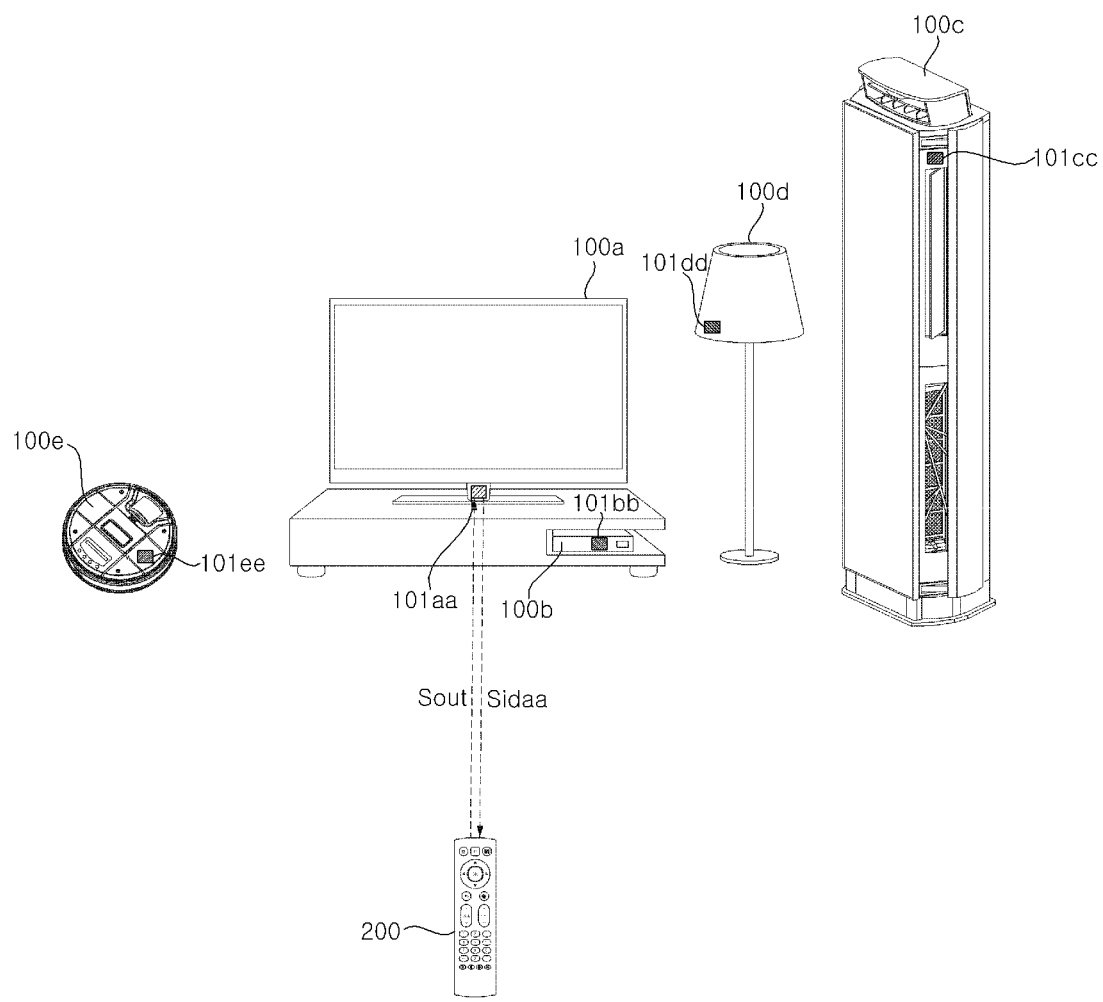
Figure 11J:
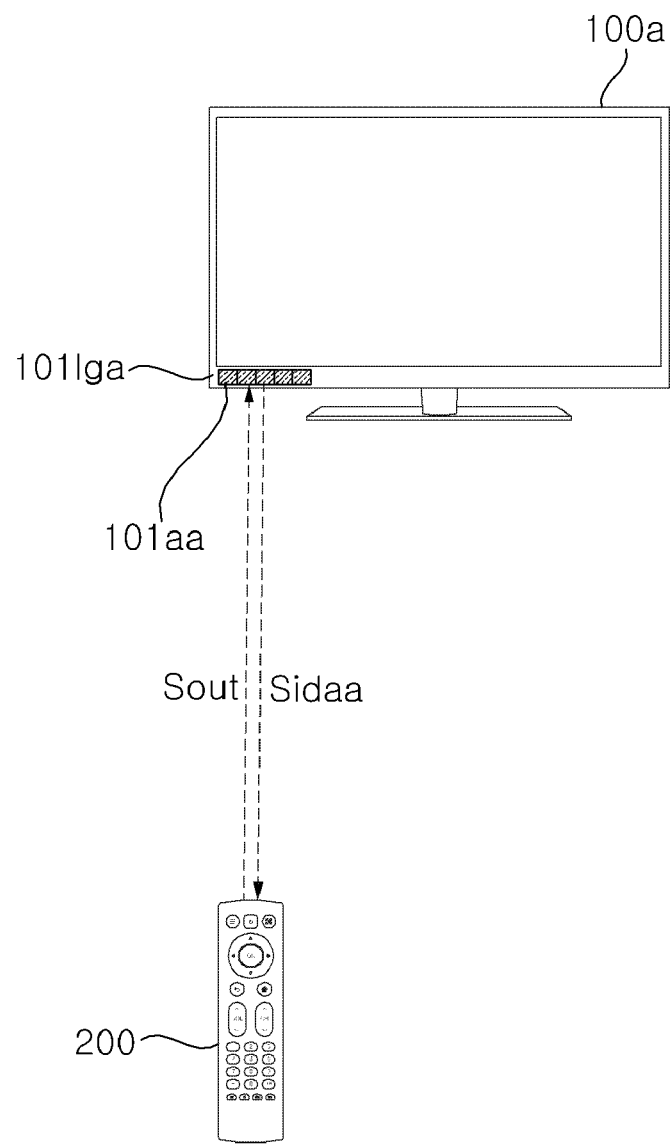
Figure 11L:
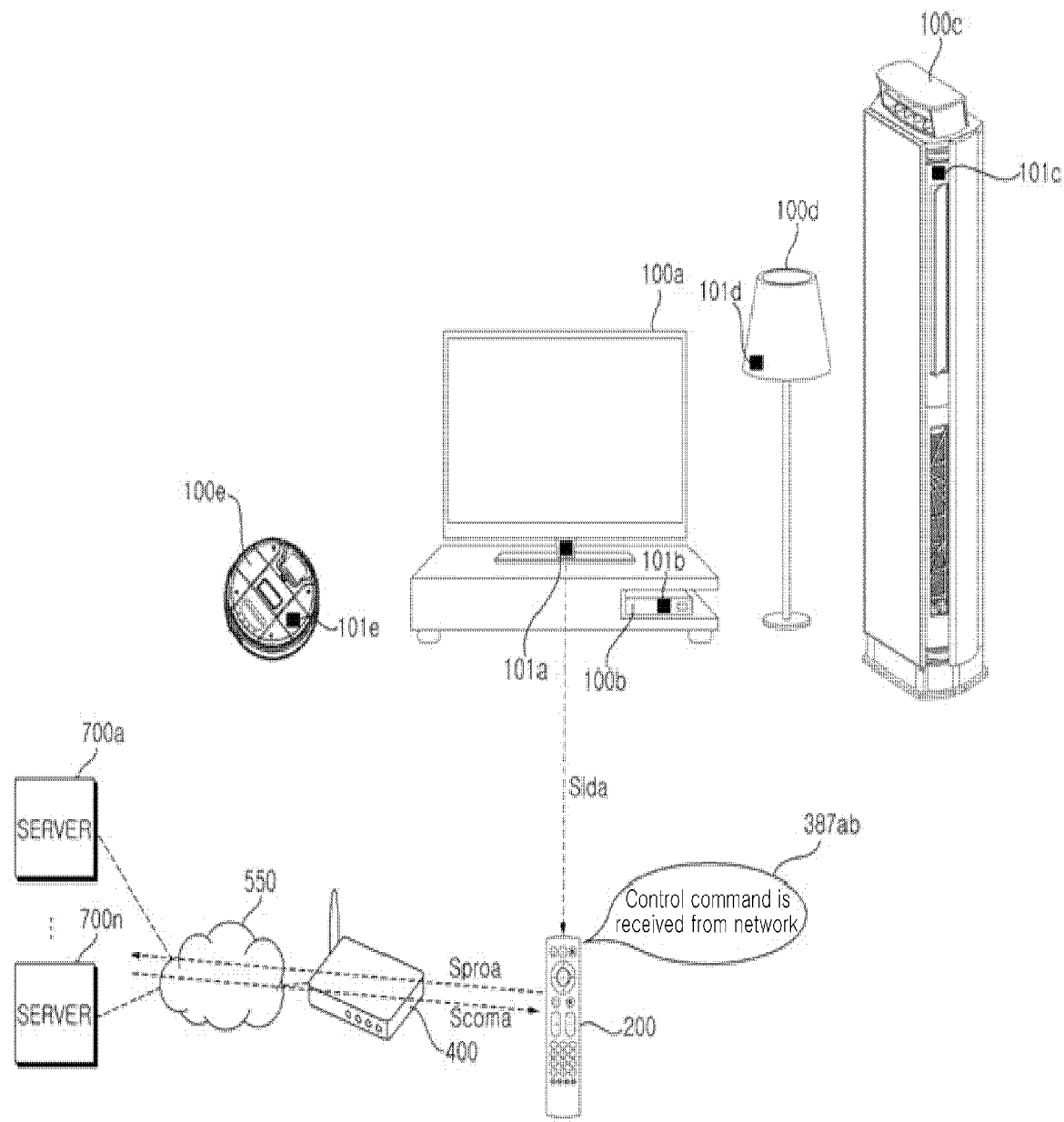
Figure 11M:
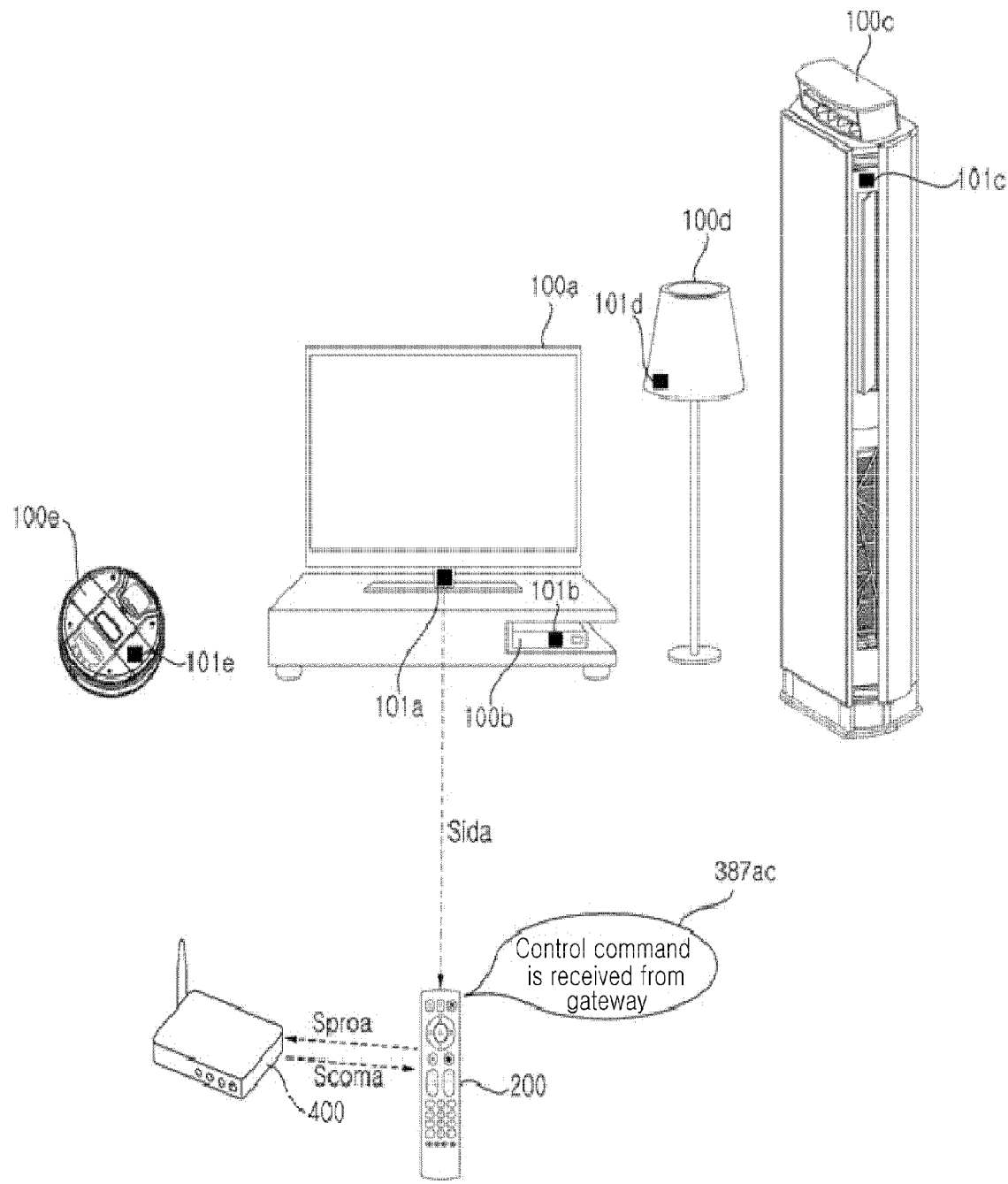
Figure 11N:
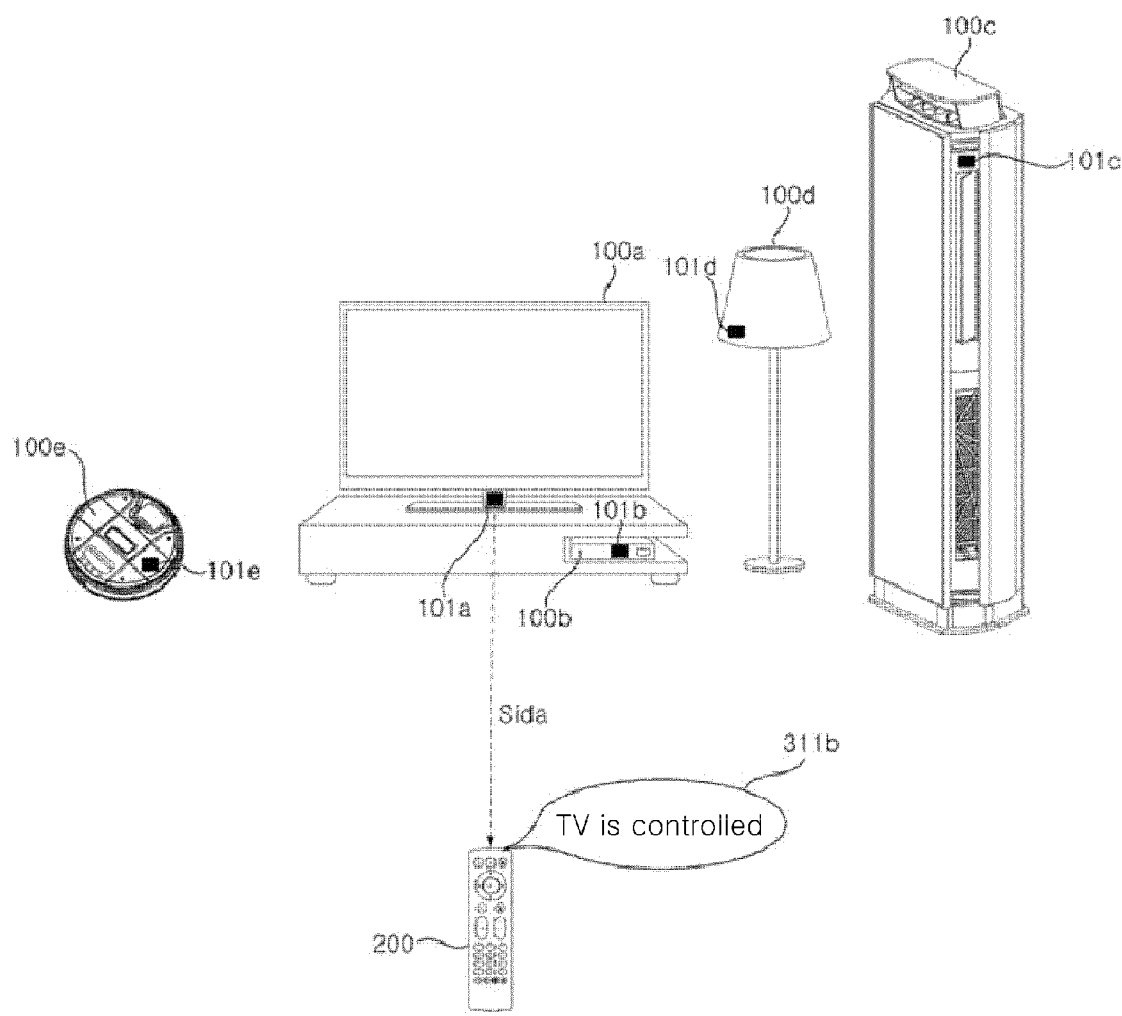
Figure 11P:
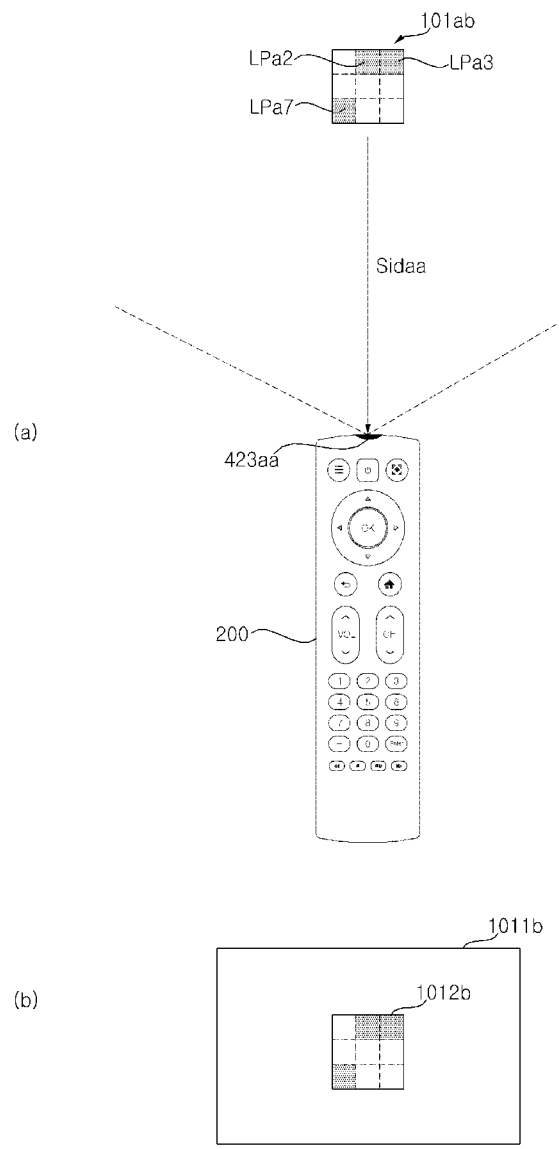

FIG. 10 is a flowchart illustrating an example of a remote control apparatus operation method according to another embodiment of the present invention and FIGS. 11*a* to 11*p* are diagrams referred to for description of the remote control apparatus operation method of FIG. 10.

The operation method of FIG. 10 is similar to the operation method of FIG. 8 but differs from the operation method of FIG. 8 in that the former includes an output signal output step S906 and a step S910 of receiving a reflected ID signal in response to an output signal. Steps S905 and S913 to S925 correspond to steps S805 and S811 and steps S813 to S825 of FIG. 8.

Referring to FIG. 11*a*, transmission devices 101*aa*, 101*bb*, 101*cc*, 101*dd*, 101*ee*, 101*ff*, 101*gg* and 101*hh* are passive transmission devices and may include a reflection member for reflecting an external output signal without an additional power supply.

For device identification during reflection, the transmission devices may include different reflection pattern members for respective devices.

The remote control apparatus 200 may output an output signal Sout to a device at which the remote control apparatus 200 is pointed through the transmitter 421.

When the remote control apparatus 200 is pointed at the air-conditioner 100*c*, as shown in FIG. 11*a*, the output signal Sout output from the remote control apparatus 200 is input to the transmission device 101*cc* corresponding to the air-conditioner 100*c* and the transmission device 101*cc* may output a reflected signal, that is, an ID signal Sidcc, to the remote control apparatus 200 through reflection or total reflection using a specific pattern formed therein.

Accordingly, the remote control apparatus 200 may receive one or more ID signals including the ID signal Sidcc through the receiver 423 and perform signal processing on the ID signal Sidcc to confirm or identify the air-conditioner 100*c* as a currently remotely controllable device.

FIG. 11*b* illustrates the transmission device 101*cc* of the air-conditioner 100*c*, which includes a space-based first IR reflection pattern.

Particularly, (a) of FIG. 11*b* illustrates a case in which the transmitter 421 of the remote control apparatus 200 outputs the IR output signal Sout to the transmission device 101*cc* of the air-conditioner 100*c* at which the remote control apparatus 200 is pointed and the IR camera 423*aa* receives the reflected IR signal Sidcc according to the first IR reflection pattern formed in the transmission device 100*cc* of the air-conditioner 100*c*.

Accordingly, the IR camera 423*aa* can capture at least one IR image 1011*a* including the first IR reflection pattern 1012*a* as shown in (b) of FIG. 11*b*.

The processor 480 may compare the first IR reflection pattern 1012*a* included in the captured IR image 1011*a* with IR pattern data prestored in the memory 470 to identify the device at which the remote control apparatus 200 is pointed as the air-conditioner 100*c*.

Although the figure illustrates a 3×3 IR pattern, the IR pattern may be modified in various manners.

FIG. 11*c* illustrates a case in which the transmission device 101*cc* including the space-based first IR reflection pattern is provided to a logo 1011*gc* formed at the front side of the air-conditioner 100*c*.

As shown, when the transmission device 101*cc* including the space-based first IR reflection pattern is provided to the logo 1011*gc* formed at the front side of the air-conditioner 100*c*, there is no need to form the IR reflection pattern in a separate space and thus the degree of freedom in design can be improved.

Meanwhile, a control command extraction step S914 may be performed after control command information is received from the transmission device 101 or the gateway 400, as described above.

FIG. 11*d* illustrates a case in which control command information is received from the transmission device 101*c* corresponding to the air-conditioner 100*c*.

FIG. 11*e* illustrates a case in which control command information is received from the server 700. Particularly, the figure illustrates output of the control command information reception completion message 387*cb* as sound.

FIG. 11*e* illustrates a case in which the remote control apparatus 200 outputs the control command information request Sproc to the server 700 and receives the control command information Scomc from the server 700.

FIG. 11*f* illustrates a case in which control command information is received from the gateway 400. Particularly, the figure illustrates output of the control command information reception completion message 387*cc* as sound.

FIG. 11*f* illustrates a case in which the remote control apparatus 200 outputs the control command information request Sproc to the gateway 400 and receives the control command information Scomc from the gateway 400.

When a control command corresponding to at least part of the multiple keys is completed on the basis of the control command information received through the transmission device 101*c*, the server 700 or the gateway 400, the remote control apparatus 200 may output the message 311*a* indicating that the device is controllable, as shown in FIG. 11*g*.

FIG. 11*h* illustrates a case in which the output signal Sout output from the remote control apparatus 200 is input to the transmission device 101*aa* corresponding to the image display device 100*a* and the transmission device 101*aa* may output a reflected signal, that is, an ID signal Sidaa, to the remote control apparatus 200 through reflection or total reflection using a specific pattern formed therein when the remote control apparatus 200 is pointed at the image display device 100*a*.

Accordingly, the remote control apparatus 200 may receive one or more ID signals including the ID signal Sidaa through the receiver 423, detect the ID signal Sidaa and perform signal processing on the detected ID signal Sidaa to confirm or identify the image display device 100a as a currently remotely controllable device.

FIG. 11i illustrates the transmission device 101aa of the image display device 100a, which includes a space-based second IR reflection pattern.

Particularly, (a) of FIG. 11i illustrates a case in which the transmitter 421 of the remote control apparatus 200 outputs the IR output signal Sout to the transmission device 101aa of the image display device 100a at which the remote control apparatus 200 is pointed and the IR camera 423aa receives the reflected IR signal Sidaa according to the second IR reflection pattern formed in the transmission device 100aa of the image display device 100a.

Accordingly, the IR camera 423aa can capture at least one IR image 1011b including the second IR reflection pattern 1012b as shown in (b) of FIG. 11e.

The processor 480 may compare the second IR reflection pattern 1012b included in the captured IR image 1011b with IR pattern data prestored in the memory 470 to identify the device at which the remote control apparatus 200 is pointed as the image display device 100a.

FIG. 11j illustrates a case in which the transmission device 101aa including the space-based second IR reflection pattern is formed in a bezel area 1011gc of the image display device 100a.

As shown, when the transmission device 101aa including the space-based second IR reflection pattern is formed in the bezel area 1011gc of the image display device 100a, there is no need to form the IR reflection pattern in a separate space and thus the degree of freedom in design can be improved.

FIG. 11k illustrates a case in which control command information is received from the transmission device 101a corresponding to the image display device 100a.

FIG. 11l illustrates a case in which control command information is received from the server 700.

FIG. 11l illustrates a case in which the remote control apparatus 200 outputs the control command information request Sproa to the server 700 and receives the control command information Scoma from the server 700.

FIG. 11m illustrates a case in which control command information is received from the gateway 400. Particularly, the figure illustrates output of the control command information reception completion message 387ac as sound.

FIG. 11m illustrates a case in which the remote control apparatus 200 outputs the control command information request Sproa to the gateway 400 and receives the control command information Scoma from the gateway 400.

When a control command corresponding to at least part of the multiple keys is completed on the basis of the control command information received through the transmission device 101a, the server 700 or the gateway 400, the remote control apparatus 200 may output the message 311b indicating that the device is controllable, as shown in FIG. 11n.

FIG. 11o is similar to FIG. 11b and illustrates a case in which the transmitter 421 of the remote control apparatus 200 does not output the IR output signal Sout and the transmission device 101cb of the air-conditioner 100c causes only some LPc3, LPc6, LPc7 and LPc9 of nine IR emission units to emit light.

The IR image 1011a captured by the IR camera 423aa may be identical to that shown in FIG. 11b. Accordingly, the processor 480 can compare the IR image 1011a with the IR pattern data prestored in the memory 470 to identify the device at which the remote control apparatus 200 is pointed as the air-conditioner 100c.

FIG. 11p is similar to FIG. 11i and illustrates a case in which the transmitter 421 of the remote control apparatus 200 does not output the IR output signal Sout and the transmission device 101ab of the image display device 100a causes only some LPa2, LPa3 and LPa7 of nine IR emission units to emit light.

The IR image 1011b captured by the IR camera 423aa may be identical to that shown in FIG. 11e. Accordingly, the processor 480 can compare the IR image 1011b with the IR pattern data prestored in the memory 470 to identify the device at which the remote control apparatus 200 is pointed as the image display device 100a.

Figure 12A:
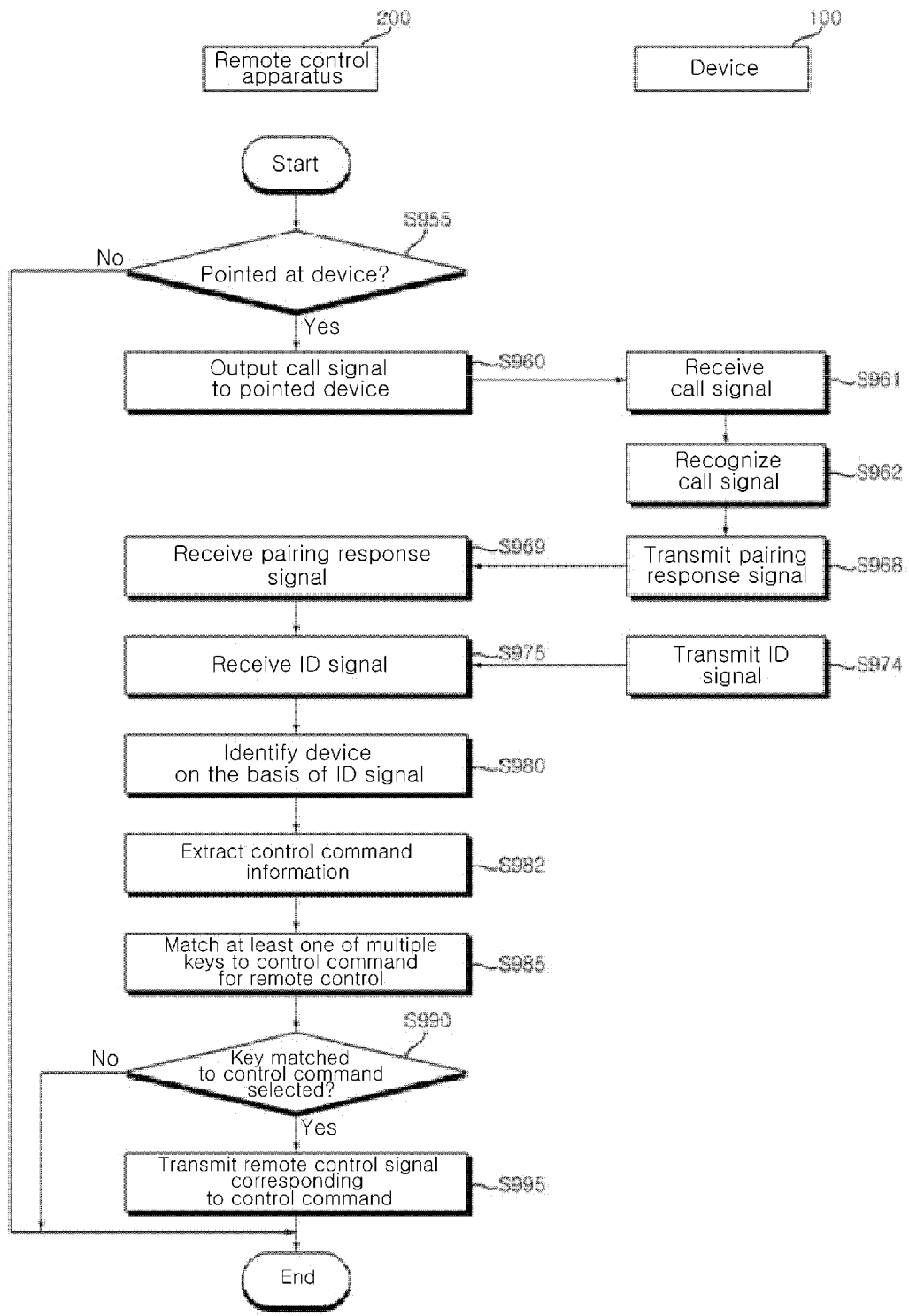
FIGS. 12a to 12c are flowcharts illustrating examples of a remote control apparatus operation method according to another embodiment of the present invention.
Figure 12B:
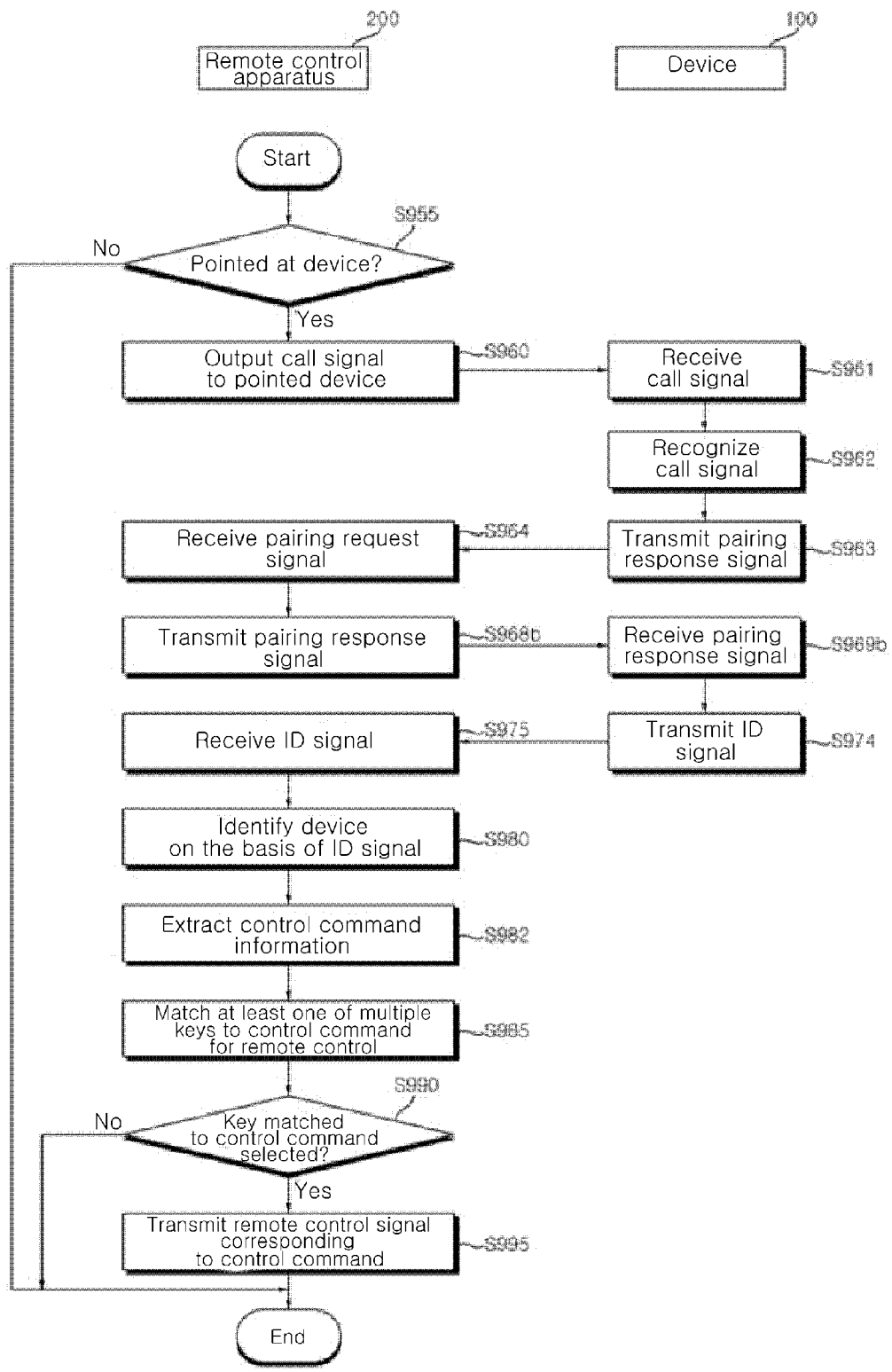
Figure 12C:
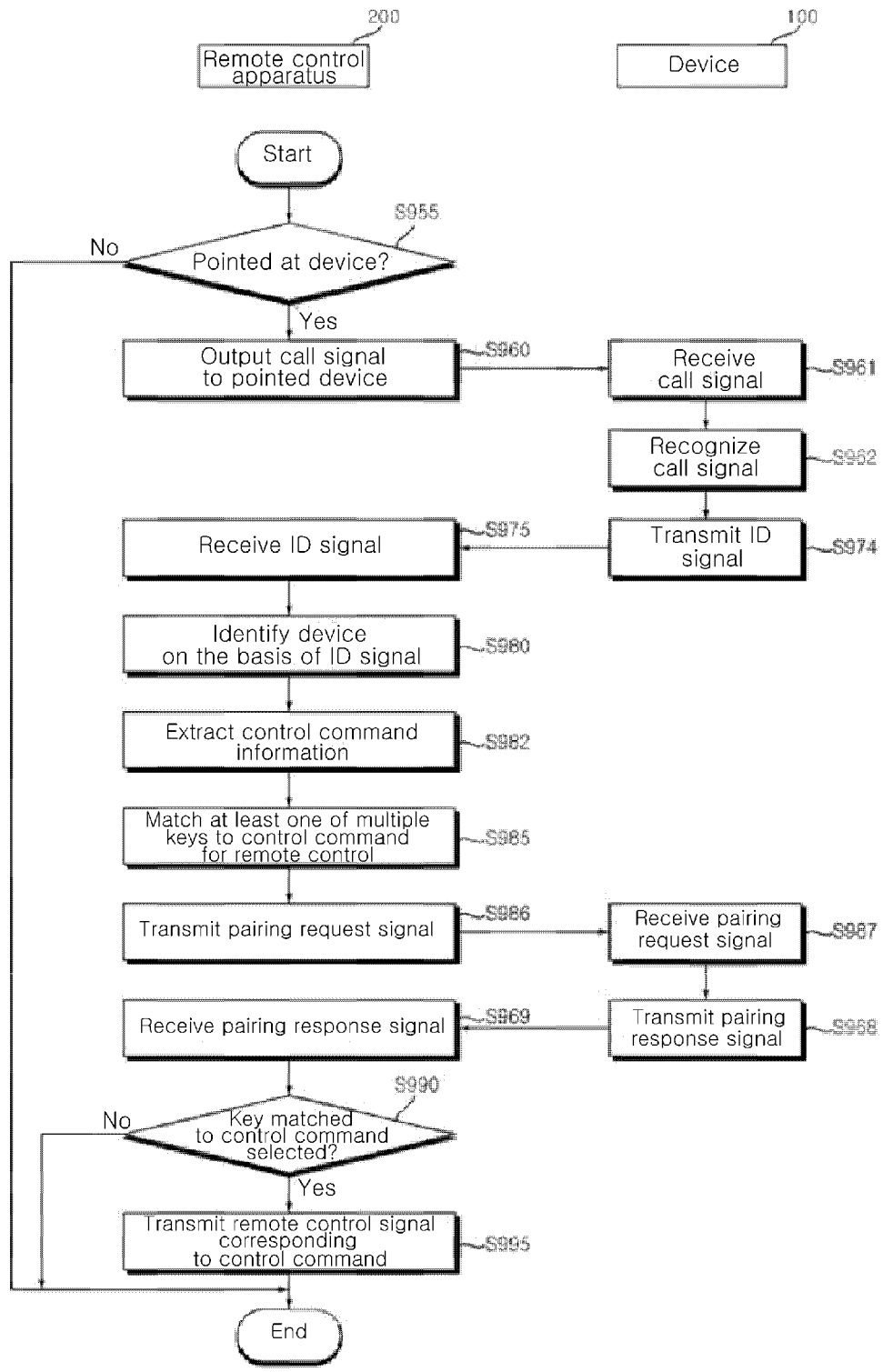

FIGS. 12a to 12c are flowcharts illustrating examples of a remote control apparatus operation method according to another embodiment of the present invention and FIGS. 13a to 13d are diagrams referred to for description of the remote control apparatus operation method of FIGS. 12a to 12c.

Referring to FIG. 12a, when the remote control apparatus 200 is pointed at a device (S955), the transmitter 421 of the remote control apparatus 200 transmits a call signal Scall to the device (S960).

The call signal Scall may include a pairing request signal.

The device 100 at which the remote control apparatus 200 is pointed may receive the call signal Scall (S961) and recognize the call signal Scall (S962).

The device 100 may recognize the pairing request signal upon recognition of the call signal and transmit a pairing response signal in response to the pairing request signal (S968).

The remote control apparatus 200 may receive the pairing response signal (S969). Accordingly, pairing between the remote control apparatus 200 and the device 100 can be completed.

The device 100 may transmit an ID signal after completion of pairing (S974).

Then, the remote control apparatus 200 may receive the ID signal (S975).

The processor 480 of the remote control apparatus 200 may identify the device on the basis of the ID signal (S980). The device identification method has been described above.

The processor 480 of the remote control apparatus 200 may extract control command information about the identified device after identification of the device (S982).

As described above, the processor of the remote control apparatus 200 may extract the control command information about the device from the device ID signal or receive a signal including the control command information from the device, the gateway 400 or the server 700 and extract the control command information about the device from the signal.

Subsequently, the processor 480 of the remote control apparatus 200 matches at least one of the multiple keys to a control command for remote control of the device (S985).

Then, the processor 480 of the remote control apparatus 200 determines whether a key matched to the control command is selected (S990) and controls a remote control signal corresponding to the control command to be transmitted when the key matched to the control command is selected (S995). Accordingly, the device can be easily remotely controlled.

FIG. 12b is similar to FIG. 12a but differs from FIG. 12a with respect to the call signal output step S960 to the identification step S980.

Referring to FIG. 12b, the transmitter 421 of the remote control apparatus 200 transmits a call signal Scall to a device at which the remote control apparatus 200 is pointed (S960).

The device 100 at which the remote control apparatus 200 is pointed may receive the call signal Scall (S961) and recognize the call signal Scall (S962).

The device 100 may transmit a pairing request signal upon recognition of the call signal (S963).

The receiver 423 of the remote control apparatus 200 may receive the pairing request signal (S964).

The transmitter 421 of the remote control apparatus 200 may transmit a pairing response signal in response to the pairing request signal (S968b).

The device 100 may receive the pairing response signal (S969b). Accordingly, pairing between the remote control apparatus 200 and the device 100 can be completed.

The device 100 may transmit an ID signal after completion of pairing (S974). Then, the receiver 423 of the remote control apparatus 200 may receive the ID signal (S975).

FIG. 12c is similar to FIG. 12a but differs from FIG. 12a with respect to the call signal output step S960 to the matching step S985.

Referring to FIG. 12c, the transmitter 421 of the remote control apparatus 200 transmits a call signal Scall to a device at which the remote control apparatus 200 is pointed (S960).

The device 100 at which the remote control apparatus 200 is pointed may receive the call signal Scall (S961) and recognize the call signal Scall (S962).

The device 100 may transmit an ID signal upon recognition of the call signal (S974). Then, the receiver 423 of the remote control apparatus 200 may receive the ID signal (S975).

Subsequently, the processor 480 of the remote control apparatus 200 identifies the device on the basis of the received ID signal (S980).

Upon identification of the device, the processor 480 of the remote control apparatus 200 may extract control command information about the identified device (S982).

As described above, the processor of the remote control apparatus 200 may extract the control command information about the device from the device ID signal or receive a signal including the control command information from the device, the gateway 400 or the server 700 and extract the control command information about the device from the signal.

Subsequently, the processor 480 of the remote control apparatus 200 matches at least one of the multiple keys to a control command for remote control of the device (S985).

Then, the transmitter 421 of the remote control apparatus 200 may transmit a pairing request signal (S986). The device 100 may receive the pairing request signal (S987).

Thereafter, the device 100 may transmit a pairing response signal in response to the pairing request signal (S988).

The receiver 423 of the remote control apparatus 200 may receive the pairing response signal (S989). Accordingly, pairing between the remote control apparatus 200 and the device can be completed.

Figure 13A:
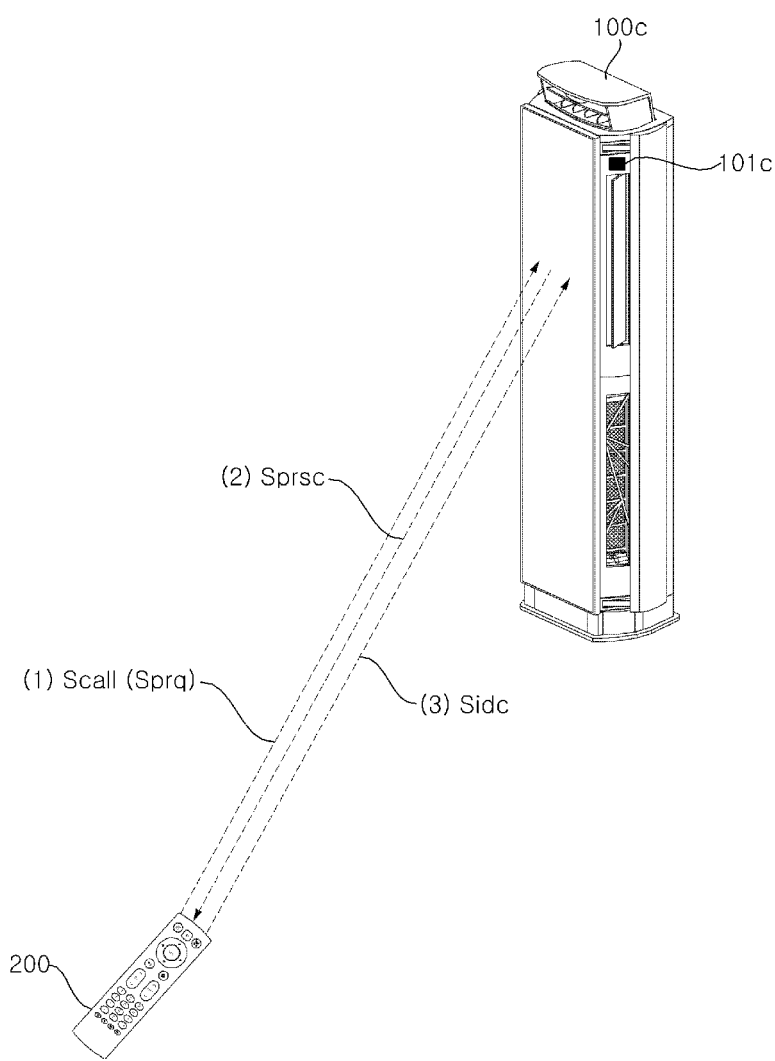

FIG. 13a is a diagram referred to for describing an example of a method of identifying the air-conditioner 100c by the remote control apparatus 200 in relation with FIG. 12a.

When the remote control apparatus 200 transmits a call signal Scall to the air-conditioner 100c, the air-conditioner 100c receives and recognizes the call signal Scall. In addition, the air-conditioner 100c recognizes a pairing request signal Sprq included in the call signal Scall.

The air-conditioner 100c transmits a pairing response signal Sprsc upon recognition of the pairing request signal Sprq. The remote control apparatus 200 receives the pairing response signal Sprsc, and thus pairing is completed.

The air-conditioner 100c outputs an ID signal Sidc upon completion of pairing. The remote control apparatus 200 receives the ID signal Sidc and identifies the air-conditioner 100c on the basis of the ID signal Sidc.

Figure 13B:
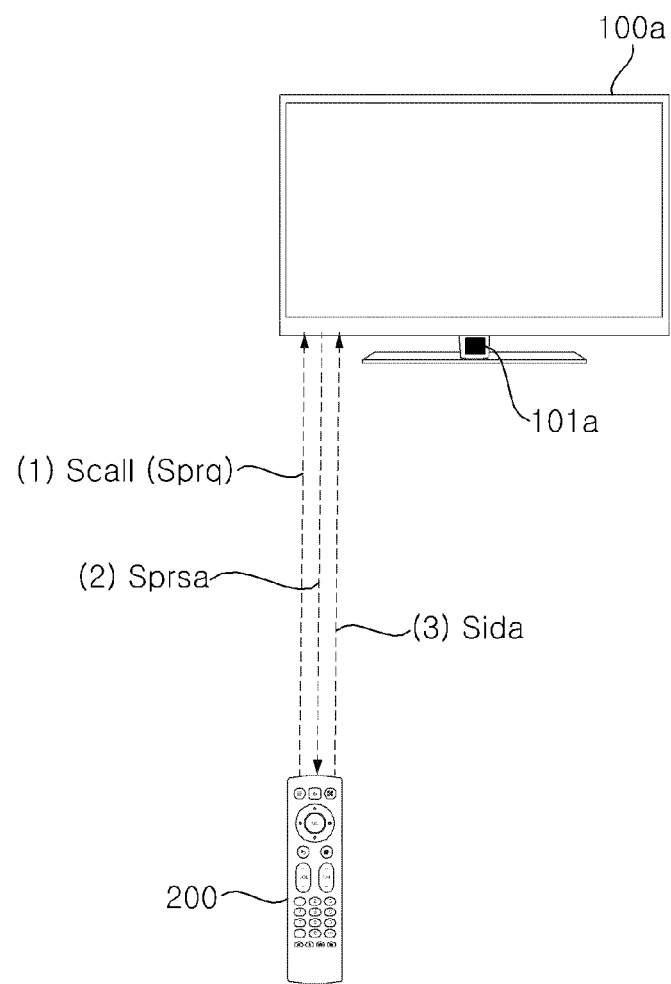

FIG. 13b is a diagram referred to for describing another example of a method of identifying the image display device 100a by the remote control apparatus 200 in relation with FIG. 12a.

When the remote control apparatus 200 transmits a call signal Scall to the image display device 100a, the image display device 100a receives and recognizes the call signal Scall. In addition, the image display device 100a recognizes a pairing request signal Sprq included in the call signal Scall.

The image display device 100a transmits a pairing response signal Sprsa upon recognition of the pairing request signal Sprq. The remote control apparatus 200 receives the pairing response signal Sprsa, and thus pairing is completed.

The remote control apparatus 200 may receive an ID signal through any one of an RF signal, a Wi-Fi signal, a ZigBee signal, a Bluetooth signal, a laser signal and a UWB signal from the image display device 100a through pairing between the image display device 100a and the remote control apparatus 200.

The image display device 100a outputs an ID signal Sida upon completion of pairing. The remote control apparatus 200 receives the ID signal Sida and identifies the image display device 100a on the basis of the ID signal Sida.

Figure 13C:
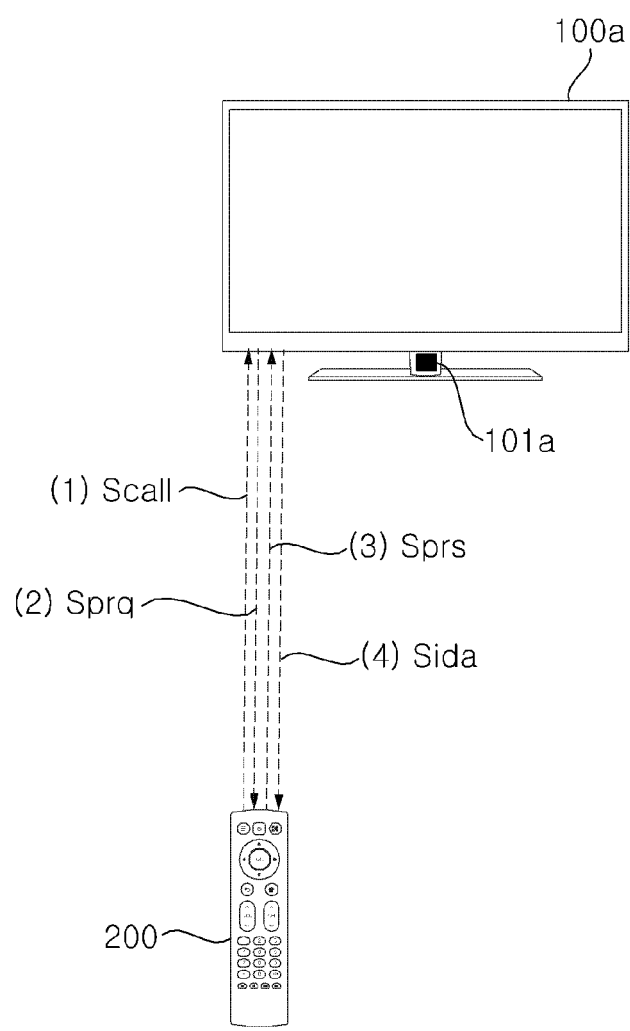

FIG. 13c is a diagram referred to for describing another example of a method of identifying the image display device 100a by the remote control apparatus 200 in relation with FIG. 12b.

When the remote control apparatus 200 transmits a call signal Scall to the image display device 100a, the image display device 100a receives and recognizes the call signal Scall. In addition, the image display device 100a transmits a pairing request signal Sprq upon recognition of the call signal Scall.

The remote control apparatus 200 receives the pairing request signal Sprq and transmits a pairing response signal Sprs in response to the pairing request signal Sprq.

The image display device 100a receives the pairing response signal Sprs, and thus pairing is completed.

The image display device 100a outputs the ID signal Sida upon completion of pairing. The remote control apparatus 200 receives the ID signal Sida and identifies the image display device 100a on the basis of the ID signal Sida.

Figure 13D:
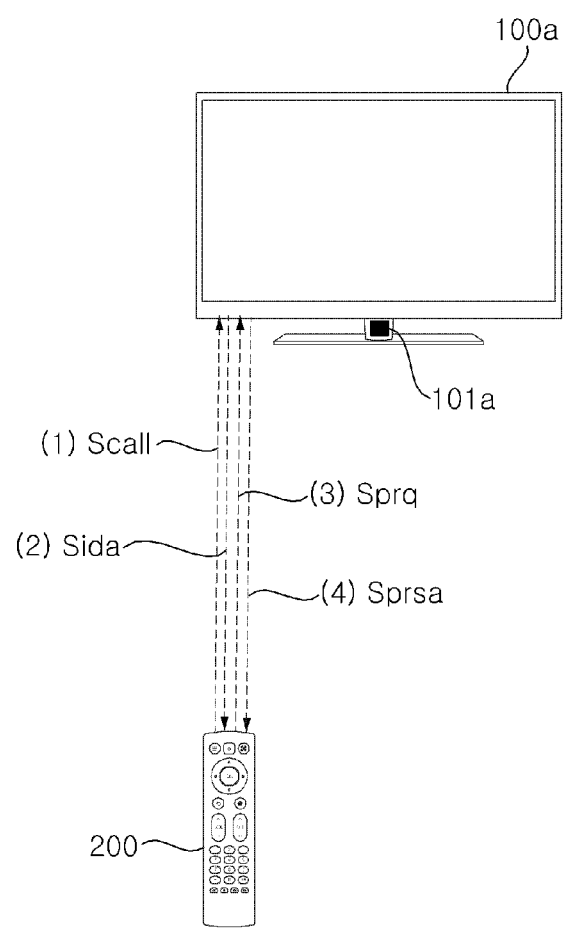

FIG. 13d is a diagram referred to for describing another example of a method of identifying the image display device 100a by the remote control apparatus 200 in relation with FIG. 12c.

When the remote control apparatus 200 transmits a call signal Scall to the image display device 100a, the image display device 100a receives and recognizes the call signal Scall. In addition, the image display device 100a outputs the ID signal Sida upon recognition of the call signal Scall. The remote control apparatus 200 receives the ID signal Sida and identifies the image display device 100a on the basis of the ID signal Sida.

The remote control apparatus 200 transmits a pairing request signal Sprq upon completion of device identification. The image display device 100a receives the pairing request signal Sprq and transmits a pairing response signal Sprsa in response to the pairing request signal Sprq.

The remote control apparatus 200 receives the pairing response signal Sprsa, and thus pairing is completed.

Figure 13F:
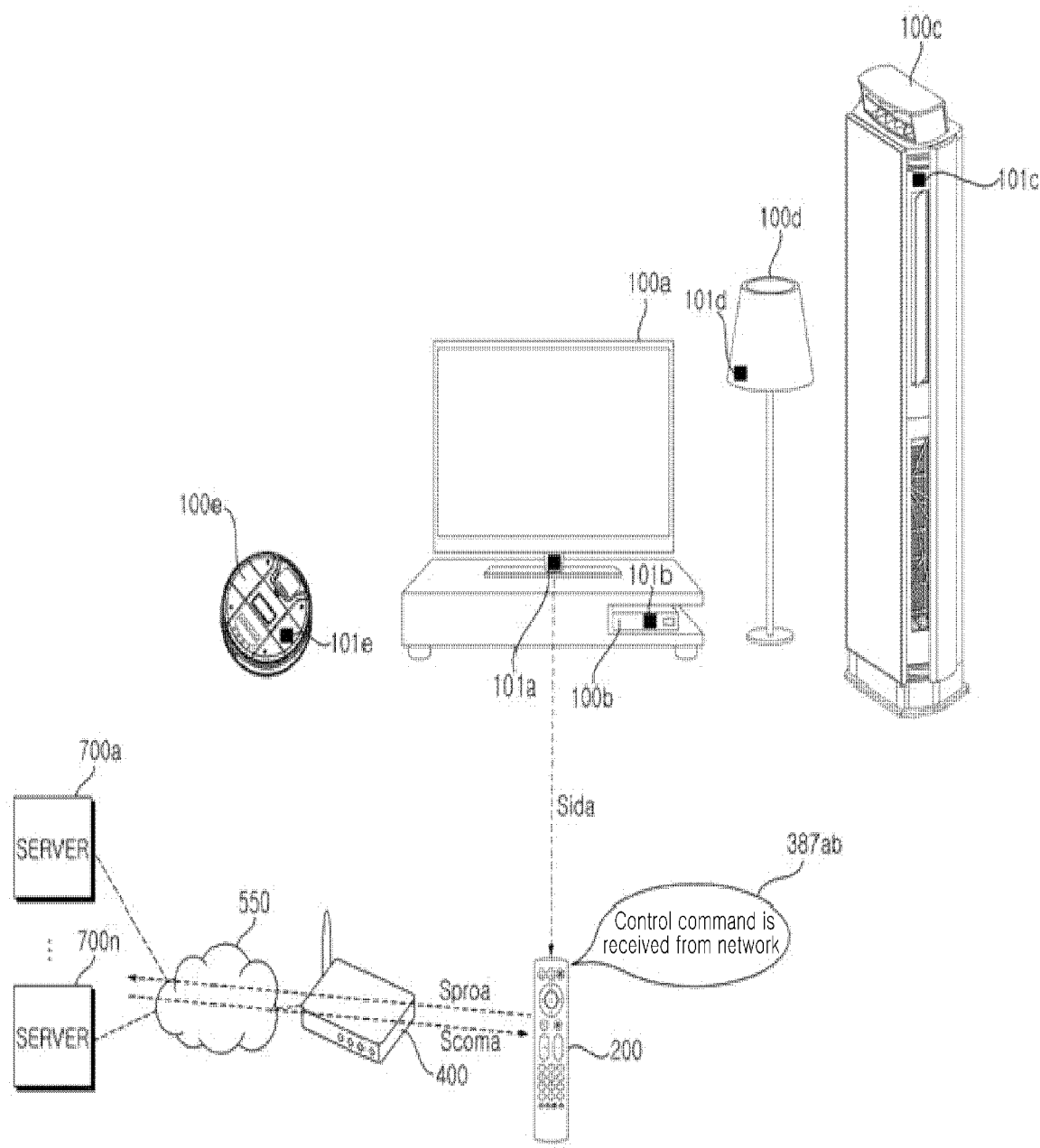
Figure 13G:
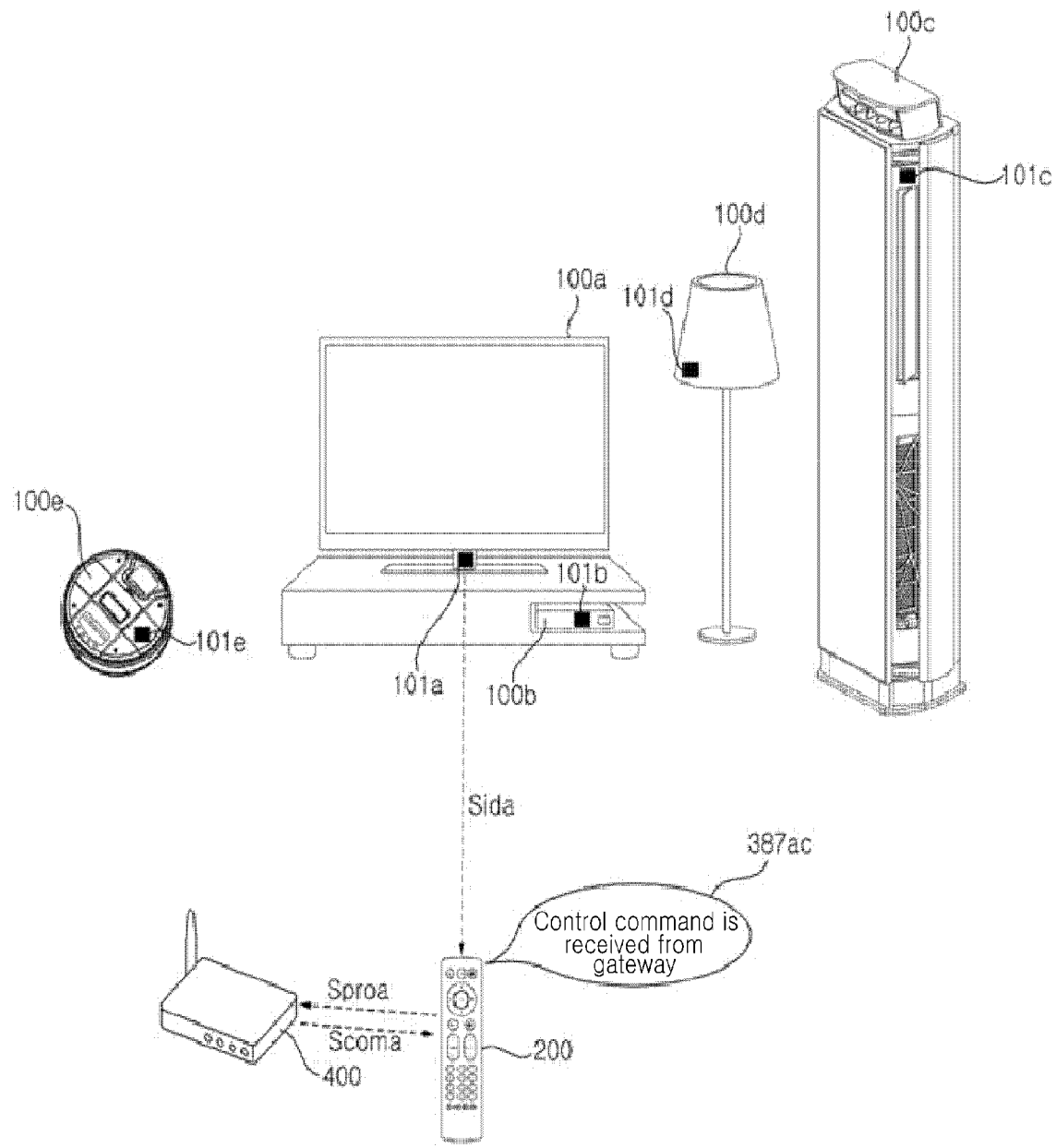

FIGS. 13e to 13g illustrate various examples of extracting control command information after reception of an ID signal.

FIG. 13e illustrates a case in which the control command information is received from the transmission device 101a. The figure illustrates output of a message 387aa indicating control command information reception from the transmission device as sound.

FIG. 13f illustrates a case in which the control command information is received from the server 700. The figure illustrates output of a message 387ab indicating control command information reception from the server as sound.

FIG. 13g illustrates a case in which the control command information is received from the gateway 400. The figure illustrates output of a message 387ac indicating control command information reception from the gateway 400 as sound.

Consequently, the processor 480 of the remote control apparatus 200 may match at least one of the multiple keys to a control command for remote control of a device on the basis of the control command information received from the outside, as illustrated in FIGS. 13e to 13g.

Figure 14:
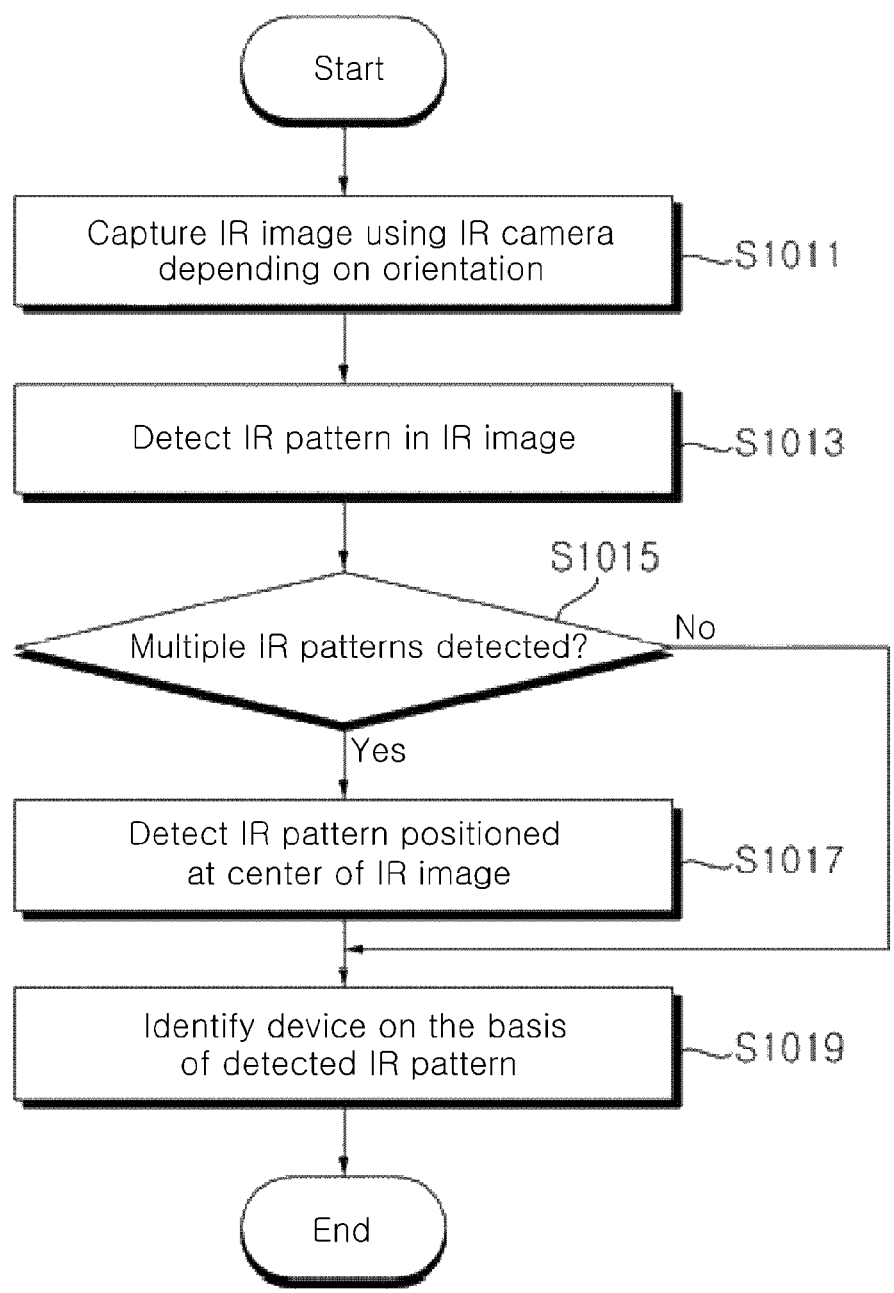
FIG. 14 is a flowchart illustrating an example of a remote control apparatus operation method according to another embodiment of the present invention.
Figure 15B:
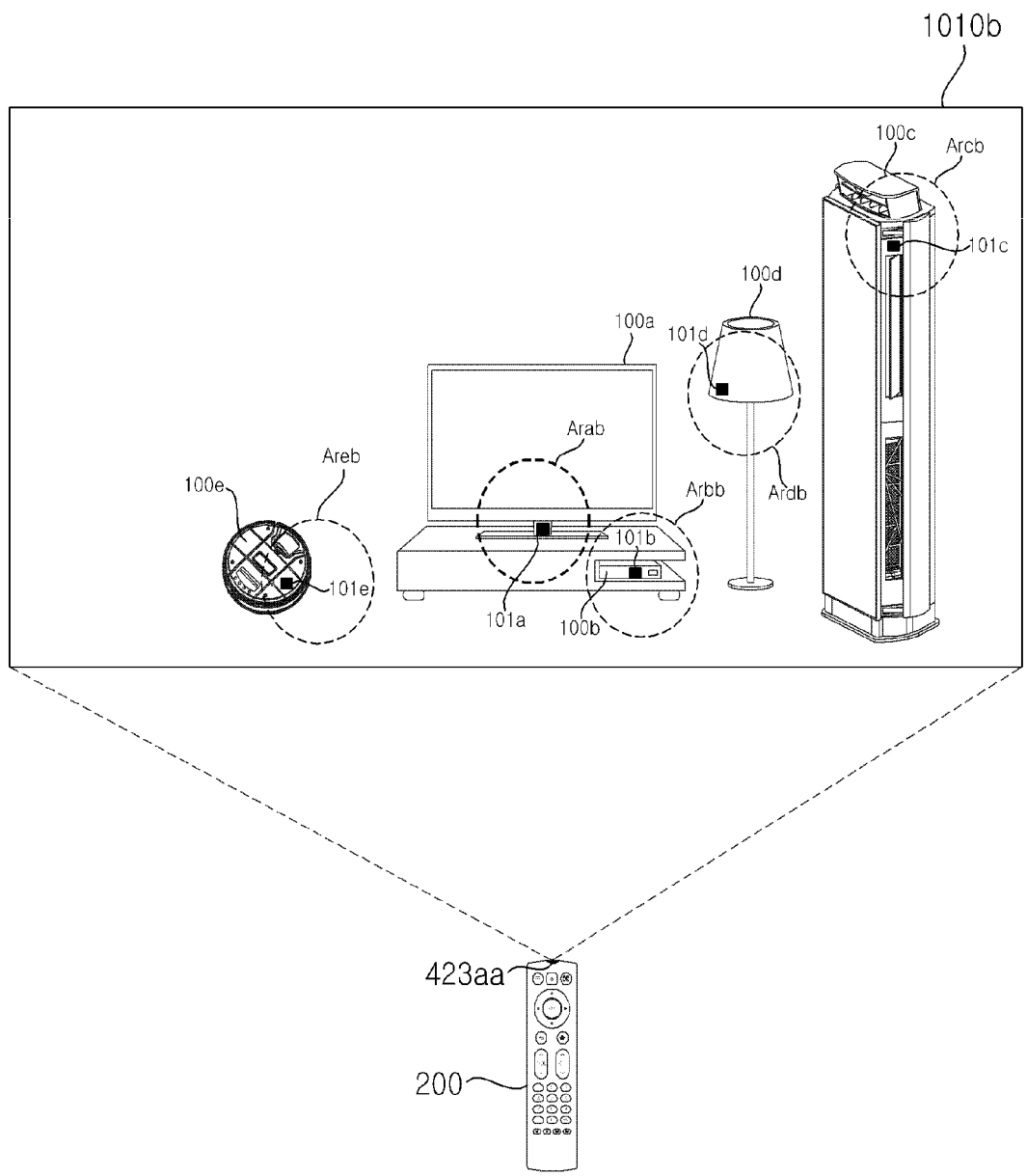

FIG. 14 is a flowchart illustrating an example of a remote control apparatus operation method according to another embodiment of the present invention and FIGS. 15a and 15b are diagrams referred to for description of the remote control apparatus operation method of FIG. 14.

Referring to FIG. 14, the receiver 423 of the remote control apparatus 200 may capture an IR image (S1011).

For example, when the transmission device 101 outputs an IR ID signal, the receiver 423 of the remote control apparatus 200 may include the IR camera 423aa in order to detect an IR ID signal.

When the IR camera 423aa receives at least one IR ID signal, the IR camera 423aa may capture an IR image from the received at least one IR ID signal.

Particularly, the IR camera 423aa may capture an IR image including the device 100 or the transmission device 101 corresponding to the device depending on the orientation of the remote control apparatus 200.

The processor 480 may detect an IR pattern from the device 100 or the transmission device 101 corresponding to the device, which is included in the captured IR image (S1013).

Subsequently, the processor 480 determines whether IR signals are output from one or more transmission devices corresponding to one or more devices and IR patterns based on one or more IR signals are detected (S1015).

When IR signals are output from one or more transmission devices corresponding to one or more devices and IR patterns based on one or more IR signals are detected, the processor 480 may detect an IR pattern positioned at the center of the IR image as a representative IR pattern (S1017) and identify the device on the basis of the representative IR pattern (S1019).

When there is a single IR pattern in step S1015, the processor 480 may identify the device on the basis of the single IR pattern in step S1019.

FIGS. 15a and 15b illustrate a method of selecting a device on the basis of one of multiple IR signals when the remote control apparatus receives the multiple IR signals.

It is assumed that the remote control apparatus 200 includes the receiver 423 which receives IR signals, and the receiver 423 includes the IR camera 423aa.

Referring to FIG. 15a, when the remote control apparatus 200 is pointed at the air-conditioner 100c among multiple devices, as illustrated in FIG. 3a, the IR camera 423aa may capture an IR image 1010a as shown in the figure.

When multiple IR signals are received, the processor 480 may detect an IR signal corresponding to the center of the IR image captured by the IR camera as a representative IR signal, identify a device corresponding to the detected representative IR signal and control the identified device to be remotely controllable.

That is, the processor 480 may detect an IR pattern positioned at the center of the IR image as a representative IR pattern, confirm or identify a device corresponding to the detected IR pattern and control the confirmed or identified device to be remotely controllable.

In the figure, the air-conditioner 100c and the transmission device 101c corresponding to the air-conditioner are located at the center of the IR image 1010a, and the lighting device 100d and the transmission device 101d corresponding thereto, the set-top box 100b and the transmission device 101b corresponding thereto, and the image display device 100a and the transmission device 101a corresponding thereto are arranged at the left of the air-conditioner.

The processor 480 may detect an IR pattern area from which an IR signal is output in the IR image 1010a.

The processor 480 may select an area Arca including the transmission device 101c corresponding to the air-conditioner positioned at the center from among the area Arca including the transmission device 101c corresponding to the air-conditioner, an area Arda including the transmission device 101d corresponding to the lighting device 100d, an area Arba including the transmission device 101b corresponding to the set-top box 100b and an area Araa including the transmission device 101a corresponding to the image display device 100a.

Then, the processor 480 may extract the area Arca including the transmission device 101c corresponding to the air-conditioner positioned at the center from among the multiple areas and detect an IR pattern within the area Arca.

For example, the processor 480 may detect an IR signal from the transmission device 101c corresponding to the air-conditioner 100c as a representative IR signal, confirm or identify the air-conditioner 100c corresponding to the detected representative IR signal, and match at least part of the multiple keys to a control command for remote control of the air-conditioner 100c in response to the confirmed or identified air-conditioner 100c.

Referring to FIG. 15b, when the remote control apparatus 200 is pointed at the image display device 100a among multiple devices, as illustrated in FIG. 3c, the IR camera 423aa may capture an IR image 1010b as shown in the figure.

When multiple IR signals are received, the processor 480 may detect an IR signal corresponding to the center of the IR image captured by the IR camera as a representative IR signal, identify a device corresponding to the detected representative IR signal and control the identified device to be remotely controllable.

In the figure, the image display device 100a and the transmission device 101a corresponding thereto are located at the center of the IR image 1010b, the set-top box 100b and the transmission device 101b corresponding thereto, the lighting device 100d and the transmission device 101d corresponding thereto, and the air-conditioner 100c and the transmission device 101c corresponding thereto are arranged at the right of the image display device 100a, and the robot cleaner 100e and the transmission device 101e corresponding thereto are arranged at the left of the image display device 100a.

The processor 480 may detect an IR pattern area from which an IR signal is output in the IR image 1010b.

The processor 480 may select an area Arab including the transmission device 101a corresponding to the image display device 100a positioned at the center from among the area Arab including the transmission device 101a corresponding to the image display device 100a, an area Arbb including the transmission device 101b corresponding to the set-top box 100b, an area Ardb including the transmission device 101d corresponding to the lighting device 100d, an area Arcb including the transmission device 101c corresponding to the air-conditioner 100c and an area Areb including the transmission device 101e corresponding to the robot cleaner 100e.

Then, the processor 480 may extract the area Arab including the transmission device 101a corresponding to the image display device 100a positioned at the center from among the multiple areas and detect an IR pattern within the area Arab.

Accordingly, the processor 480 may detect an IR signal from the transmission device 101a corresponding to the image display device 100a as a representative IR signal, confirm or identify the image display device 100a corresponding to the detected representative IR signal, and match at least part of the multiple keys to a control command for remote control of the image display device 100a in response to the confirmed or identified image display device 100a.

The aforementioned IR pattern may be a time-based IR pattern or a space-based IR pattern.

A time-based IR pattern may include a pattern of a level or duty varying for a predetermined time when the transmission device 101 transmits a level-variable or duty-variable IR signal.

Here, when the transmission device 101 transmits a level-variable or duty-variable IR signal, the processor 480 may detect a variable level or variable duty based IR pattern on the basis of multiple captured IR images and identify a device on the basis of the detected IR pattern.

A space-based IR pattern includes a reflection pattern in a case in which an IR reflection pattern is formed, the transmitter 421 of the remote control apparatus 200 outputs an IR output signal Sout to the transmission device 101 and the IR output signal Sout is selectively reflected from the transmission device 101 according to the IR reflection pattern.

Here, the processor 480 may detect an IR pattern reflected according to an IR reflection pattern formed in the device 100a or the transmission device 101a corresponding to the device in a captured IR image having at least one reflection pattern including an IR reflection pattern reflected from the device 100a or the transmission device 101a corresponding to the device, and confirm or identify the device 1001 on the basis of the detected IR pattern.

When the transmission device 101 has a reflection pattern and an absorption pattern, the processor 480 may detect an IR pattern on the basis of an IR reflection pattern and an IR absorption pattern formed in a device or a transmission device corresponding to the device in a captured IR image and identify the device on the basis of the detected IR pattern.

Time-based IR pattern detection is described with reference to FIGS. 9b to 9h and space-based IR pattern detection is described with reference to FIGS. 11b to 11m.

FIG. 9b illustrates output of an IR ID signal IRc from the transmitter 106c of the transmission device 101c corresponding to the air-conditioner 100c.

As shown in (a) of FIG. 9b, the IR camera 423aa of the remote control apparatus 200 may capture an IR image including the transmission device 101c corresponding to the air-conditioner 100c.

When a device at which the remote control apparatus 200 is pointed is changed, the processor 480 may control a control command with respect to at least one of the multiple keys to be varied. This will be described below with reference to FIG. 16.

Figure 16:
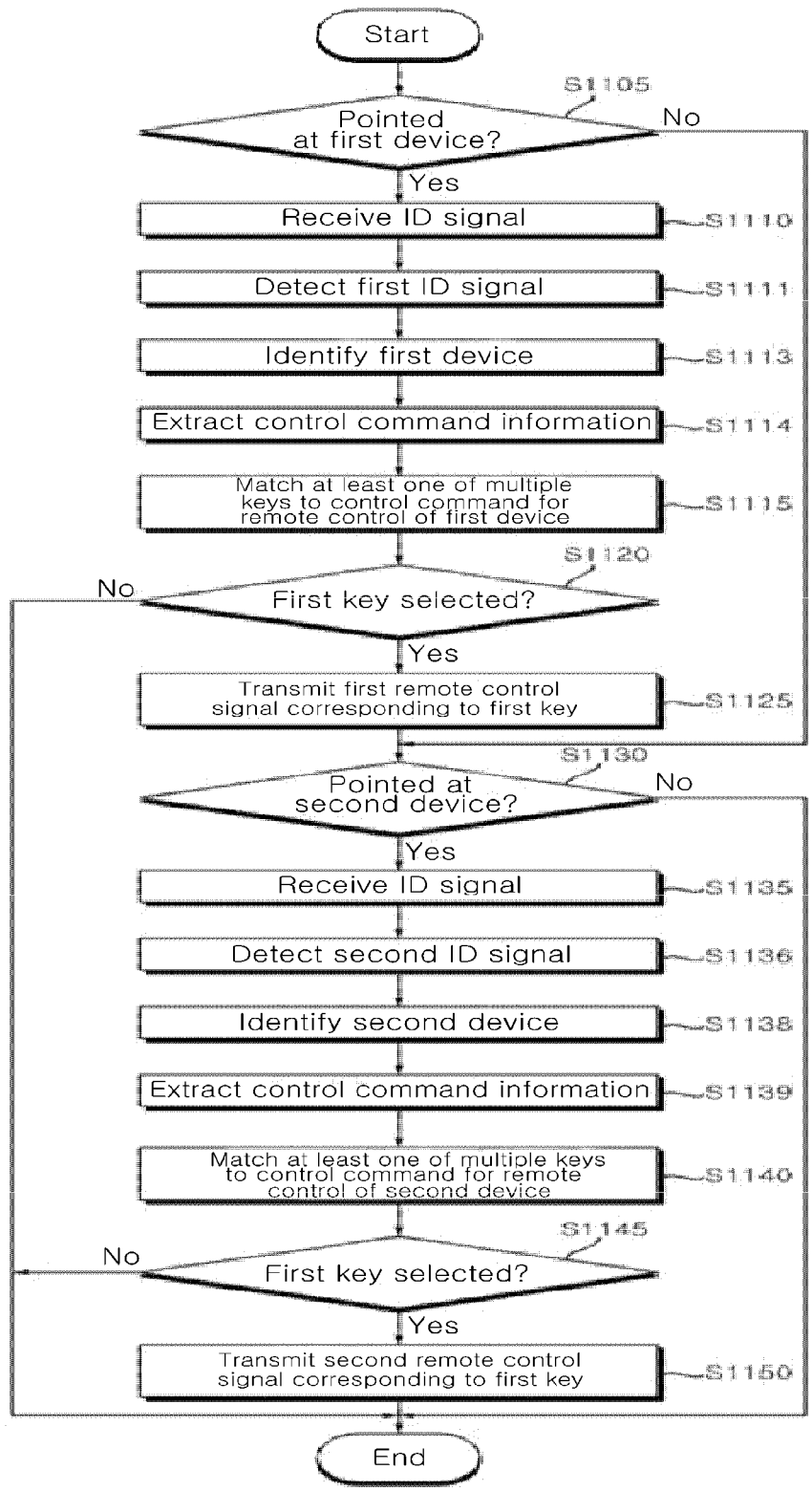
FIG. 16 is a flowchart illustrating an example of a remote control apparatus operation method according to another embodiment of the present invention.

FIG. 16 is a flowchart illustrating an example of a remote control apparatus operation method according to another embodiment of the present invention and FIGS. 17a to 27e are diagrams referred to for description of the remote control apparatus operation method of FIG. 16.

Referring to FIG. 16, when the remote control apparatus 200 is pointed at a first device (S1105), the receiver 423 of the remote control apparatus 200 receives one or more ID signals (S1110).

Subsequently, the processor 480 of the remote control apparatus 200 detects a first ID signal from one or more ID signals including the first ID signal (S1111) and identifies the first device on the basis of the detected first ID signal (S1113).

For example, when the remote control apparatus 200 is pointed at the air-conditioner 100c, as shown in FIG. 3a, the receiver 423 of the remote control apparatus 200 may receive one or more ID signals and detect the first ID signal corresponding to the air-conditioner and output from the air-conditioner 100c or the transmission device 101c corresponding to the air-conditioner 100c from the one or more ID signals.

One ID signal can be detected using the method described in FIGS. 14 to 15b.

The processor 480 of the remote control apparatus 200 identifies or confirms the ID signal of the first device on the basis of the detected first ID signal. For example, the processor 480 may compare the detected first ID signal with ID signal pattern data stored in the memory 470 to confirm the first ID signal as the ID signal of the first device.

Then, the processor 480 of the remote control apparatus 200 extracts control command information about the first device (S1114).

As described above, the processor 480 may extract the control command information about the first device from the device ID signal or receive a signal including the control command information from a device, the gateway 400 or the server 700 and extract the control command information about the first device from the signal.

The processor 480 of the remote control apparatus 200 matches at least one of the multiple keys to a control command for remote control of the first device (S1115).

Then, the processor 480 of the remote control apparatus 200 determines whether a first key from among keys matched to the control command is selected (S1120) and controls a first remote control signal corresponding to the control command or the first key to be transmitted when the first key is selected (S1125). Accordingly, the first device can be easily remotely controlled.

When the remote control apparatus 200 is pointed at a second device (S1130), the receiver 423 of the remote control apparatus 200 receives one or more ID signals (S1135).

Subsequently, the processor 480 of the remote control apparatus 200 detects a second ID signal from one or more ID signals including the second ID signal (S1136) and identifies the second device on the basis of the detected second ID signal (S1138).

For example, when the remote control apparatus 200 is pointed at the image display device 100a, as shown in FIG. 3b, the receiver 423 of the remote control apparatus 200 may receive one or more ID signals and detect the second ID signal corresponding to the image display device 100a and output from the image display device 100a or the transmission device 101a corresponding to the image display device 100a from the one or more ID signals.

Subsequently, the processor 480 of the remote control apparatus 200 identifies or confirms the ID signal of the second device on the basis of the detected second ID signal. For example, the processor 480 may compare the detected second ID signal with ID signal pattern data stored in the memory 470 to confirm the second ID signal as the ID signal of the second device.

Then, the processor 480 of the remote control apparatus 200 extracts control command information about the second device (S1139).

As described above, the processor 480 may extract the control command information about the second device from the device ID signal or receive a signal including the control command information from a device, the gateway 400 or the server 700 and extract the control command information about the second device from the signal.

The processor 480 of the remote control apparatus 200 matches at least one of the multiple keys to a control command for remote control of the second device (S1140).

Then, the processor 480 of the remote control apparatus 200 determines whether a first key from among keys matched to the control command is selected (S1145) and controls a second remote control signal corresponding to the control command or the first key to be transmitted when the first key is selected (S1150). Accordingly, the second device can be easily remotely controlled.

Figure 17A:
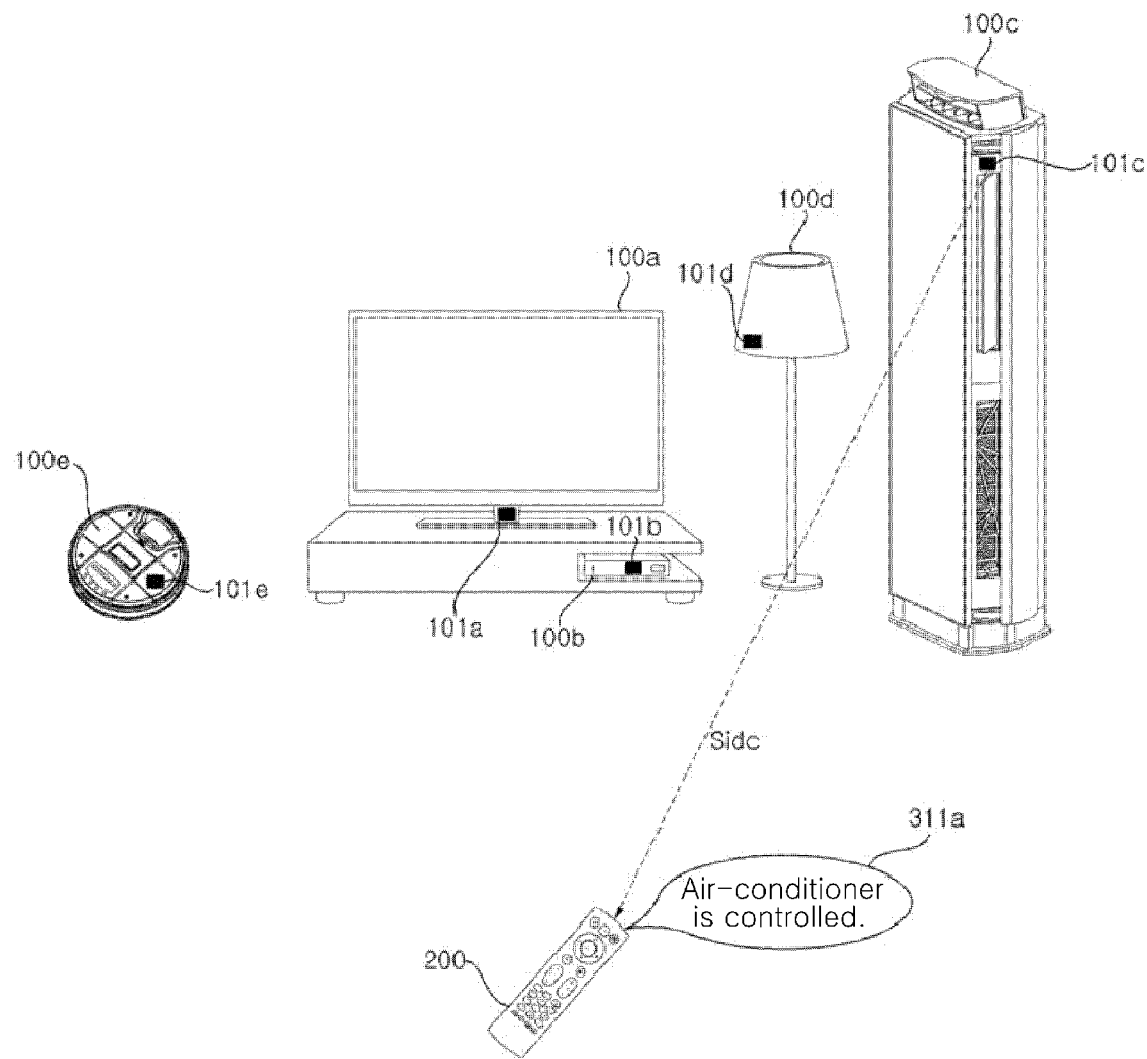
FIGS. 17a to 27e are diagrams referred to for description of the remote control apparatus operation method of FIG. 16.

FIG. 17a illustrates a case in which the remote control apparatus 200 is pointed at the air-conditioner 100c among various home devices 100a, 100b, 100c, 100d and 100e.

The remote control apparatus 200 receives an ID signal Sidc from the transmission device 101c corresponding to the air-conditioner 100c. Then, the remote control apparatus 200 may detect the ID signal Sidc from one or more ID signals including the ID signal Sidc, confirm or identify the device at which the remote control apparatus 200 is pointed as the air-conditioner 100c on the basis of the detected ID signal Sidc, and match at least part of the multiple keys to a control command for the air-conditioner 100c.

Figure 17B:
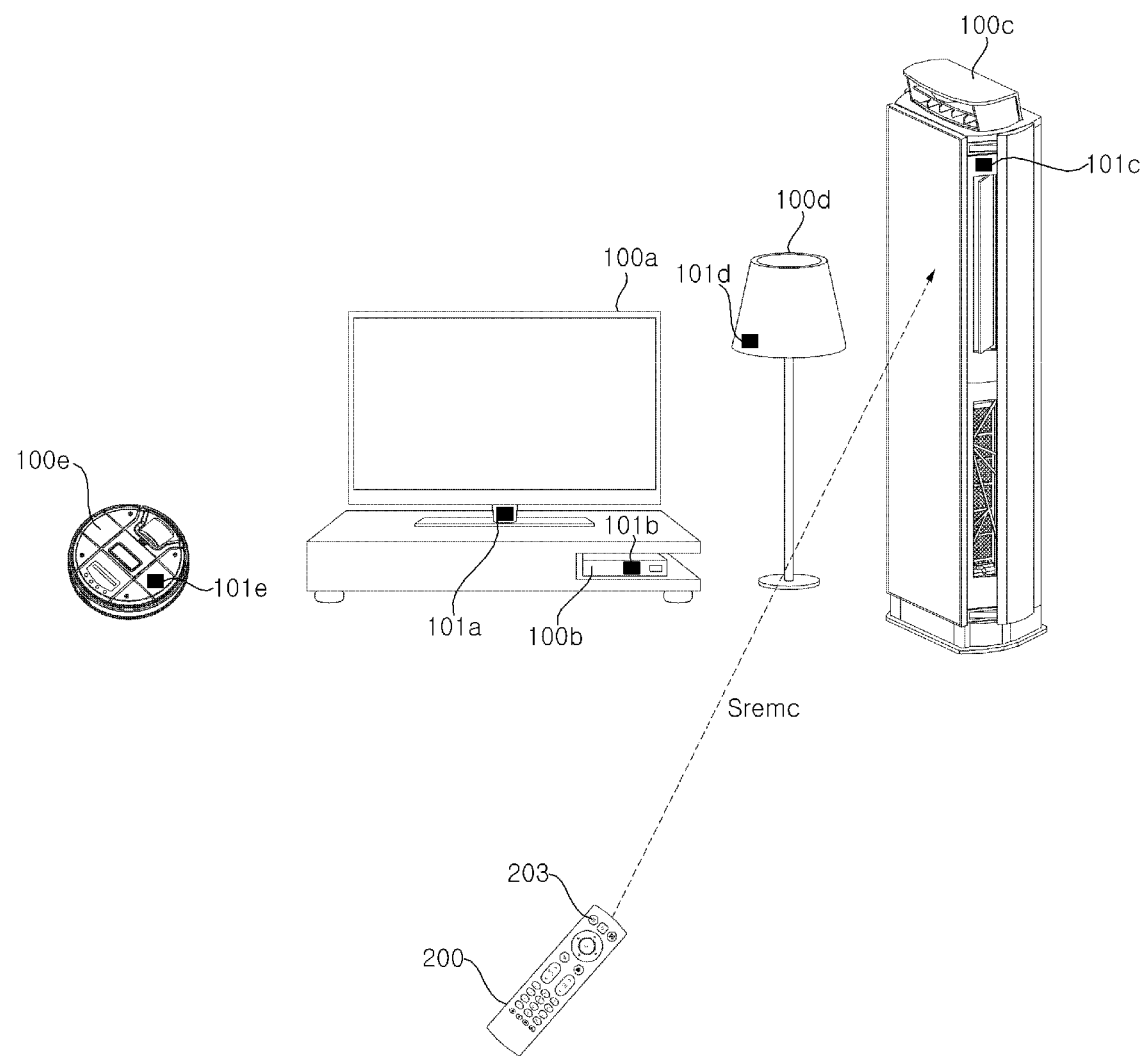

FIG. 17b illustrates a case in which the menu key 203 is selected from the multiple keys of the remote control apparatus 200. Accordingly, a remote control signal Sremc corresponding to the menu key 203 is transmitted to the air-conditioner 100c.

For example, the remote control apparatus 200 may match the menu key 203 to a blower strength control command in order to control the air-conditioner.

Accordingly, the air-conditioner 100c can output cold wind in response to a blower strength set depending on operation of the menu key 203, as illustrated in FIG. 17c.

Figure 18A:
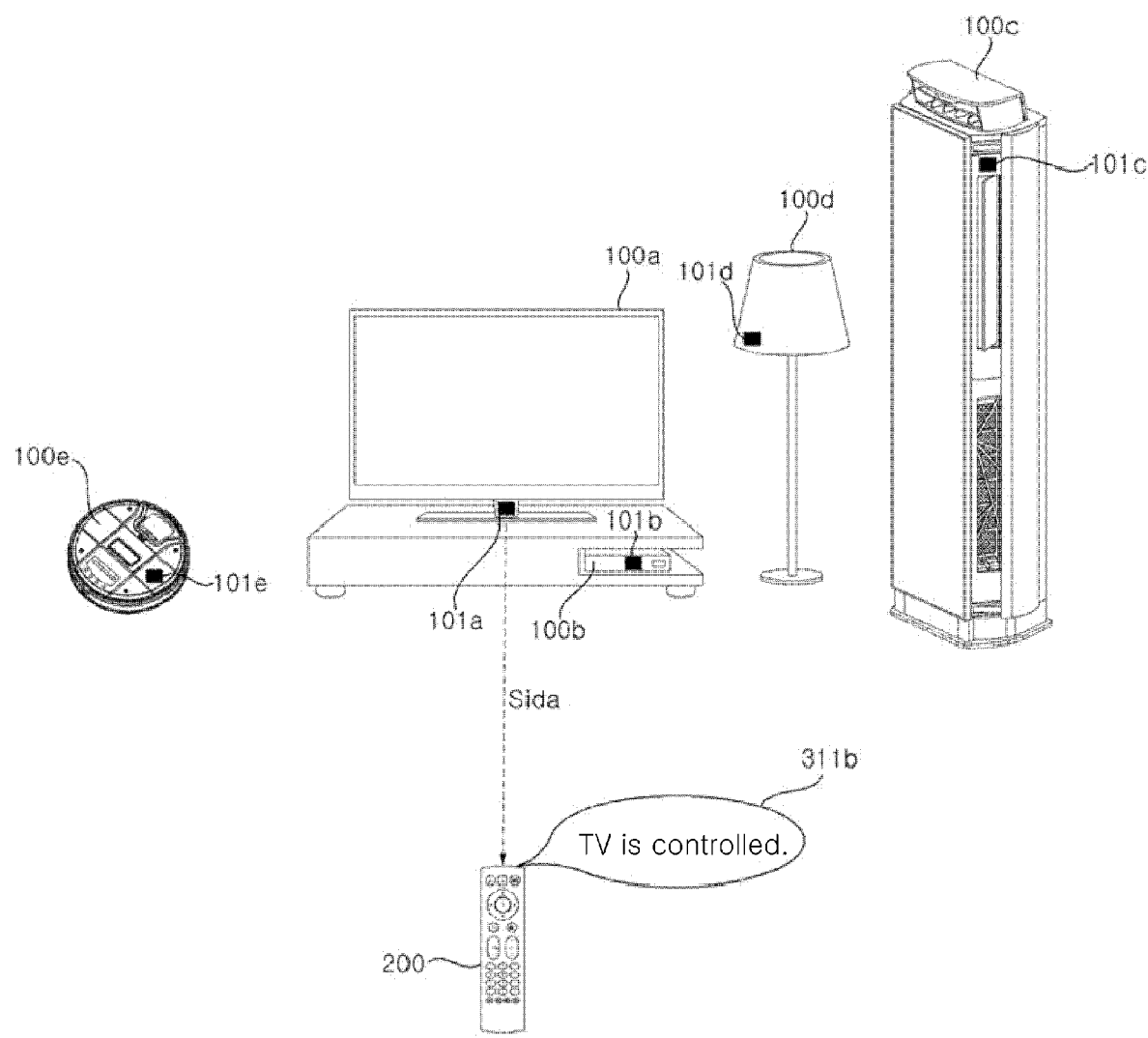

FIG. 18a illustrates a case in which the remote control apparatus 200 is pointed at the image display device 100a among various home devices 100a, 100b, 100c, 100d and 100e.

The remote control apparatus 200 receives an ID signal Sida from the transmission device 101a corresponding to the image display device 100a. Then, the remote control apparatus 200 may detect the ID signal Sida from one or more ID signals including the ID signal Sida, confirm or identify the device at which the remote control apparatus 200 is pointed as the image display device 100a on the basis of the detected ID signal Sida, and match at least part of the multiple keys to a control command for the image display device 100a.

Figure 18B:
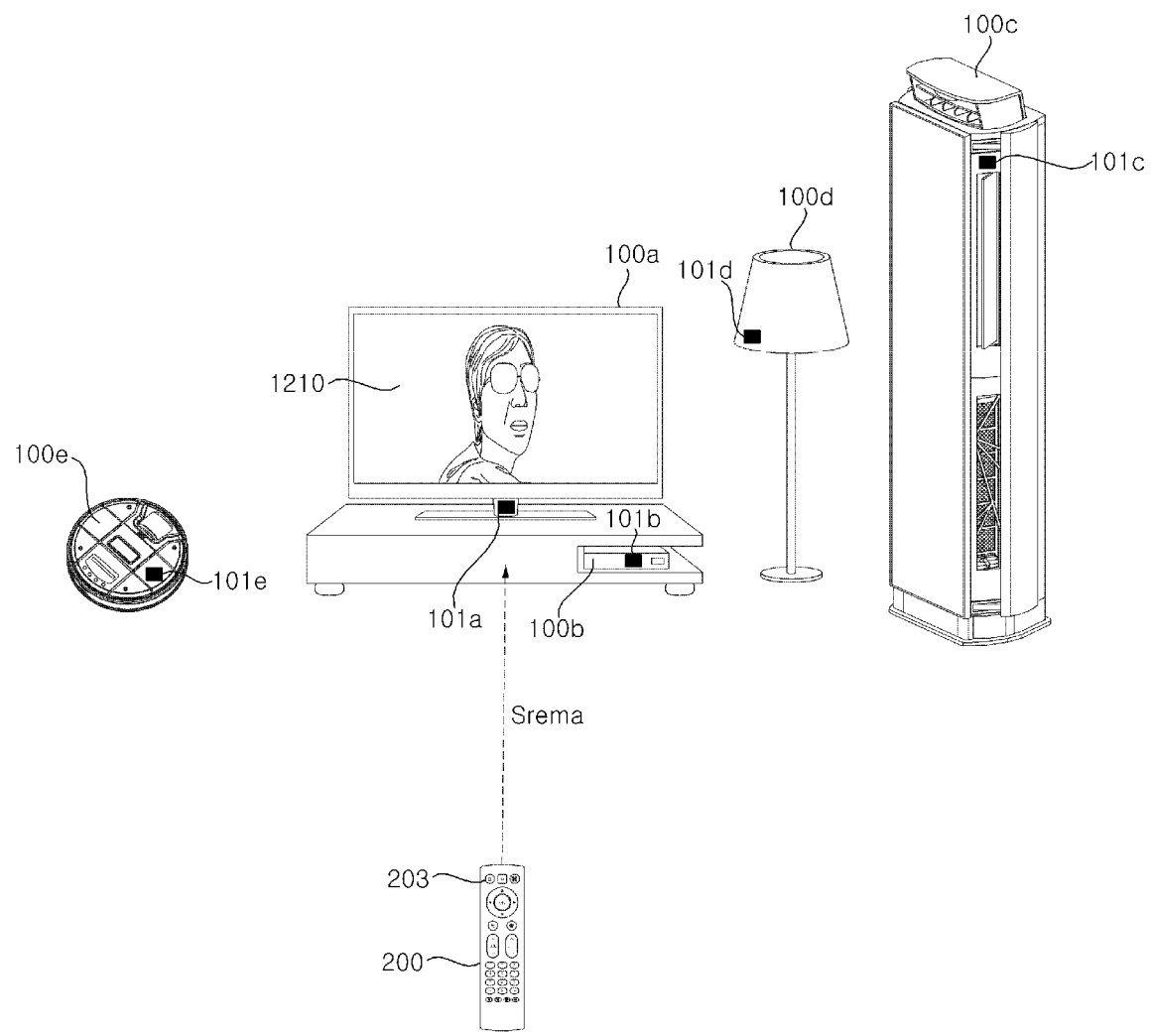

FIG. 18b illustrates a case in which the menu key 203 is selected from the multiple keys of the remote control apparatus 200. Accordingly, a remote control signal Srema corresponding to the menu key 203 is transmitted to the image display device 100a.

Figure 18C:
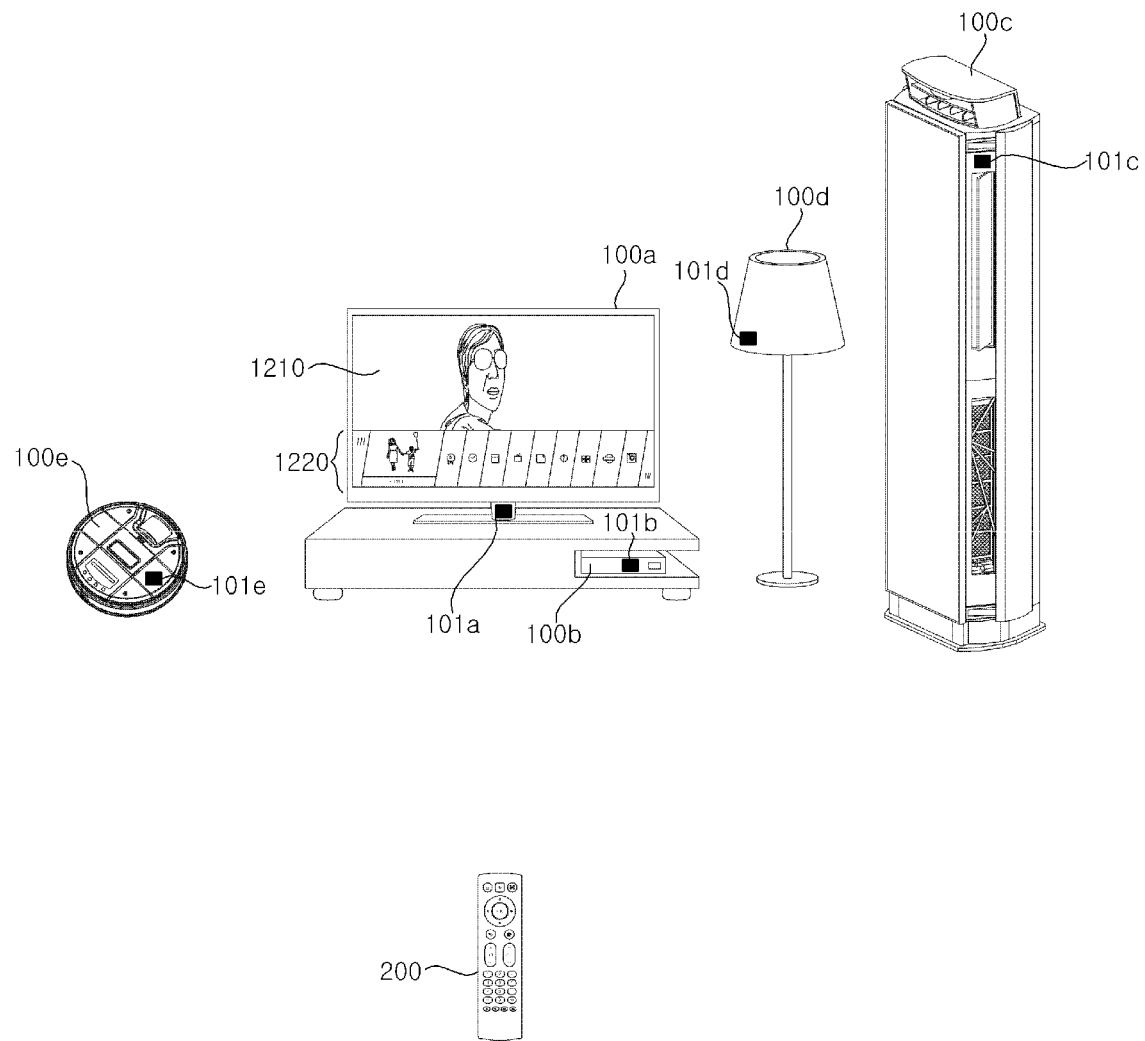

Accordingly, menu objects can be displayed on the lower end of a screen according to operation of the menu key 203 while a predetermined image 1210 is displayed on the image display device 100a, as illustrated in FIG. 18c.

As illustrated in FIGS. 17a to 18c, different devices can be easily remotely controlled by setting different operations to the menu key.

Figure 19A:
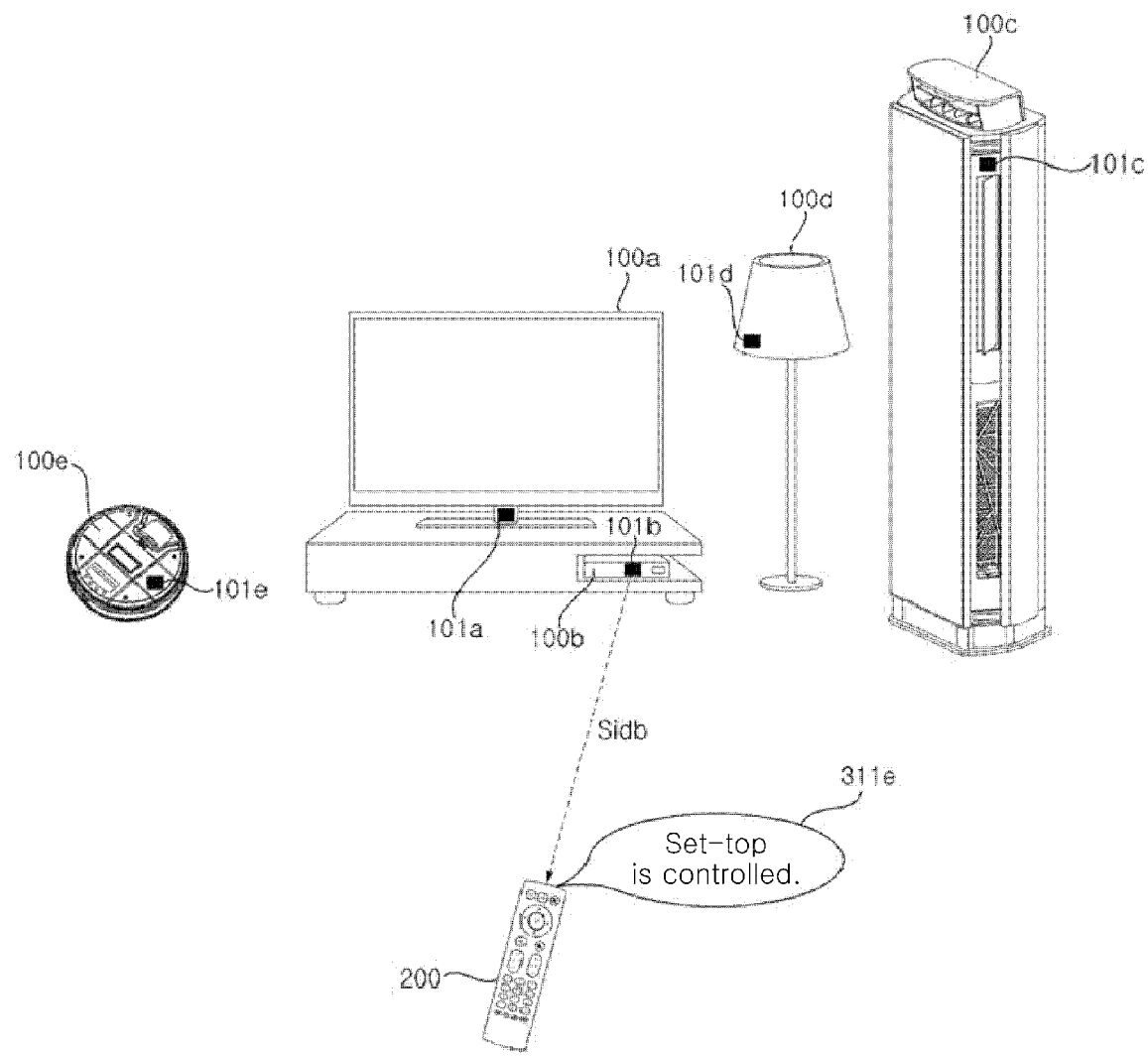

FIG. 19a illustrates a case in which the remote control apparatus 200 is pointed at the set-top box 100b among various home devices 100a, 100b, 100c, 100d and 100e.

The remote control apparatus 200 receives an ID signal Sidb from the set-transmission device 101b corresponding to the set-top box 100b. Then, the remote control apparatus 200 may detect the ID signal Sidb from one or more ID signals including the ID signal Sidb, confirm or identify the device at which the remote control apparatus 200 is pointed as the set-top box 100b on the basis of the detected ID signal Sidb, and match at least part of the multiple keys to a control command for the set-top box 100b.

Figure 19B:
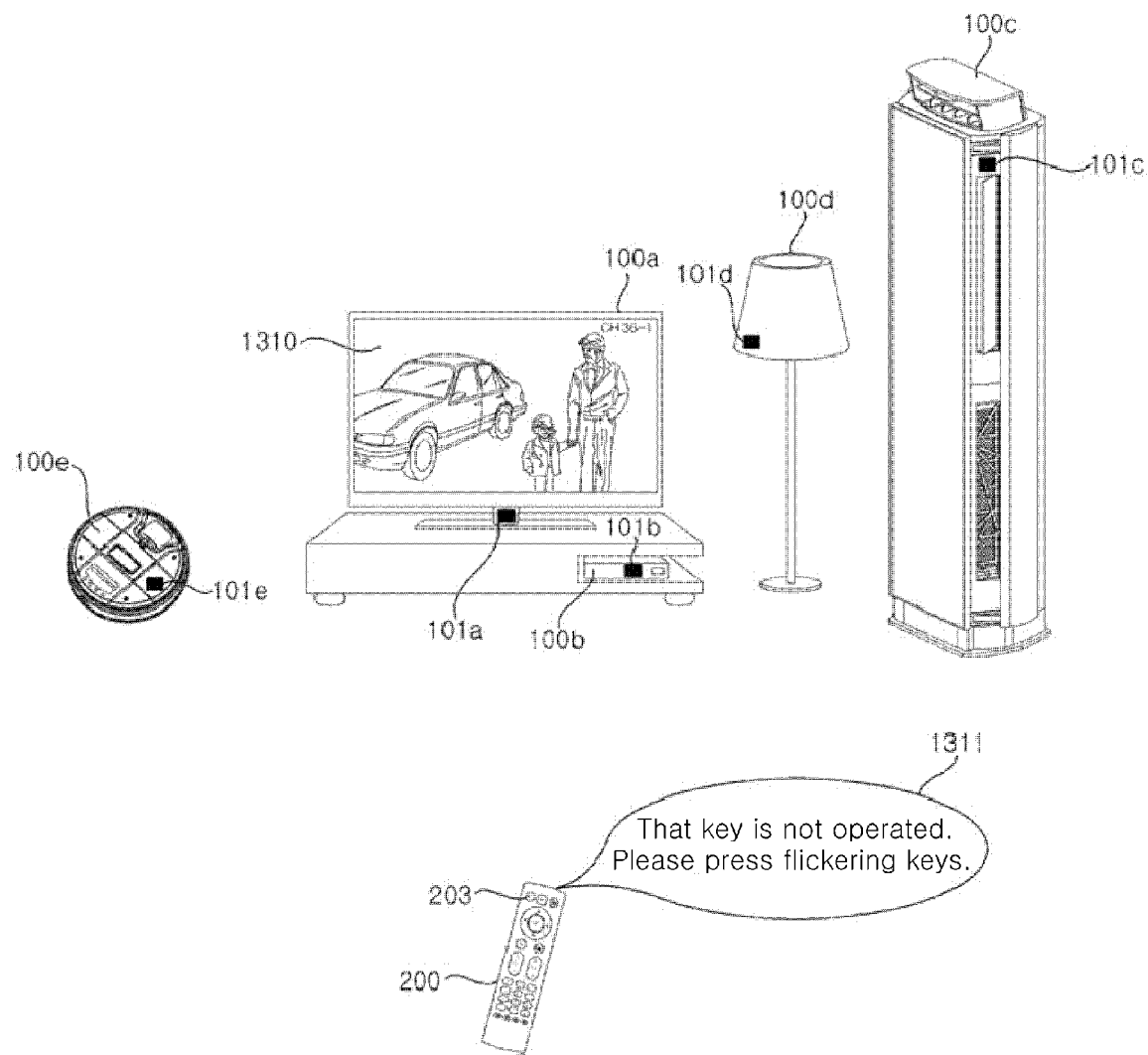

FIG. 19b illustrates a case in which the menu key 203 is selected from the multiple keys of the remote control apparatus 200.

For example, when a specific operation is not set to the menu key 203 for control of the set-top box, the remote control apparatus 200 may output an inoperable message 1311 as sound, as shown in the figure. Accordingly, the user can recognize that the menu key is not operated.

Figure 19C:
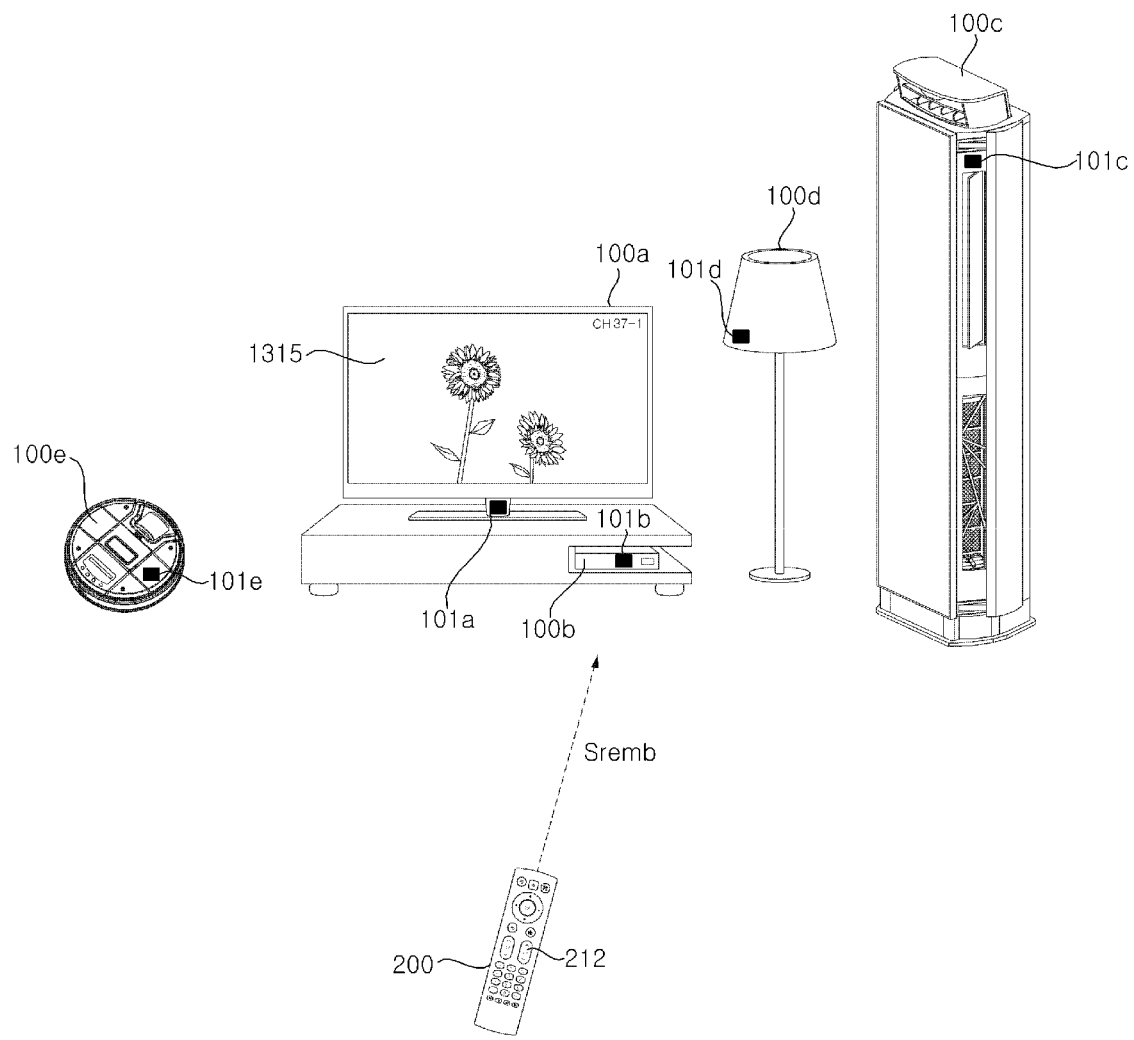

FIG. 19c illustrates a case in which the channel key 212 is selected from among the multiple keys of the remote control apparatus 200.

The remote control apparatus 200 may transmit a remote control signal Sremb related to channel change to the set-top box 100b according to operation of the channel key 212.

Accordingly, the set-top box 100b may perform channel change and provide a broadcast image of the changed channel to the image display device 100a.

The figure illustrates a case in which a broadcast image 1315 of CH37-1 changed from a broadcast image 1310 of CH36-1 displayed in FIG. 19b is displayed on the image display device 100a.

Figure 20A:
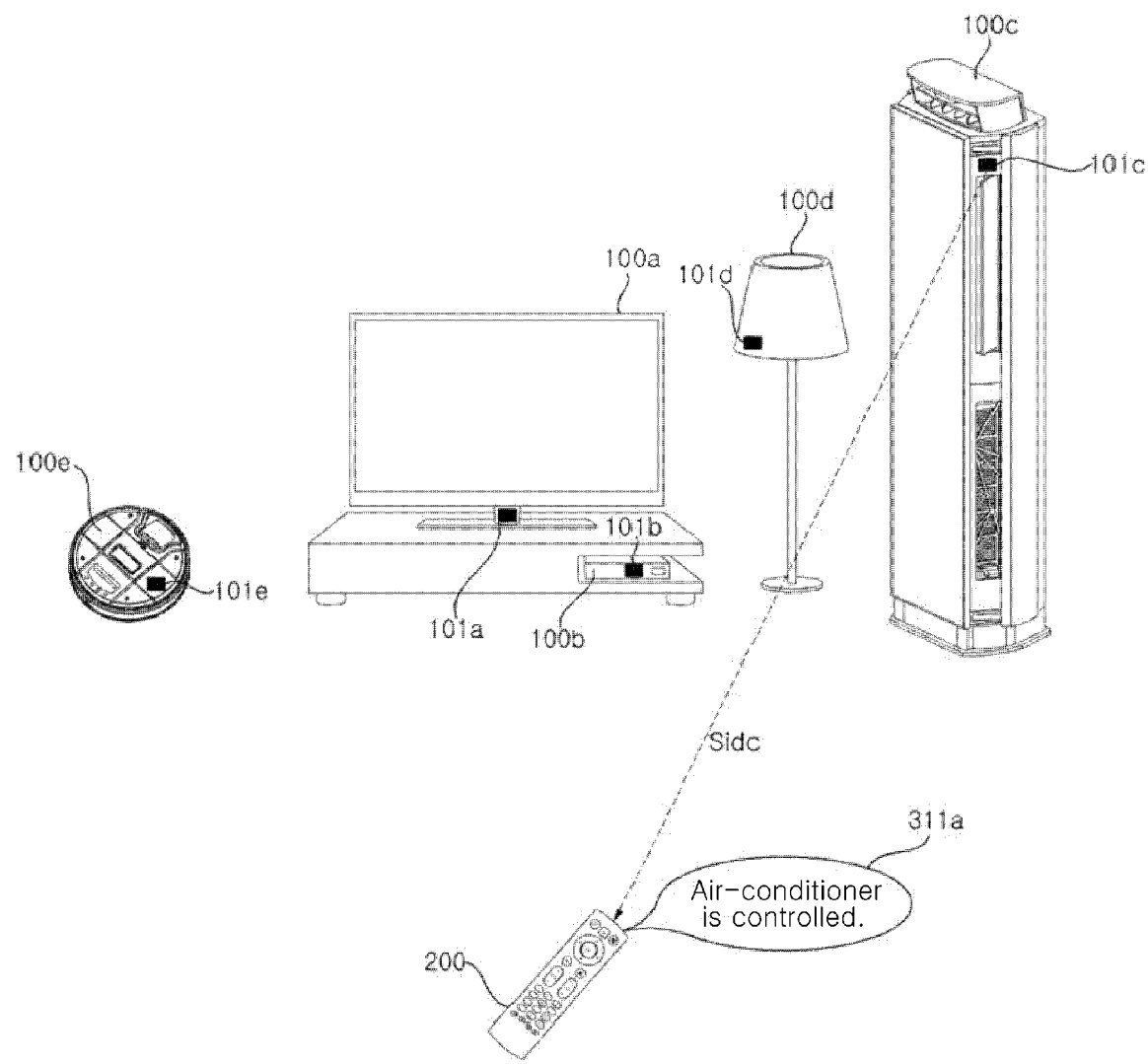

FIG. 20a illustrates a case in which the remote control apparatus 200 is pointed at the air-conditioner 100c among various home devices 100a, 100b, 100c, 100d and 100e.

The remote control apparatus 200 receives the ID signal Sidc from the transmission device 101c corresponding to the air-conditioner 100c. Then, the remote control apparatus 200 may detect the ID signal Sidc from one or more ID signals including the ID signal Sidc, confirm or identify the device at which the remote control apparatus 200 is pointed as the air-conditioner 100c on the basis of the detected ID signal Sidc, and match at least part of the multiple keys to a control command for the air-conditioner 100c.

When device confirmation is completed or key setting is completed while the remote control apparatus 200 is pointed at the air-conditioner 100c, the remote control apparatus 200 may output, as sound, a message 311a indicating that the air-conditioner is controllable, such as "air-conditioner is controlled". Accordingly, the user can recognize that the air-conditioner is controllable.

Figure 20B:
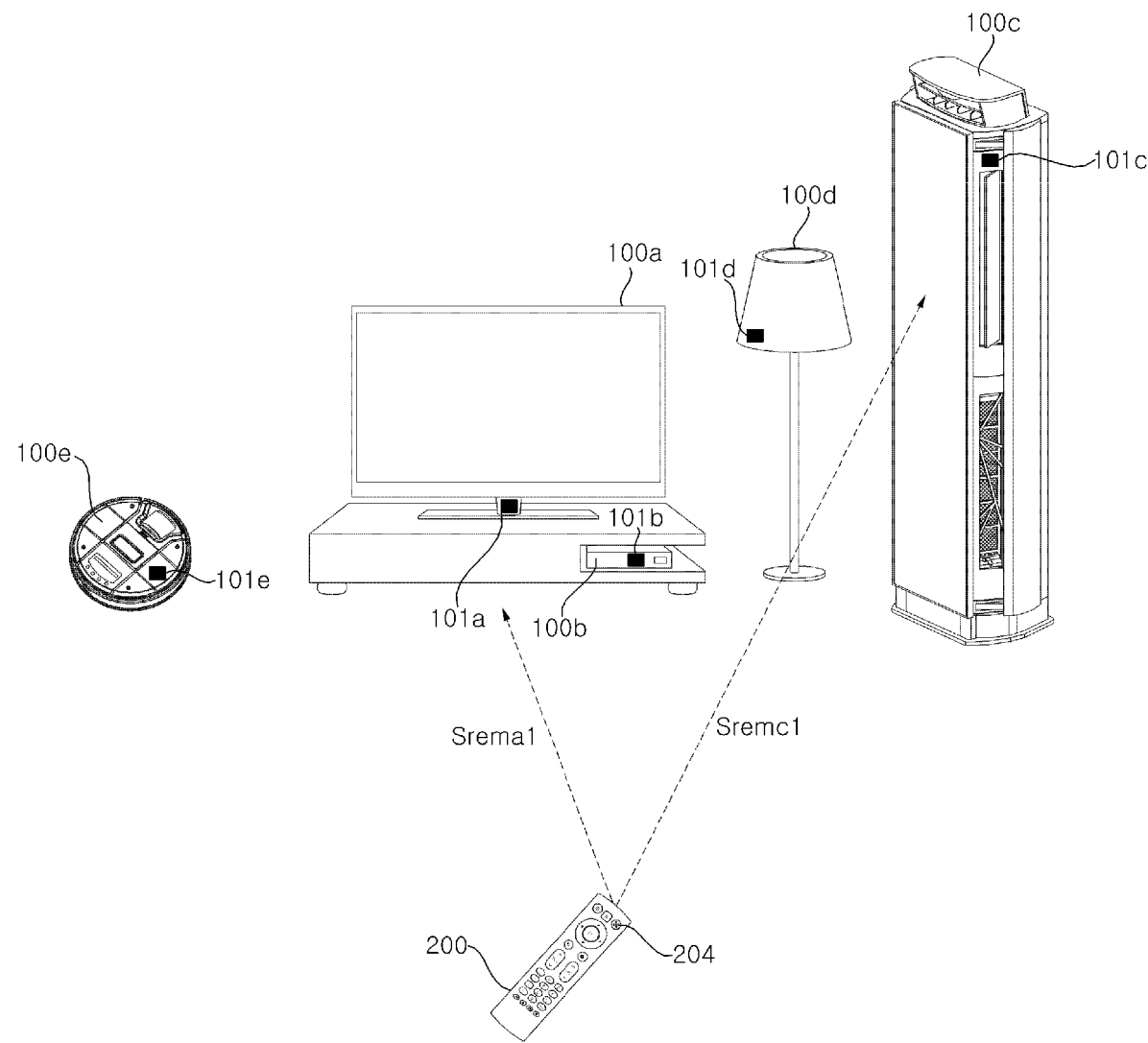

FIG. 20b illustrates a case in which the multi-device operation key 204 is selected from among the multiple keys of the remote control apparatus 200.

The multi-device operation key 204 may be called IFTTT (If This, Then That) key.

When the remote control apparatus 200 is set to remotely control the air-conditioner 100c, a function of turning on the air-conditioner 100c and a function of turning on the image display device 100a may be set to the multi-device operation key 204.

For example, when the multi-device operation key 204 is selected, the remote control apparatus 200 may transmit a power on signal to the air-conditioner 100c as a first remote control signal Sremc1 and transmit a power on signal to the image display device 100a as a second remote control signal Srema1.

Figure 20C:
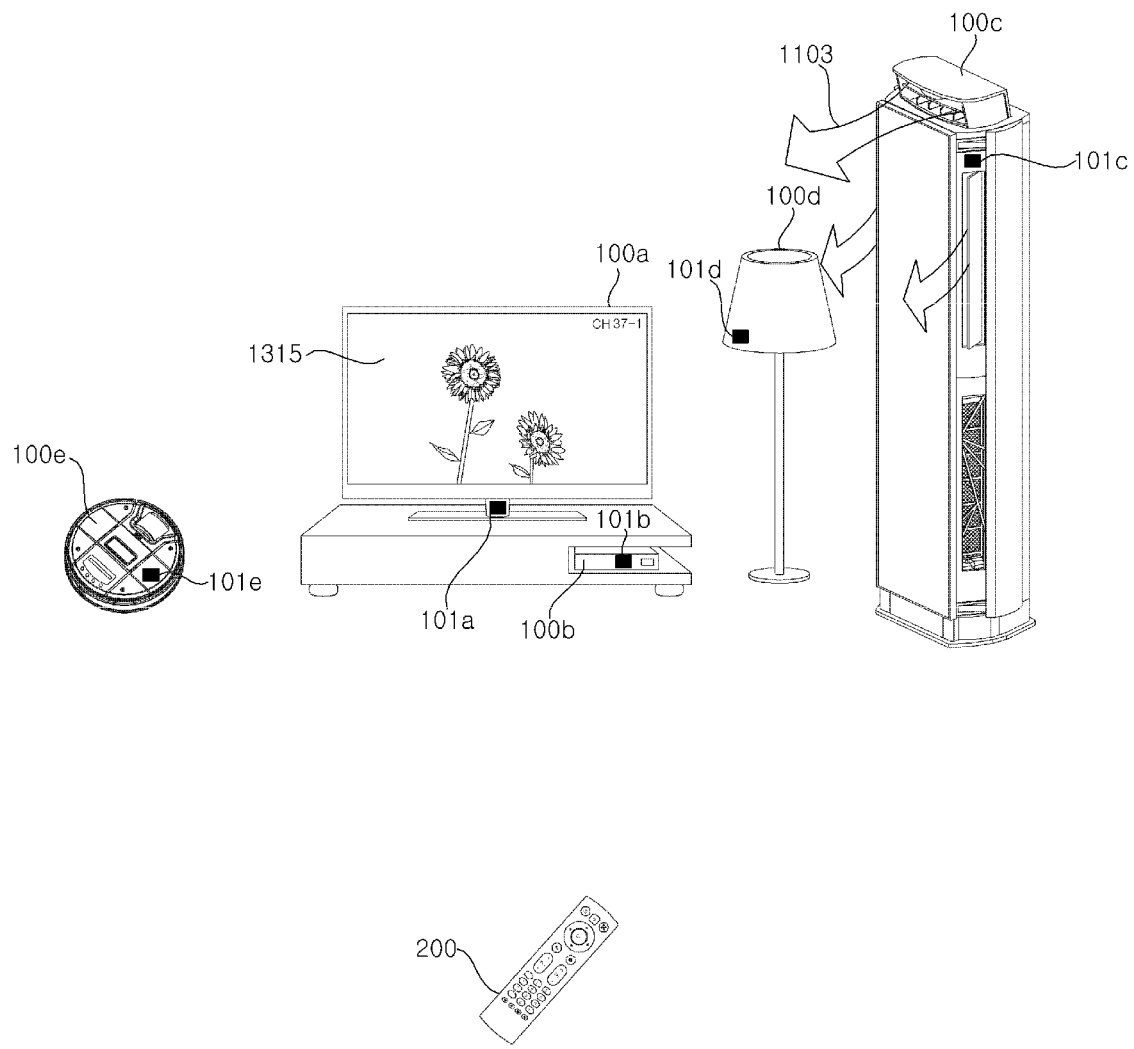

Accordingly, the air-conditioner 100c may be turned on to output cold air 1103 and the image display device 100a may be turned on to display a predetermined image 1315, as illustrated in FIG. 20c.

Multi-device functions may be set to the multi-device operation key 204 in various manners by user selection.

For example, when the multi-device operation key 204 is selected, the remote control apparatus 200 may transmit a power on signal as the first remote control signal Sremc1 and a second remote control signal Srema11 to the air-conditioner 100c.

Figure 20D:
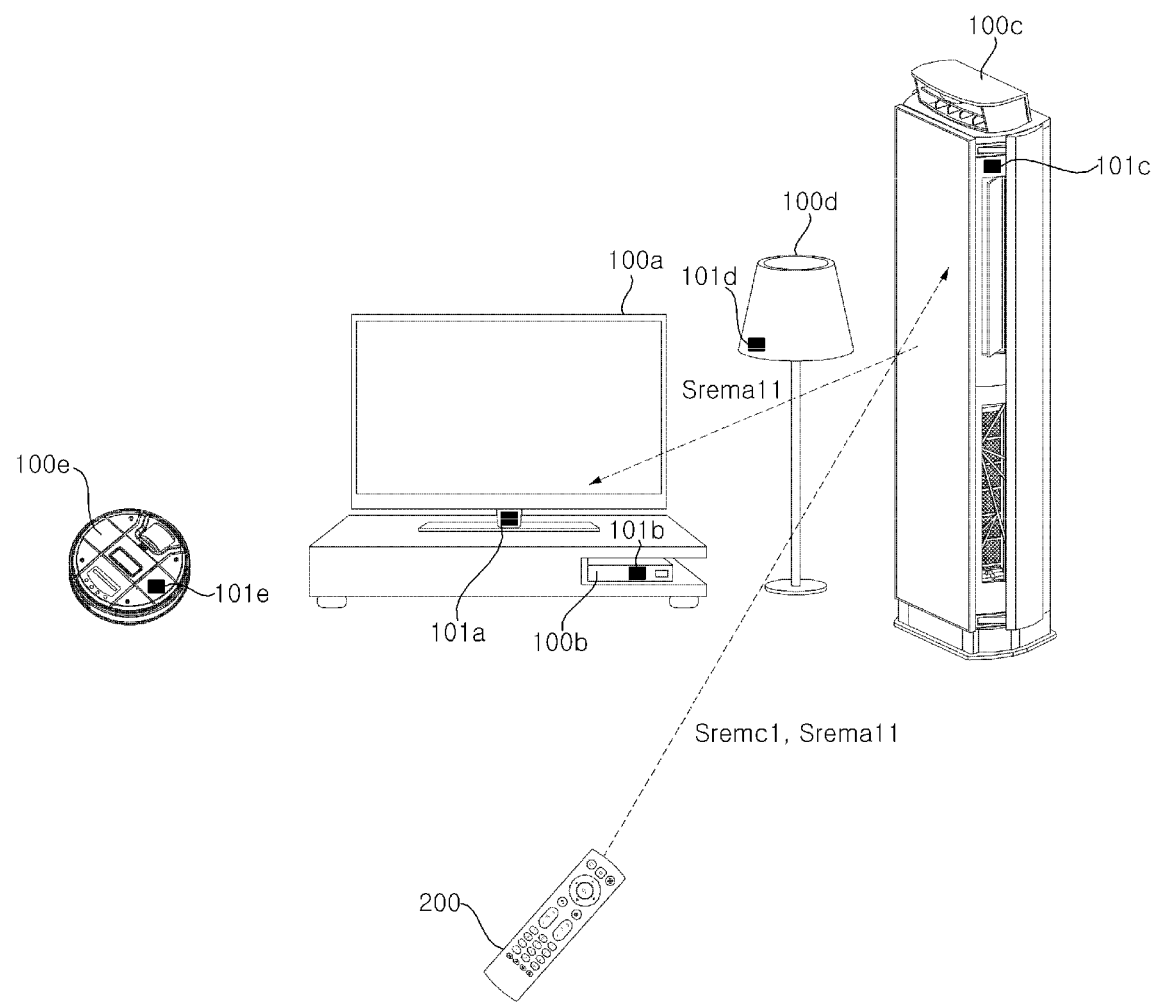

In this case, the air-conditioner 100c may transmit a power on signal corresponding to the second remote control signal Srema11 to the image display device 100a, as illustrated in FIG. 20d.

That is, a device at which the remote control apparatus 200 is pointed may receive a predetermined remote control signal and transmit a remote control signal corresponding to the multi-device operation key 204 to another device according to operation of the multi-device operation key 204.

Figure 21A:
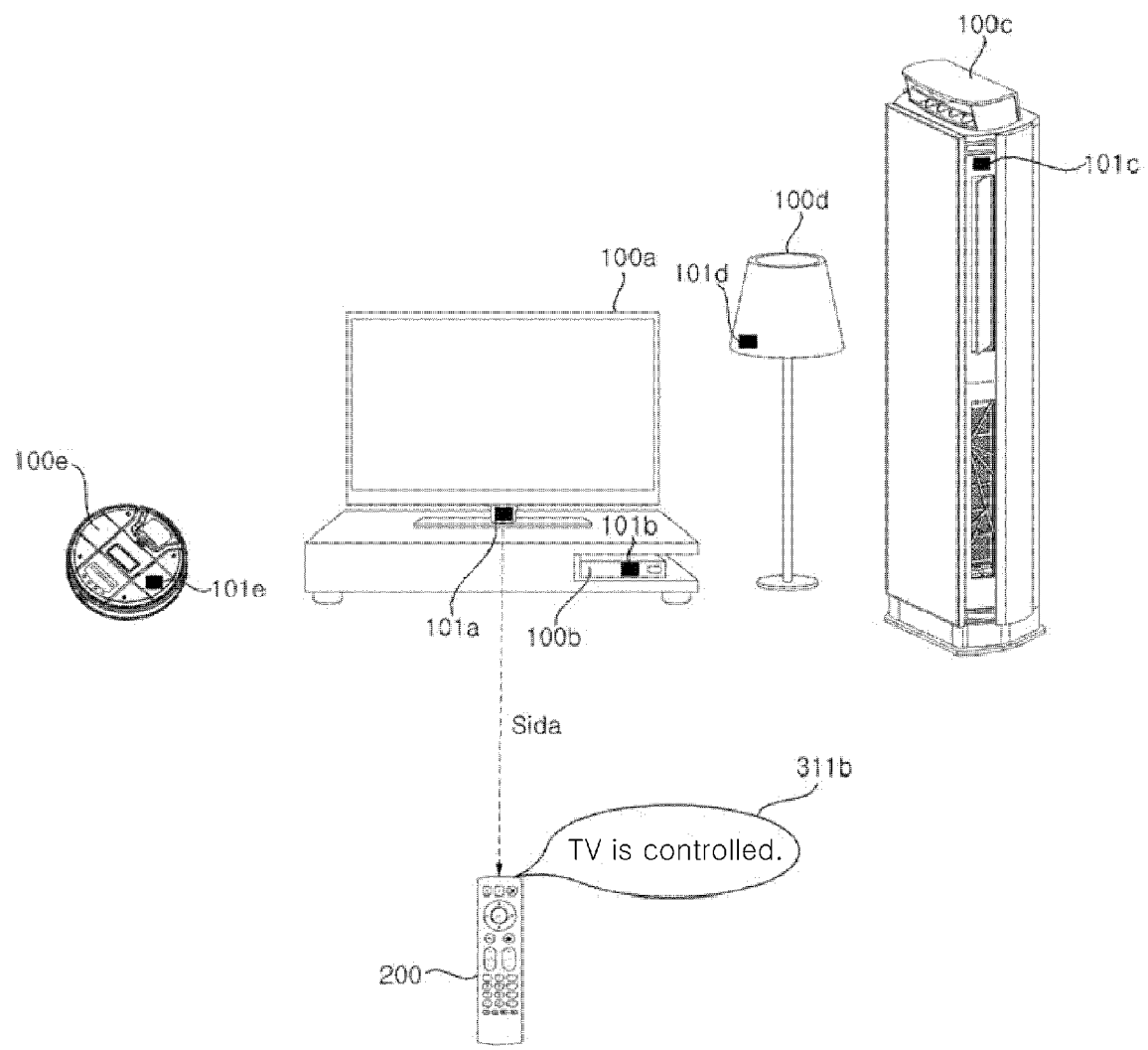

FIG. 21a illustrates a case in which the remote control apparatus 200 is pointed at the image display device 100a among various home devices 100a, 100b, 100c, 100d and 100e.

The remote control apparatus 200 receives the ID signal Sida from the transmission device 101c corresponding to the image display device 100a. Then, the remote control apparatus 200 may detect the ID signal Sida from one or more ID signals including the ID signal Sida, confirm or identify the device at which the remote control apparatus 200 is pointed as the image display device 100a on the basis of the detected ID signal Sida, and match at least part of the multiple keys to a control command for the image display device 100a.

Figure 21B:
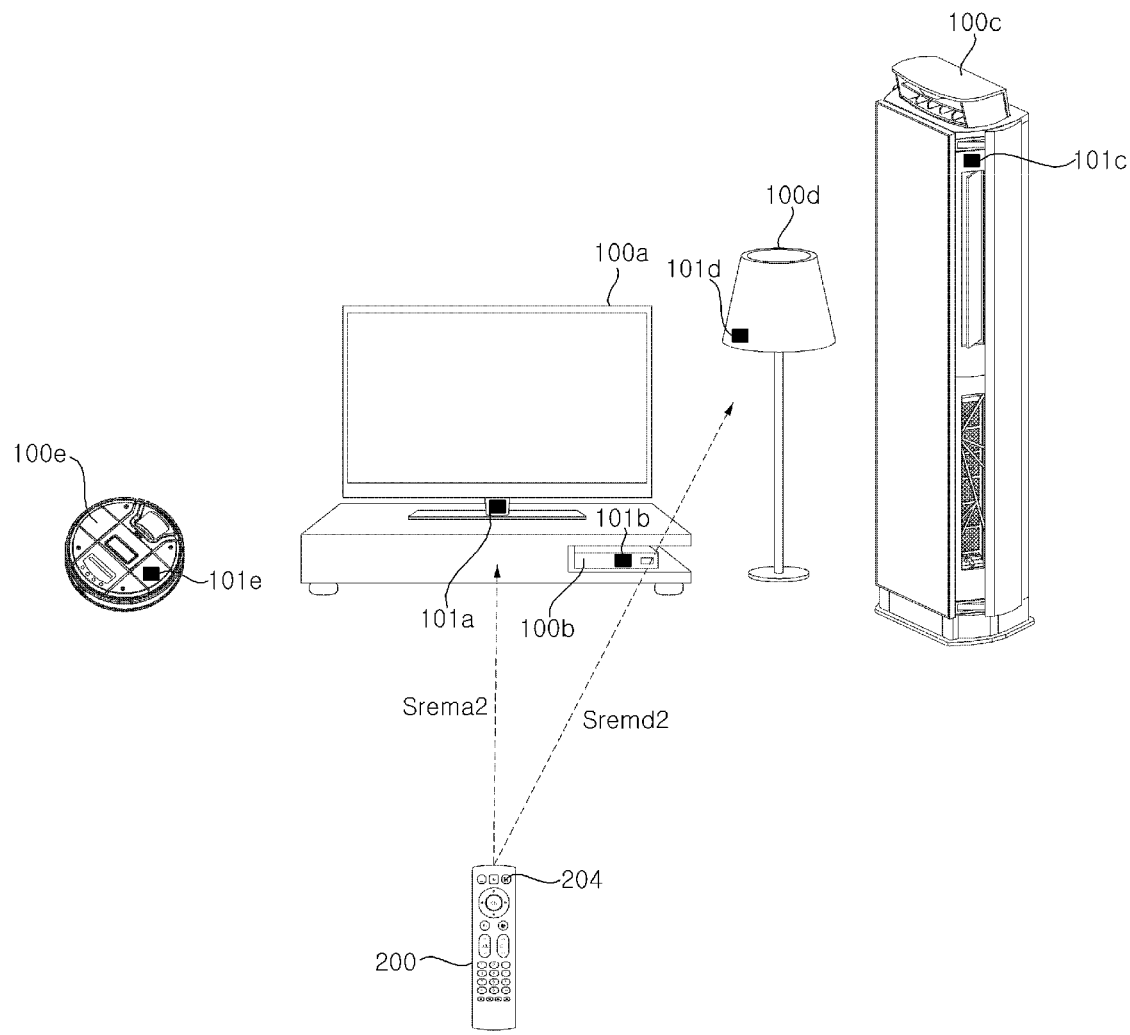

FIG. 21b illustrates a case in which the multi-device operation key 204 is selected from among the multiple keys of the remote control apparatus 200.

When the remote control apparatus 200 is set to remotely control the image display device 100a, a function of turning on the image display device 100a and a function of turning on the lighting device 100d may be set to the multi-device operation key 204.

That is, the remote control apparatus 200 may transmit a power on signal to the image display device 100a as a first remote control signal Srema2 and transmit a power on signal to the lighting device 100d as a second remote control signal Sremd2 when the multi-device operation key 204 is selected.

Figure 21C:
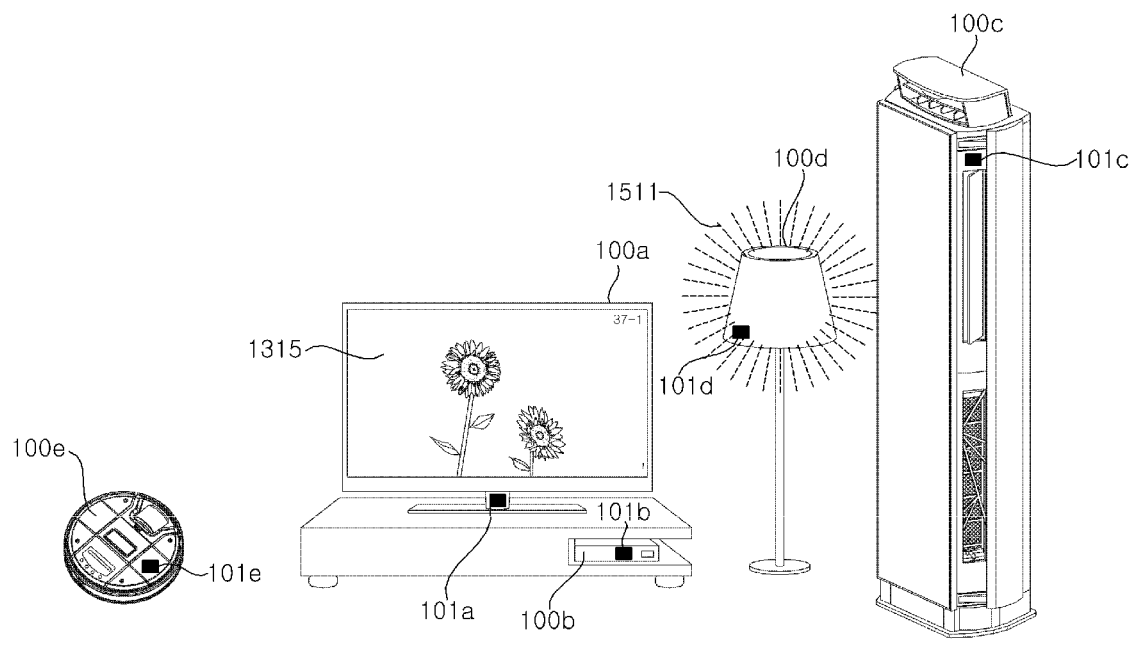

Accordingly, the image display device 100a may be turned on to display the predetermined image 1315 and the lighting device 100d may be turned on to emit light 1511 having a first color according to operation of the multi-device operation key 204, as illustrated in FIG. 21c.

Figure 22C:
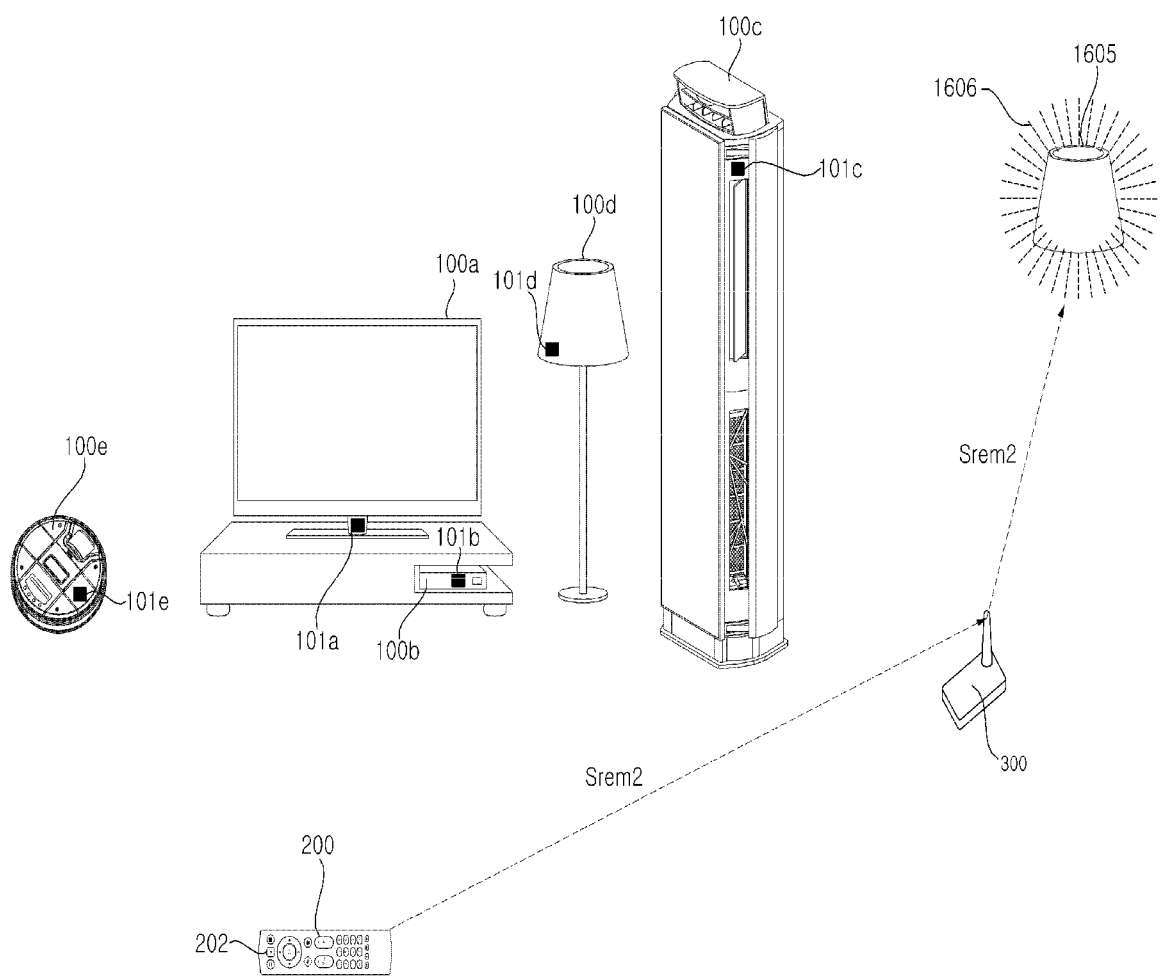

FIGS. 22a to 22c illustrate a method of remotely controlling a device corresponding to a user voice when the user voice is received through a microphone.

FIG. 22a illustrates a case in which a sound 1611 indicating a specific device, such as "turn on the lights in the upstairs room", is received when the remote control apparatus 200 is not pointed at any one of devices 100a, 100b, 100c, 100d and 100e in front thereof.

The microphone 435 of the remote control apparatus 200 may acquire a user voice including information about a predetermined device and the processor 480 may perform signal processing on the acquired user voice to extract device information included in the voice and match at least one of the multiple keys to a control command for remote control of the device corresponding to the extracted device information.

That is, the processor 480 may perform signal processing on the user voice through a voice recognition algorithm to recognize a sound such as "turn on the lights in the upstairs room".

In addition, the processor 480 may set a key for a lighting device (not shown) of the upstairs room and output, as sound, a message 1612 indicating that lighting of the upstairs room is controllable, such as "lighting of the upstairs room is controlled", as illustrated in the figure, when key setting is completed. Accordingly, the user can recognize that lighting of the upstairs room is controllable.

FIG. 22c illustrates a case in which the power key 202 is selected from among the multiple keys of the remote control apparatus 200.

The processor 480 outputs a remote control signal Srem2 for turning on the lighting device of the upstairs room to an AP device 300 according to operation of the power key 202. Then, the AP device 300 may transmit the remote control signal Srem2 to the lighting device 1605 of the upstairs room, which is connected through a wireless network.

Accordingly, the lighting device 1605 of the upstairs room is turned on to emit light 1606 having a predetermined color.

The processor 480 may set a remote control signal, which is output when a key set for remote device control is operated on the basis of IR signal reception, and a remote control signal, which is output when a key set for remote device control is operated on the basis of voice recognition, to different types.

That is, the processor 480 may control the transmitter 421 to output a remote control signal, which is output when a key set for remote device control is operated on the basis of IR signal reception, on the basis of an IR signal and control the transmitter 421 to output a remote control signal, which is output when a key set for remote device control is operated on the basis of voice recognition, on the basis of various communication protocol signals.

Further, when an IR based remote control signal is output, the processor 480 may control an IR based remote control signal having a different pattern to be output in order to control a specific device.

The remote control apparatus 200 may remotely control a specific device further using various input methods such as voice recognition and gesture in addition to the keys included in the input unit.

For example, when the remote control apparatus 200 is pointed at a specific device, the remote control apparatus 200 may receive an ID signal through the receiver 423, and when a user voice is acquired through the microphone 435 while at least one of the multiple keys is set to a key for remotely controlling the device, control a remote control signal corresponding to the user voice to be transmitted to the device.

Alternatively, when a user voice is acquired through the microphone 435 within a predetermined time when the first device is remotely controllable, the processor 480 of the remote control apparatus 200 may control a remote control signal corresponding to the user voice to be transmitted to the device. This will be described with reference to FIGS. 23a to 23c.

Figure 23A:
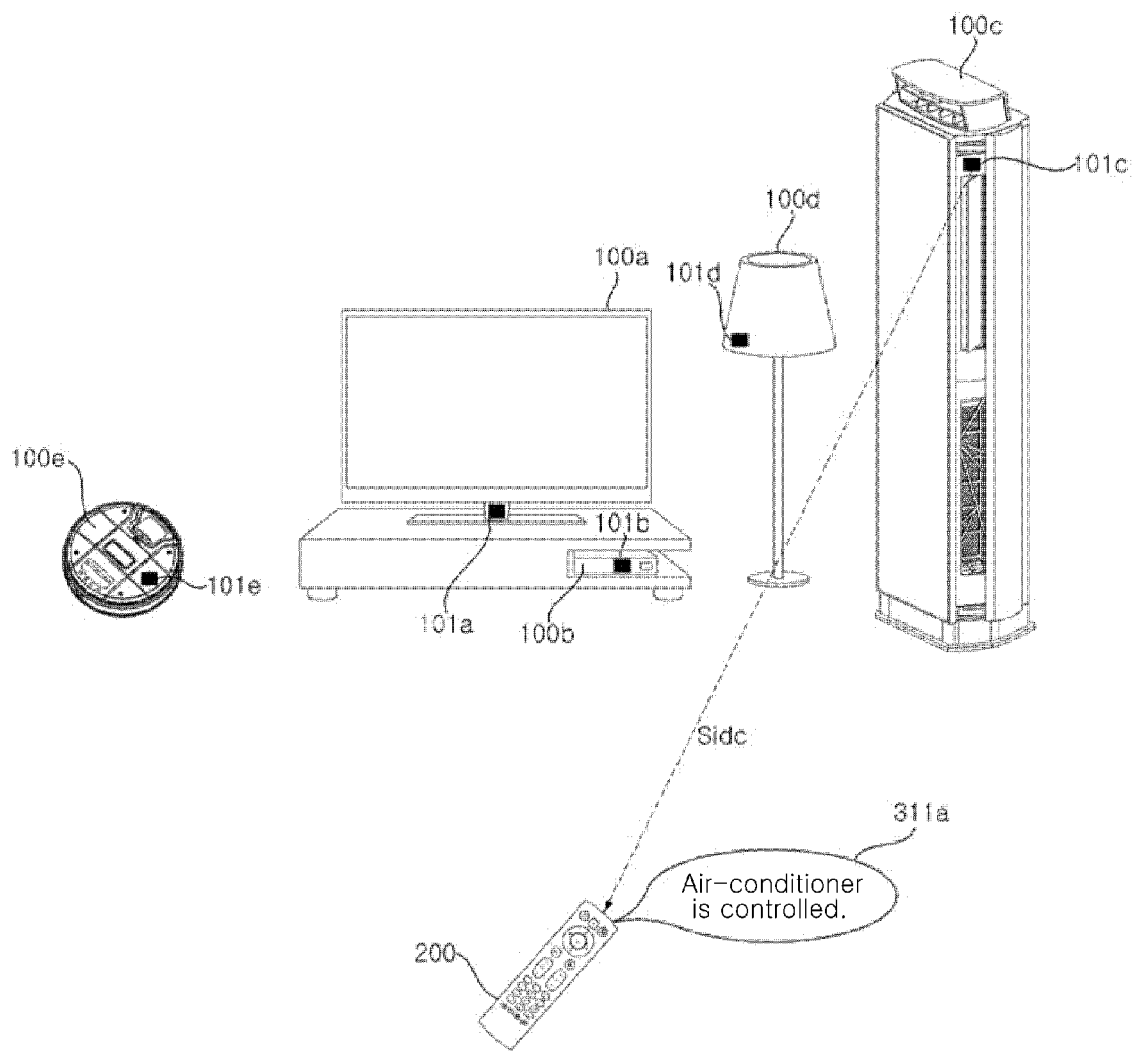

FIG. 23a illustrates a case in which the remote control apparatus 200 can remotely control the air-conditioner 100c from among various home devices 100a, 100b, 100c, 100d and 100e.

Figure 23B:
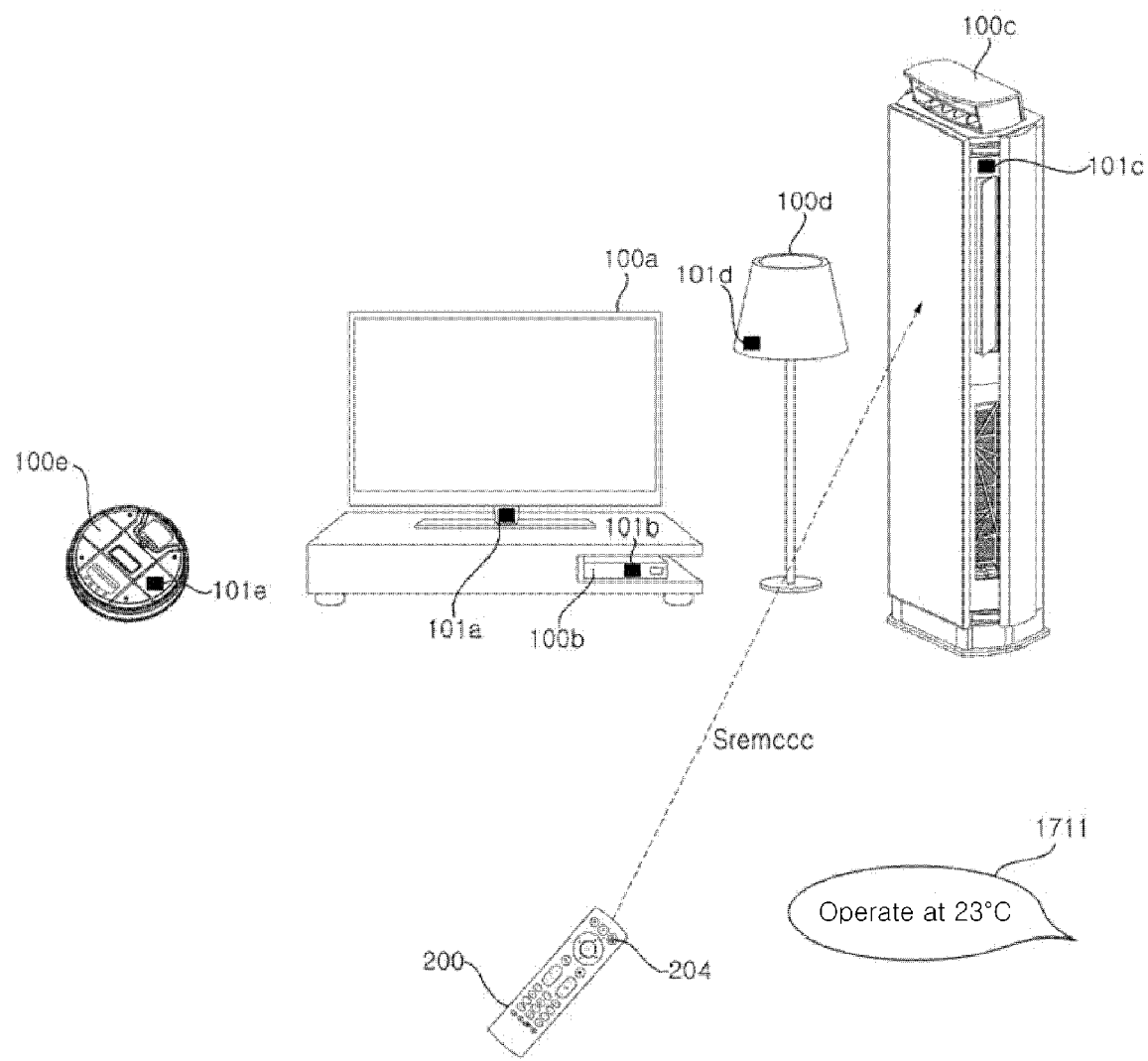

FIG. 23b illustrates a case in which a user voice such as "set temperature to 23° C." is provided.

The microphone 435 of the remote control apparatus 200 recognizes a user voice 1711 such as "set temperature to 23° C." and the processor 480 performs signal processing on the acquired user voice.

The processor 480 may control a remote control signal Sremcc corresponding to "set temperature to 23° C." 1711 to be output after voice recognition signal processing.

Figure 23C:
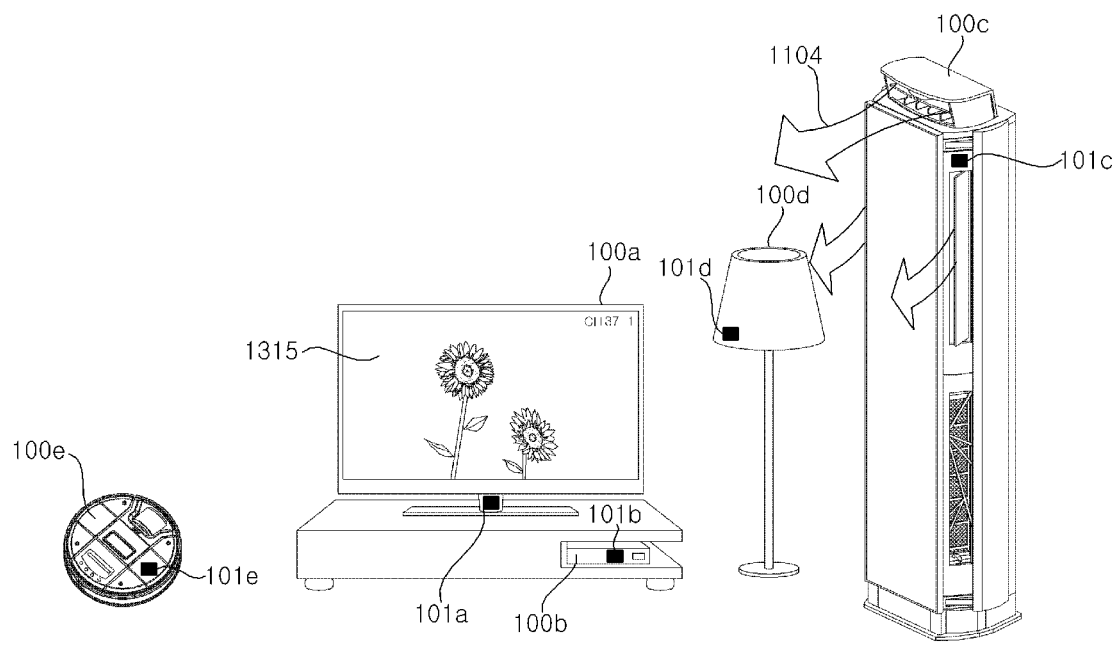

Accordingly, the air-conditioner 100c is operated with a target temperature set to 23° C., as illustrated in FIG. 23c. The figure illustrates output of cold air 1104 according to operation of the air-conditioner.

In this manner, the remote control apparatus may easily remotely control a specific device through a user voice instead of key operation.

Meanwhile, when the remote control apparatus 200 receives an ID signal Sid from the device 100, the processor 480 of the remote control apparatus 200 may detect the ID signal Sid from one or more ID signals including the ID signal Sid and control an ID signal detection completion message to be output when detection of the ID signal Sid is completed.

Figure 24A:
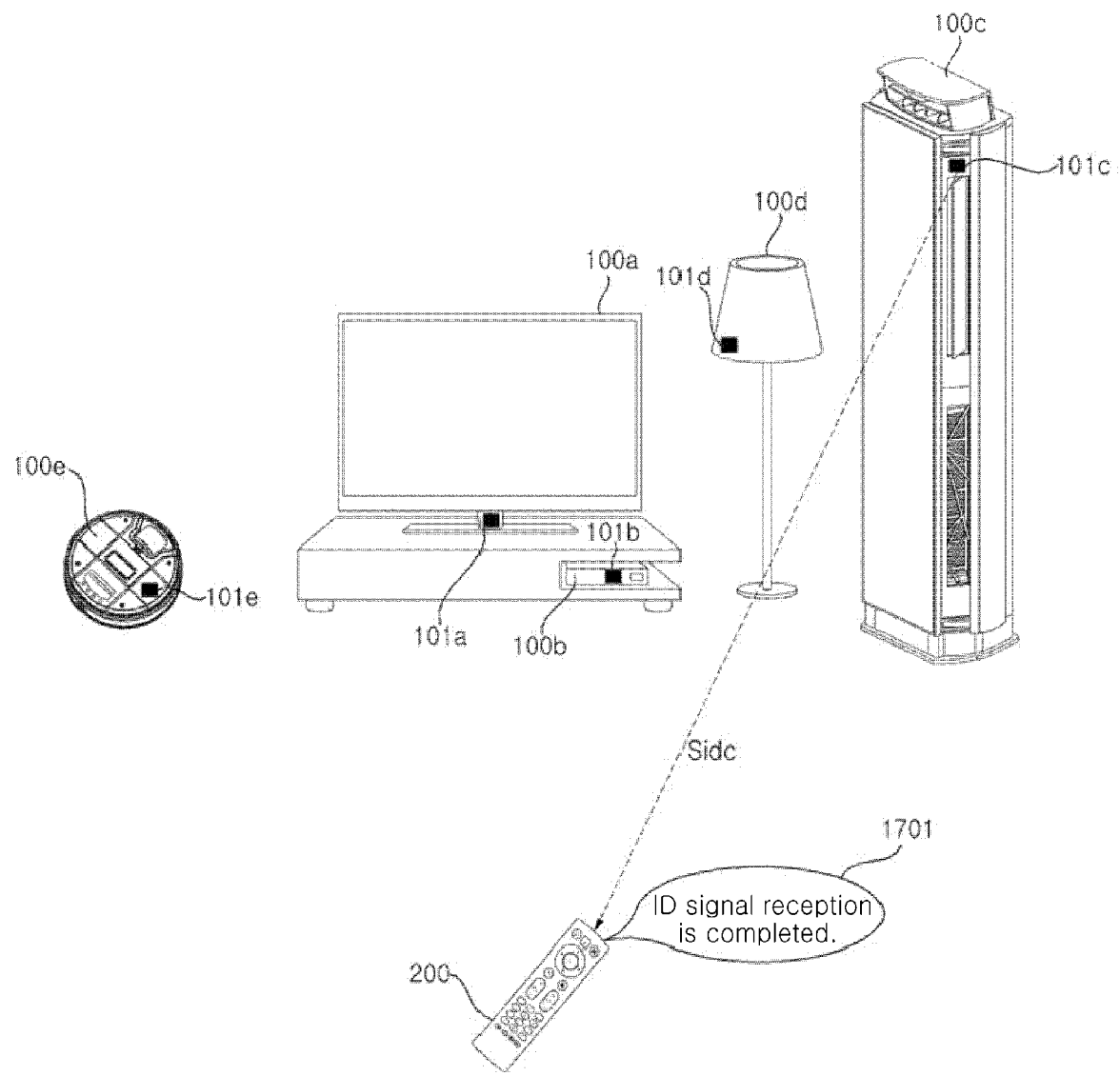

FIG. 24a illustrates output of an ID signal detection completion message 1701 as sound.

The processor 480 of the remote control apparatus 200 may confirm or identify a device on the basis of a detected device ID signal Sidc. Then, the processor 480 may control a control command to be matched to at least one of the multiple keys for remote control of the confirmed or identified device.

Further, the processor 480 of the remote control apparatus 200 may control a message 1702 indicating that a key is being set or will be set to be output.

FIG. 24b illustrates output of the message 1702 indicating that a key is being set or will be set as sound after detection of the device ID signal Sidc.

The processor 480 of the remote control apparatus 200 may control a message 1703 indicating that a device is controllable to be output when matching of a key to a control command for remote control of the device is completed, as illustrated in FIG. 24c. The figure illustrates output of the message 1703 indicating that the air-conditioner is controllable as sound.

Figure 24D:
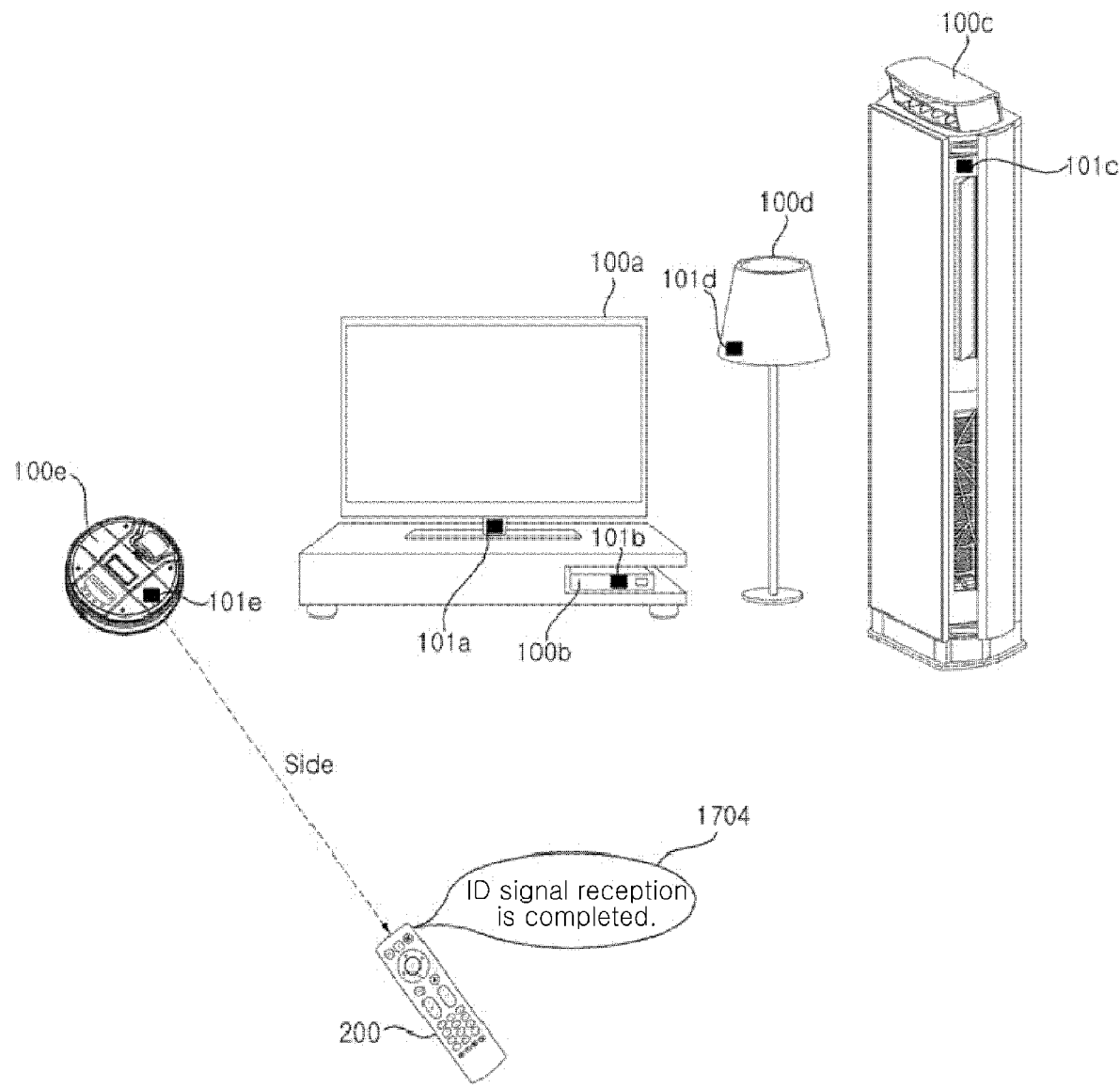

FIG. 24d illustrates output of the ID signal detection completion message 1704 as sound.

The processor 480 of the remote control apparatus 200 may perform device confirmation or identification on the basis of the detected device ID signal Side. In addition, the processor 480 may control a control command to be matched to at least one of the multiple keys for remote control of the confirmed or identified device.

The processor 480 of the remote control apparatus 200 may control the message 1702 indicating that a key is being set or will be set to be output.

FIG. 24e illustrates output of a message 1705 indicating that a key is being set or will be set as sound after detection of the device ID signal Side.

The processor 480 of the remote control apparatus 200 may control a message 1706 indicating that a device is controllable to be output, as shown in FIG. 24f, when a key has been matched to a control command for remote control of the corresponding device. In the figure, the message 1706 indicating that the robot cleaner is controllable is output as sound.

Further, the processor 480 may control multiple control commands to be matched to a first key among the multiple keys and controls a remote control signal corresponding to a control command from among the multiple control commands to be transmitted to a device depending on the number of selections of the first key, a first key selection time, a gesture when the first key is selected, or a user voice input when the first key is selected. This will be described with reference to FIGS. 25a to 25d.

Figure 25A:
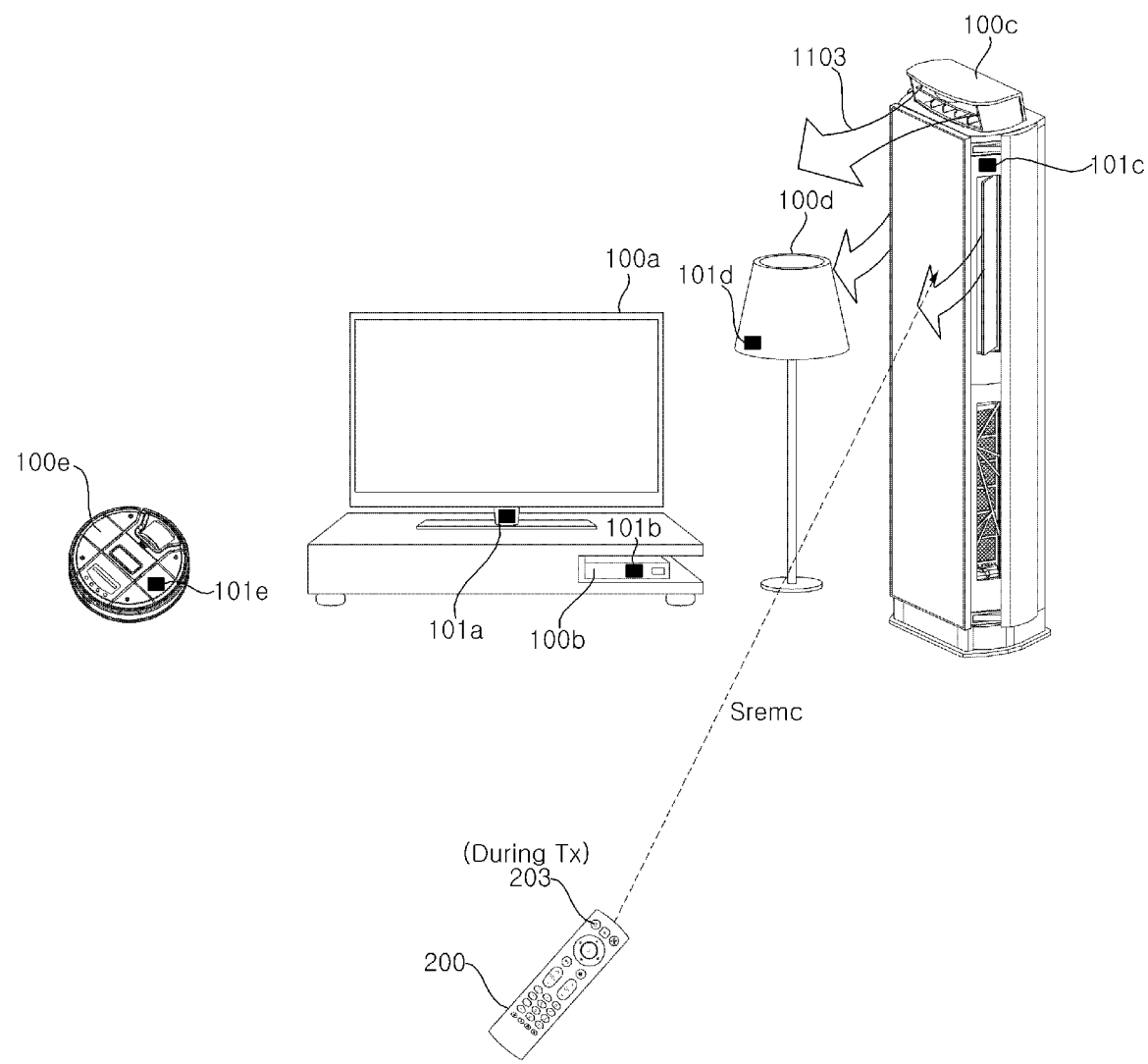

FIG. 25a illustrates a case in which the menu key 203 is matched to a blower strength setting command when the menu key 203 is pushed for a time Tx when the remote control apparatus 200 can remotely control the air-conditioner 100c, and blower strength is set in the air-conditioner 100c according to operation of the menu key 203. The figure shows that cold air 1103 corresponding to the set blower strength is output.

Figure 25B:
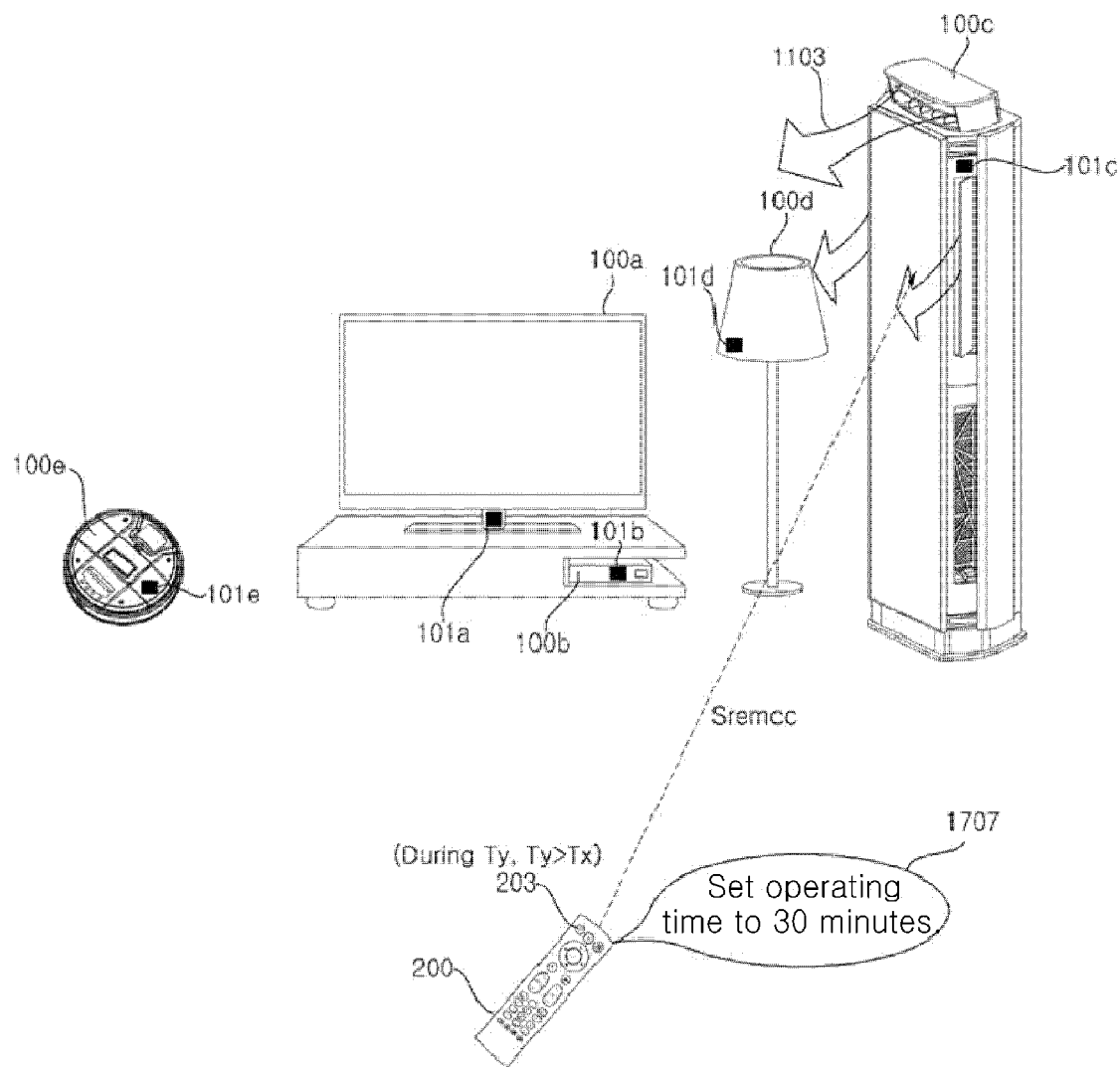

FIG. 25b illustrates a case in which the menu key 203 is matched to an operating time setting command when the menu key 203 is pushed for a time Ty longer than Tx when the remote control apparatus 200 can remotely control the air-conditioner 100c, and operating time is set in the air-conditioner 100c according to operation of the menu key 203.

The processor 480 of the remote control apparatus 200 may control the menu key 203 to be matched to the air-conditioner operating time setting command and control an operating time setting message 1707 to be output when the menu key 203 is pushed for a long time such as Ty.

Figure 25C:
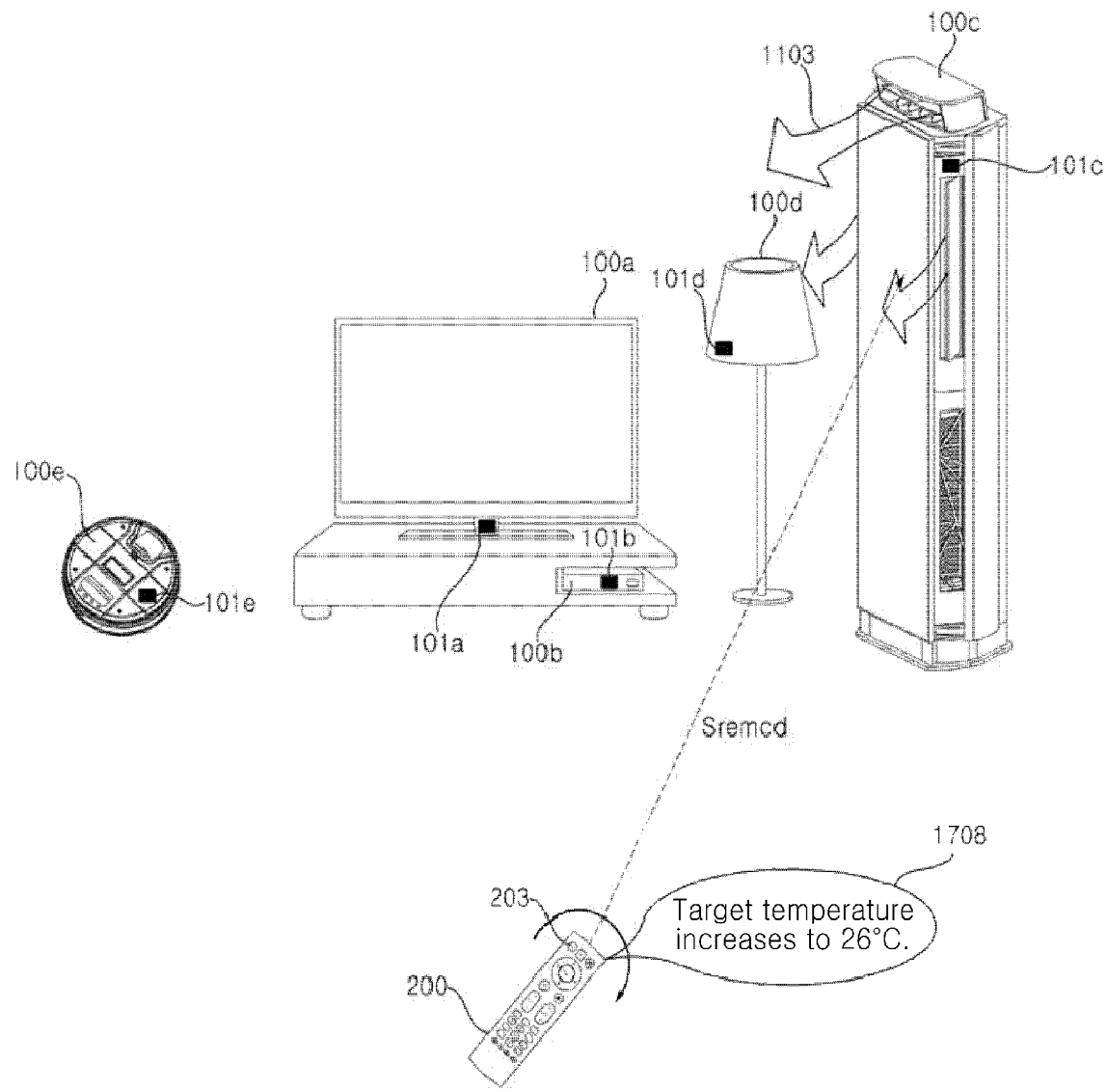

FIG. 25c illustrates a case in which the menu key 203 is operated and the remote control apparatus 200 is rotated clockwise when the remote control apparatus 200 can remotely control the air-conditioner 100c.

The processor 480 of the remote control apparatus 200 may extract a motion of the remote control apparatus 200 on the basis of the gyro sensor 441 or the acceleration sensor 443 and match a control command to the motion.

The figure shows that a control command corresponding to target temperature increase is matched to clockwise motion of the remote control apparatus 200.

The processor 480 of the remote control apparatus 200 may control the control command corresponding to target temperature increase to be matched to clockwise motion of the remote control apparatus 200 and control a target temperature increase message 1708 to be output as sound.

Figure 25D:
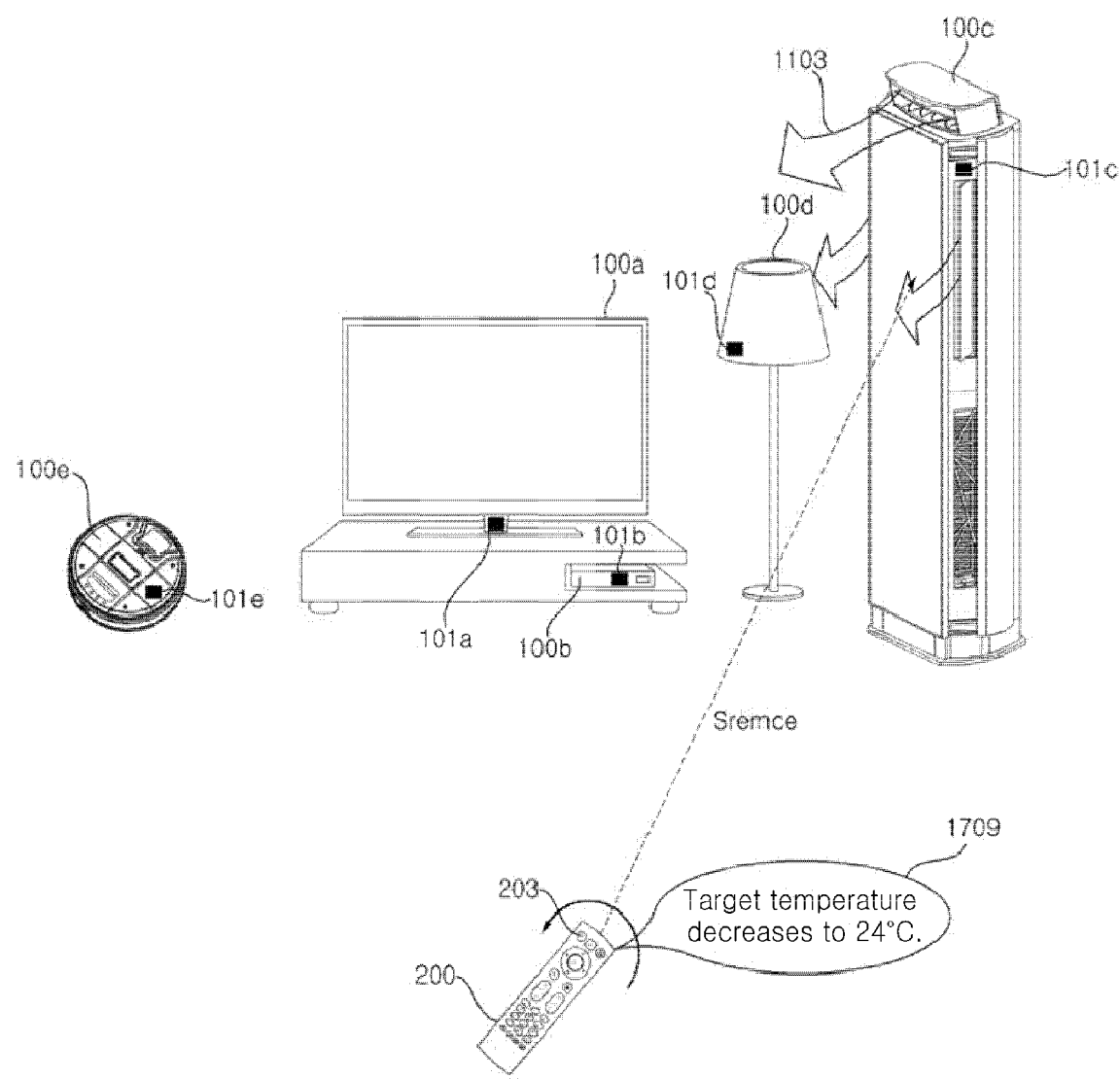

FIG. 25d illustrates a case in which a control command corresponding to target temperature decrease is matched to a counter clockwise motion of the remote control apparatus 200, distinguished from FIG. 25c.

The processor 480 of the remote control apparatus 200 may control the control command corresponding to target temperature decrease to be matched to a counter clockwise motion of the remote control apparatus 200 and control a target temperature decrease message 1709 to be output as sound.

Further, when the remote control apparatus 200 receives an ID signal Sid from the device 100, the processor 480 of the remote control apparatus 200 may control the remote control apparatus 200 to detect the ID signal Sid from one or more ID signals including the ID signal Sid and to output the ID signal detection completion message when detection of the ID signal Sid is completed.

Figure 26A:
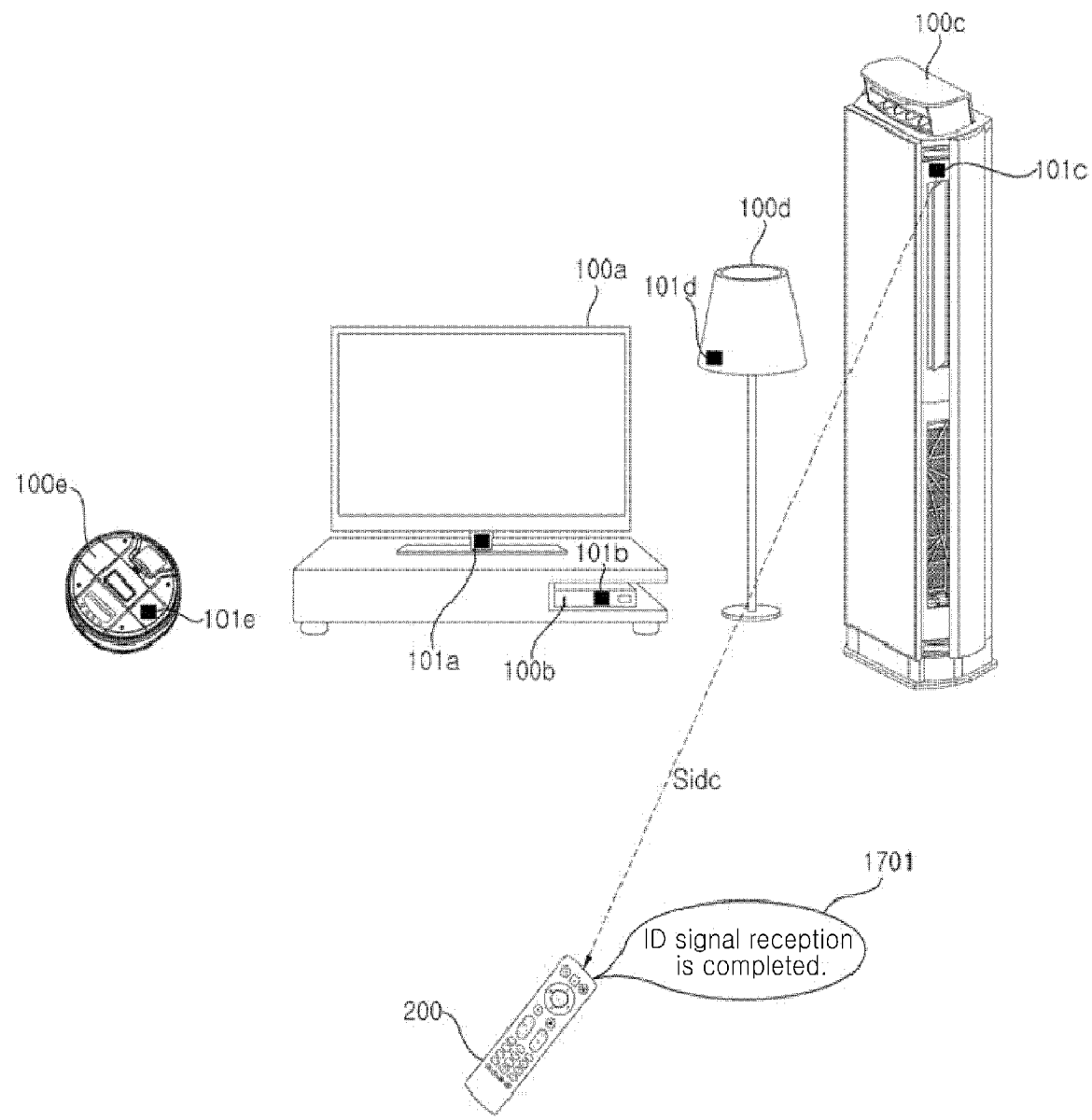

FIG. 26*a* illustrates output of the ID signal detection completion message 1701 as sound.

The remote control apparatus 200 may include the camera 495 for capturing images. The processor 480 may perform user authentication on the basis of an image captured by the camera 495 and control the remote control apparatus 200 to remotely control a device when user authentication has been successfully performed.

FIG. 26*b* illustrates a case in which the camera 495 of the remote control apparatus 200 is pointed at the face of a user 51.

The camera 495 may capture an image including a user face and the processor 480 may perform user authentication on the basis of the image captured by the camera 495.

For example, when user face images are stored in the memory 470, the processor 480 may perform user authentication by comparing the image captured by the camera 495 with user face image data stored in the memory 470.

FIG. 26*c* illustrates user authentication using the fingerprint recognition unit 499 of the remote control apparatus 200.

When the user 51 puts their finger 52 on the fingerprint recognition unit 499 of the remote control apparatus 200, the fingerprint recognition unit 499 can capture an image of the fingerprint of the finger 52.

The processor 480 may perform user authentication by comparing the captured fingerprint image data with fingerprint images stored in the memory 470.

The processor 480 of the remote control apparatus 200 may control a user authentication success message 1711 to be output as sound when user authentication has been successfully performed, as shown in FIG. 26*d*.

Figure 26E:
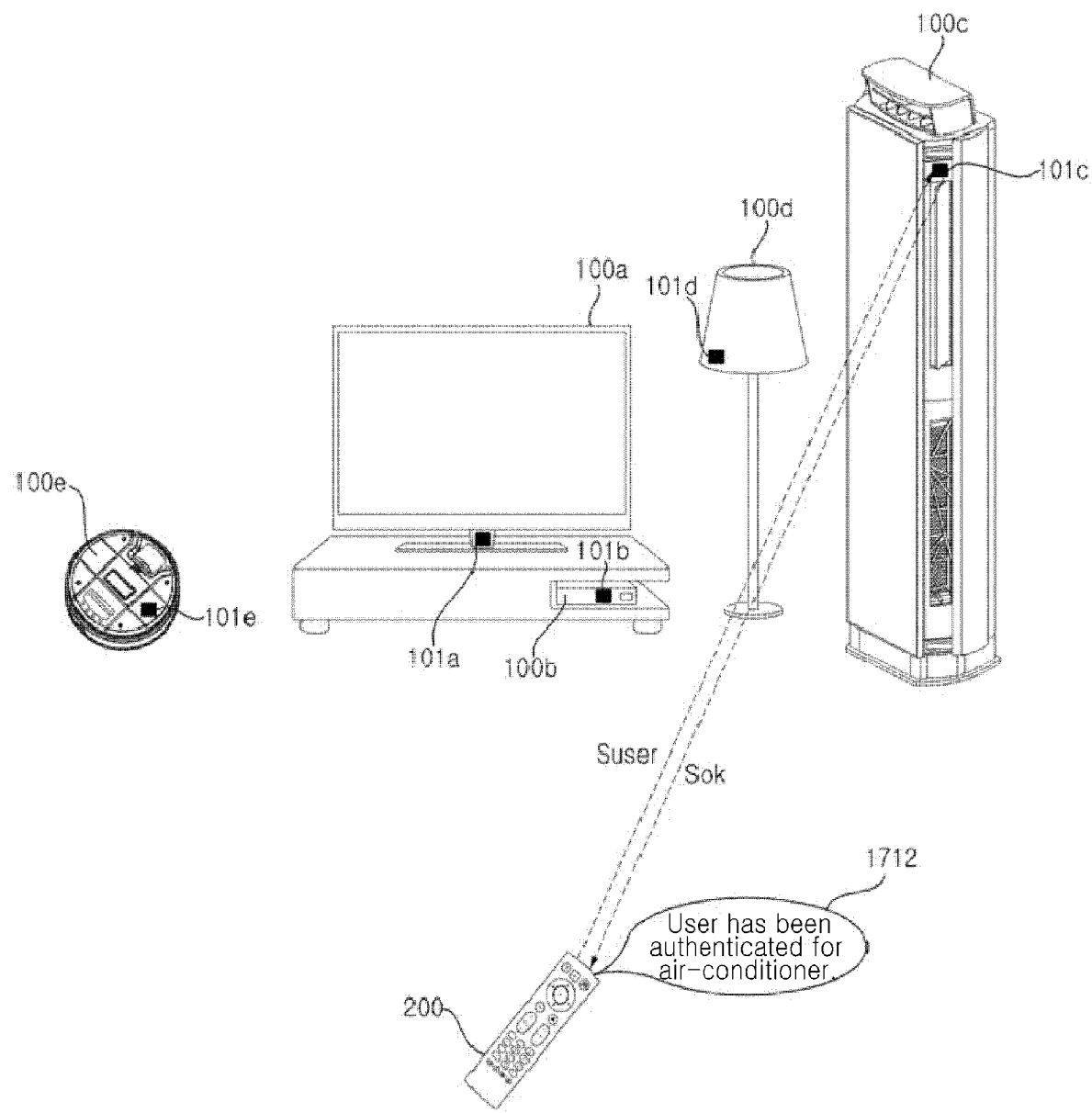

Alternatively, the processor 480 of the remote control apparatus 200 may extract user information on the basis of an image captured by the camera 495, control the user information Suser to be transmitted to the device 100*c* at which the remote control apparatus 200 is pointed, as shown in FIG. 26*e*, and when user authentication acknowledgement information Sok is received from the device 100*c*, control the device to be remotely controlled.

Particularly, the processor 480 of the remote control apparatus 200 may control an authentication completion message 1712 to be output as sound from the device when the user authentication acknowledgement information Sok is received from the device 100*c*.

The processor 480 of the remote control apparatus 200 may control the device to be remotely controllable when user authentication has been successfully performed and control a device control execution message 1713 for an authenticated user to be output, as shown in FIG. 26*f*.

For example, the processor 480 of the remote control apparatus 200 may control a key setting guidance message 1714 with respect to at least part of the multiple keys to be output, as shown in FIG. 26*g*.

Accordingly, the user can easily select a key corresponding to a desired operation.

Particularly, the processor 480 of the remote control apparatus 200 may set a customized operating key in response to user authentication, and thus user convenience can be improved.

The processor 480 may control the remote control apparatus 200 to enter a standby mode when key input is not applied for a predetermined time, and when the standby mode is ended, match at least one of the multiple keys to a control command for remote device control in order to remotely control the device at which the remote control apparatus 200 was pointed immediately before the remote control apparatus 200 enters the standby mode. This will be described with reference to FIGS. 27*a* to 27*e*.

Figure 27A:
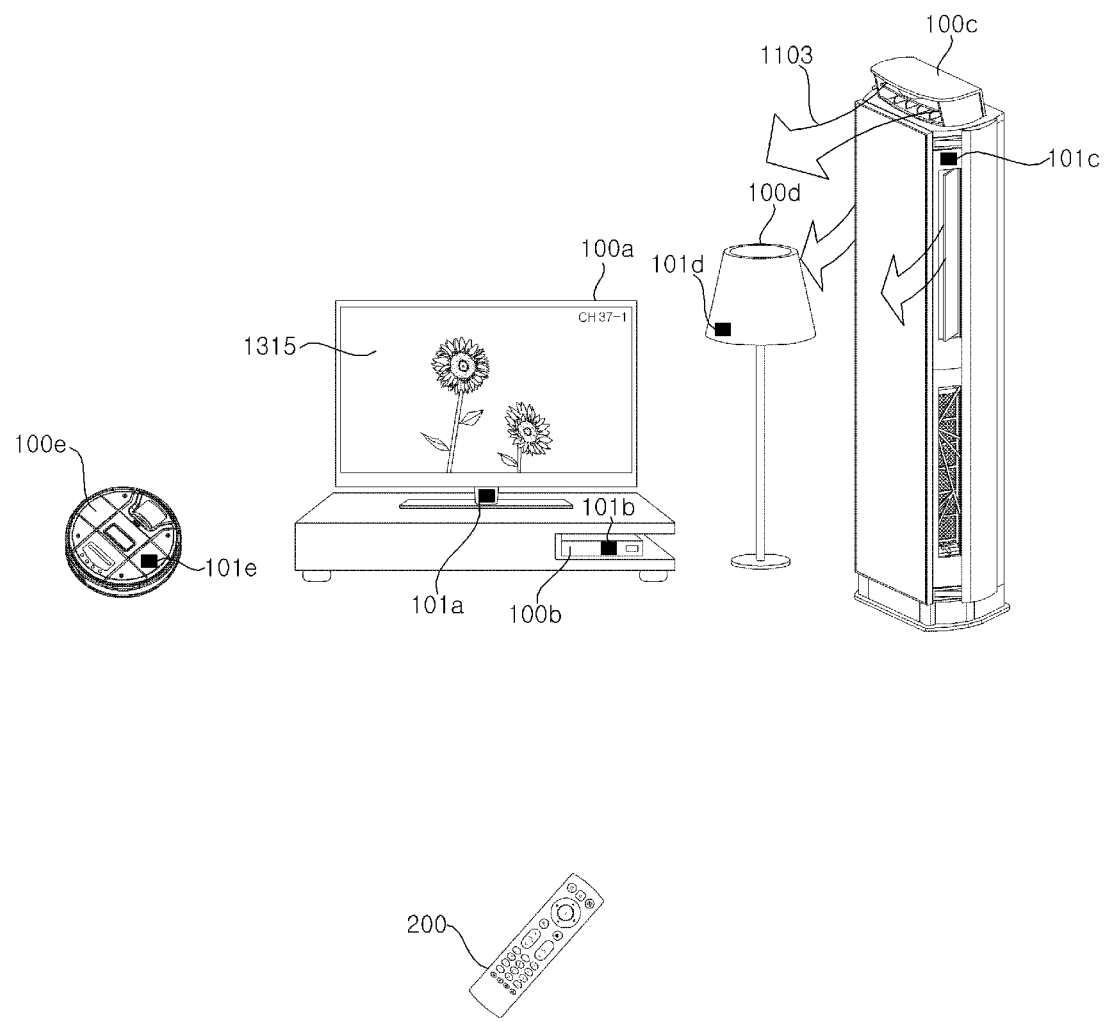

FIG. 27*a* illustrates a case in which the remote control apparatus 200 operates to control the air-conditioner 100*c*.

When the remote control apparatus 200 does not operate for a predetermined time, as shown in FIG. 27*b*, the processor 480 of the remote control apparatus 200 may limit power of each unit and control each unit to enter the standby mode. For example, the processor 480 may control only the sensor unit 440 and the wireless communication unit 420 to operate.

The processor 480 of the remote control apparatus 200 may control a message 1716 indicating entrance to the standby mode to be output as sound when the remote control apparatus 200 enters the standby mode.

When the remote control apparatus 200 is moved or a predetermined key is pressed in the standby mode, as shown in FIG. 27*c*, the processor 480 of the remote control apparatus 200 may control the standby mode to be ended.

The processor 480 of the remote control apparatus 200 may control a standby mode end message 1717 to be output as sound as shown in the figure.

Here, when the standby mode is ended, the processor 480 of the remote control apparatus 200 may control the remote control apparatus 200 to operate to control the air-conditioner 100*c* at which the remote control apparatus 200 was pointed immediately before the remote control apparatus 200 enters the standby mode.

The processor 480 of the remote control apparatus 200 may control the message 1717 indicating that the air-conditioner is controllable to be output as sound as shown in the figure.

Further, the processor 480 of the remote control apparatus 200 may initialize at least one of the multiple keys when the standby mode is ended. In addition, the processor 480 of the remote control apparatus 200 may control an initialization message 1718 to be output as sound, as shown in FIG. 27*d*.

Figure 27E:
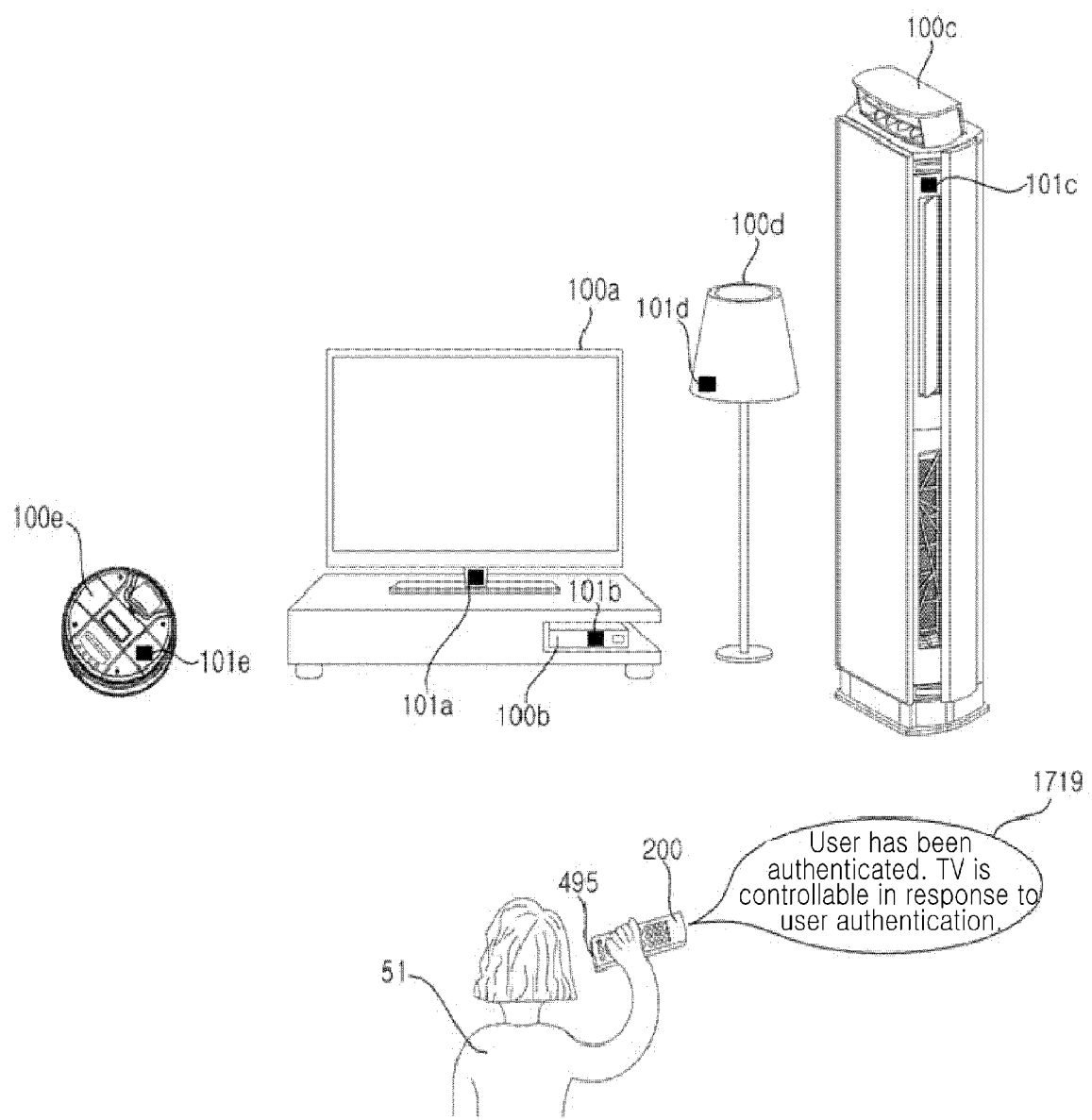

When the standby mode is ended, the processor 480 of the remote control apparatus 200 may control a device set by default to be remotely controlled in response to user authentication when user authentication through the camera 495 of the remote control apparatus 200 is performed, as shown in FIG. 27*e*. In addition, the processor 480 of the remote control apparatus 200 may control a message 1719 indicating that a device is controllable in response to user authentication to be output as sound, as shown in FIG. 27*e*.

Figure 28:
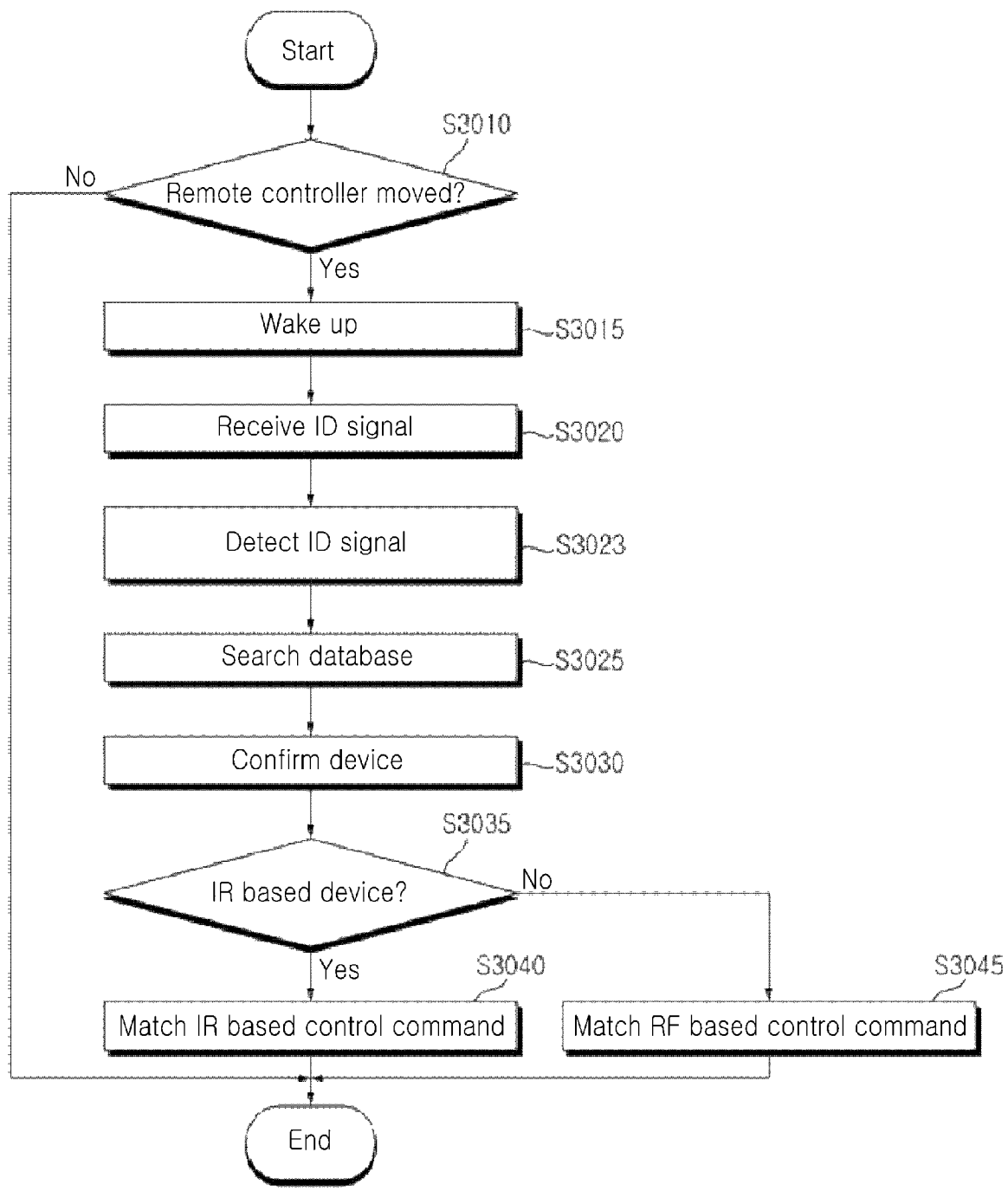
FIG. 28 is a flowchart illustrating an example of a remote control apparatus operation method according to another embodiment of the present invention.
Figure 29A:
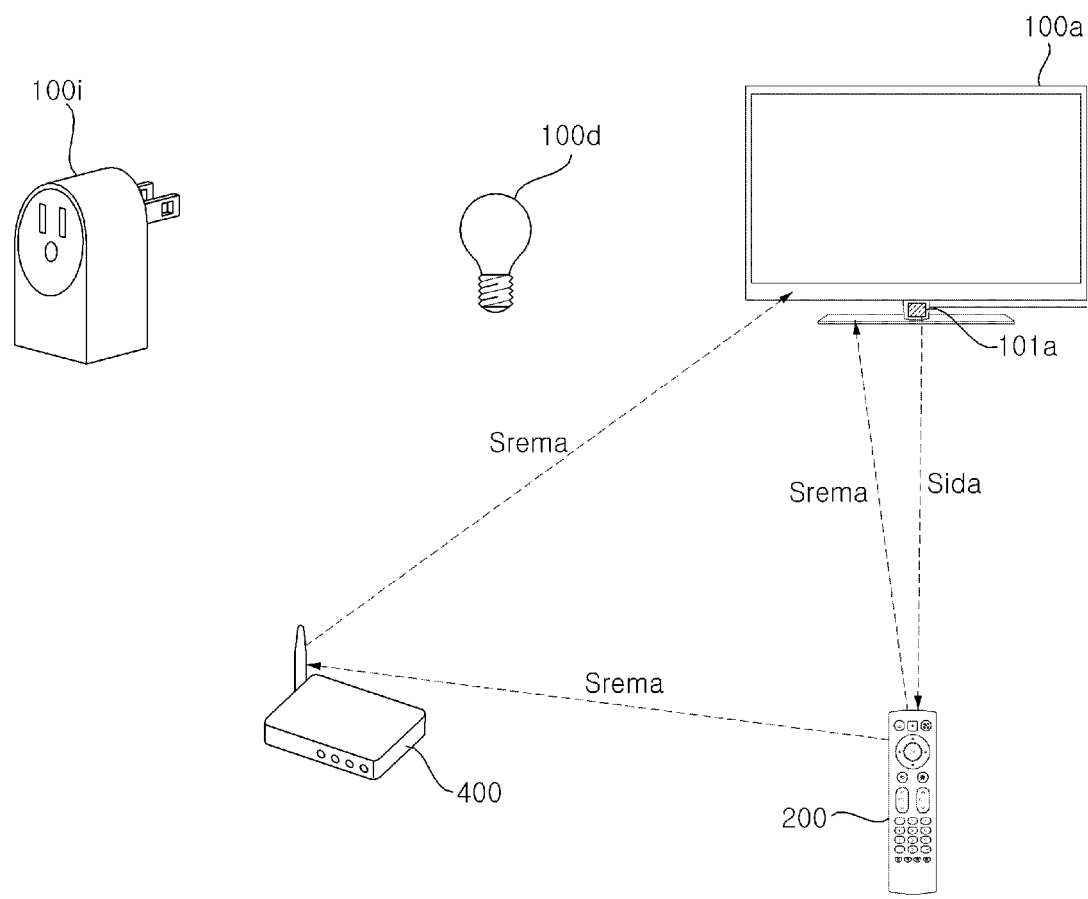
FIGS. 29a to 29c are diagrams referred to for description of the remote control apparatus operation method of FIG. 28.
Figure 29B:
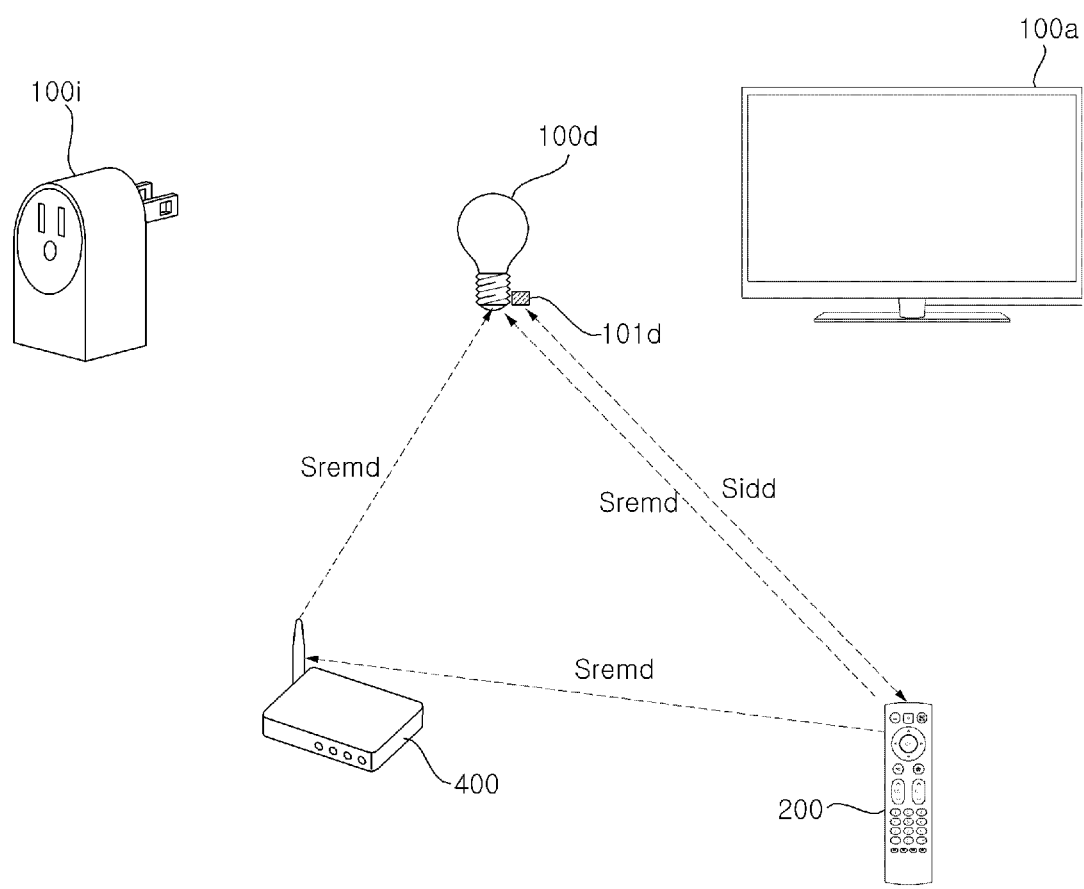
Figure 29C:
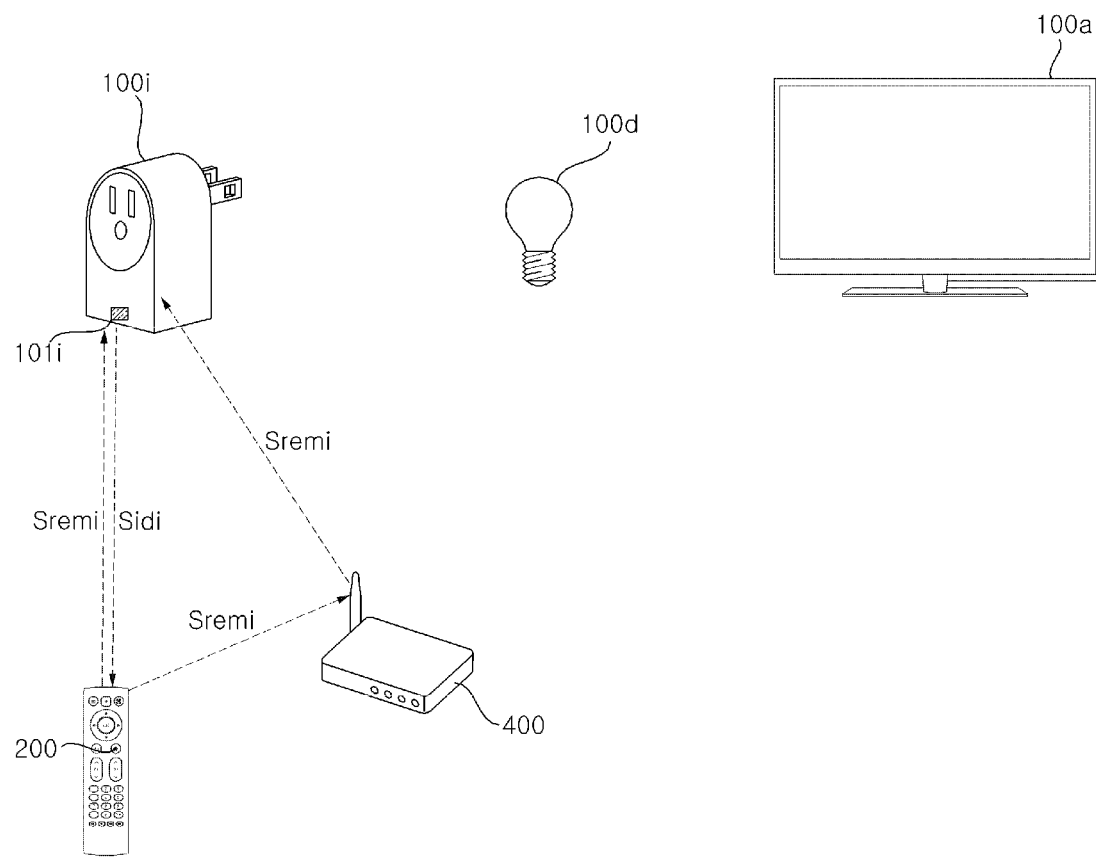

FIG. 28 is a flowchart illustrating an example of a remote control apparatus operation method according to another embodiment of the present invention and FIGS. 29*a* to 29*c* are diagrams referred to for description of the remote control apparatus operation method of FIG. 28.

FIG. 28 illustrates an operation of waking up the remote control apparatus 200 in a standby mode state to set a control command for the remote control apparatus which is pointed at a device.

Referring to FIG. 28, the processor 480 of the remote control apparatus 200 determines whether the remote control apparatus 200 is moved (S3010).

The processor 480 of the remote control apparatus 200 may determine whether the remote control apparatus 200 is moved on the basis of sensor information from the gyro sensor 441 or the acceleration sensor 443 in the sensor unit 440.

When the remote control apparatus 200 is moved, the processor 480 of the remote control apparatus 200 may control each unit of the remote control apparatus 200 to wake up (S3015). For example, the processor 480 may control each unit to be provided with power.

When the remote control apparatus 200 is pointed at a specific device, the receiver 423 of the remote control apparatus 200 receives an ID signal from the specific device 100 or the transmission device 101 corresponding to the device 100 (S3020).

Then, the processor 480 of the remote control apparatus 200 detects the ID signal from the device 100 or the transmission device 101 corresponding to the device from one or more received ID signals (S3023).

The processor 480 of the remote control apparatus 200 may search a database included in the memory 470 to compare the detected ID signal with data stored in the database (S3025). Then, the processor 480 may confirm or identify the device by comparing the received ID signal with prestored ID signal related data (S3030).

Further, the processor 480 may extract control command information, as described above, after device identification or confirmation. That is, the processor 480 may extract control command information from a device ID signal or receive a signal including the control command information from the device, the gateway 400 or the server 700 and extract the control command information from the signal.

The processor 480 of the remote control apparatus 200 determines whether the confirmed device is an IR based device (S3035) and, when the confirmed device is an IR base device, matches at least one of the multiple keys to an IR signal based control command (S3040).

When the confirmed device is not an IR based device, the processor 480 of the remote control apparatus 200 may extract control command information (S3043) and match at least one of the multiple keys to a control command based on a protocol signal other than IR signals on the basis of the extracted control command (S3045).

The signal other than IR signals may be any one of an RF signal, a Wi-Fi signal, a ZigBee signal, a Bluetooth signal and a laser signal.

FIGS. 29a to 29c illustrate the remote control apparatus 200, the image display device 100a which is an IR based device, a smart plug 100i and a smart lamp 100d which are devices based on signals other than IR signals, and the gateway 400.

FIG. 29a illustrates a case in which the remote control apparatus 200 is pointed at the image display device 100a.

The processor 480 of the remote control apparatus 200 may identify the device on the basis of the ID signal Sida from the transmission device 101a corresponding to the image display device 100a.

The processor 480 of the remote control apparatus 200 may match at least one of the multiple keys to an IR signal based control command. Accordingly, an IR based remote control signal Srema can be output when a key matched to the control command is selected.

In addition, the processor 480 of the remote control apparatus 200 may request device control command related information from the gateway 400 after device identification and receive the device control command related information from the gateway 400.

The remote control signal Sream from the remote control apparatus 200 may be directly transmitted to the image display device 100a or transmitted to the image display device 100a via the gateway 400.

When the remote control apparatus 200 is pointed at the smart lamp 100d or the smart plug 100i, as shown in FIG. 29b or 29c, the processor 480 of the remote control apparatus 200 may match at least one of the multiple keys to a control command based on a signal other than IR signals on the basis of a received ID signal Sidd or Sidi.

The processor 480 of the remote control apparatus 200 may request device control command related information from the gateway 400 after device identification and receive the device control command related information from the gateway 400.

In addition, the processor 480 of the remote control apparatus 200 may match at least one of the multiple keys to a control command based on a signal other than IR signals on the basis of the received control command information.

Accordingly, a remote control signal Sremd or Sremi based on a signal other than IR signals can be output when a key matched to the control command is selected. Particularly, the output remote control signal Sremd or Sremi based on a signal other than IR signals may be transmitted to the smart lamp 100d or the smart plug 100i via the gateway 400.

FIG. 30 is a flowchart illustrating an example of a remote control apparatus operation method according to another embodiment of the present invention.

Referring to FIG. 30, the processor 480 of the remote control apparatus 200 may identify a device on the basis of a received ID signal (S3310).

The processor 480 of the remote control apparatus 200 determines whether a control command for the identified device is stored in the memory 470 (S3315). When the control command for the identified device is stored in the memory 470, the processor 480 may match the control command to at least one of the multiple keys on the basis of the control command stored in the memory 470.

When the control command for the identified device is not stored in the memory 470, the processor 480 of the remote control apparatus 200 may control a device control command request to be transmitted (S3320).

The gateway 400 may receive the device control command request (S3325) and transmit the device control command request to the server 700 through the network 550 (S3330).

Here, when the device is an IR based device, the device control command request can be transmitted to a server related to IR based devices.

When the device is an RF based device, the device control command request can be transmitted to a server related to RF based devices.

When the device is a smart device, the device control command request can be transmitted to a server related to smart devices.

The gateway 400 may receive a device control command from the server 700 (S3335). In addition, the gateway 400 may update the device control command (S3040). That is, the device control command may be stored in the server 700.

Further, the gateway 400 may transmit the device control command (S3345).

The remote control apparatus 200 may receive the device control command from the gateway 400 (S3350). In addition, the remote control apparatus 200 may update the device control command (S3340). That is, the device control command may be stored in the memory 470 of the remote control apparatus 200.

Alternatively, the remote control apparatus 200 may receive the device control command from the gateway 400 and directly match the device control command to at least one of the multiple keys as an update method.

The remote control apparatus and the operation method of the image display device including the same of the present invention may be implemented as code that can be written to a processor-readable recording medium and can thus be read by a processor. The processor-readable recording medium may be any type of recording device in which data can be stored in a processor-readable manner. Examples of the processor-readable recording medium include a ROM, a RAM, a CD-ROM, a magnetic tape, a floppy disk, optical data storage, and a carrier wave, e.g., data transmission over the Internet. Furthermore, as the processor-readable recording medium is distributed to a computer system connected via a network, processor-readable code may be saved and executed in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A remote control apparatus comprising:
a key input unit including multiple keys;
a transmitter for transmitting an output signal;
a receiver for receiving a device identification signal from a passive transmission device including a reflection member for reflecting the output signal without an additional power supply, wherein the passive transmission device corresponding to a remotely controllable device;
a processor for detecting an identification signal of the remotely controllable device from the received device identification signal, extracting information on a control command for remote control of the remotely controllable device based on the detected identification signal, and matching at least one of multiple keys of the remote control apparatus to the control command for remote control of the remotely controllable device based on the extracted information on the control command,
wherein the transmitter transmits a signal corresponding to the control command when the at least one of the multiple keys matched to the control command is selected,
wherein the passive transmission device includes a different reflection pattern member from passive transmission devices of other remotely controllable devices, and
wherein when a multi-device operation key included in the key input unit is operated when at least one of the multiple keys has been matched to the control command for remote control of a first remotely controllable device, the processor controls a first remote control signal for remote control of the first remotely controllable device and a second remote control signal for remote control of a second remotely controllable device to be transmitted to the first remotely controllable device, and the first remotely controllable device transmits the second remote control signal to the second remotely controllable device.

2. The remote control apparatus according to claim 1, wherein the identification signal includes an infrared (IR) identification signal, and
wherein, when the receiver receives the IR identification signal, the processor controls a camera to capture an IR image from the received IR identification signal.

3. The remote control apparatus according to claim 2, wherein the processor detects an IR pattern positioned at a center of the captured IR image as a representative IR pattern based on the captured IR image and identifies the remotely controllable device based on the detected representative IR pattern.

4. The remote control apparatus according to claim 2, wherein, when the receiver receives a level variable or duty variable IR identification signal, the processor detects a level variable or duty variable IR pattern based on multiple captured IR images and identifies the remotely controllable device based on the detected IR pattern.

5. The remote control apparatus according to claim 2, wherein the transmitter transmits an IR output signal to the passive transmission device, and the receiver detects an IR pattern, reflected by an IR reflection pattern formed in the passive transmission device, in the captured IR image and identifies the remotely controllable device based on the detected IR pattern.

6. The remote control apparatus according to claim 2, wherein the processor detects an IR pattern included in the captured IR image and emitted from the passive transmission device and identifies the remotely controllable device based the detected IR pattern.

7. The remote control apparatus according to claim 1, wherein when the identification signal corresponds to a first identification signal, the processor matches at least one of the multiple keys to a control command for remote control of a first remotely controllable device based on the detected first identification signal, and when the identification signal corresponds to a second identification signal, the processor matches at least one of the multiple keys to a control command for remote control of a second remotely controllable device based on the detected second identification signal.

8. The remote control apparatus according to claim 1, further comprising a microphone for acquiring a user voice,
wherein, when the user voice is acquired through the microphone within a predetermined time upon completion of identification of the remotely controllable device or completion of matching of the control command for remote control of the remotely controllable device, the processor controls a remote control signal corresponding to the user voice to be transmitted to the remotely controllable device.

9. The remote control apparatus according to claim 7, wherein, when a multi-device operation key included in the key input unit is operated when at least one of the multiple keys has been matched to the control command for remote control of the first remotely controllable device, the processor controls a first remote control signal for remote control of the first remotely controllable device and a second remote control signal for remote control of the second remotely controllable device to be transmitted.

10. The remote control apparatus according to claim 7, further comprising an audio output unit,
wherein the processor controls the audio output unit to output a first sound representing remote control of the first remotely controllable device upon detection of the first identification signal and controls the audio output unit to output a second sound representing remote control of the second remotely controllable device upon detection of the second identification signal.

11. The remote control apparatus according to claim 1, further comprising a microphone for acquiring a user voice, wherein the processor performs signal processing on the acquired user voice to extract device information included in the voice and matches at least one of the multiple keys to a control command for remote control of a corresponding remotely controllable device corresponding to the extracted device information.

12. The remote control apparatus according to claim 1, wherein the device identification signal is one of an infrared signal, a radio frequency (RF) signal, a Wi-Fi signal, a ZigBee signal, a Bluetooth signal, a laser signal and an Ultra-Wideband (UWB) signal, and the signal corresponding to the control command is one of an infrared signal, an RF signal, a Wi-Fi signal, a ZigBee signal, a Bluetooth signal, a laser signal and a UWB signal.

13. The remote control apparatus according to claim 1, wherein the processor extracts information related to a device control command from the device identification signal and matches at least one of the multiple keys to the control command for remote control of the remotely controllable device based on the information related to the device control command.

14. The remote control apparatus according to claim 1, wherein the processor receives information on a device control command for controlling the remotely controllable device from the remotely controllable device or the transmission device corresponding to the remotely controllable device and matches at least one of the multiple keys to the control command for remote control of the remotely controllable device based on the received information on the device control command.

15. The remote control apparatus according to claim 14, wherein the processor identifies the remotely controllable device based on the detected device identification signal, transmits information on the identified device to the remotely controllable device or the transmission device corresponding to the remotely controllable device, receives information on a device control command for controlling the remotely controllable device from the remotely controllable device or the transmission device corresponding to the remotely controllable device, and matches at least one of the multiple keys to the control command for remote control of the remotely controllable device based on the received information on the device control command.

16. The remote control apparatus according to claim 14, wherein the processor transmits a device control command request to the remotely controllable device or the transmission device corresponding to the remotely controllable device, and then receives information on a device control command for controlling the remotely controllable device from the remotely controllable device or the transmission device corresponding to the remotely controllable device and matches at least one of the multiple keys to the control command for remote control of the remotely controllable device based on the received information on the device control command.

17. The remote control apparatus according to claim 1, wherein the processor identifies the remotely controllable device based on the detected device identification signal, transmits information on the identified device to a gateway or a server, receives information on a device control command for controlling the remotely controllable device from the gateway or the server and matches at least one of the multiple keys to the control command for remote control of the remotely controllable device based on the received information on the device control command.

18. The remote control apparatus according to claim 1, wherein the processor transmits a device control command request to the gateway or the server, receives information on a device control command for controlling the remotely controllable device from the gateway or the server and matches at least one of the multiple keys to the control command for remote control of the remotely controllable device based on the received information on the device control command.

19. The remote control apparatus according to claim 1, wherein the processor receives information on a device control command for remote control of at least one remotely controllable device from the gateway or the server based on control command profile information stored in a memory.

20. The remote control apparatus according to claim 1, further comprising at least one of:
  a camera for capturing images; and
  a fingerprint recognition unit,
  wherein the processor performs user authentication based on an image captured through the camera or the fingerprint recognition unit and controls the remotely controllable device to be remotely controlled when user authentication has been successfully performed.

21. The remote control apparatus according to claim 1, wherein the processor controls multiple control commands to be matched to a first key among the multiple keys and controls a remote control signal corresponding to a relevant control command from among the multiple control commands to be transmitted to the remotely controllable device depending on a number of selections of the first key, a first key selection time, a gesture when the first key is selected, or a user voice input when the first key is selected.

* * * * *